United States Patent [19]

Kato

[11] Patent Number: 5,809,512

[45] Date of Patent: Sep. 15, 1998

[54] INFORMATION PROVIDER APPARATUS ENABLING SELECTIVE PLAYING OF MULTIMEDIA INFORMATION BY INTERACTIVE INPUT BASED ON DISPLAYED HYPERTEXT INFORMATION

[75] Inventor: Masao Kato, Yokohama, Japan

[73] Assignee: Matsushita Electric Industrial Co., Ltd., Osaka, Japan

[21] Appl. No.: 681,420

[22] Filed: Jul. 23, 1996

[30] Foreign Application Priority Data

Jul. 28, 1995 [JP] Japan .................................. 7-193257
May 30, 1996 [JP] Japan .................................. 8-137286

[51] Int. Cl.$^6$ ...................................................... G06T 1/00
[52] U.S. Cl. .......................................... 707/502; 345/302
[58] Field of Search ................................ 345/302, 473–4; 707/501

[56] References Cited

U.S. PATENT DOCUMENTS

| | | | |
|---|---|---|---|
| 5,553,222 | 9/1996 | Milne et al. | 345/302 |
| 5,608,859 | 3/1997 | Taguchi | 345/302 |
| 5,659,793 | 8/1997 | Escobar et al. | 345/302 |
| 5,701,451 | 12/1997 | Rogers et al. | 1/1 |

FOREIGN PATENT DOCUMENTS

| | | |
|---|---|---|
| 425907 | 1/1992 | Japan . |
| 5274326 | 10/1993 | Japan . |

OTHER PUBLICATIONS

Behavior Research Methods, Instruments & Computers, vol. 27, No. 2, 1 Jan. 1995, pp. 200–205, XP000567305, Chu J Y M et al: "Creating a Hypertext Markup Language Document for an Information Server".

Scaling New Heights in Technical Communication, Banff, Sep. 28–Oct. 1, 1994, 28 Sep. 1994, Institute of Electrical and Electronics Engineers, pp. 192–197, XP000510688, Lau T: "Building a Hypermedia Information System on the Internet".

Computer Communications, vol. 15, No. 10, 1 Dec. 1992, pp. 611–618, XP000321682, Blakowski G et al: "Tool Support for the Syschronization and Presentation of Distributed Multimedia".

Systems & Computers in Japan, vol. 25, No. 12, 1 Nov. 1994, pp. 1–11, XP000499036, Kazutoshi Fujikawa et al: "Synchronization Mechanism Among Multimedia Information on the Distributed Hypermedia System Harmony".

IEEE Multimedia, vol. 1, No. 1, 21 Mar. 1994, pp. 47–59, XP000440888, Furht B: "Multimedia Systems: An Overview".

"Teach Yourself More Web Publishing with NTML in a Week" by Laura Lemay; Dec. 15, 1995; pp. 105–107 (w/partial English translation).

Primary Examiner—Joseph H. Feild
Assistant Examiner—Ja-Hee Choi
Attorney, Agent, or Firm—Lowe Hauptman Gopstein Gilman & Berner

[57] ABSTRACT

An information provider apparatus, enabling a user to employ hyperlink selection from a displayed hypertext data page to obtain and play the contents of specific sets of multimedia data which are held in a data storage device, executes control of playing of a set based upon elapsed frame numbers of a video clip which forms part of the set, in conjunction with scenario data which have been predetermined for the set. The apparatus can be used in a network in which users of various client terminals can access multimedia data stored at a server computer, or can exchange electronic mail items each consisting of a set of multimedia data in conjunction with corresponding scenario data, or can post messages on a "notice board" hypertext page at the server computer, each message consisting of a set of multimedia data and corresponding scenario data, with other users of the network being able to access the posted messages by browsing selection.

74 Claims, 103 Drawing Sheets

FIG. 4

Playing control table of information browsing section

203

| File extension | Data type | Player program |
|---|---|---|
| .html | HTML (hypertext) | — |
| .gif | GIF (still picture) | xv |
| .mpeg | MPEG (video) | mpeg-play |
| .ref | HV (scenario reference) | HV-ref-play |

FIG. 11

Playing control table of information browsing section

303

| File extension | Data type | Player program |
|---|---|---|
| .html | HTML (hypertext) | |
| .gif | GIF (still picture) | xv |
| .mpeg | MPEG (video) | mpeg-play |
| .sci | HV (scenario) | HV-sci-play |

FIG. 15

Playing control table of information browsing section

403

| File extension | Data type | Player program |
|---|---|---|
| .html | HTML (hypertext) | — |
| .gif | GIF (still picture) | xv |
| .mpeg | MPEG (video) | mpeg-play |
| .tit | HV title (hypervideo) | HV-tit-play |

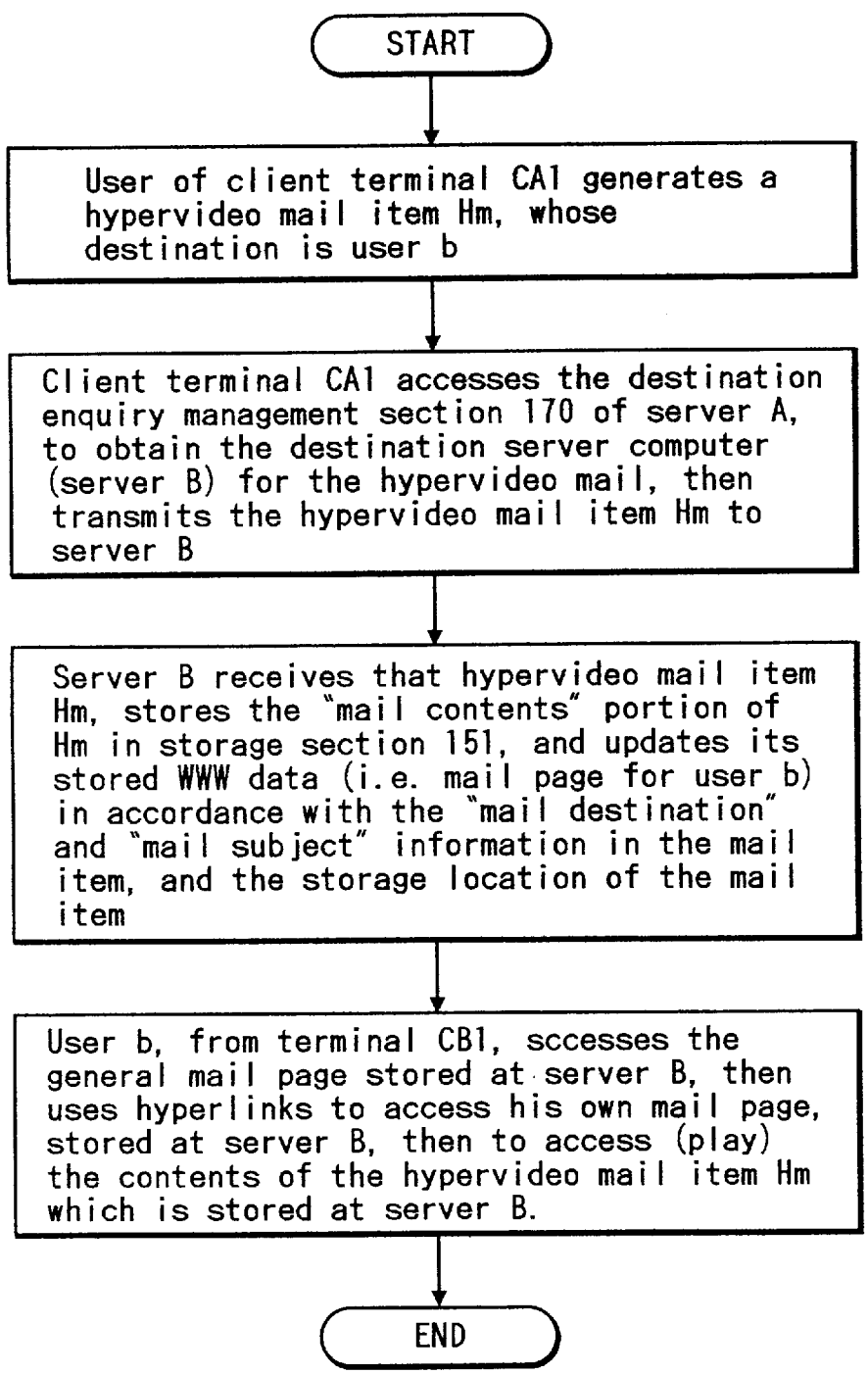

FIG. 67 PRIOR ART

```
sample.html
1   <HTML>
2   <HEAD>
3   <TITLE> sample page </TITLE>
4   </HEAD>
5
6   <BODY>
7   <H1> sample page </H1>
8
9   <A HREF = "pics.html"> link to hypertext data page </A>
10  <P>
11
12  <A HREF = "movs.mpeg"> link to video data </A>
13  <P>
14
15  </BODY>
16  </HTML>
17
```

FIG. 68
PRIOR ART

Playing control table of information browsing section

24

| File extension | Data type | Player program |
|---|---|---|
| .html | HTML (hypertext) | — |
| .gif | GIF (still picture) | xv |
| .mpeg | MPEG (video) | mpeg-play |

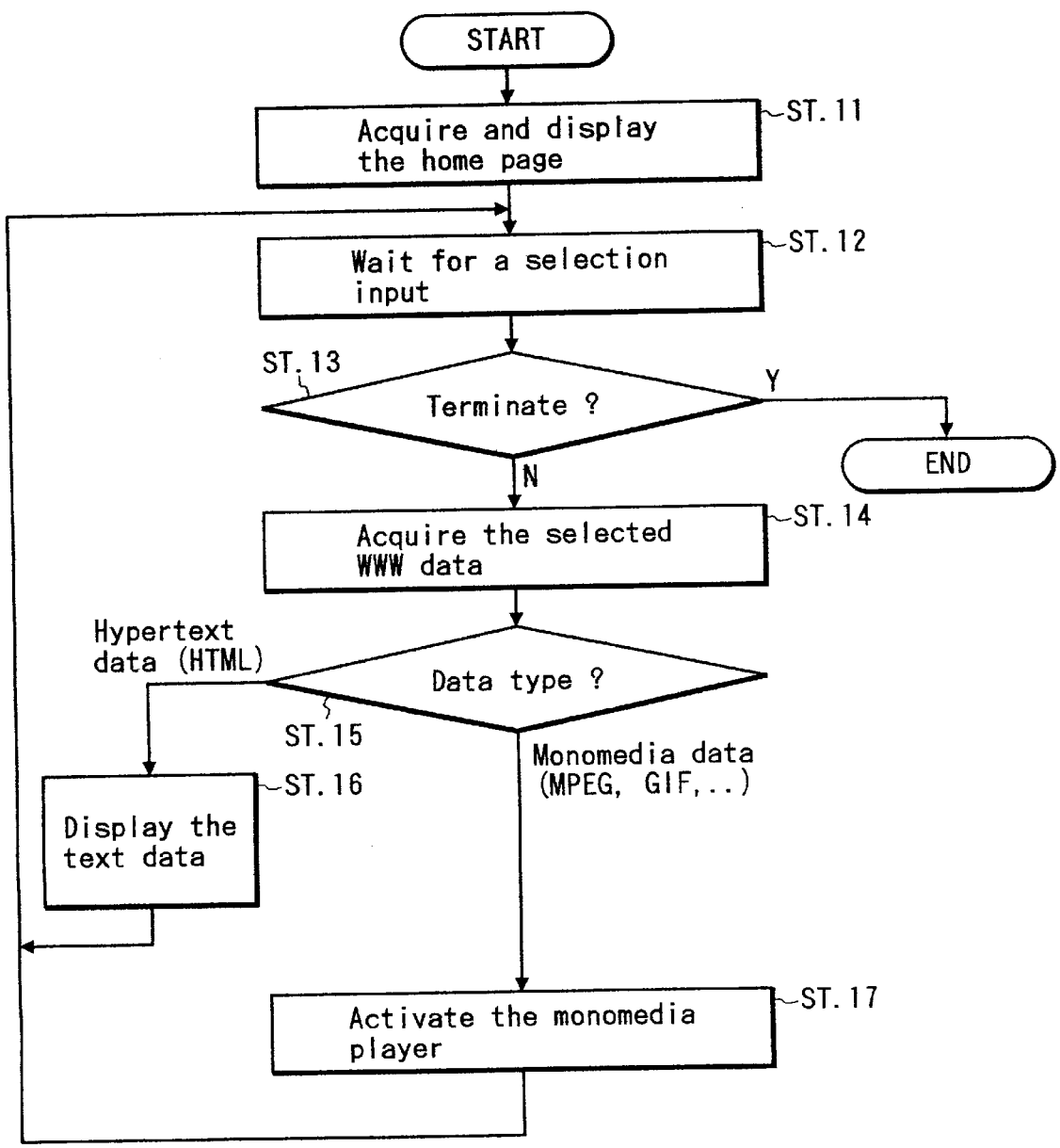

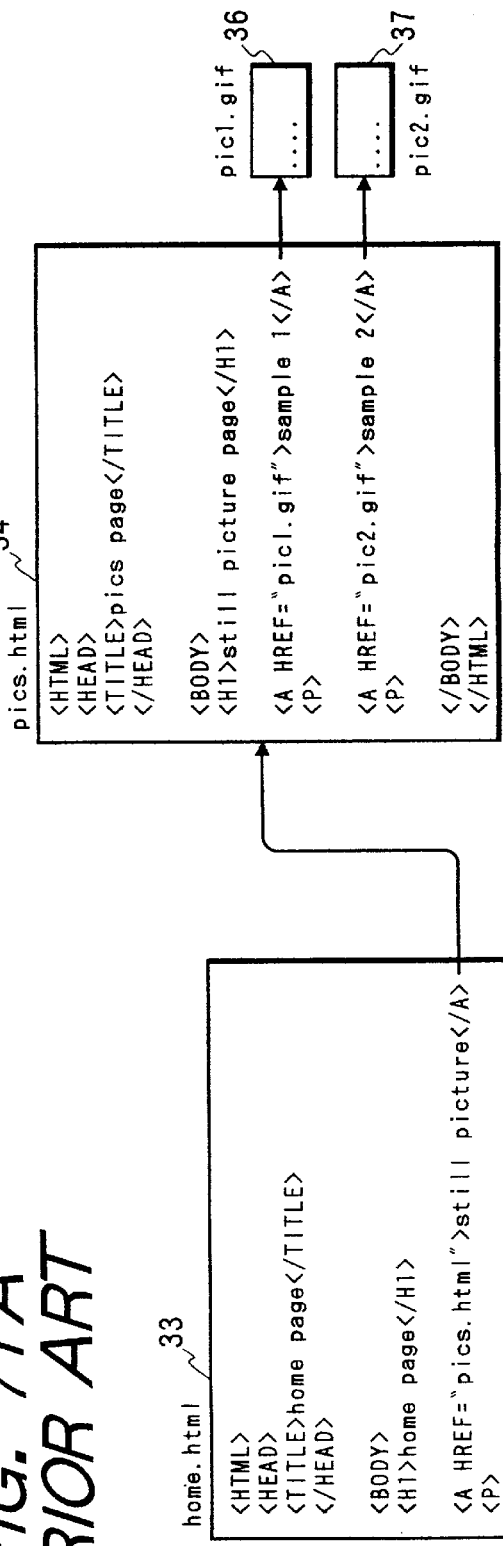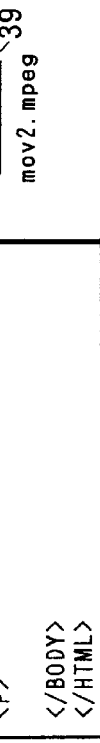
FIG. 71A PRIOR ART
FIG. 71B

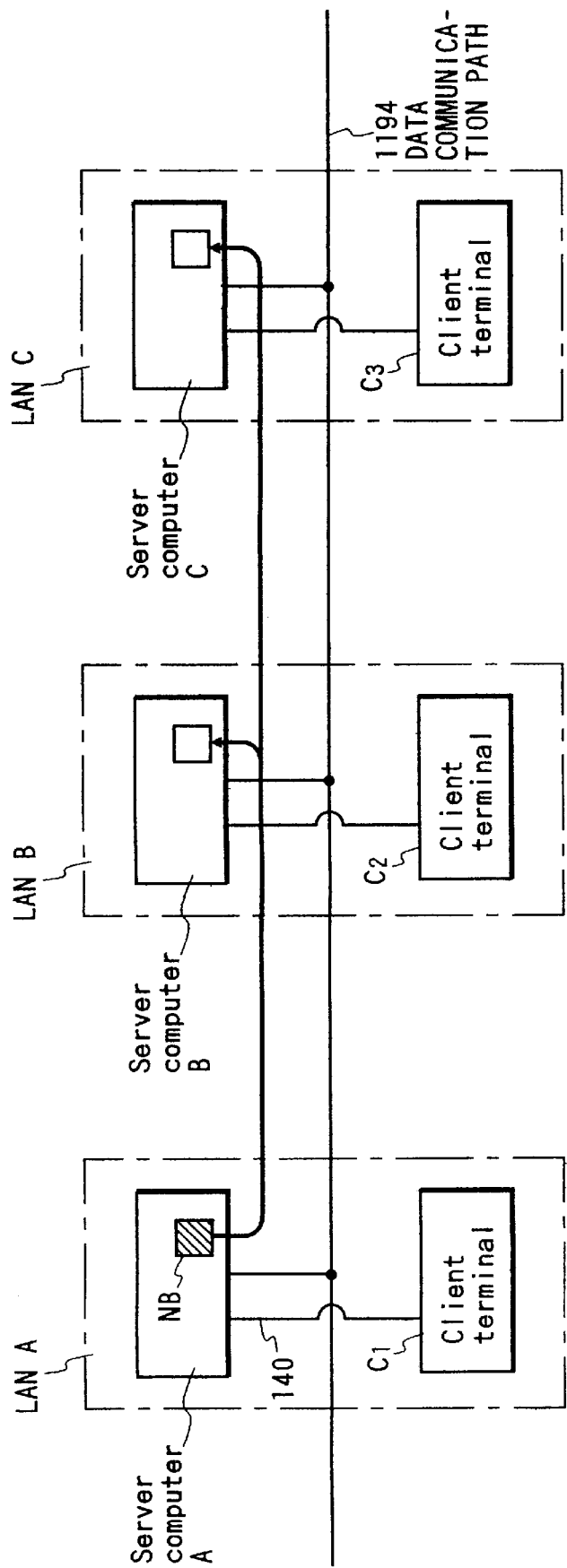

FIG. 78A (Within server computer A)

| Name of noticeboard which is subject to distribution | Name of server computers to which noticeboard is distributed |
|---|---|
| "New Products Guide" | B, C |
| ........................ | ............... |
| ........................ | ............... |

FIG. 78B (Within server computer B)

| Name of noticeboard which is subject to distribution | Names of server computers to which noticeboard is distributed |
|---|---|
| "New Products Guide" | A, C |
| ........................ | ............... |
| ........................ | ............... |

FIG. 78C (Within server computer C)

| Name of noticeboard which is subject to distribution | Names of server computers to which noticeboard is distributed |
|---|---|
| "New Products Guide" | A, B |
| ........................ | ............... |
| ........................ | ............... |

FIG. 84

| Notice board name | "New Products Guide" |
|---|---|
| Message theme | "29-inch Wide-Screen TV" |
| List of stored files | |

2801

A:/HV/new/29tv.sci

A:/HV/new/29tv.mpeg

A:/HV/new/29tv.gif

A:/HV/new/29tv.text

FIG. 89

| Program that is scheduled to be executed | Scheduled time of execution |
|---|---|
| Processing for acquiring message files | 21:00 |
| Processing for xxxxx | Once every 15 minutes, Monday to Friday |

Example of firewall setting

| Path | Protocol | Connection possible/impossible |
|---|---|---|
| Server B ↔ exterior of domain | SMTP | Possible |
| | FTP | Impossible |

| Request name | "Retransmission request" |
|---|---|
| Server computer name | B |
| Message name | "New Products Guide" |
| Message theme | "29-inch Wide-Screen TV" |

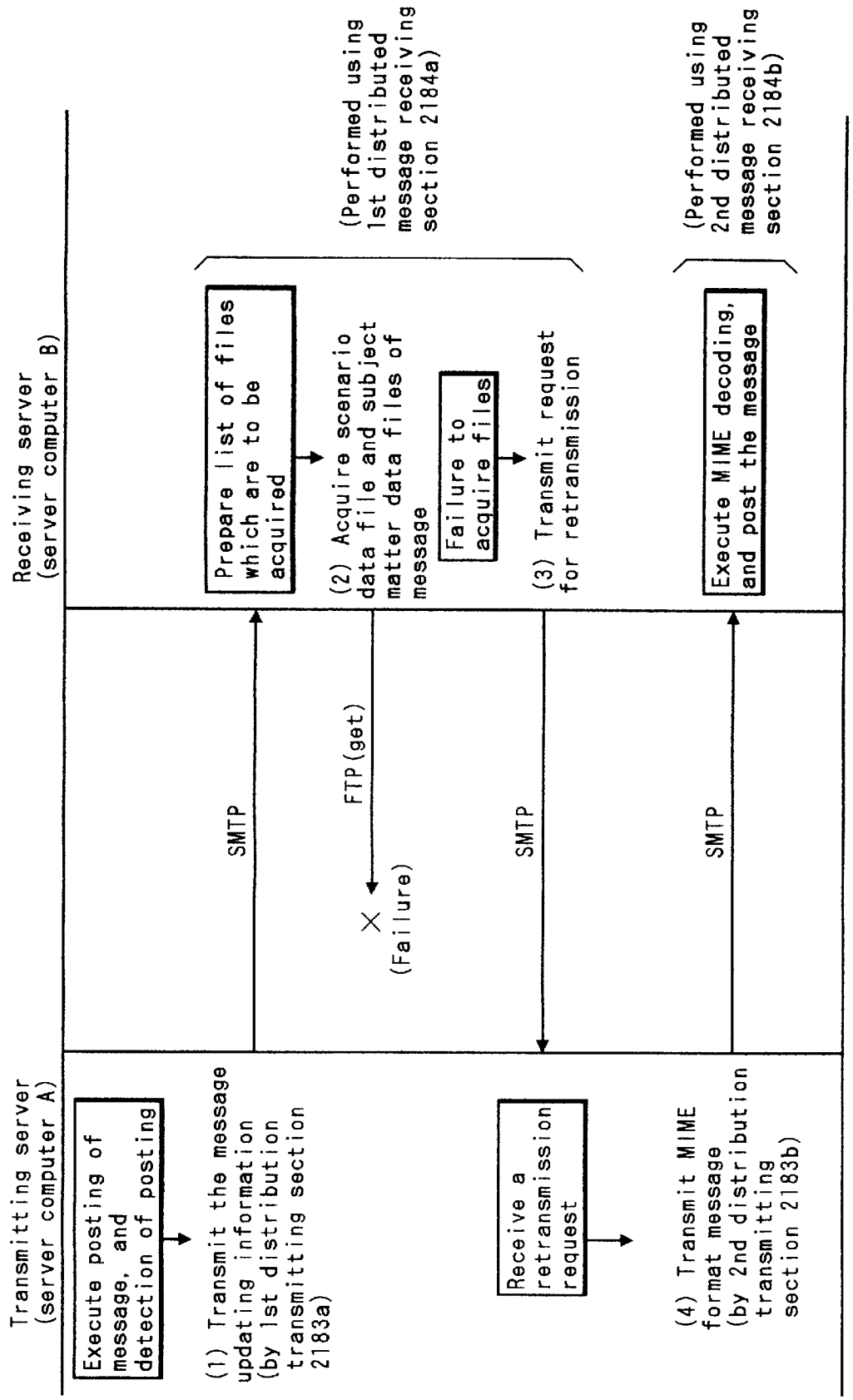

INFORMATION PROVIDER APPARATUS ENABLING SELECTIVE PLAYING OF MULTIMEDIA INFORMATION BY INTERACTIVE INPUT BASED ON DISPLAYED HYPERTEXT INFORMATION

BACKGROUND OF THE INVENTION

1. Field of the Invention

The present invention relates to an information provider apparatus whereby a user can selectively obtain and play various types of data, with the selection being performed interactively based on hypertext data which are displayed to the user.

In particular, the invention relates to such an information provider apparatus whereby the provided data can consist of a plurality of different types of monomedia data, which can be played simultaneously to provide a multimedia data presentation, whereby the monomedia data can include data such as video or audio data which are of continuous (i.e. time-varying) type, and whereby such data can be selected and played by the user with no substantial delay occurring between the time at which the user executes the selection and the time at which playing of that data begins, even if the data are stored at a remote location.

2. Prior Art Technology

In recent years, use of hypertext data has become widespread in the field of data processing display technology. Hypertext data consist of units of pages, which can be successively acquired (i.e. by readout from memory) and displayed. Each page of the data contains one or more embedded text elements each of which points to some other page of the hypertext data, or to a data file which is stored in memory, such that selection of an embedded element by a user will result in the corresponding page being displayed, or the corresponding file data being read out and played. (It should be noted that the term "played" as used in the following description and appended claims is intended to have the meaning "displayed", when applied to text data or still picture data, and the meaning "played, providing a continuous-motion picture", when applied to video data). Such linking connections from an embedded text element in a hypertext page to some other hypertext data page or to a monomedia data file are often referred to as hyperlinks, and that term will be used in the following. When a hypertext page is displayed, the user can activate a hyperlink, (generally by using a pointing device such as a mouse) by specifying the display screen region where the embedded hyperlink text element appears. In the following, the term "data item" will be applied to refer to such objects as a hypertext page, the contents of a monomedia data file (such as a text document, a video clip, and audio clip, etc.), and a region of a hypertext page that is used to activate a hyperlink will be referred to as an item selection region.

Hypertext data are thus convenient for use in a system in which one or more client terminals are connected by respective data transmission paths or a network to a server computer, which may be a server of a wide-area network, such as a Web server of the Internet, or a server of an intra-organization "intranet". Information stored in memory at the server computer may be made available in common to each of the client terminals. With the Internet or an "intranet", client terminals communicate with a server computer on the basis of hyperlinks, i.e. using the HTTP (Hypertext Transfer Protocol) for data transfer between server and client terminals, and with hypertext data being expressed in HTML (Hypertext Markup Language). When a user of a client terminal selects a hyperlinked data item in a displayed page, then the selected data item (hypertext data page or monomedia data file) is downloaded from the server computer, i.e. is read out from memory at the server computer, transferred via a data communication path to the client terminal, stored in memory at the client terminal, and can then be played by the user.

In the following, an example of a prior art type of information provider appparatus will be described. This may be configured as a client terminal linked by a data communication path to a server computer. Since hypertext data and monomedia data (as defined above) are the types of data which are transferred via the World Wide Web, hypertext data and monomedia data which are stored and managed in such a way that hypertext data pages and monomedia data files can be accessed by a user via respective hyperlinks (from a displayed hypertext page) will be collectively referred to in the following as WWW data. However it should be emphasized that the term "WWW data" is used in that manner only for convenience of description when referring to a specific class of data, and does not in any way limit the present invention to use with the World Wide Web or the Internet.

FIG. 66 is a system block diagram which shows the basic configuration of the prior art information provider apparatus example. In FIG. 66, a WWW data service section 3 is formed of a WWW data management section 32 and WWW data storage section 31, and is coupled via a data communication path 4 to an information browsing section 2, which can be controlled by a user by means of an I/O section 1. The I/O section 1 and information browsing section 2, in combination, may constitute a client terminal, with the WWW data service section 3 constituting a server computer. The I/O section 1 includes an input apparatus 11, which receives operation inputs from a user, and a display apparatus 12 which serves to output to the user various types of media data, i.e. make the data visible or audible to the user as the data are being played. Hence it should be understood that the display apparatus 12 in general represents a combination of such types of apparatus as a video display device, audio amplifier and loudspeaker, etc. The input apparatus 11 generally consists of a keyboard, together with a pointing device such as a mouse.

The information browsing section 2 includes a browsing control section 21 which serves to obtain, from the WWW data service section 3, WWW data which have been selected by the user by means of the input apparatus 11. The information browsing section 2 further includes an acquired data storage section 22, for holding downloaded WWW data, and a monomedia data playing section 23 which controls playing of the WWW data.

The WWW data service section 3 is made up of a WWW data storage section 31, such as a high-capacity hard disk data storage device, and a WWW data management section 32 which outputs specific parts of the WWW data (i.e. in units of hypertext data pages or data files) to the data communication path 4 in accordance with requests which are sent from the information browsing section 2 via the data communication path 4. Such requests are generated based on hyperlink selection operations executed using the input apparatus 11.

The data communication path 4 operates on the basis of a HTTP communication system 41, which controls communication between the server computer and the client terminal, i.e. controls transfer of downloading requests from the client terminal to the server computer, and the transferring of requested hypertext data pages or monomedia data files from the server computer to the client terminal. Specifically, the HTTP communication system 41 of FIG. 66 conceptually represents a combination of software (programs) and hardware which are used by the browsing control section 21 and WWW data management section 32 to implement communication via the data communication path 4 by using the HTTP protocol.

FIG. 67 shows an example of the format of a page of WWW data that is expressed in HTML, as used by such a prior art type of information provider apparatus. As shown, the page has the name "sample.html", it contains a hyperlink to another hypertext data page, named "pics.html", in the ninth line, and a hyperlink to a video data file having the file name "movs.mpeg" in the twelfth line.

FIG. 68 shows an example of the configuration of a playing control table 24 which is held in the browsing control section 21 of the information browsing section 2. The table consists of a set of records, each representing a type of data file (or hypertext page unit) which can be held by the information browsing section 2. Each of the records has the following components:

(1) File Extension

This is the file name extension which is used in the name of that type of file, or in the name of a hypertext page.

(2) Data Type

This indicates the format of the data in each of the corresponding files.

(3) Player

This specifies the name of the application program which is invoked to play the data of the corresponding files. If no player is specified, then this signifies that the data are played by the browsing control section 21, as is the case with HTML data.

Thus for example in FIG. 68, each file having the file extension ".gif" contains data expressing still pictures, in the GIF format, and the player program is specified as the "xv" program. In addition each file having the file extension ".mpeg" contains video data, in a compressed video data format such as the MPEG (or MPEG2) format, and the corresponding player program is designated as the "mpeg-play" program.

FIG. 69 is a flow diagram which shows the basic operation sequence of such a prior art information provider apparatus. The operation is as follows:

Step 1

The home page (i.e. the base page of hypertext data), which is held in the WWW data storage section 31 of the server computer, is requested by the client terminal, and is then transferred to the information browsing section 2, and is displayed to the user by the display apparatus 12.

Step 2

The system waits to receive an input from the user, via the input apparatus 11.

Step 3

A decision is made as to whether the user has input a command to end operation (in which case operation is terminated), or selected a hyperlinked data item, in which case:

Step 4

The data which are the destination of the hyperlink are transferred from the WWW data service section 3, and stored in the acquired data storage section 22. The data can then be played by the user, through the display apparatus 12.

The sequence of steps 2 through 4 is thereafter successively repeated.

With a prior art type of information provider apparatus which executes the above form of basic operation, when each type of WWW data is acquired by the client terminal from the server computer, data processing is executed by the browsing control section 21 as illustrated by the flow diagram of FIG. 70. The operation is as follows:

Step 11

A home page acquisition request is generated by the information browsing section 2 and is transferred via the data communication path 4 to the WWW data service section 3. Hypertext data expressing the home page are then read out from the WWW data storage section 31 of the WWW data service section 3 and transferred via the data communication path 4 to the information browsing section 2, to be displayed by the display apparatus 12.

Step 12

The input apparatus 11 is then used to specify either selection of a hyperlinked data item, or to specify that operation is to be ended.

Step 13

If termination of operation has been specified in step 12, then operation is ended.

Step 14

If a hyperlinked item of WWW data has been selected in step 12, then the data are acquired by the information browsing section 2 from the server computer, and stored in the acquired data storage section 22.

Step 15

A decision is made as to whether the acquired and stored WWW data are hypertext data (in the HTML format) or monomedia data.

Step 16

If the acquired data are hypertext data, then the page data displayed by the display apparatus 12 are updated accordingly.

Step 17

If the acquired data are monomedia data, then the data are supplied to the display apparatus 12 by the monomedia data playing section 23, and operation returns to step 12.

Judgement of the type of WWW data in step 15 is based on the playing control table, which has the form illustrated in FIG. 68, i.e. with the judgement being based on the respective file extensions of the acquired data files (i.e. considering each page unit of hypertext data as a file).

FIG. 71A shows an example of successive configurations of WWW data which become stored in the acquired data storage section 22 of the information browsing section 2 of such a prior art information provider apparatus, as a result of execution of selection operations by a user as described above. FIG. 71B shows an example of initial setting information for WWW data providing, which is stored in the acquired data storage section 22 of that apparatus. In FIG. 71A, 33, 34 and 35 denote respective pages of hypertext data which are provided as WWW data, while 36 to 39 denote respective files of monomedia data which are similarly provided. As shown, the home page contains hyperlinks to the hypertext pages which are named pics.html and movs.html. The page which is named pics.html, for example, contains hyperlinks to two still picture data files, which are named pic1.gif and pic2.gif respectively.

In FIG. 71B, the single-record table 40 shows the format under which the home page data are managed, i.e. using the file name "home.html".

An example of the operation of such a prior art information provider apparatus will be described in the following, for the case of the WWW data configuration example of FIGS. 71A and 71B, referring to FIG. 72. FIG. 72 shows examples of actual display screen contents which correspond to the contents of the hypertext data and monomedia data shown in FIGS. 71A, 71B. Firstly, when operation is started, the display screen of the display apparatus 12 will be of the form indicated by 41 in FIG. 72, with the home page 41a being displayed. The item selection regions are assumed to be indicated by underlining the corresponding parts of the displayed text. In that condition, the user can select hyperlinks to either a set of still picture items, or to a set of video items. If the user selects the set of still picture items, for example by "clicking" a switch of a mouse, after having moved the display cursor to "still picture set" region of the display screen, then the display will be updated as indicated numeral 42, with the "still picture set" page 42a being displayed. In that condition, if the user now selects the "sample 1" region, then a "still picture display" application program will be invoked, and the "sample 1" still picture will be displayed. The resultant display screen will be as indicated by numeral 43, with the still picture 43a being displayed, but with the "still picture set" page 42a continuing to be displayed in the background. In addition, a specific region 43c of the display screen 43 will be delineated, which can be selected by the user (as described for the item selection regions) when it is desired to terminate the still picture display. Such a selectable control region 43a of a display is often referred to as a "button".

Similarly, if the user selects the "video set" from the home page 41a at display screen 41, then the display screen designated by numeral 44 will be produced, with the "video set" page 44a being displayed. In that condition, if for example the "sample 1" item is selected by the user, then a "video display" application program will be invoked, whereby the data of the video data file corresponding to "sample 1" will begin to be played on an updated display screen 45, as indicated by numeral 45a. In addition, respective buttons or icons which can be selected by the user to control playing of the video (including a "terminate playing" button) are also displayed, as indicated by numeral 45c. The "video set" page 44a continues to be displayed, in the background.

In addition to using hyperlinks to shift between different hypertext data pages, is possible to use alternative methods, for example whereby a user can move to an immediately preceding page (i.e. a page which the user had previously selected). Such operation can be based on maintaining a history of pages which have been successively selected by the user, and utilizing that history for reference purposes.

In that way, WWW data can be managed in a manner that is based upon hypertext data, i.e. whereby hyperlinks are embedded in each page of hypertext data, pointing to other page units of the hypertext data or to monomedia data files. When the user performs a hyperlink selection operation, the designated data are acquired from the WWW data service section 3 via the data communication path 4, using the HTTP communication system 41, and then are handled in accordance with the type of data. For example if an acquired data file has the file name extension ".mpeg", it will be judged that the contents are video data. The appropriate program is thereby invoked to play the data.

The various sections of such a prior art type of information provider apparatus typically use the following types of hardware and software:

I/O section 1: The input apparatus 11 generally includes a pointing device such as a mouse, as mentioned above, while the display apparatus 12 generally includes a bit-mapped type of display device.

Information browsing section 2: The browsing control section 21 may use a WWW data display program such as the NCSA Mosaic (a registered trademark of NCSA, which is the National Center for Super Computing Applications, University of Illinois, U.S.A), or Netscape (a registered trademark of Netscape Communications Co., U.S.A). The monomedia data playing section 23 may use the "mpeg-play" program for displaying video data in the MPEG format, and the "xv" program for displaying still picture data in the GIF (Graphics Interchange Format).

WWW data service section 3: The WWW data management section 32 may use the daemon process "httpd" (a registered trademark of the aforementioned NCSA, and of CERN, the European Particle Physics Laboratory).

Data communication path 4: The HTTP communication system 41 may use the aforementioned HTTP communication protocol.

With such a prior art type of information provider apparatus, the data which are managed consist of either hypertext data or monomedia data. As described above, data (i.e. hypertext page data or monomedia file data) which are selected by a user, by utilizing the hyperlinks, are downloaded to the client terminal by utilizing a suitable hypertext data communication protocol, and and can then be played, with the previous hypertext page (i.e. from which the currently played data were linked) remaining at least partially visible in the display.

With improvements which have been achieved in monomedia data processing capabilities in recent years, it has become possible to easily manage large amounts of multi-media data, i.e. a complex combination of text, video, still picture (graphics) and audio data. Multimedia data are widely used for example to implement multimedia display "presentations" for commercial or other purposes, whereby text, video, graphic and audio information concerning a theme such as a commercial product, for example, are simultaneously presented. There is a need for an information provider apparatus whereby users of client terminals can easily and rapidly select from various sets of data, e.g. data which are held stored at a server computer, which will result in playing of respectively different sets of multimedia data, i.e. each set constituting a multimedia presentation formed of various types of media data which are played for respectively predetermined durations, and with attributes such as display screen position and picture size of video clips, still pictures and text portions which are components of the clip also being respectively predetermined. That would preferably be accomplished by means of a new type of information provider apparatus, whereby it would become possible to select desired multimedia data sets by using hyperlinks which are embedded in hypertext data pages as described above. That would provide the advantage of convenience to the user, since a user need only select a hypertext data page and the "click" on the appropriate hyperlink position, to start playing a desired multimedia clip, in same way as has been used for moving through a succession of hypertext data pages, or for downloading a monomedia data file from a hypertext data page.

However if it were attempted to use prior art types of information provider apparatus to achieve such a function, various problems would arise. Firstly, as described hereinabove referring to the example of FIG. 66 which utilizes the HTTP communication protocol, when such a prior art type of information provider apparatus acquires a specific mono-media data file, such as a file of video data, the data are first read out from the WWW data storage section 31 of the WWW data service section 3 in the server computer, are transferred to the information browsing section 2 of the client terminal, and are then stored in the acquired data storage section 22 of the information browsing section 2.

Until all of the monomedia data file have been stored in the acquired data storage section 22, playing of the monomedia data contents cannot begin. Since multimedia data is a combination of various types of monomedia data, before playing a specific set of multimedia data, it would be necessary to first download into the acquired data storage section 22 each of the monomedia data files which are to be components of the multimedia data set, then download information (referred to in the following as scenario information) which specifies the various aforementioned attributes which are to be assigned for playing each of the components of the multimedia data. Thus, a substantial time would elapse between the point at which a user selects playing of a specific clip of multimedia data, and the time at which playing of the multimedia data actually begins.

Such a time lag problem also exists, of course, when monomedia data such as a still picture data file is downloaded from a hyperlink of a hypertext page. One attempt to reduce this problem, with respect to still picture (graphics) data, is provided by the Netscape browser program (developed by Netscape Communications Co., U.S.A.) for WWW data communication. When that program is utilized by a client terminal, it becomes possible to begin displaying the contents of a still picture while the picture data are in the process of being downloaded by the client terminal. However in the case of video data, it is still necessary to store all of the contents of a video data file beforehand at the client terminal, before playing of the data can begin.

There is therefore a requirement for an information provider apparatus whereby a user can easily select multimedia data to be played, from among a plurality of different sets of multimedia data, i.e. different multimedia data clips, and whereby there is no substantial time lag between the point at which such a selection operation is performed by the user and the point at which playing of the selected multimedia data begins.

SUMMARY OF THE INVENTION

It is an objective of the present invention is to overcome the disadvantages of the prior art described above, by providing an information provider apparatus whereby a user can employ hyperlink selection from a displayed page of hypertext data to select a set of multimedia data to be played, with that set being selected from among various predetermined sets of multimedia data which are held stored in a data storage device which may be stored for example at a server computer of a client/server network.

It is a further objective of the invention to provide such an information provider apparatus, configured such that even if the selected data are stored at a remote installation playing of the selected data can be rapidly started in response to a user designation, by directly transferring the selected data from the remote installation and playing the data as they are received.

It is a further objective of the invention to provide such an information provider apparatus, configured as a client/server network having a plurality of client terminals which are respectively operable by users, and at least one server computer, whereby the multimedia data can be held stored in a data storage device of the server computer and whereby each user of a client terminal can access and play the data independently of other users.

It is moreover an objective of the invention to provide such an information provider apparatus, configured as a client/server network having a plurality of client terminals which are respectively operable by users, and at least one server computer, whereby the users of client terminals may generate and exchange hypervideo mail items, each consisting of a set of multimedia data in combination with corresponding scenario data.

An information provider apparatus according to the present invention operates on multimedia data in a form which will be referred to in the following as hypervideo data, with respective separately managed sets of hypervideo data being referred to as hypervideo clips. With the present invention, the data constituting a hypervideo clip consists of:

(a) A plurality of files of subject matter data, which express the monomedia data contents of the hypervideo data. These files include a file for at least one video clip, which is used as a reference video clip. Successive frame numbers of the reference video clip are used to synchronize the playing of other monomedia data items (such as other video clips, audio clips, still pictures, text documents, etc.) of the hypervideo clip, during playing of the hypervideo clip. (b) A file of scenario data, containing information expressing respective storage locations of the subject matter data files, and also information which expresses respective playing attributes for the subject matter data files, e.g. times at which the contents of the various files are to begin to be played (expressed in terms of elapsed frame numbers of the aforementioned reference video clip), and the position and size of the display screen region in which visual data items are to be displayed, etc. The subject matter data storage location information may simply consist of a list of the respective subject matter data file names, in some cases.

According to a first aspect, such an information provider apparatus comprises:

a data input/output section including data input means operable by a user for inputting operating commands, and data display means for displaying a plurality of types of monomedia data including at least video data and text data, the operating commands being generated by hyperlink selection in accordance with a page of hypertext data which is currently being displayed by the data display means;

data storage means for storing hypertext data and data of at least one hypervideo clip, the hypervideo clip data being formed of subject matter data and scenario data, the subject matter data comprising data of a plurality of monomedia data items which include a video clip that has been preassigned as a reference video clip of the hypervideo clip, the scenario data including information specifying times of starting playing of respective ones of the monomedia data items other than the reference video clip, the starting times being specified in terms of frame numbers of the reference video clip;

means responsive to the operating commands for reading out, from the data storage means, the scenario data and subject matter data of a hypervideo clip which is specified by the operating commands; and means for continuously supplying the reference video data of the specified hypervideo clip to the data data display means to be displayed thereby, as the reference video data are read out from the data storage means, and for maintaining a count of elapsed frame numbers of the reference video clip, selectively generating data transfer commands to acquire from the data storage means specific subject matter data of the specified hypervideo clip other than the reference video clip, at times determined in accordance with the the count of frame numbers in conjunction with the scenario data, and continuously supplying the specific subject matter data to the data display means as the specific subject matter data are read out from the data storage means, with video data of the subject matter data being transferred to the data display means at a transmission rate which permits real-time transfer and continuous-motion display of the contents of the video data.

According to a second aspect, such an information provider apparatus comprises:

a first data service section including first data storage means having stored therein hypertext page data and monomedia data, the monomedia data including scenario reference data corresponding to respective hypervideo clips, the scenario reference data being connected by hyperlinks to the hypertext page data, the scenario reference data including storage location information for respective scenario data files of the hypervideo clips within second data storage means, the first data service section being responsive to externally supplied first data transfer commands for selectively reading out the hypertext page data and scenario reference data;

a second data service section, including the second data storage means having stored therein data constituting the hypervideo clips, responsive to second data transfer commands for selectively reading out the data, the data of a hypervideo clip consisting of a scenario data file and a plurality of subject matter data files for respective monomedia data items, the monomedia data items including a video clip which has been preassigned as a reference video clip, the scenario data including storage location information for the subject matter data files with respect to the second data storage means and playing information including times of starting playing the contents of respective ones of the subject matter data files other than the reference video clip, the starting times being specified in terms of frame numbers of the reference video clip;

a data input/output section including input means operable by a user for inputting operating commands and data display means for playing a plurality of types of monomedia data including at least video data and text data, the operating commands being generated by hyperlink selection from a page of hypertext data which is currently being displayed by the data display means;

information browsing means comprising information browsing control means, acquired data storage means and hypervideo data playing means, the information browsing control means being responsive to the operating commands for generating corresponding ones of the first data transfer commands to thereby acquire, from the first data service section, data of a specific one of the hypertext pages or scenario reference data for a specific one of the hypervideo clips, the acquired data storage means storing the acquired hypertext page data and scenario reference data, with the hypertext page data being read out and supplied to the data display means, and the hypervideo data playing means reading out the scenario reference data from the acquired data storage means and using the scenario reference data to generate the second data transfer commands for thereby obtaining the scenario data of the specific hypervideo clip from the second data service section, using the scenario data to further generate the second data transfer commands for thereby obtaining the reference video clip data of the specific hypervideo clip from the second data service section and continuously supplying the reference video clip data to the data display means, maintaining a count of elapsed frame numbers of the reference video clip, further generating the second data transfer commands to begin obtaining from the second data service section the contents of specific subject matter data files of the hypervideo clip at respective times determined in accordance with the the count of frame numbers in conjunction with the scenario data, and continuously supplying the contents to the data display means; and first data transfer means for transferring the first data transfer commands from the information browsing control means to the first data service section and for transferring resultant hypertext page data and scenario reference data to be stored in the acquired data storage means, and second data transfer means for transferring the second data transfer commands from the hypervideo data playing means to the second data service section and for transferring resultant scenario data and subject matter data to the hypervideo data playing means, the second data transfer means executing the data transfer at a transmission rate permitting real-time transfer with continuous-motion display of the contents of video data portions of the subject matter data.

According to a third aspect, such an information provider apparatus comprises:

a first data service section including first data storage means having stored therein hypertext page data and monomedia data, the monomedia data including scenario reference data corresponding to respective hypervideo clips, the scenario reference data being connected by hyperlinks to the hypertext page data, the scenario reference data including storage location information for respective scenario data files of the hypervideo clips within second data storage means, the first data service section being responsive to externally supplied first data transfer commands for selectively reading out the hypertext page data and scenario reference data;

a second data service section, including the second data storage means having stored therein data constituting the hypervideo clips, responsive to second data transfer commands for selectively reading out the data, the data of a hypervideo clip consisting of a scenario data file and a plurality of subject matter data files for respective monomedia data items, the monomedia data items including a video clip which has been preassigned as a reference video clip, the scenario data including storage location information for the subject matter data files with respect to the second data storage means and playing information including times of starting playing the contents of respective ones of the subject matter data files other than the reference video clip, the starting times being specified in terms of frame numbers of the reference video clip;

a data input/output section including input means operable by a user for inputting operating commands and data display means for playing a plurality of types of monomedia data including at least video data and text data, the operating commands being generated by hyperlink selection from a page of hypertext data which is currently being displayed by the data display means;

information browsing means comprising information browsing control means, acquired data storage means and hypervideo data playing means, the information browsing control means being responsive to the operating commands for generating corresponding ones of the first data transfer commands to thereby acquire, from the first data service section, data of a specific one of the hypertext pages or scenario reference data for a specific one of the hypervideo clips, the acquired data storage means storing the acquired hypertext page data and scenario reference data, with the hypertext page data being read out and supplied to the data display means, and the hypervideo data playing means reading out the scenario reference data from the acquired data storage means and using the scenario reference data to generate the second data transfer commands for thereby obtaining the scenario data of the specific hypervideo clip from the second data service section, using the scenario data to further generate the second data transfer commands for thereby obtaining the reference video clip data of the specific hypervideo clip from the second data service section and continuously supplying the reference video clip data to the data display means, maintaining a count of elapsed frame numbers of the reference video clip, further generating the second data transfer commands to begin obtaining from the second data service section the contents of specific subject matter data files of the hypervideo clip at respective times determined in accordance with the the count of frame numbers in conjunction with the scenario data, and continuously supplying the contents to the data display means; and first data transfer means for transferring the first data transfer commands from the information browsing control means to the first data service section and for transferring resultant hypertext page data and scenario reference data to be stored in the acquired data storage means, and second data transfer means for transferring the second data transfer commands from the hypervideo data playing means to the second data service section and for transferring resultant scenario data and subject matter data to the hypervideo data playing means, the second data transfer means executing the data transfer at a transmission rate permitting real-time transfer with continuous-motion display of the contents of video data portions of the subject matter data.

With such an information provider apparatus, the data input/output section and information browsing means in combination can constitute a client terminal, and the first data service section and second data service section in combination can constitute a server computer for providing hypertext data and hypervideo data to the client terminal, with the client terminal and server computer being mutually connected by the data communication path.

In particular, the apparatus can be configured in the form of a network, i.e. comprising a plurality of the client terminals, each connected to the server computer by the data communication path for mutually independently communicating with the server computer, the data communication path being configured as a network data communication path.

Furthermore, such an information provider apparatus can be configured for providing hypervideo mail in a similar manner to providing conventional electronic mail. According to a fourth aspect, such an information provider apparatus comprises:

hypervideo mail processing means for processing hypervideo mail items each consisting of a hypervideo clip in combination with at least mail destination information, the hypertext data in the data storage means further including hypervideo mail page data containing, for each of respective hypervideo mail items received by the hypervideo mail processing means, the mail destination information in conjunction with a hyperlink to the scenario reference data file of the mail item, the hypervideo mail processing means comprising:

temporary mail storage means, mail processing means for receiving externally supplied hypervideo mail items, extracting the destination information from an externally supplied hypervideo mail item, transferring the subject matter data and scenario data contents of the hypervideo mail item to the second data service section to be stored in the second data storage means, and transferring resultant storage location information for the subject matter data and scenario data, in conjunction with the mail destination information, to the first data service section for thereby generating a scenario reference file for the mail item and updating the hypervideo mail page data.

In general, the hypervideo mail generating means, the data input/output section and the information browsing means, in combination, will constitute a client terminal, and the hypervideo mail processing means, first data service section and second data service section, in combination, will constitute a mail server computer, the client terminal and mail server computer being mutually connected by the data communication path.

Such an apparatus can also be configured as a network, i.e. comprising a plurality of the client terminals, each connected to the mail server computer by the data communication path for mutually independently communicating with the mail server computer, with the data communication path being configured as a network data communication path.

Furthermore, the apparatus can be configured as a plurality of such networks, i.e. local area networks, which mutually communicate via an inter-network data communication path, wherein the mail server computer of a local area network executes dedicated storage of data of hypervideo mail items having as destinations any of the client terminals of the local area network, wherein each of the mail server computers further comprises destination enquiry management means for providing information specifying respective hypervideo mail item storage dedication relationships between the mail server computers and client terminals, and wherein an originating client terminal functions, prior to sending a hypervideo mail item to a destination client terminal, to obtain from the destination management means of the mail server computer of the originating client terminal, the identity of the dedicated mail server computer of the destination client terminal, and to then transmit the hypervideo mail item to the dedicated mail server computer.

An information provider apparatus according to the present invention can further be configured to enable hypervideo messages to be "posted" on an electronic "notice board", to be made accessible to various users. Each hypervideo message is based on a hypervideo clip (i.e. a combination of scenario data and multimedia data including a reference video clip) in conjunction with the name of a notice board on which the message is to be posted, and information such as a message title or "message theme" indicative of the nature of the message. Each notice board consists of a predetermined hypertext page.

Such an information provider apparatus can be configured as a wide-area network, formed of a plurality of client/server local area networks, in which hypervideo messages which are posted to a specific notice board within one local area network, e.g. by being sent by a user of a client terminal of that network to the server computer of that network, are automatically distributed to each of a predetermined set of other local area networks, to be posted on a corresponding notice board in each of these other local area networks.

Specifically, with such an information provider apparatus, the hypertext page data include data of at least one page which is assigned as a notice board, the apparatus further comprising hypervideo message posting processing means for receiving externally supplied hypvervideo messages each formed of scenario data and subject matter data of a hypervideo clip in conjunction with information specifying a message theme and a name of a notice board page, each of the hypvervideo messages being configured in a predetermined format, the hypvervideo message posting processing means including:

hypervideo message data distribution means for supplying the subject matter data data and scenario data of a hypervideo message to the second data service means to be stored as scenario data and subject matter data files in the second data storage means and obtaining from the second data service means storage locating information for the message data contents, and notice board page updating processing means for receiving from the hypervideo message data distribution means the notice board name information, message theme information and storage location information for the hypervideo message data contents, and for supplying the storage location information and message theme information to the first data service means to thereby update a notice board page which is specified by the notice board name information, by inserting the message theme information into the notice board page with the message theme information having a hyperlink connection to the scenario data and subject matter data files.

With such an information provider apparatus the hypervideo mail generating means data input/output means and information browsing means in combination may constitute a client terminal, and the hypervideo mail processing means, first data service means, second data service means and hypervideo message posting processing means in combination may constitute a server computer, with the client terminal and server computer being mutually connected by the data communication path, and the apparatus may comprise a plurality of the client terminals each connected to the server computer by the data communication path for mutually independently communicating with the server computer, with at least one of the client terminals comprising hypvervideo message generating means controllable for generating arbitrary hypvervideo messages and sending the hypvervideo messages to the server computer via the data communication path to the local area network, the data communication path being configured as a network data communication path, Such an information provider apparatus may moreover comprise a wide-area network having a plurality of local area networks, each comprising a plurality of the client terminals and a server computer mutually connected by a network data communication path, and an inter-network data communication path interconnecting respective server computers of the local area networks, wherein the client terminals of a local area network transmit hypvervideo messages only to the server computer of the local area network, each of the server computers further including wide-area distribution processing means, the wide-area distribution processing means comprising:

means responsive to posting of a hypervideo message by the server computer for distributing the hypervideo message, via the inter-server data communication path to each of a predetermined set of other server computers of the wide-area network, and means responsive to receiving, via the inter-network data communication path, a distributed hypervideo message, for executing processing to post the distributed hypervideo message in a notice board page which is specified by the notice board name information of the hypervideo message.

The wide-area distribution processing means of a server computer may comprise distribution memory means having stored therein information specifying, for each of respective notice board pages assigned in the first data service means of the server computer, respective names of other server computers to which are predetermined as distribution destination server computers for the notice board page, message posting detection means coupled to the hypervideo message posting processing means, responsive to execution of processing to post a hypervideo message by the hypervideo message posting processing means for generating detection result data corresponding to the hypervideo message, the detection result data specifying at least information specifying the message theme of the hypervideo message and a name of a notice board page on which the hypervideo message was posted, distribution transmitting means coupled to receive the detection result data from the message posting detection means, for obtaining from the distribution condition memory respective names of the distribution destination server computers corresponding to the notice board page, and for transmitting the hypervideo message to each of the distribution destination server computers, via the inter-server data communication path, and distributed message data receiving means for receiving distributed hypervideo messages transmitted thereto via the inter-server data communication path for configuring each the distributed hypervideo message in the predetermined format and supplying the distributed hypervideo message to the hypervideo message posting processing means.

The distribution transmitting means may comprise means for transmitting a hypervideo message to a distribution destination server computer via the inter-server data communication path by:

creating a header file containing the notice board name information and message theme information of the hypervideo message, obtaining from the second data service means the scenario data file and subject matter data files of the hypervideo message, and transmitting the data contents of each of the header file, scenario data file and subject matter data files to the distribution destination server computer via the inter-server data communication path by direct data transfer, using a wide-area network file transfer protocol (i.e. FTP).

The distributed message data receiving means may comprise means for processing the data of a hypervideo message received via the inter-server data communication path by obtaining from the header file the notice board name information and message theme information, and combining the notice board name and message theme information with the data contents of the scenario data file and subject matter data files to configure the hypervideo message in the predetermined format, and supplying a resultant hypervideo message to the hypervideo message posting processing means.

Alternatively, information provider apparatus the distribution transmitting means of such an information provider apparatus may comprise means for transmitting a hypervideo message by a server computer via the inter-network data communication path by:

obtaining storage position information for the scenario data and subject matter data files of the hypervideo message, with respect to the second data service means, to generate message updating information containing the storage position information together with the notice board name information and message theme information, and transmitting the message updating information via the inter-server data communication path to the distribution destination server computer. The distributed message data receiving means may comprise means for processing the message updating information of a hypervideo message, received via the inter-server data communication path, by:

obtaining from the message updating information the storage position information which is contained therein;

obtaining the data contents of the scenario data file and subject matter data files of the hypervideo message by direct data transfer via the inter-server data communication path using a wide-area network file transfer protocol (FTP), from a server computer which originated the message updating information, and obtaining, from the message updating information, the notice board name information and message theme information which are contained therein, and combining the notice board name and message theme information with the data contents of the scenario data file and subject matter data files to configure the hypervideo message in the predetermined format, and supplying a resultant hypervideo message to the hypervideo message posting processing means.

In that case, each of the server computers may comprise temporary data storage means (i.e. such as a mail spool, for received electronic mail items) which can be used to temporarily hold the message updating information, when the message updating information are received via the inter-server data communication path. In general, the means for processing the message updating information by the distributed message data receiving means will perform the processing by executing a specific program, and so the each server computer may further comprise scheduling memory means for storing schedule data which specify scheduled times of execution of at least the specific program, and scheduling execution means coupled to the distributed message data receiving means, for controlling the distributed message data receiving means to initiate the processing of message updating information which is held in the temporary data storage means, at a time determined by the schedule data.

Alternatively, with such an information provider apparatus the distribution transmitting means may comprise means for encoding the hypervideo message corresponding to the detection result data, to obtain an encoded hypervideo message having the form of an electronic mail item, by creating a header file containing the notice board name and message theme information from the detection result data, and encoding the header file together with the scenario data and subject matter data files of the hypervideo message corresponding to the detection result data, and means for transmitting the encoded hypervideo message to each of the distribution destination server computers via the inter-server data communication path by using an electronic mail transfer communication protocol which is designed for transfer of electronic mail items within a wide-area network. In that case, the distributed message data receiving means will comprise means for decoding an encoded hypervideo message which is received via the inter-network data communication path to obtain the header file, scenario data file and subject matter data files, for configuring the data of the header file, scenario data file and subject matter data files in the predetermined hypervideo message format, and supplying a resultant hypervideo message to the hypervideo message posting processing means.

Such encoding of the data of a hypervideo message in the form of an electronic mail item is preferably executed by using Multi-purpose Internet Mail Extensions (MIME) encoding, and the electronic mail transfer communication protocol is preferably the Simple Mail Transfer Protocol (SMTP), which are widely used at present with the Internet. Such a manner of transferring a hypervideo message within a wide-area network can enable reliable (although relatively slow-speed) message transfer to be achieved, even via a network communication path which does not satisfy the necessary conditions for implementing high-speed direct transfer of file data using a file transfer protocol (FTP).

As a further alternative, with such an information provider apparatus the distribution transmitting means may be formed of a 1st distribution transmitting means and a 2nd distribution transmitting means, and the distributed message data receiving means may be formed of a 1st distributed message data receiving means and a 2nd distributed message data receiving means. The 1st distribution transmitting means comprises means for obtaining storage position information for the scenario data and subject matter data files of the hypervideo message, with respect to the second data service means, to generate message updating information containing the storage position information together with the notice board name information and message theme information which are conveyed by the detection result data, and means for transmitting the message updating information via the inter-server data communication path to each the distribution destination server computer. The 1st distributed message data receiving means comprises means for processing the message updating information of a hypervideo message, received via the inter-server data communication path, by obtaining from the message updating information the storage position information which is contained therein, obtaining the data contents of the scenario data file and subject matter data files of the hypervideo message by direct data transfer via the inter-server data communication path from a server computer which originated the message updating information, using a wide-area network file transfer protocol (FTP), configuring the notice board name information and message theme information from the message updating information together with the contents of the scenario data file and subject matter data files in the predetermined format, and supplying a resultant hypervideo message to the hypervideo message posting processing means, and comprising means, functioning in the event of a failure to obtain the data contents of the scenario data file and subject matter data files of the hypervideo message by direct data transfer, for sending to the originating server computer via the inter-server data communication path a request for retransmission of the hypervideo message, encoded in the form of an electronic mail item. The 2nd distribution transmitting means comprises means functioning in response to receiving via the inter-server data communication path a request for retransmission of a hypervideo message which has been transmitted by the 1st distribution transmitting means, for creating a header file containing the notice board name and message theme information from the detection result data of the hypervideo message, encoding the header file together with the scenario data and subject matter data files of the hypervideo message, as an encoded hypervideo message in the form of an electronic mail item, and transmitting the encoded hypervideo message via the inter-server data communication path using an electronic mail transfer communication protocol which is designed for transfer of electronic mail items within a wide-area network, to a distribution destination server computer which originated the request for retransmission. The 2nd distributed message data receiving means comprises means for decoding an encoded hypervideo message which is received via the inter-network data communication path, to obtain the header file, scenario data file and subject matter data files, for configuring the data of the header file, scenario data file and subject matter data files in the predetermined format, and supplying a resultant hypervideo message to the hypervideo message posting processing means. Such an apparatus also includes distributed message data input processing means coupled to receive data transmitted via the intra-network data communication path, for notifying the 1st distributed message data receiving means when the received data consist of message updating information and for supplying the message updating information to the 1st distributed message data receiving means, for notifying the 2nd distributed message data receiving means when the received data consist of a distributed hypervideo message encoded as an electronic mail item and for supplying the encoded hypervideo message to the 2nd distributed message data receiving means, and for notifying the 2nd distribution transmitting means when the received data consist of a request for retransmission of a hypervideo message and for supplying the request to the 2nd distribution transmitting means.

In that case, it becomes possible to implement high-speed message transfer between server computers of a wide-area network by using direct transfer of message data, i.e. employing a file transfer protocol (FTP), when such data transfer is possible, and to automatically change to transferring message data in the form of electronic mail (e.g. using the SMTP) when data transfer by FTP is impossible, such as when a "firewall" protection feature is in effect within the data communication path between two server computers.

It can thus be understood that an information provider apparatus according to the present invention basically enables a user to specify playing of desired hypervideo data in a similar manner to the conventional "browsing" method of specifying playing of desired monomedia data. That is to say, selection control by a user is based upon hyperlink selection from a displayed page of hypertext data, with suitable hypervideo data playing means being automatically invoked to play the contents of the hypervideo data which are acquired in response to such user selection.

It can be further understood that the invention provides an information provider apparatus whereby data of a scenario file which contains information expressing storage locations in the server computer of respective subject matter data files of selected hypervideo data, and which is stored at the server computer, are transferred from the server computer to the client terminal by using a suitable communication system, i.e. based on the HTP (Hypertext Transfer Protocol), which is suitable for transfer of data expressed in HTML (Hypertext Markup Language), and whereby contents of the subject matter data files can be transferred from the server computer to the client terminal by using communication software means such as the Network File System which enables direct simultaneous accessing by the client terminal of a plurality of subject matter data files which are stored at the server computer, for thereby enabling hypervideo data to be played while the subject matter data of the hypervideo data are in the process of being transferred from the server computer to the client terminal.

As a result, the amount of time which must elapse between the point at which a user of a client terminal selects specific hypervideo data, and the point at which playing of the selected hypervideo data begins, can be made substantially shorter than would be possible with a prior art type of apparatus.

It can be further understood that the invention may be implemented as an information provider apparatus whereby the scenario data of hypervideo data can be linked directly to hypertext data which can be accessed by a user, so that it is not necessary to provide reference information for the scenario data. This can decrease the data storage requirements of the information provider apparatus.

Alternatively, the invention can be implemented as an information provider apparatus whereby a specific set of hypervideo data consisting of a scenario data file and subject matter data files can be managed collectively as a single file set, which can be connected by hyperlink to a hypertext data page. In that case, it becomes possible to use only a low-speed data communication system for transferring the hypervideo data from a server computer to a client terminal.

The invention can also be implemented as an information provider apparatus whereby hypervideo data and WWW data can be stored at a single server computer which is connected via a network to a plurality of client terminals, with each of the client terminals being enabled to play the hypervideo data.

Alternatively, the invention can be implemented as an information provider apparatus in the form of a network having a server computer and a plurality of client terminals, whereby each of the client terminals, in addition to being able to play hypervideo data which is managed by a server computer for all of the client terminals in common, is also enabled to play hypervideo data which are specific to that client terminal.

It can be further understood that the invention can be implemented as an information provider apparatus whereby hypervideo mail items, i.e. electronic mail items each based on a hypervideo clip, can be exchanged between client terminals, in a network having a server computer and a plurality of client terminals, or within a wide-area network formed of a plurality of local area networks.

Similarly the invention enables hypervideo messages, each based on a hypervideo clip, to be "posted" on an electronic "notice board" and so made available to all of the users of a local area network, or to all of the users of a a wide-area network formed of a plurality of local area networks, or to users of specific local area networks of such a wide-area network.

BRIEF DESCRIPTION OF THE DRAWINGS

FIG. 4 shows an example of a playing control table which is stored in an information browsing section of the first embodiment;

FIG. 11 shows an example of a playing control table which is stored in an information browsing section of the second embodiment;

FIG. 15 shows an example of a playing control table which is stored in an information browsing section of the third embodiment;

FIG. 46 is a flow diagram showing the basic operating sequence which occurs during transfer of a mail item, with the fourteenth embodiment;

FIG. 67 shows an example of WWW data written in HTML, for use with the information provider apparatus of FIG. 66;

FIG. 68 shows an example of a playing control table, which is stored in an information browsing control section of the prior art information provider apparatus of FIG. 66;

FIG. 70 is a flow diagram showing a processing sequence which is executed by a browsing control section of the prior art information provider apparatus of FIG. 66;

FIGS. 71A and 71B show examples of WWW data which are stored in a WWW data storage section of the prior art information provider apparatus of FIG. 66;

FIG. 76 is a diagram for illustrating the process of distribution of a hypervideo message between sites of a wide-area network;

FIG. 77 shows an example of the format of detection result data, which are used with the twentieth embodiment, conveying summary information concerning a posted hypervideo message;

FIGS. 78A, 78B, 78C are table examples to illustrate the format of a distribution condition table, used with the twentieth embodiment to specify those destinations to which a posted hypervideo message is to be distributed;

FIG. 84 shows an example of the format of message updating information, conveying the notice board name and message theme of a hypervideo message in conjunction with storage location information for the message contents, for use with a twenty-first embodiment of the invention;

FIG. 89 shows an example of an execution schedule table, for use with the twenty-second embodiment;

FIG. 105 is a conceptual diagram for illustrating a synchronization relationship between server computers which respectively distribute and receive a hypervideo message with the twenty-fourth embodiment.

DESCRIPTION OF PREFERRED EMBODIMENTS

Figure 1:
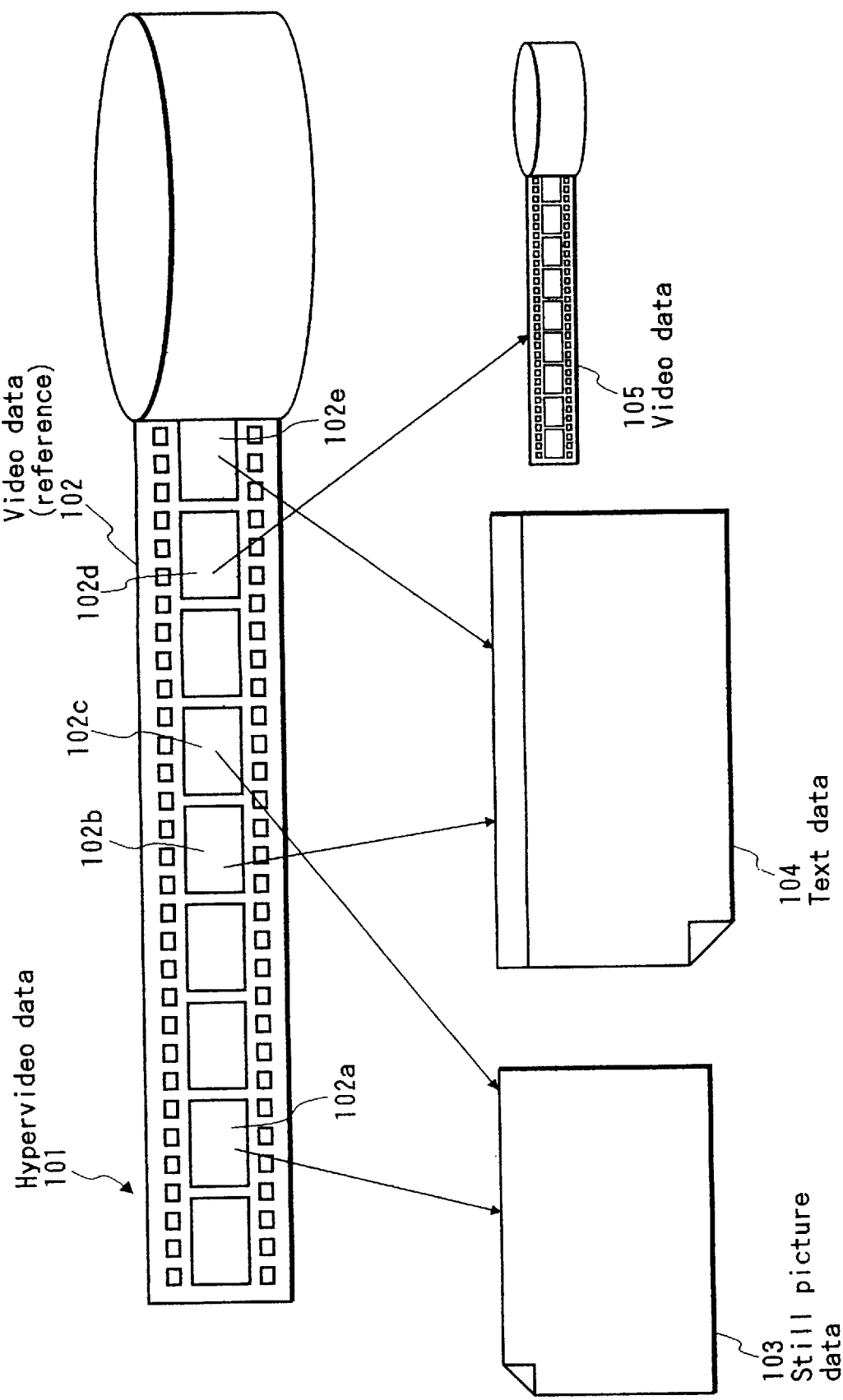
FIG. 1 is a conceptual diagram for describing the basic principles of playing hypervideo data by an apparatus according to the present invention.

The basic principles of the present invention will first be described, referring to FIG. 1. It will be assumed that data, stored as files, are acquired from storage and played, with the necessary apparatus being described hereinafter. As stated hereinabove, an information provider apparatus according to the present invention operates on hypervideo data which consist of:

(a) Subject matter data, which express the actual contents which are to be played (where "played" is used in the most general sense, applying to playing of audio or video data and also to displaying of text or still picture data). Thus the subject matter data consist of at least one video data file (of a reference video clip, described hereinafter), and monomedia data files which may include one or more video data files, still picture data files, audio data files, and/or text data files.

(b) A file of scenario data, which contains information indicating the storage locations of the subject matter data, e.g. directory path and file name information for each of the subject matter data files. The scenario data further includes playing information for the subject matter data. Specifically, the playing information at least expresses, for each of the subject matter data files, the time at which the corresponding data are to begin to be played (i.e. in relation to the start of playing the hypervideo data), and the position and size of the display screen region in which the data are to be displayed (in the case of data other than audio data). In the case of data which is not of continuous form, such as text or still picture data, the scenario data for a subject matter data file may also specify the time at which playing of the file contents is to to be ended.

The basic principles of playing the hypervideo data will be described referring to the conceptual diagram of FIG. 1, in which numeral 101 denotes data that in combination constitute the subject matter of a complete set of hypervideo data. Such a set will be referred to in the following as a hypervideo clip (by analogy with the terms "video clip" and "audio clip"). The hypervideo data 101 are made up of a combination of data files which include data of one or more video clips, and also may include data of audio clips, text data, and still picture data. However the hypervideo data 101 contains at least a reference video data file 102, i.e. a file whose video frame numbers are used as reference data, and whose contents are played extends continuously from the start to end of playing the hypervideo data 101. The video data 102 will be assumed to be stored and accessed as a file which is named a1.mpeg. The successive frame numbers of the reference video data 102 are used as timing references for the start of playing other components of the hypervideo data 101, which in this simple example include the still picture data 103 (from a file named a2.gif), the text data 104 (from a file named a3.text), and the video data 105 (from a file named a2.mpeg), as shown in FIG. 1. In the example of FIG. 1, at the commencement of playing the hypervideo clip, only the contents of the reference video data 102 are acquired and displayed, with the size and position of the resultant display picture being determined by the scenario data. When playing of frame 102a of reference video data 102 begins, the still picture of data 103 is acquired and begins to be displayed, combined with any image which is currently being displayed as a result of the video data 102, with attributes such as the size and screen position of that still picture being determined by the scenario data. When playing of frame 102b of the reference video data 102 begins, the text data 104 also is acquired and begins to be displayed (again, in a manner specified by the scenario data contents) together with the other data which are being displayed. At reference frame number 102c, as specified by the scenario data, display of the still picture data 103 is halted. When the reference frame number 102d is reached, then the video data 105 begins to be acquired continuously, and played as it is being acquired, with the display size and screen position of the resultant video picture being determined by the scenario data. At the reference frame number 102e, again as specified by the scenario data, display of the text data 104 is halted.

In that way, control of playing the hypervideo data to provide a multimedia presentation can be easily implemented, based on the subject matter data and the contents of the scenario data together with a count of the number of video frames of the reference video data 102 which have been played.

Figure 2:
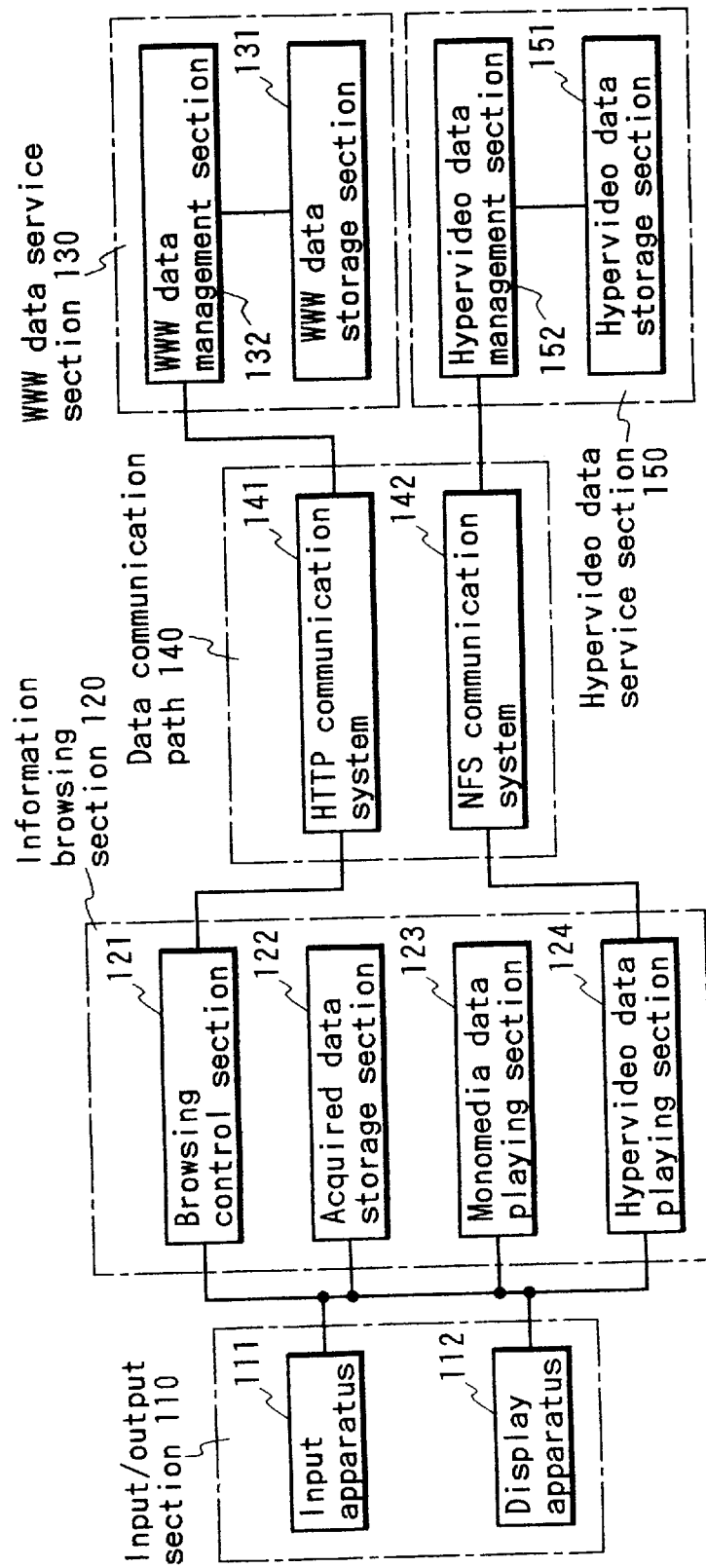
FIG. 2 is a system block diagram of a first embodiment of an information provider apparatus according to the present invention.

FIG. 2 is a simple system block diagram showing the basic elements of a first embodiment of an information provider apparatus according to the present invention. This consists of an I/O section 110, an information browsing section 120, a data communication path 140, a WWW data service section 130 and a hypervideo data service section 150. With this embodiment, the data communication path 140 has a sufficiently wide transmission bandwidth to enable real-time transfer of video data over that communication path to a video display apparatus at a sufficiently high data transfer rate to enable continuous-motion display of the data contents. The I/O section 110 and WWW data service section 130 respectively correspond to the I/O section 1 and WWW data service section 3 of the prior art information provider apparatus example of FIG. 66, described above, with the I/O section 110 consisting of a input apparatus 111 and a display apparatus 112, and the WWW data service section 130 consisting of a WWW data management section 132 and a WWW data storage section 131. However the information browsing section 120, in addition to including a browsing control section 121, an acquired data storage section 122 and a monomedia data playing section 123, differs from the information browsing section 2 of the prior art information provider apparatus example by further including a hypervideo data playing section 124. The function of the hypervideo data playing section 124 is to execute playing of acquired hypervideo data, based upon the contents of acquired scenario data and upon reference video frame numbers as described above. The hypervideo data service section 150 consists of a hypervideo data storage section 151 which stores hypervideo data (i.e. subject matter data together with related scenario data, as described above) and a hypervideo data management section 152 which controls outputting of selected parts of the stored hypervideo data in accordance with externally supplied data transfer requests which are sent from the information browsing section 120.

In addition to the HTTP (Hypertext Transfer Protocol) communication system 141, which is used for hypertext data communication between the information browsing section 120 and WWW data service section 130, the data communication path 140 further includes a NFS (Network File System, a registered trade mark of Sun Microsystems Inc., U.S.A.) communication system 142, i.e. a data communication system utilizing the NFS protocol for high-speed data transfer via the data communication path 140, between the information browsing section 120 and hypervideo data service section 150. It should be understood that FIG. 2 is essentially a conceptual block diagram, and that the data communication path 140 will in general consist of a single physical communication path, with data being routed between the information browsing section 120 and the WWW data service section 130 and hypervideo data management section 152 in accordance with the communication protocol which is being utilized, i.e. the HTTP or the NFS communication protocol. More specifically, the HTTP communication system 141 represents respective software (communication application programs) and hardware which are provided within the browsing control section 121 and WWW data management section 132, which implement data communication via the data communication path 140, using the HTTP. Similarly, the NFS communication system 142 represents respective software and hardware which are provided within the hypervideo data playing section 124 and hypervideo data management section 152, which implement data communication via the data communication path 140 using the NFS protocol.

When data are transferred over a communication path by using the HTTP, e.g. transferred from the WWW data storage section 131 to the information browsing section 120 in FIG. 2, then in general, all of the transferred data (a page of hypertext data or a monomedia data file) must first be stored in memory at the receiving side, i.e. a downloading operation must be completed before playing of the received data can begin. However data transfer using a communication protocol such as the NFS protocol is executed in a basically different manner. When a communication program which implements the NFS protocol is invoked, e.g. by a client terminal which is coupled via a data communication path to a server computer, the client terminal becomes enabled to directly access the contents of data files which are stored at the server computer. Thus, it is not necessary for the client terminal to download all of the data of a monomedia data file before starting to play the contents of the file. Instead, the client terminal can play the file data, by substantially real-time operation, as they are successively received. With recent advances which have been made in communication and computer technology, it has thereby become possible to use a such a communication technique to enable a client terminal to generate a real-time video display as the video data are being successively transferred from a server computer. In addition, with the NFS system, it is possible for a plurality of data files of a server computer to be accessed simultaneously by one or more client computers.

Although it is assumed in this description that the NFS communication system is utilized, it would of course be equally possible to utilize any other data communication system which provides similar file access capabilities and is capable of transferring video data over a communication path to a video display apparatus at a sufficiently high transfer rate to enable continuous-motion display of the video data contents during real-time data transfer.

Figure 3:
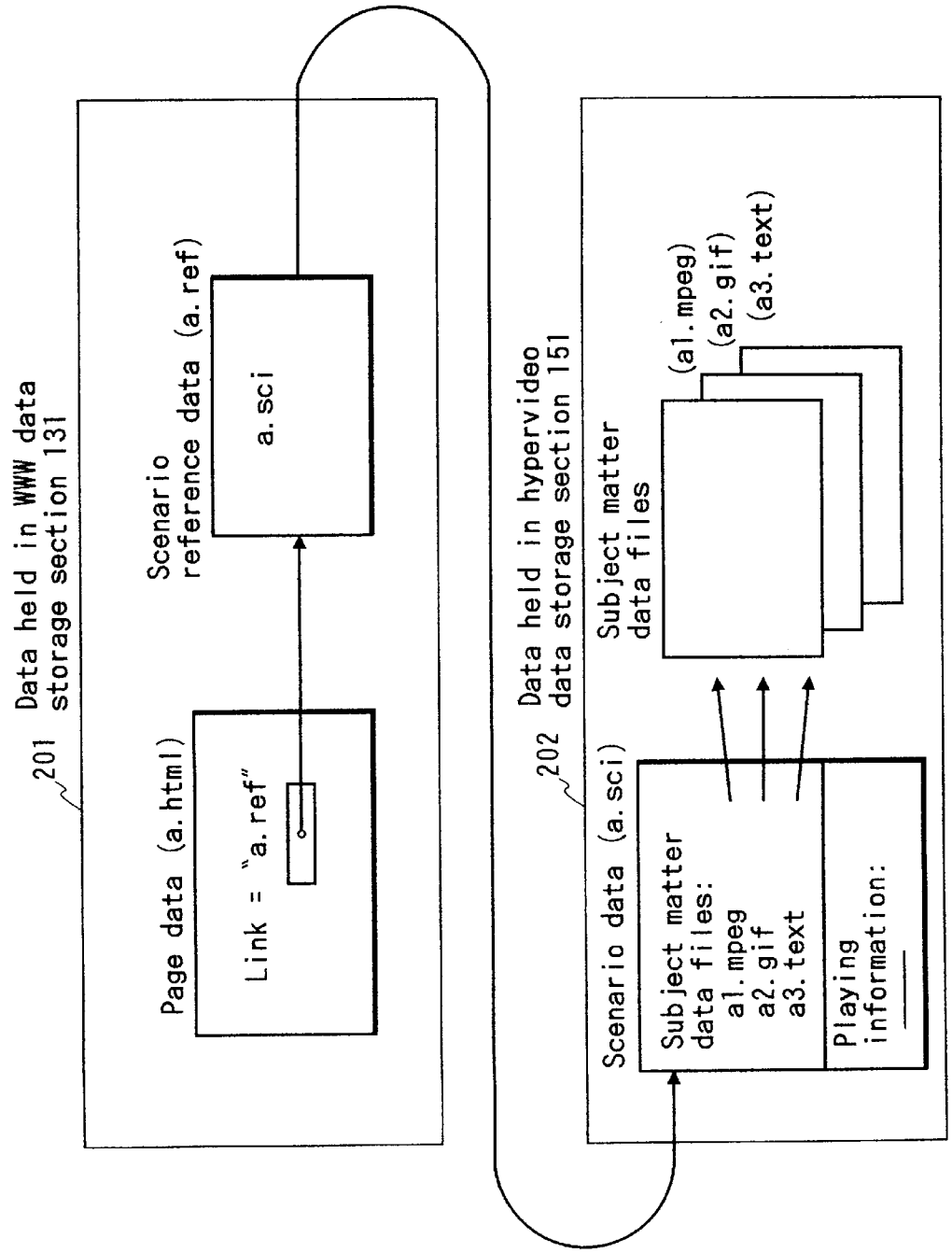
FIG. 3 is a diagram for illustrating how respective types of data are stored and utilized, for the first embodiment.

The above points are illustrated in FIG. 3, which conceptually shows an example of the contents of hypervideo data which relate to a specific hypervideo clip. This consists of WWW data 201 which are transferred by using the HTTP communication system 141 and are stored and managed by the WWW data service section 130, and hypervideo data 202 which are transferred by using the NFS communication system 142 and are stored and managed by the hypervideo data service section 150. In the example of FIG. 3, the WWW data 201 contain the following:

Data of a Hypertext Page (a.html). and Scenario Data (a.ref)

As shown, the hypertext page contains a hyperlink to scenario data (a.ref) for a specific hypervideo clip. The scenario data consist of information which specifies where the scenario data file of the hypervideo clip are being held in the hypervideo data storage section 151. In this example, the information is assumed to consist simply of the scenario file name (a.sci), however in general, directory path information for that scenario file may also be included.

The hypervideo data 202 contains the following:

(a) Scenario Data (a.sci)

This is a data file which, as described above, contains information specifying the storage locations of the subject matter data files (i.e. the files a1.mpeg, a2.gif, a3.text) and also playing information, which relates to control of playing the subject matter data contents, i.e. data which specify times of starting to play specific parts of the component media data of a hypervideo data clip (determined on the basis of frame numbers of a reference video clip as described above), etc.

(b) Subject matter media data (a1.mpeg), (a2.gif), (a3.text)

This consists of a plurality of monomedia data files containing the media data which are actually played, and which in conjunction with the scenario data (a.sci) constitute the hypervideo data of this hypervideo clip.

FIG. 4 shows an example of the contents of a playing control table 203 which is held in the browsing control section 121 of the information browsing section 120. In addition to the records which are identical in form and function to those of the playing control table 24 of the prior art apparatus, shown in FIG. 68, i.e. records for the respective file extensions ".html", "gif", and "mpeg", the playing control table 203 further includes a record for the file extension ".ref". This file extension is used in the file name of any scenario data file. When such a file is transferred to the information browsing section 120 in response to a hyperlink data transfer request, the browsing control section 121 first stores the contents in the acquired data storage section 122, then detects the file extension ".ref" by referring to the playing control table 203, and responds by causing the hypervideo data playing section 124 to send a request (using the NFS communication system 142) to the hypervideo data service section 150 for the corresponding scenario data file. When for example the scenario data file "a.ref", containing as data contents the file name "a.sci", is received by the browsing control section 121, and stored in the acquired data storage section 122, a program (designated as the HV-ref-play player program in FIG. 4) is invoked, whereby the hypervideo data playing section 124 sends a data transfer command to the hypervideo data management section 152 such that the hypervideo data playing section 124 is enabled to begin reading out the contents of the corresponding scenario data file "a.sci" from the hypervideo data storage section 151, via the data communication path 140. The hypervideo data playing section 124 then begins to operate in accordance with the scenario data contents. Specifically, after various initialization processing has been completed, the hypervideo data playing section 124 sends to the hypervideo data service section 150 a data transfer request for accessing the file of the reference video clip of the specified hypervideo clip, invokes the "mpeg-play" player program, and begins to continuously transfer the reference video data from the hypervideo data storage section 151 via the data communication path 140 using the NFS communication system 142, to be played by the display apparatus 112. Thereafter, the other monomedia data contents of the specified hypervideo clip are similarly transferred from the hypervideo data storage section 151 to the hypervideo data playing section 124, using the NFS communication system 142, and are played by the display apparatus 112, at times which are determined based on the contents of the scenario data and the elapsed number of frames of the reference video data, as described hereinabove. That processing continues until the end of the scenario, i.e. until the final frame of the reference video clip has been played.

Figure 5:
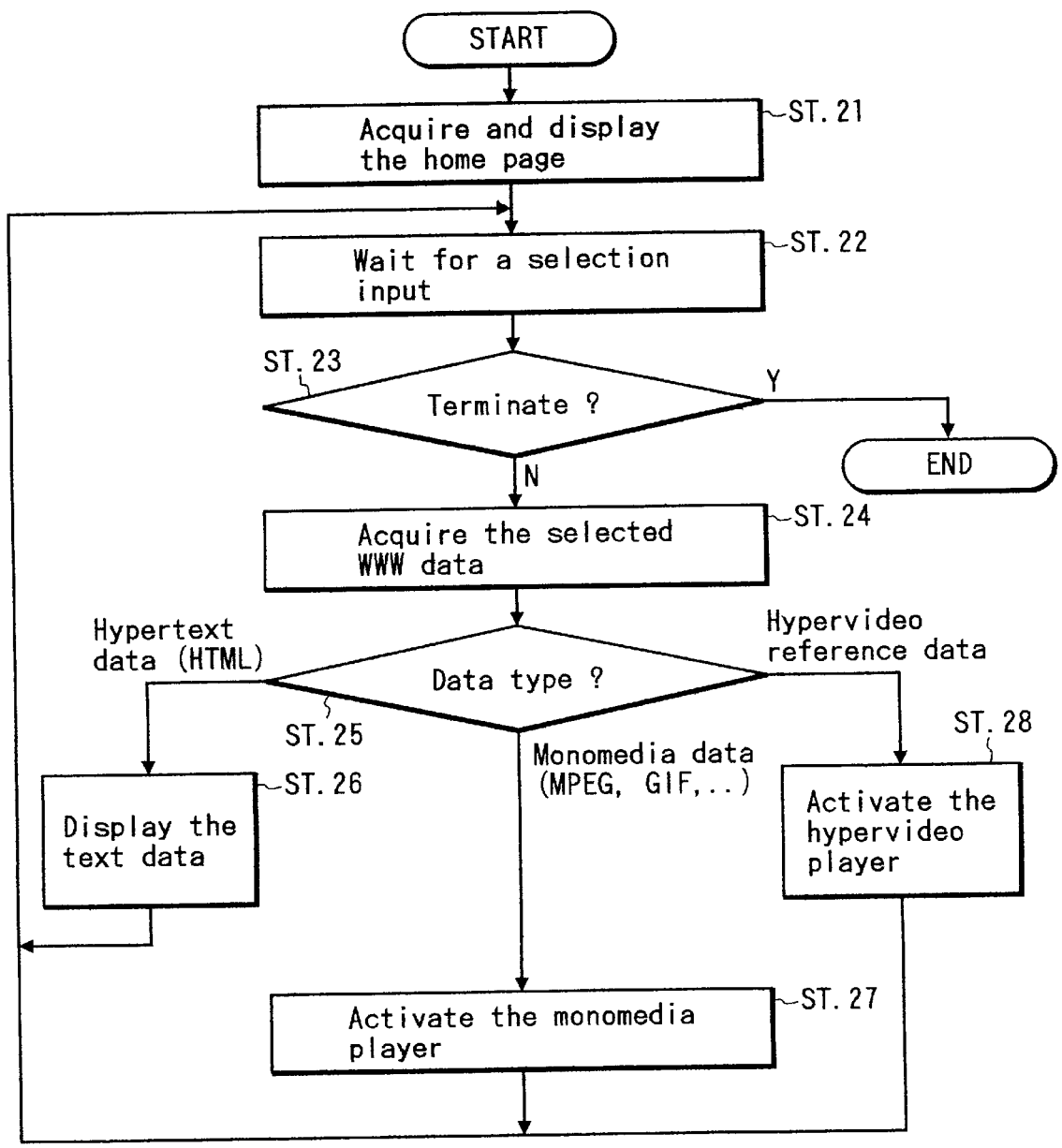
FIG. 5 is a flow diagram showing an operation sequence which is executed by a browsing control section of the first embodiment.
Figure 69:
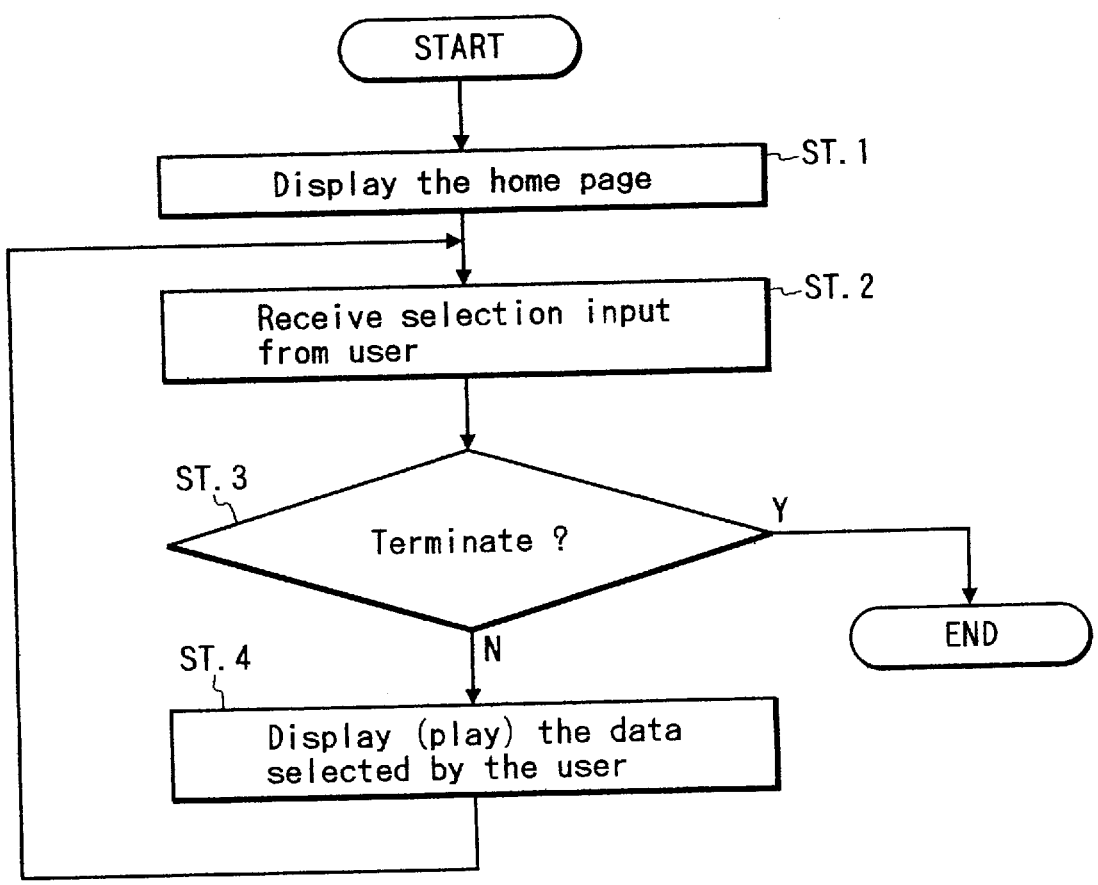
FIG. 69 is a flow diagram showing the basic operation sequence of the prior art information provider apparatus of FIG. 66.
Figure 72:
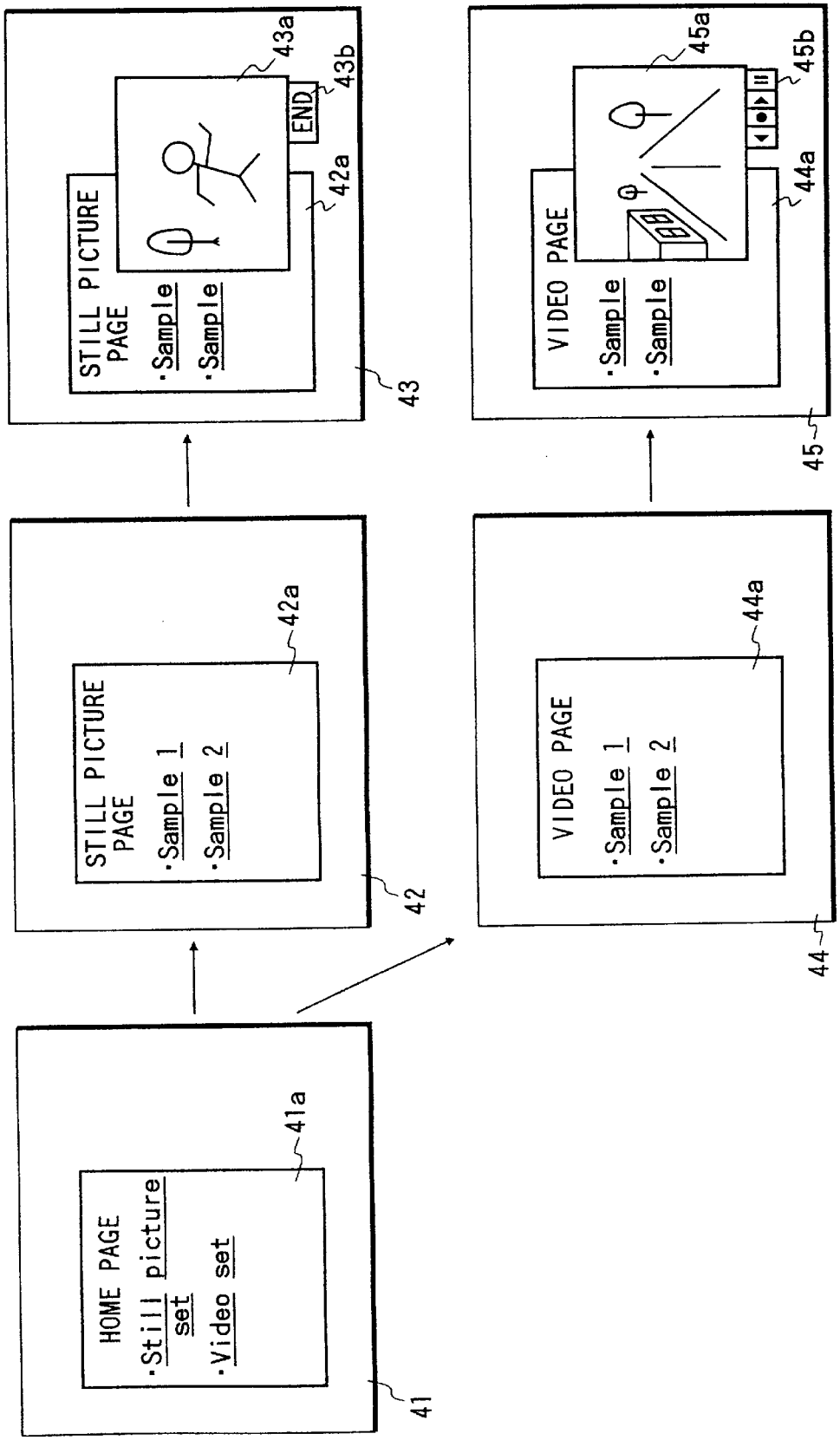
FIG. 72 shows examples of successive display pictures which are generated during operation of the prior art apparatus of FIG. 66.

FIG. 5 is a flow diagram showing the operating sequence executed by the information browsing section 120 of this embodiment. In FIG. 5, steps 21, 22 and 23 correspond to steps 1, 2 and 3 in the flow diagram of FIG. 69 for the prior art example described hereinabove, so that it can be understood that the operations which must be executed by a user are similar to those of the prior art example. The processing steps are as follows:

Step 21: A request for transfer of the home page is sent by the browsing control section 121 via the data communication path 140, using the HTTP communication system 141, to the WWW data service section 130. The transferred data are stored in the acquired data storage section 122, and displayed by the display apparatus 112.

Step 22: The system waits to receive a hyperlink selection input, or a "terminate operation" input from the user, via the input apparatus 111.

Step 23: A judgement is made, in accordance with the user input operation, to either terminate operation or to request selected WWW data from the WWW data service section 130.

Step 24: The selected WWW data are transferred by the browsing control section 121 from the WWW data service section 130 to the information browsing section 120, using the HTTP communication system 141, and stored in the acquired data storage section 122.

Step 25: A judgement is made, based on the file extension of the transferred WWW data and the contents of the playing control table 203, as to the type of data which have been selected.

Step 26: If the transferred data are in HTML format, having the file extension ".html" (i.e. indicating a hypertext data page) then the data contents are supplied to the display apparatus 112, to update the displayed hypertext page data.

Step 27: If the transferred data are monomedia data, e.g. having a file extension such as ".mpeg" or ".gif", then the appropriate player program is invoked by the monomedia data playing section 123, and the data are played (displayed) by the display apparatus 112.

Step 28: If the transferred data are scenario reference data (with file extension ".ref") then the data are supplied to hypervideo data playing section 124, causing the hypervideo data playing program to be invoked, so that a request is sent to the hypervideo data service section 150 (using the NFS communication system 142) to access corresponding hypervideo scenario data file. Transfer and playing of the scenario data, and consequent transfer/playing of the subject matter data of the corresponding hypervideo clip as described above, then begins, and operation returns to step 22.

Judgement of the type of data which have been transferred in step 24 is based on the file extension of the data, in conjunction with the contents of the playing control table 203, as described hereinabove.

Figure 6:
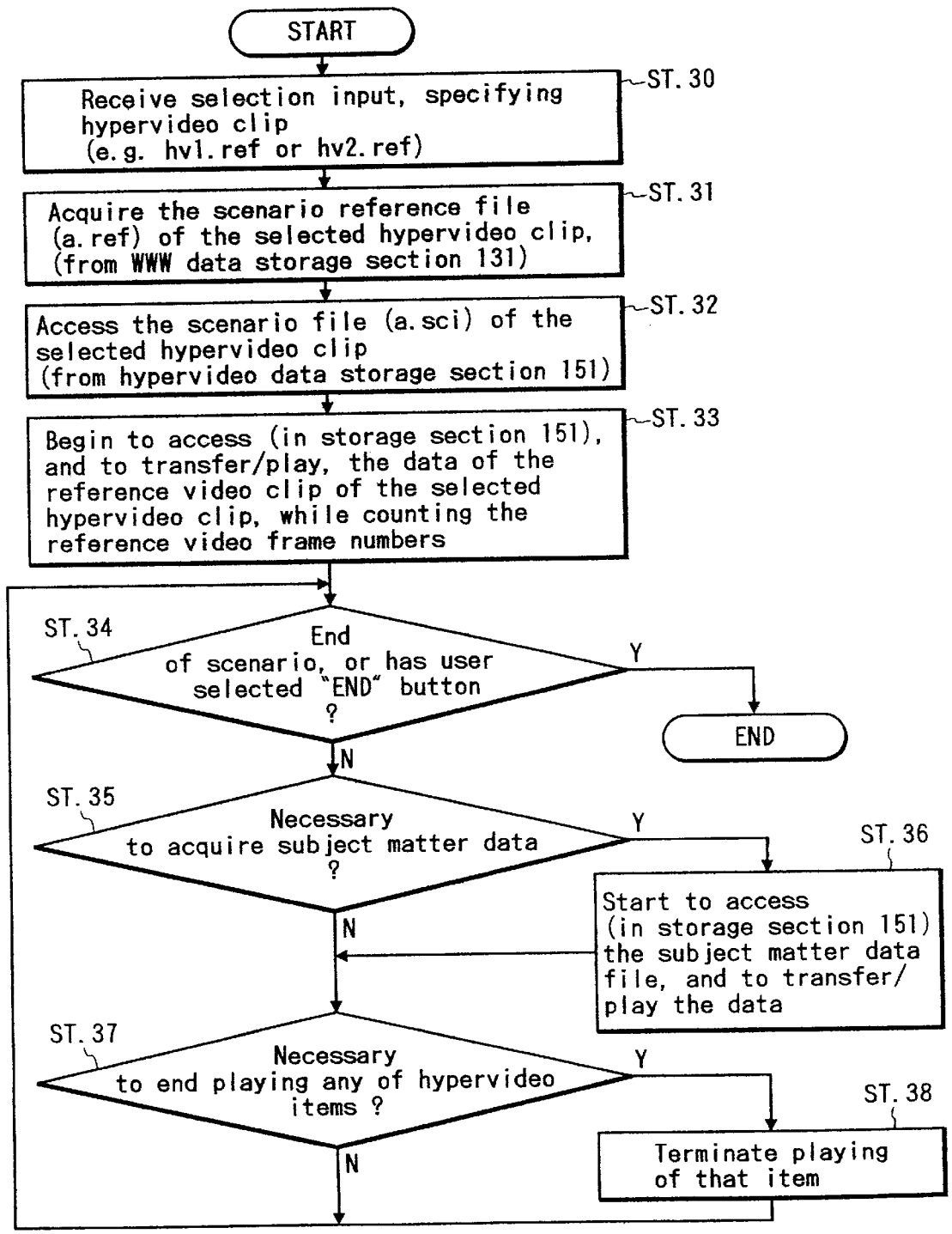
FIG. 6 is a flow diagram showing an operation sequence which is executed by a hypervideo data playing section of the first embodiment.

The operation sequence that is executed by the hypervideo data playing section 124, in step 28 of FIG. 5, will be described referring to FIG. 6, and is as follows:

Step 30: A selection input specifying a hypervideo clip is received from the user.

Step 31: The scenario reference file for that hypervideo clip is acquired, i.e. is read out from the WWW data storage section 131 of the WWW data service section 130, transferred via the data communication path 140 using the HTTP communication system 141, and stored in the acquired data storage section 122.

Step 32: The hypervideo data playing section 124 then accesses the scenario data file of that hypervideo clip, which is stored in the hypervideo data storage section 151 of the hypervideo data service section 150, and begins to receive the data of that file, transferred via the data communication path 140, using the NFS communication system 142.

Step 33: After executing various initialization operations, the hypervideo data playing section 124 begins to access the data file of the reference video clip of the selected hypervideo clip, stored in the hypervideo data storage section 151, and to transfer (via the data communication path 140, using the NFS communication system 142) and play the contents of the reference video data file of the specified hypervideo clip, while counting successive reference video frame numbers. Thereafter, the loop of steps 34 to 38 is repetitively executed in accordance with the scenario data, until the end of the scenario is reached or the user selects termination of playing.

Step 34: If it is found that the end of the scenario has been reached (for example, the final frame number of the reference video clip has been reached) or if the "terminate" button has been selected by the user, then operation returns to step 22 of the processing flow of FIG. 5. Otherwise, operation proceeds to step 35.

Step 35: A judgement is made as to whether, at this point in playing the hypervideo data, the scenario data require that new subject matter data are to be read out from the hypervideo data storage section 151 and played. If so, step 36 is executed. If not, operation proceeds to step 37.

Step 36: The hypervideo data playing section 124 accesses and transfers the contents of the required subject matter data file from the hypervideo data storage section 151 (via the data communication path 140, using the NFS communication system 142) is started, and the data are played by the hypervideo data playing section 124 and display apparatus 112. In the case of continuous-type data (i.e. video or audio data), the data are successively transferred to and played by the display apparatus 112, as they are received from the data communication path 140.

Step 37: A decision is made as to whether it is necessary to end playing of a hypervideo item, e.g. to end displaying of a text or still picture item, the decision being based on the scenario data contents and the reference frame number count.

Step 38: Playing of that item is terminated, if so decided in step 37. Accessing of the corresponding subject matter data file in the hypervideo data storage section 151 by the hypervideo data playing section 124 is terminated. Operation then returns to step 34.

Figure 7:
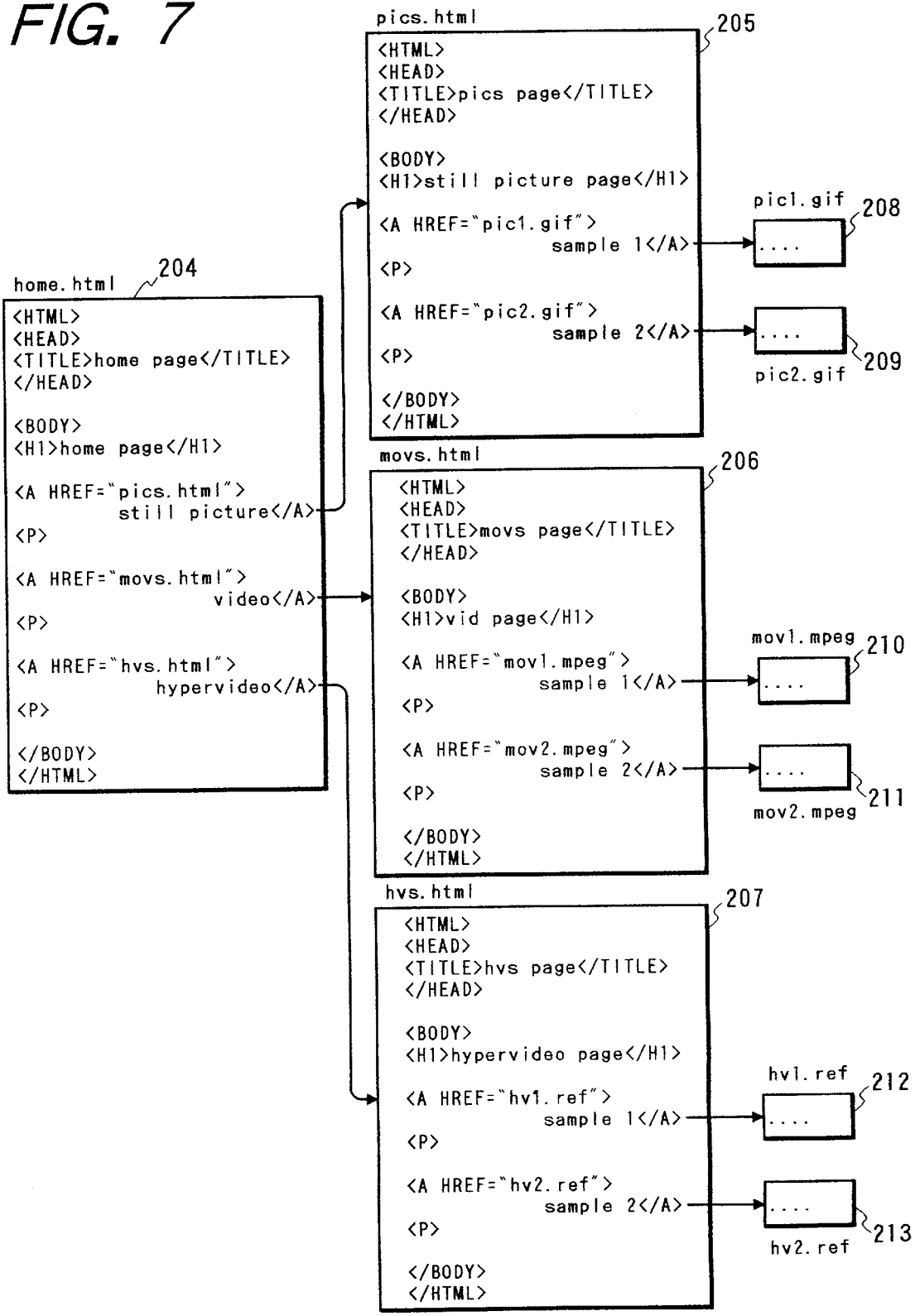
FIG. 7 is a conceptual diagram showing examples of respective types of data which are stored in a WWW data storage section of the first embodiment.
Figure 8:
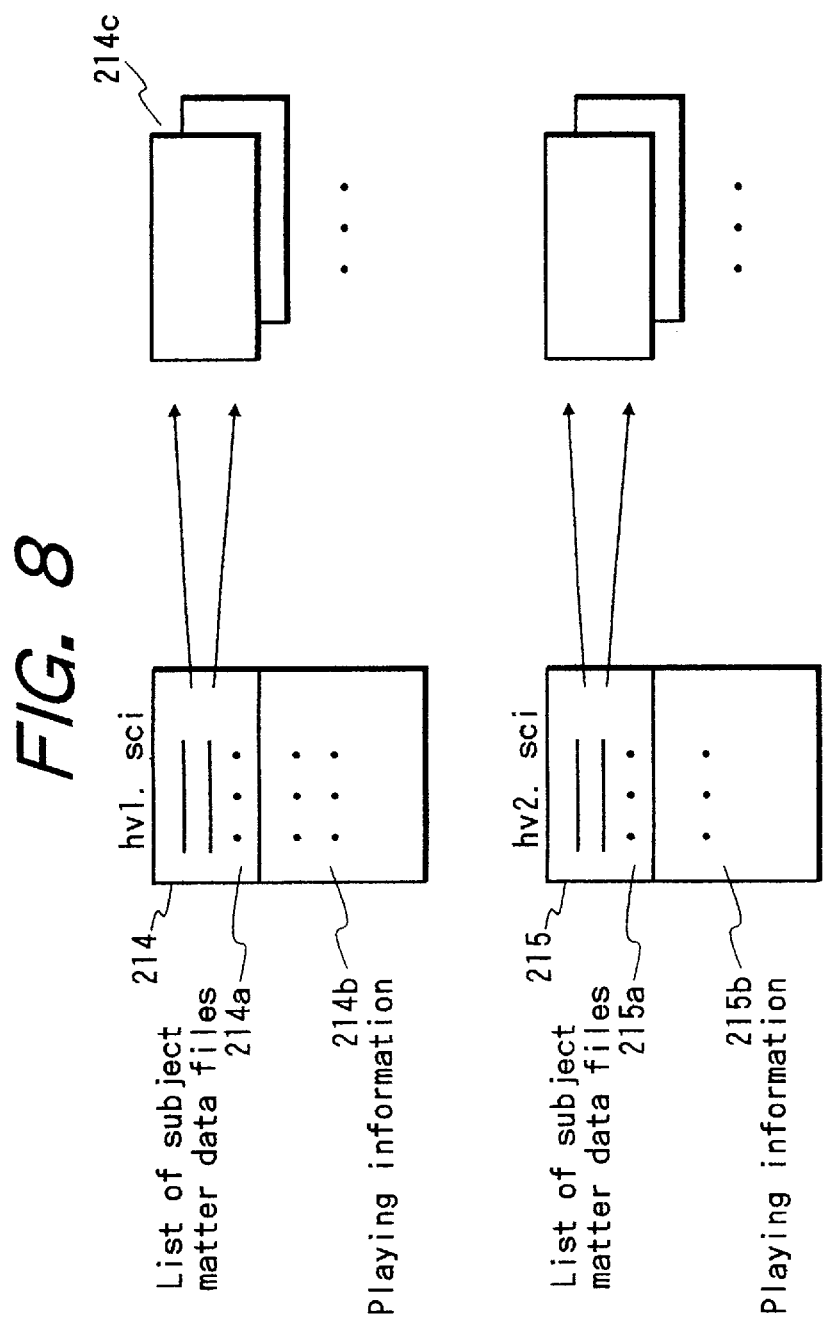
FIG. 8 is a conceptual diagram for illustrating hypervideo data which are stored in a hypervideo data storage section of the first embodiment.

FIG. 7 shows an example of WWW data which might be stored in the WWW data storage section 131 of the WWW data service section 130 of this embodiment. FIG. 8 shows a corresponding example of hypervideo data which might be stored in the hypervideo data storage section 151 of the hypervideo data service section 150. In FIG. 7, 204 is a home page of hypertext data, 205, 206 and 207 denote respective page units of hypertext data which are connected by hyperlinks to the home page 204, while 208 to 213 denote respective monomedia data files which are connected by hyperlinks to the hypertext pages 205, 206 and 207. The monomedia data files 212, 213 are respective scenario reference files (hv1.ref, hv2.ref). These scenario reference files respectively contain the file names (hv1.sci, hv2.sci) of two scenario data files, as indicated by numerals 214, 215 in FIG. 8.

As illustrated in FIG. 8, each of the scenario data files consists of a section, such as section 214a, which provides information indicating the storage locations of the subject matter data files 214c of the corresponding hypervideo clip, and a section such as section 214b which contains playing information for subject matter data files 214c. In this example, it is assumed that the storage location information simply consists of a list of file names of the subject matter data files.

An example of the operation of this embodiment will be described referring to FIG. 9, assuming that the WWW data and hypervideo data shown in FIGS. 7 and 8 are utilized. Firstly, on start-up, the display produced by the display apparatus 112 will become as indicated by numeral 216 in FIG. 9, i.e. containing the home page 216a, in which hyperlink items are displayed in underlined form, together with text contents of the home page. In this example, the user can select either monomedia data items (i.e. the set of still picture items, the set of video items) or the set of hypervideo items. If the hypervideo set is selected (e.g. the user uses a mouse which is part of the input apparatus 111, in conjunction with a display cursor, to "click on" the underlined item "Hypervideo picture set"), then the display produced by the display apparatus 112 will become as indicated by numeral 217, i.e. the hypervideo page 217a will appear, which contains two hyperlink items (sample 1 and sample 2), linked to respective hypervideo clips. If the user selects one of these two hyperlink items, then the processing of step 28 of FIG. 5, described above, is put into operation. As a result, playing of the specified hypervideo clip begins, so that the display produced by the display apparatus 112 will become as indicated by numeral 218, i.e. the hypervideo page 217a will remain displayed in the background, while the (visual) contents of the selected hypervideo clip will be displayed in the foreground, as indicated by numeral 218. The displayed contents of the hypervideo clip are designated as 218a. These contents, in this example, consist of a text portion 218d, a video picture 218e, and a still picture 218f, with the video picture 218a being generated by the reference video clip. In addition, buttons (i.e. for use with a pointing device such as a mouse) for use in controlling the hypervideo display also appear on the display screen, as designated by 218b, together with an "end" button 218c for use in terminating the hypervideo playing operation when desired.

If on the other hand the user selects the static picture set or the video set, from the home page hyperlink items, then the operation will proceed as described hereinabove for the prior art apparatus example of FIGS. 71A, 71B.

With the first embodiment of an information provider apparatus described above, the programs for obtaining hypervideo data (from the hypervideo data service section 150) and playing the data in accordance with the scenario data are invoked automatically, when the user selects a hypervideo item to be played. The user performs that selection (by means of hyperlink items which appear within a displayed page of hypertext information) in the same way as is conventionally used to select WWW data, i.e. to select a new hypertext data page or to select a monomedia data item. Thus, the embodiment is extremely convenient and simple for the user.

Moreover, the implementation of hypervideo selection and playing functions can be very easily performed, due to the use of the scenario data files as an intermediary between the hyperlinks of the conventional hypertext data and the complex combinations of various types of media data which constitute the hypervideo data. That is to say, rather than attempting to directly link the hypervideo data to the conventional hypertext data, hyperlinks are established from hypertext data (such as the hypertext data page 217a shown in the example of FIG. 9) to the scenario data files. When a scenario data file is thereby downloaded from the WWW data that is held in the WWW data service section 130, that fact is detected by the information browsing section 120 (based on the file extension of the downloaded data), whereupon a program is invoked for reading out the corresponding hypervideo reference data from the hypervideo data service section 150 (using the NFS communication system 142), so that the subject matter data contents of the selected hypervideo clip can thereafter be acquired and played in accordance with the scenario data as described hereinabove. As a result, provision of the hypervideo selection and playing capability does not result in any substantial increase in complexity of data management.

Furthermore with this embodiment, during playing of hypervideo, any necessary subject matter data (and in particular, video data) can be directly accessed by the information browsing section 120 and played as it is received, without the need to first store the subject matter data in memory within the information browsing section 120. This is due to the fact that the subject matter data are accessed by using a communication system such as the the NFS communication system 142. As a result, when a user selects a specific hypervideo clip (using a hyperlink within a hypertext data page as described above) playing of the selected hypervideo can begin almost immediately, i.e. the amount of delay between the time at which the user selects a hypervideo clip and the time at which playing of the selected data begins is much shorter than would be the case if all of the hypervideo subject matter data had to be downloaded by the information browsing section 120 before playing of the hypervideo could begin.

The above embodiment has been described only with regard to playing of hypervideo, i.e. with the scenario data for the hypervideo being acquired by the information browsing section 120 via the data communication path 140 by means of the HTTP communication system 141, and all of the hypervideo data being acquired from the hypervideo data service section 150 by means of the HTTP communication system 141. However it would be equally possible to apply similar principles to shortening the time delay which elapses between the point at which a user selects an monomedia data item such as a video clip and the point at which playing of the selected monomedia data item begins. In the case of a video clip for example that could be achieved by:

(a) storing the actual video data (i.e. subject matter data) within the hypervideo data storage section 151, (b) storing in the WWW data storage section 131 a video reference file (having a specific file extension, such as ".vre" for example) containing information which specifies the storage position of the video data within the hypervideo data storage section 151 (e.g. the file name under which the video data are stored), and (c) configuring the information browsing section 120 (i.e. by providing additional records in the playing control table 203, for file extensions such as ".vre" of monomedia data reference information) to detect that a monomedia data reference information file has been transferred from the WWW data service section 130 by the HTTP communication system 141 and stored in the acquired data storage section 122, and to respond to such a condition by using the file contents to directly begin to read out and to play the contents of the corresponding video data file, from the hypervideo data service section 150, using the NFS communication system 142.

It will be apparent that such an information provider apparatus would have a much shorter amount of time delay between selection of a monomedia data item (using a hyperlink) and the the start of playing of the selected item, than has been possible with a prior art type of information provider apparatus, with which it is necessary to completely download an entire monomedia data file (by HTTP transfer) before playing of the monomedia data can begin. It will also be apparent that such a capability can very easily be added to the functions of the first embodiment described above.

Furthermore the above embodiment has been described on the assumption that the NFS data communication protocol is used for transferring hypervideo data to the information browsing section 120, i.e. that the information browsing section 120 executes the necessary data communication program for implementing the NFS protocol and that the information browsing section 120 and hypervideo data service section 150 are equipped with the necessary data processing hardware which are required for NFS communication. However it would be equally possible to use any other data transfer system, which enables the information browsing section 120 to directly access (via the data communication path 140) the contents of files which are stored at the hypervideo data service section 150 and transfer the file contents at a sufficiently high data rate to permit continuous-motion display of transferred video data, and which also enables concurrent accessing of a plurality of files which are stored in the hypervideo data service section 150

In particular, if the hypervideo data includes large amounts of video data, i.e. data which must be read out continuously at high speed from the hypervideo data storage section 151 of the hypervideo data service section 150 (which in general will consist of a high-capacity hard disk storage device), then it may be preferable to use a data communication program such as VideoShower (a registered trademark of Matsushita Electric Industrial Co. Ltd., Japan), which enables video data to be read out from hard disk storage and supplied simultaneously, without interruptions, to a plurality of client terminals, by using a rate control technique.

Figure 10:
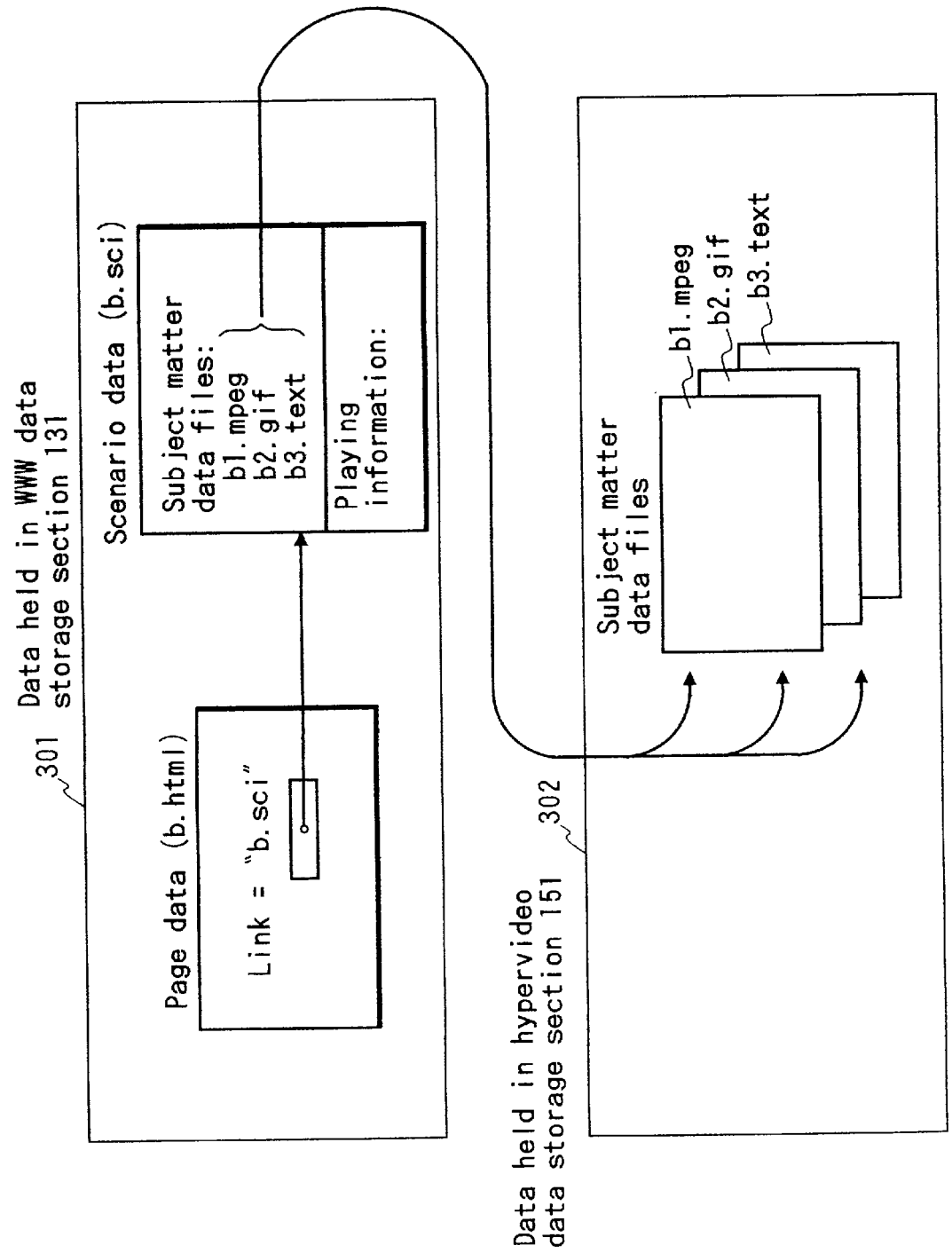
FIG. 10 is a diagram for illustrating how respective types of data are stored and utilized, for a second embodiment of an information provider apparatus according to the present invention.

A second embodiment of the invention will be described, which has the same apparatus configuration as for the first embodiment, described above and shown in FIG. 2, but differs with respect to storing and management of data. FIG. 10 shows an example of the WWW data 301 which are handled by the WWW data service section 130 and the hypervideo data 302 which are handled by the hypervideo data service section 150, with this embodiment. In FIG. 10, the WWW data 301 have the following constituents. Firstly, there is hypertext page data, including the page "b.html", which contains a hyperlink to a scenario data file "b.sc1". That scenario data file is a text file which is also a part of the WWW data 301. In the same way as for a scenario data file of the first embodiment described above, such a scenario data file contains storage location information (such as a list of file names) for the subject matter data of respective hypervideo clips, i.e. locations where the subject matter data are stored in the hypervideo data storage section 151 of the hypervideo data service section 150, and playing control information for the respective subject matter data.

The hypervideo data 302 of this embodiment, held in the hypervideo data storage section 151, consists only of the hypervideo subject matter data. In this example, the subject matter data consists of the monomedia data files "b1.mpeg", "b2.gif", and "b3.text" (i.e. for a single hypervideo clip).

FIG. 11 shows an example of the structure of a playing control table 303 which is held in the browsing control section 121 of the information browsing section 120 of this embodiment. This table is similar in format to the playing control table 203 of the first embodiment described above, shown in FIG. 4, but differs in that the ".ref" record has been replaced by a ".sc1" record, which relates to hypervideo scenario data. With this embodiment, when the browsing control section 121 detects that a file having the file extension ".sc1" has been transferred from the WWW data service section 130 and stored in the acquired data storage section 122, a player program "HV-sc1-play" is invoked for playing the hypervideo, and thereafter, the respective subject matter data are transferred by the hypervideo data playing section 124 from the hypervideo data service section 150 using the NFS communication system 142, as determined by the contents of the scenario data file, in the same way as described for the first embodiment.

Figure 12:
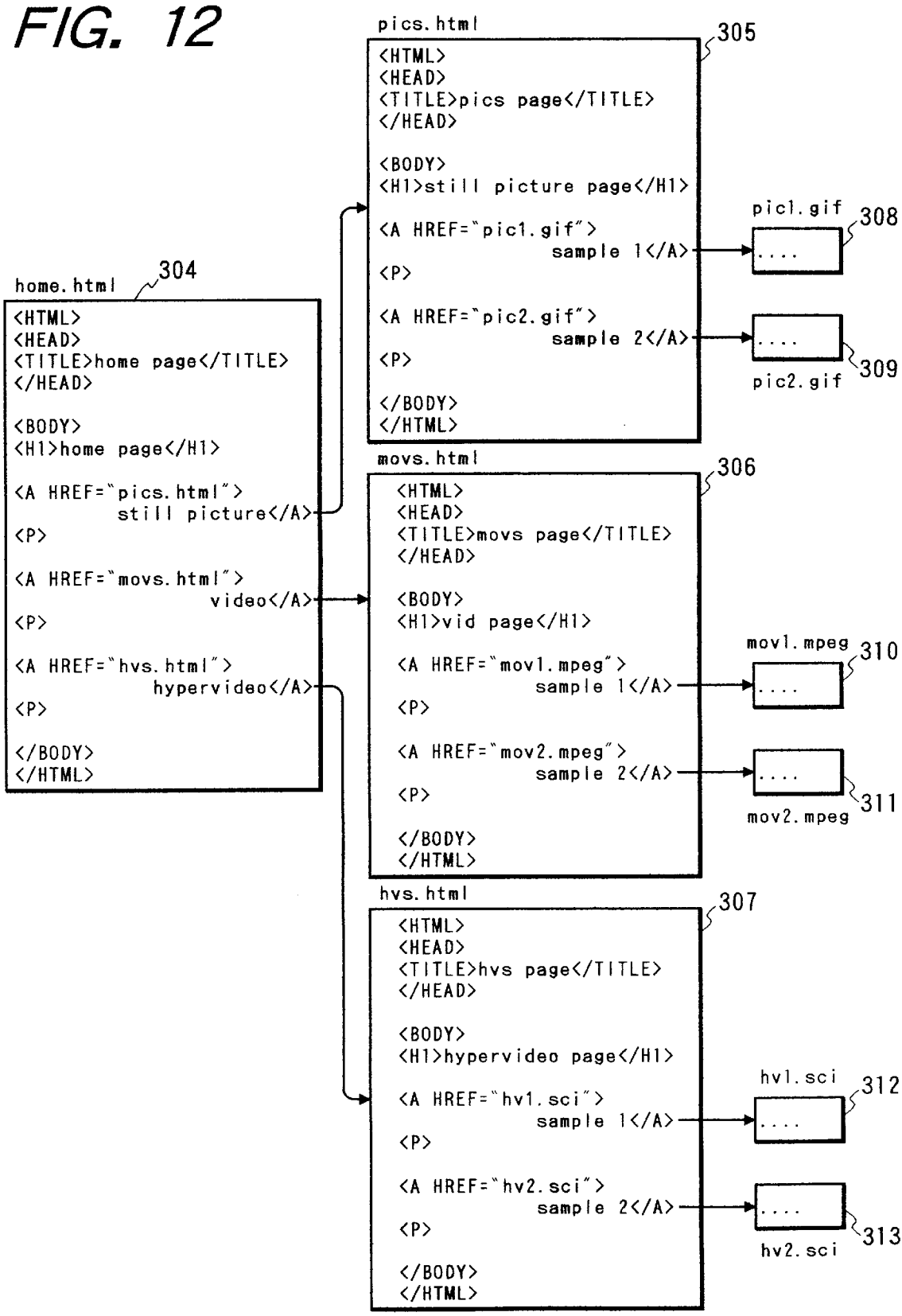
FIG. 12 is a conceptual diagram showing examples of respective types of data which are stored in a WWW data storage section of the second embodiment.

FIG. 12 shows an example of the WWW data which are stored in the WWW data storage section 131 of this embodiment. In FIG. 12, 304 to 307 denote respective hypertext data pages, with 304 denoting the home page, and 308 to 313 denote respective monomedia data files. The monomedia data files 312 and 313 are respective scenario data files (hv1.sci, hv2.sci), which are connected by hyperlinks to the hypertext page 307.

It can thus be understood that this embodiment differs from the first embodiment in that the scenario data are held in the WWW data storage section 131 rather than in the hypervideo data storage section 151, so that it becomes unnecessary to use scenario data files.

Figure 13:
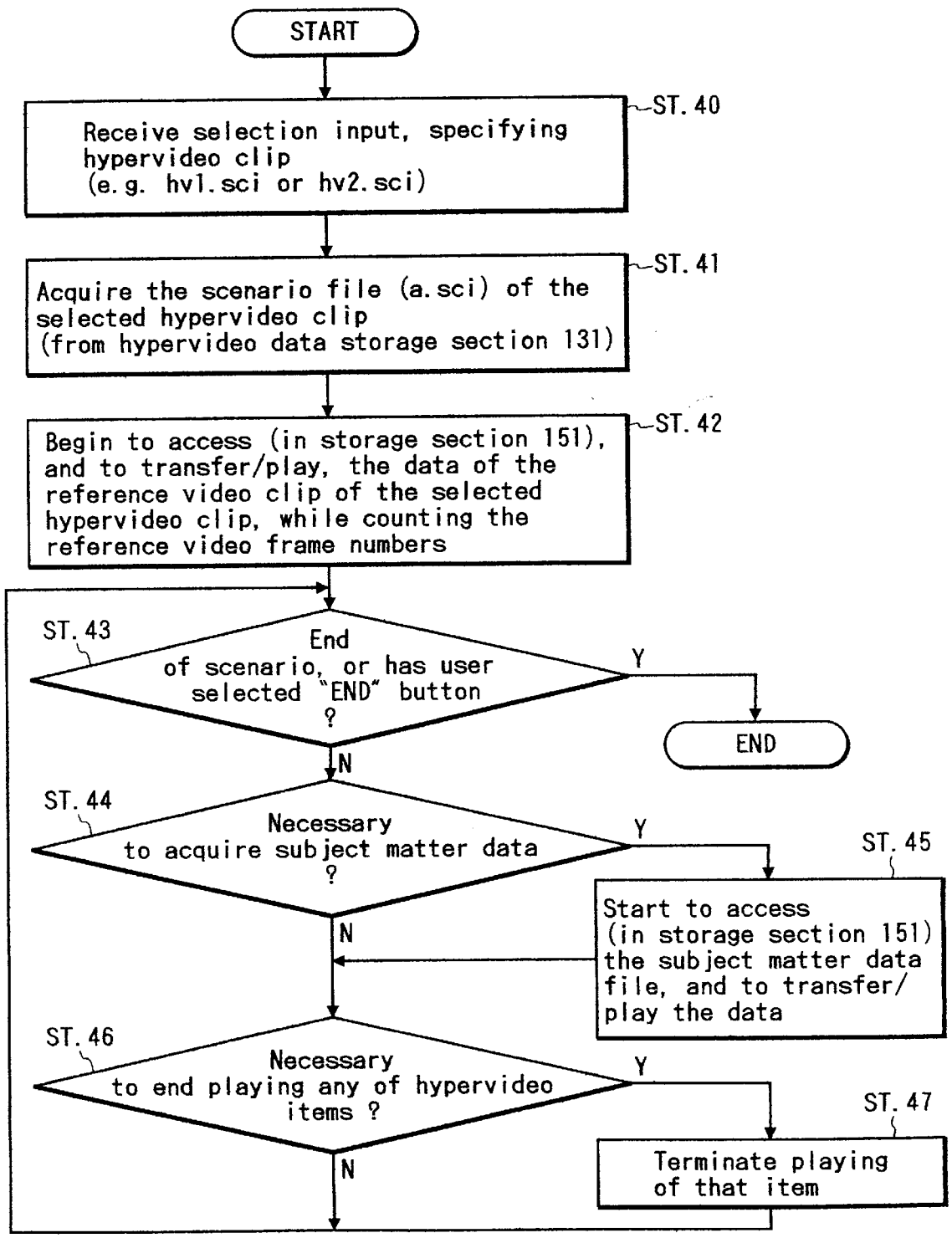
FIG. 13 is a flow diagram showing an operation sequence which is executed by a hypervideo data playing section of the second embodiment.

The basic operation sequence of this embodiment is unchanged from that of the first embodiment described above, shown in FIG. 69. In addition, the processing sequence which is executed by the browsing control section 121 in the information browsing section 120 of this embodiment is similar to that of the first embodiment shown in FIG. 5. However the operation of this embodiment differs with respect to the processing executed in step 28 by the hypervideo data playing section 124 (i.e. to implement the HV-sci-play program). The contents of that step, for this embodiment, will be described referring to FIG. 13, and are as follows:

Step 40: The system receives a selection input from the user, specifying a hypervideo clip.

Step 41: The scenario file for the specified hypervideo clip is acquired, i.e. is read out from the WWW data storage section 131 of the WWW data service section 130, transferred via the data communication path 140 using the HTTP communication system 141, and stored in the acquired data storage section 122.

Step 42: After executing various initialization operations, the hypervideo data playing section 124 begins to access the data file of the reference video clip of the selected hypervideo clip, stored in the hypervideo data storage section 151, and to transfer (via the data communication path 140, using the NFS communication system 142) and play the reference video data, while counting successive reference video frame numbers. Thereafter, the loop of steps 43 to 47 is repetitively executed to play the contents of the hypervideo clip in accordance with the scenario data, until the end of the scenario (corresponding to the final frame of the reference video clip) is reached or the user selects termination of playing.

Step 43: If it is found that the end of the scenario has been reached or if the "end" button has been selected by the user, then operation returns to step 22 of the processing flow of FIG. 5. Otherwise, operation proceeds to step 44.

Step 44: A judgement is made as to whether, at this point in playing the hypervideo data, the scenario data require that new subject matter data are to be read out from the hypervideo data storage section 151 and played. If so, step 45 is executed. If not, operation proceeds to step 47.

Step 45: Reading out of the required subject matter data file from the hypervideo data storage section 151 (via the data communication path 140, using the NFS communication system 142) is started, and playing of the data by the hypervideo data playing section 124 and display apparatus 112 is started, with the data being played as they are received.

Step 46: A decision is made as to whether it is necessary to end playing of a hypervideo item, e.g., to end displaying of a text or still picture item, the decision being based on the scenario data and the reference frame number count.

Step 47: Playing of that item is terminated, if this has been decided in step 37. Accessing of the corresponding file in the hypervideo data storage section 151 by the hypervideo data playing section 124 is terminated. Operation then returns to step 43.

Figure 9:
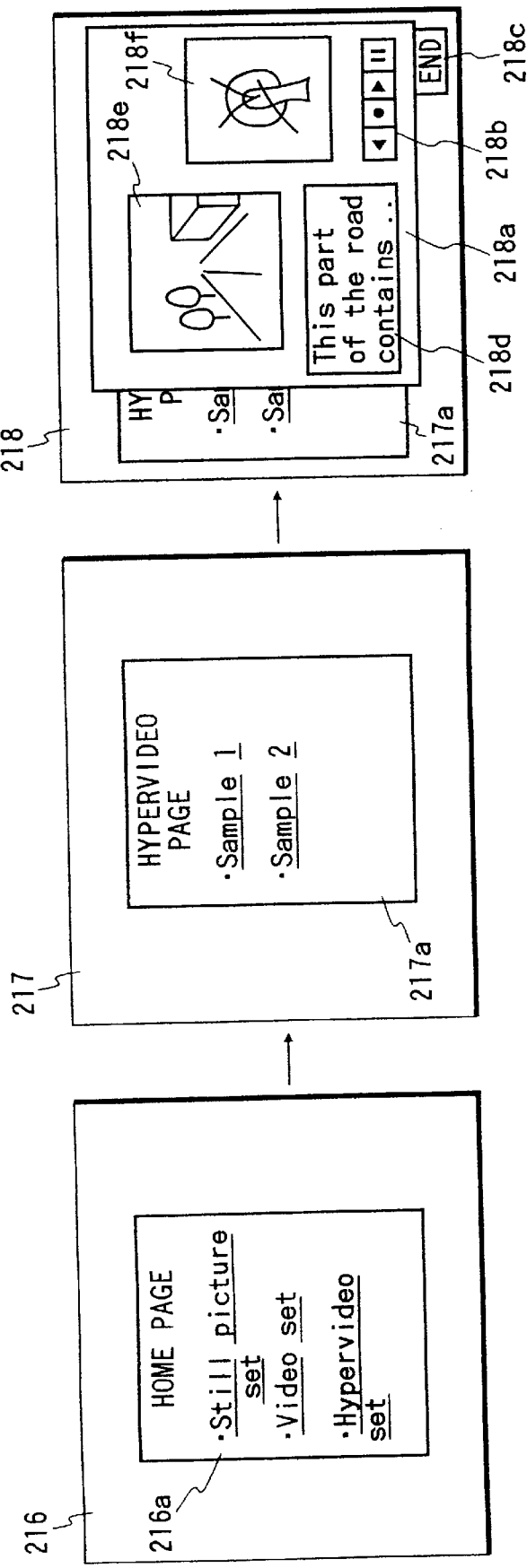
FIG. 9 is a diagram showing examples of successive display pictures which are generated during operation of the first embodiment.

The successive display pictures which are generated by the display apparatus 112 during the above procedure are identical in form to those illustrated by the examples of FIG. 9, for the first embodiment described above.

As described in the above, with the second embodiment of the invention, the structures of the WWW data and hypervideo data that are respectively handled by the WWW data service section 130 and hypervideo data service section 150 become as illustrated in FIG. 10, rather than as illustrated in FIG. 3 for the first embodiment. By establishing the playing control table and the hypervideo playing operation sequence as illustrated respectively in FIG. 11 and FIG. 13, managing of the hypervideo data and providing hypervideo to the user can be easily performed. In addition, a user of a client terminal can designate that a specific hypervideo clip is to be played, by using conventional hyperlink selection operations while observing a displayed hypertext page, in the same way that has been generally utilized for selecting playing of specific monomedia data. It can thus be understood that the second embodiment provides similar advantages to those of the first embodiment of the invention.

Moreover with the second embodiment, it is not necessary to use the scenario reference data that are used with the first embodiment, so that the WWW data and the hypervideo data have the respective structures illustrated in FIG. 10. Hence, the overall data storage efficiency of the apparatus can be increased.

Figure 14:
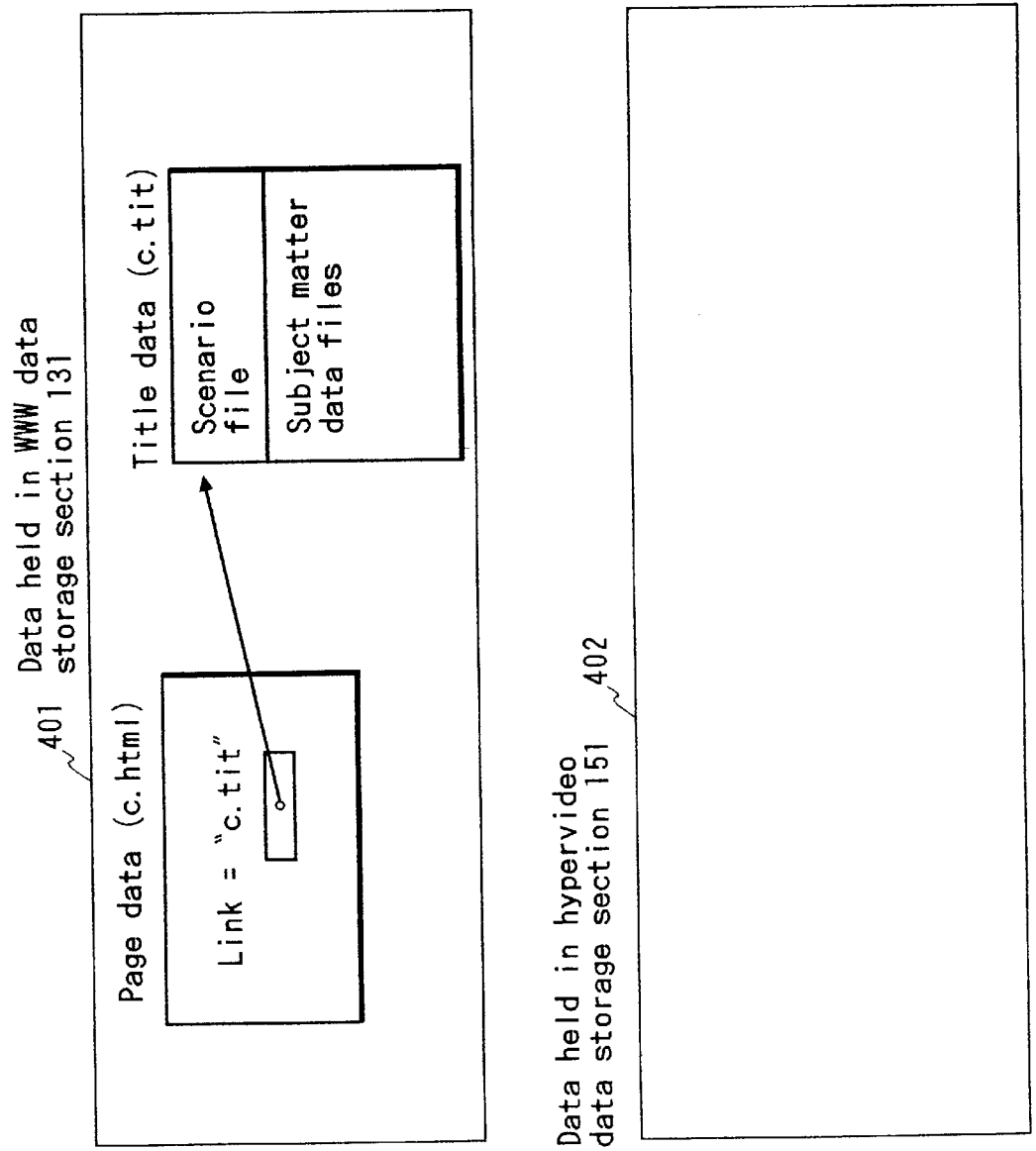
FIG. 14 is a diagram for illustrating how respective types of data are stored and utilized, for a third embodiment of an information provider apparatus according to the present invention.

A third embodiment of the invention will now be described. This embodiment uses a basically similar apparatus configuration to that of the first embodiment of an information provider apparatus, shown in FIG. 2, however this embodiment does not utilize the hypervideo data service section 150 and the NFS communication system 142 for storing, handling and transferring hypervideo data, as required with the first two embodiments described above. FIG. 14 illustrates the structure of the WWW data 401 which are stored in the WWW data storage section 131 of this embodiment. With regard to hypervideo, the WWW data contains the following types of data:

Hypertext Page Data (c.html)

This hypertext page contains one or more hyperlinks to respective sets of data files. Each of these sets includes the scenario data file and all of the monomedia data files which constitute the subject matter data, for a specific hypervideo clip. Each of such sets of files is handled (with respect to hyperlink accessing of the WWW data service section 130 by the information browsing section 120) in the same manner as a single monomedia file, such as the files "pic1.gif", and "mov1.mpeg" in the hypertext data example of FIG. 7 described hereinabove. Such a set of files will be referred to as a "title data file", and will assumed to be assigned (for the purpose of being selected by hyperlink) the file extension ".tit", such as the title data file c.tit which is held in the WWW data 401 shown in FIG. 14.

Each title data file contains the following:
(a) Scenario Data

This includes storage location information (e.g. a list of file names) for the corresponding subject matter data, and playing information for the subject matter data, as described for the preceding embodiments.
(c) Subject Matter Data This consists of a plurality of monomedia data files containing the media data contents of the hypervideo clip, as described for the preceding embodiments.

FIG. 15 shows an example of the playing control table which is held in the browsing control section 121 of the information browsing section 120 of this embodiment, designated by numeral 403. This table has a similar format to the playing control table 203 of the first embodiment described above, shown in FIG. 4, but differs in that the ".ref" record has been replaced by a ".tit" record, which relates to hypervideo title data. With this embodiment, when the browsing control section 121 detects that a file (in actuality, a specific set of files) having the file extension ".tit" has been transferred from the WWW data service section 130 and stored in the acquired data storage section 122, i.e. that each of the component files of a title data file have been successively read out from the WWW data storage section 131, transferred to the information browsing section 120 by using the HTTP communication system 141, and stored in the acquired data storage section 122, then the browsing control section 121 invokes a player program "HV-tit-play", for playing the hypervideo data. Playing of the selected hypervideo clip then begins.

Figure 16:
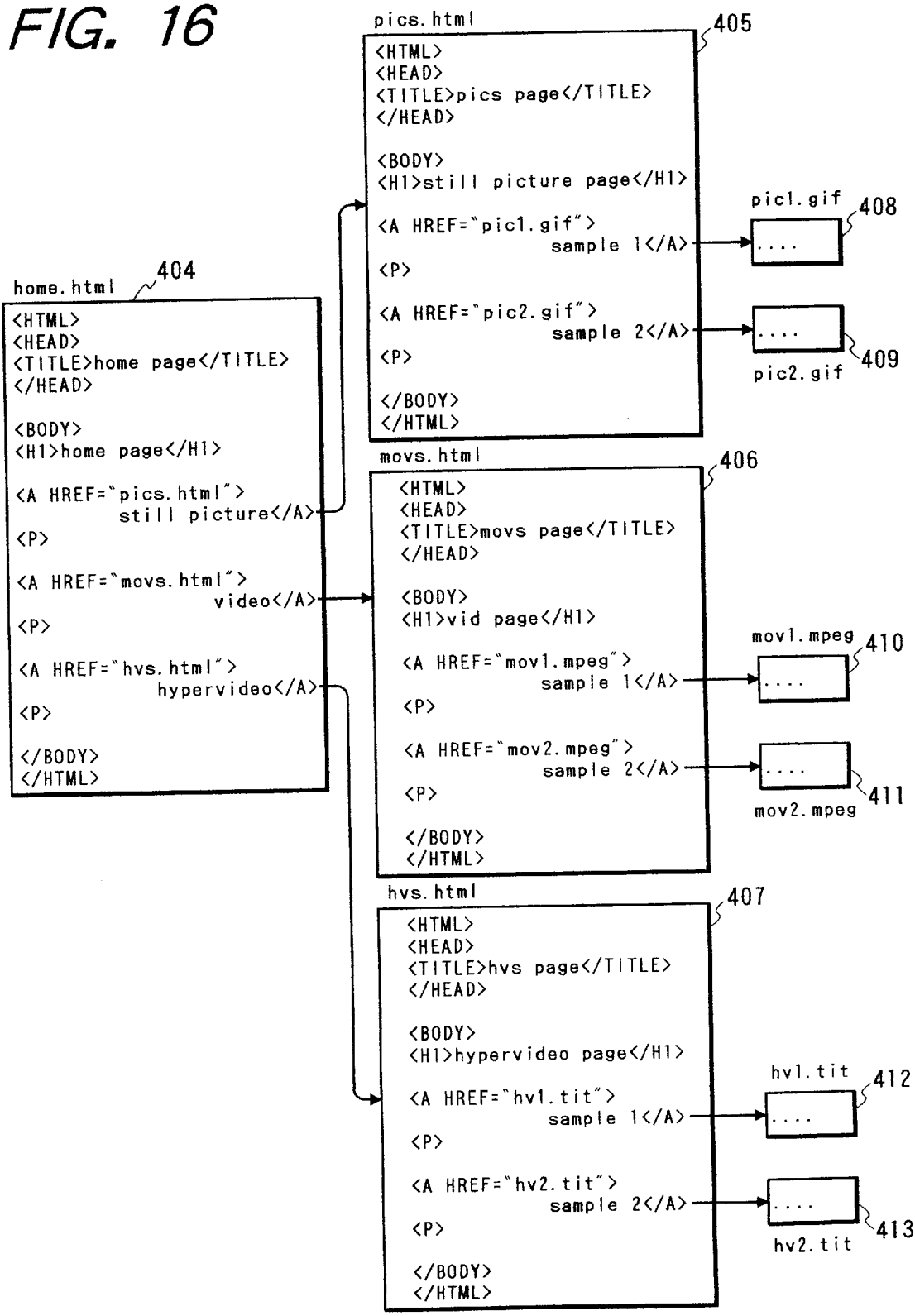
FIG. 16 is a conceptual diagram showing examples of respective types of data which are stored in a WWW data storage section of the first embodiment.

FIG. 16 shows an example of the structure of the WWW data which are stored in the WWW data storage section 131 of the WWW data service section 130 of this embodiment. In FIG. 16, 404 to 407 denote respective hypertext data page units, and 408 to 413 denote respective monomedia data files. The monomedia data files 412, 413 (hv1.tit and hv2.tit) are respective title data files, each having the constituent data files described hereinabove, i.e. each containing all of the subject matter data storage location information, scenario information, and subject matter content information that are necessary for playing a specific hypervideo clip.

Figure 17:
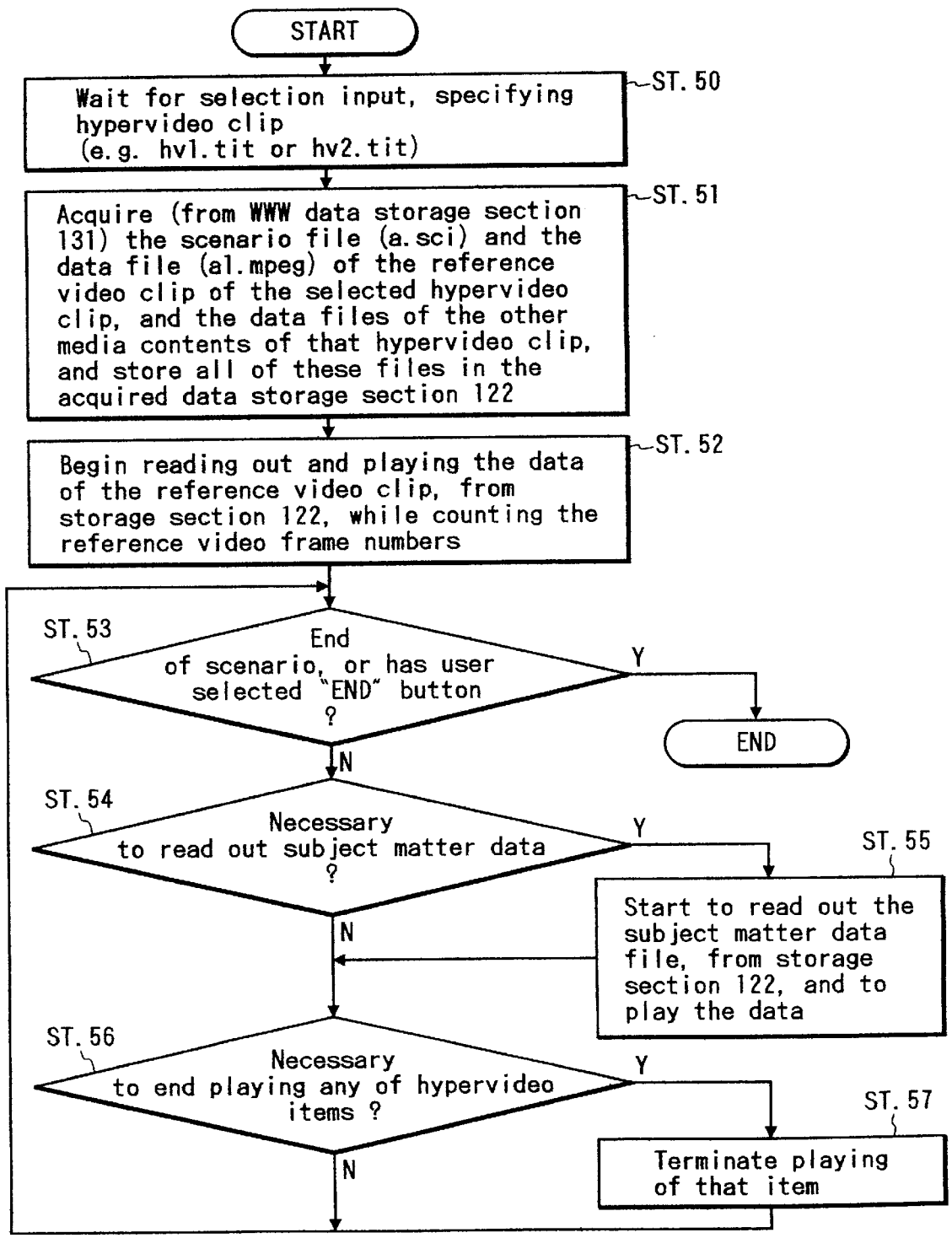
FIG. 17 is a flow diagram showing an operation sequence which is executed by a hypervideo data playing section of the first embodiment.

The basic operation sequence of this embodiment is unchanged from that of the prior art example described above. The processing sequence which is executed by the browsing control section 121 in the information browsing section 120 of this embodiment is similar to that of the first embodiment, shown in FIG. 5 and described above. However the operation of this embodiment differs with respect to the processing executed in step 28 of FIG. 5 by the hypervideo data playing section 124 (i.e. relating to the HV-tit-play program). The contents of that step, for this embodiment, will be described referring to FIG. 17, and are as follows:

Step 50: The system enters a condition in which a selection input specifying a hypervideo clip can be processed.

Step 51: If a hypervideo clip has been selected, then the browsing control section 121 acquires from the WWW data storage section 131 of the WWW data management section 132 (via the data communication path 140, using the HTTP communication system 141) the set of data files which are collectively designated as c.tit, consisting of the scenario data file of the selected hypervideo clip and the monomedia data files which constitute the subject matter data of that clip. All of the data are stored in the acquired data storage section 122.

Step 52: After executing various initialization operations, the hypervideo data playing section 124 begins to read out (from the acquired data storage section 122) the contents of the scenario data file, and to read out and play the data of the reference video clip of the selected hypervideo clip, while counting successive reference video frame numbers. Thereafter, the loop of steps 53 to 57 is repetitively executed to play the contents of the hypervideo clip in accordance with the scenario data, until the end of the scenario (corresponding to the final frame of the reference video clip) is reached or the user selects termination of playing.

Step 53: If it is found that the end of the scenario has been reached or it is detected that the "terminate" button has been selected by the user, then operation returns to step 22 of the processing flow of FIG. 5. Otherwise, operation proceeds to step 54.

Step 54: A judgement is made as to whether, at this point in playing the hypervideo data, the scenario data require that new subject matter data are to be read out from the acquired data storage section 122 and played. If so, step 55 is executed. If not, operation proceeds to to step 56

Step 55: Reading out of the monomedia data file of the required subject matter data from the acquired data storage section 122 is started, and playing of the data by the hypervideo data playing section 124 and display apparatus 112 is started.

Step 56: A decision is made as to whether it is necessary to end playing of a hypervideo item, e.g. to end displaying of a text or still picture item, the decision being based on the scenario data and the reference frame number count.

Step 57: Playing of that item is terminated, if so decided in step 56. Operation then returns to step 34.

The display sequence which occurs with this embodiment, for the case in which the WWW data and the monomedia data are as shown in FIG. 16, is identical to the sequence of the first embodiment, as shown in FIG. 9 and described above.

As described in the above referring to FIG. 14, with the third embodiment of the invention, not only the scenario data but also the subject matter data of the hypervideo data are stored (in the WWW data storage section 131) and accessed (i.e. by first being downloaded, then played) as WWW data. Thus, it is unnecessary to provide the hypervideo data service section 150 and NFS communication system 142 which are used with the preceding embodiments. Instead, all data transfers to the information browsing section 120 are performed by using the HTTP communication system 141. This has certain advantages. Firstly, the apparatus scale is reduced, since the hypervideo data service section 150 and the hardware and software necessary to implement the NFS communication system 142 can be omitted. Furthermore, file management, with regard to transferring hypervideo data to the information browsing section 120, is simplified, since all of the hypervideo data for a hypervideo clip can be handled as a single set of files which are handled in a unified way (i.e. as the file "c.tit" in FIG. 14). Thus there is greater data management and storage efficiency, and reduced possibility of errors occurring.

Apart from the above points, this embodiment provides the first basic advantage of the preceding embodiments, that is to say, a user can select playing of a desired hypervideo clip by "clicking" on a hyperlink region in a displayed hypertext page, in the conventional way. However the embodiment does not provide the second basic advantage of the preceding embodiments, whereby there is a minimum of time delay between the point at which a user selects playing of a desired hypervideo clip and the actual start of playing of the hypervideo. That is because it is necessary for the contents of the "c.tit" file, transferred using the HTTP communication system 141, to be stored in the acquired data storage section 122 before playing of the selected hypervideo clip can begin.

Figure 18:
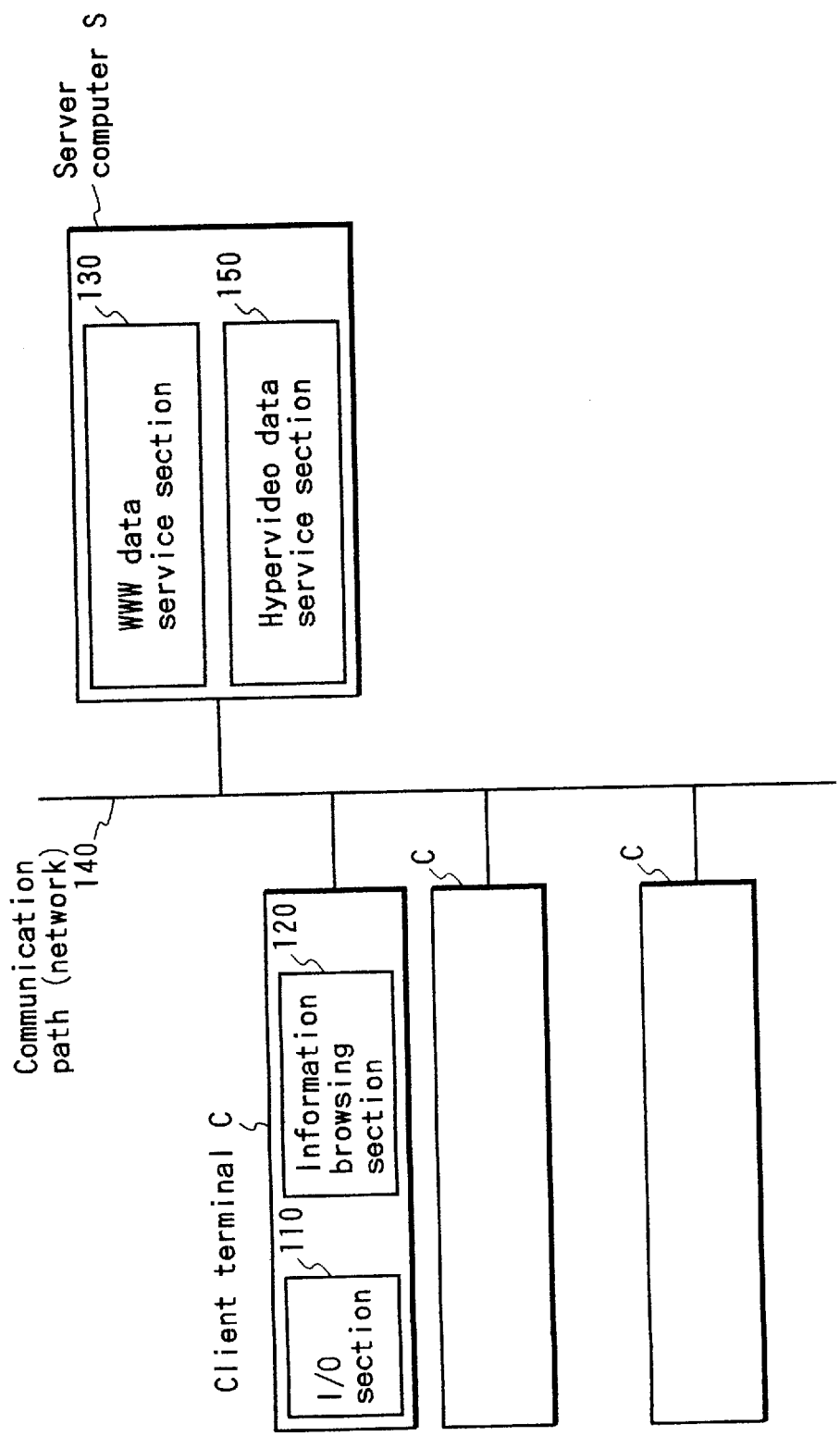
FIG. 18 is a system block diagram showing the basic configuration of a fourth embodiment of an information provider apparatus according to the present invention, which is configured as a network.

A fourth embodiment of an information provider apparatus according to the present invention will be described in the following, referring first to FIG. 18, which is a simple system block diagram of the apparatus. In FIG. 18, C denotes respective ones of a plurality of client terminals, each of which has an identical internal configuration, which are connected via a data communication path 140 to a server computer S. Each of the client terminals C has is configured of an I/O section 110 and an information browsing section 120, mutually connected as shown in FIG. 2 and described hereinabove. The server computer S is made up of a WWW data service section 130 and a hypervideo data service section 150, which are linked to the information browsing section 120 of each of the client terminals C via a data communication path 140 by using a HTTP communication system 141 and NFS communication system 142 respectively, as shown in FIG. 2 and described above. Each I/O section 110, information browsing section 120, WWW data service section 130 and hypervideo data service section 150 is configured to operate on data in a similar manner to that described hereinabove for the first embodiment, so that detailed description of these will be omitted. This embodiment constitutes a computer network, with the data communication path 140 being configured as a network data transmission path.

Figure 19:
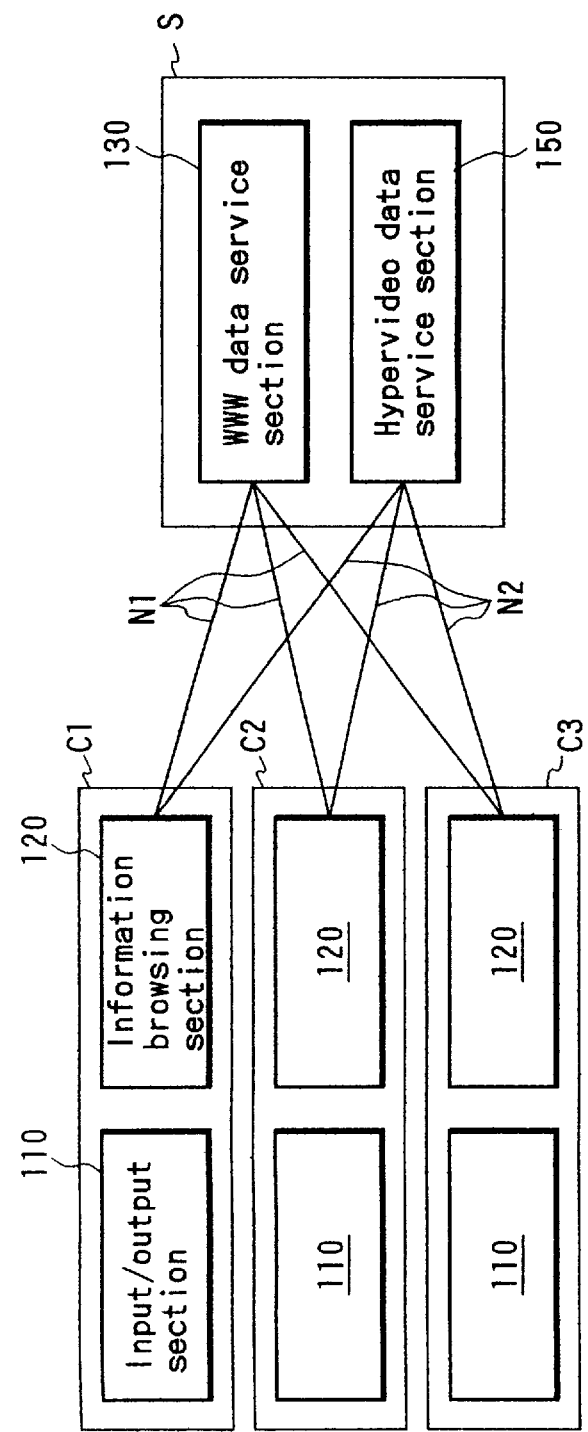
FIG. 19 is a conceptual block diagram for illustrating effective connection relationships between respective client terminals and a server computer, with the fourth embodiment.

FIG. 19 is a conceptual system block diagram for illustrating the connection relationships between the client terminals and server computer of this embodiment. In FIG. 19, each of the lines designated as N1 denotes a data communication connection which corresponds to the HTTP communication system 141 of the first embodiment of the invention, shown in FIG. 1, while each of the lines designated as N2 denotes a data communication connection which corresponds to the NFS communication system 142 of the first embodiment. Thus, each of the client terminals can independently execute data communication with the server computer S by using either the HTTP communication system 141 (for communication with the WWW data service section 130) or the NFS communication system 142 (for communication with the hypervideo data service section 150).

Figure 66:
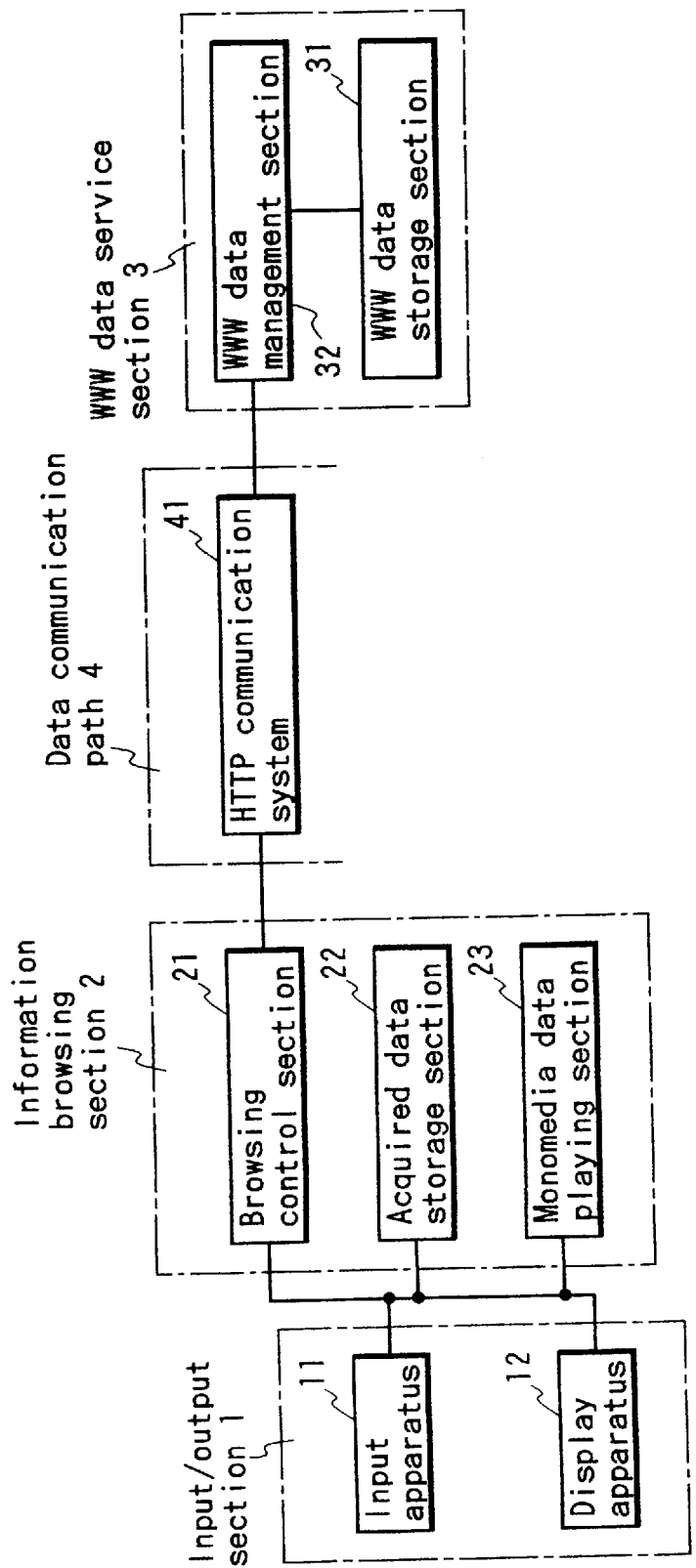
FIG. 66 is a system block diagram of an example of a prior art type of information provider apparatus.

The basic operating sequence, with this embodiment is similar to that of the prior art apparatus of FIG. 66, described hereinabove. At each of the client terminals, a user can execute input/output operations to acquire wWW data and hypervideo data which are stored in the server computer S. Playing of such acquired data is executed by each of the client terminals C independently of data input/output operations which are executed by the other client terminals.

It can thus be understood that the fourth embodiment of the invention enables the effects obtained with the first embodiment to be obtained for each of a plurality of client terminals. Such an arrangement can for example be used in teaching applications, with the various client terminals being used by respective students, and with hypervideo teaching information being stored and managed in a unified manner by the server computer S, without the need to stored hypervideo data at each of the client terminals.

In the above description of the fourth embodiment it has been assumed that the information browsing section 120 of each client terminal, and the WWW data service section 130 and hypervideo data service section 150 of the server computer, are each identical in configuration to the corresponding sections of the first embodiment. However it would be equally possible to achieve similar results by making these sections respectively identical, in configuration and operation, to the corresponding sections of the second embodiment or the third embodiment of the invention, described above.

Figure 20:
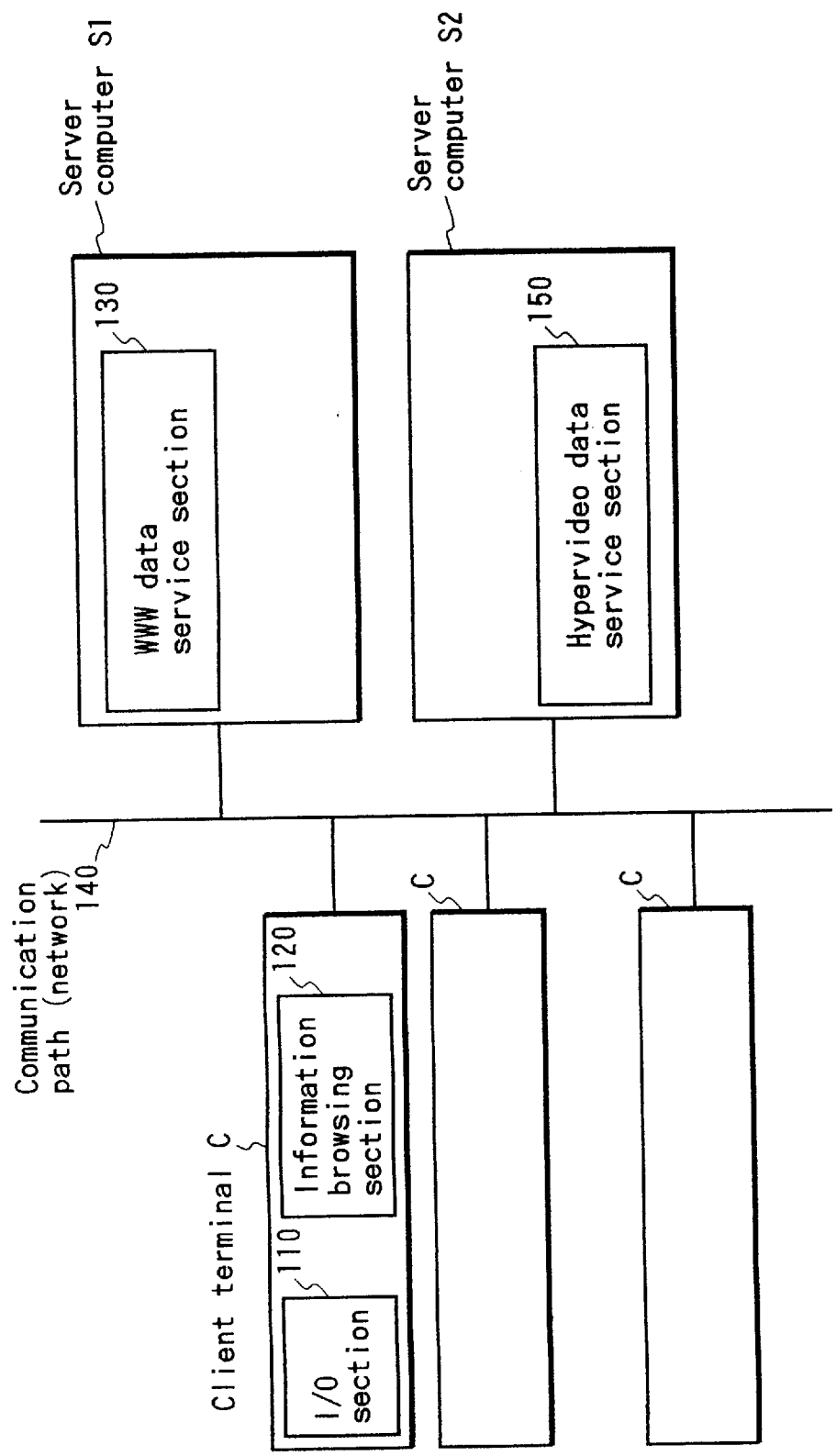
FIG. 20 is a system block diagram showing the basic configuration of a fifth embodiment of an information provider apparatus according to the present invention, which is configured as a network, having respective dedicated server computers for WWW data and hypervideo data.

A fifth embodiment of the invention will be described in the following, referring to FIG. 20, which is a simple system block diagram of this embodiment. In FIG. 20, C denotes respective ones of a plurality of client terminals which are connected via a data communication path 140 to server computers S1 and S2. S1 and S2. This embodiment constitutes a computer network, with the data communication path 140 being configured as a network data transmission path. Each of the client terminals C has the configuration described hereinabove for the first embodiment as shown in FIG. 2, i.e. includes an I/O section 110 and an information browsing section 120. The first server computer S1 contains a WWW data service section 130, while the second server computer S2 includes a hypervideo data service section 150, with the I/O section 110, information browsing section 120, hypervideo data service section 150 and WWW data service section 130 being respectively configured to operate on data as described hereinabove for the first embodiment.

The basic operation sequence executed with this embodiment is similar to that of the prior art apparatus of FIG. 66, described hereinabove. With each of the client terminals, a user can execute input/output operations to acquire WWW data which are stored in the WWW data service section 130 of the server computer S1 (i.e. which functions as a WWW data server), and hypervideo data (specifically, scenario data and subject matter data) which are stored in the hypervideo data service section 150 of the server computer S2 (i.e. which functions as a hypervideo data server). The information browsing section 120 of each of the client terminals C executes data communication with the WWW data service section 130 of the server computer S1 and with the hypervideo data service section 150 of the server computer S2 independently of the information browsing section 120 in each of the other client terminals.

Under certain conditions, this embodiment has advantages over the fourth embodiment, for the following reasons. With the fourth embodiment, in which there is only a single server computer which serves both as a WWW data server and a hypervideo data server, if there is a high frequency of WWW data transfers from the server computer to the client terminals, so that the workload imposed on the CPU of the server computer S is high, then this may have an adverse effect upon the process of transferring hypervideo data from the hypervideo data service section 150 to the client terminals (i.e. data transfer operations in which the client terminals directly access files which are stored in the hypervideo data service section 150). However with the fifth embodiment, since two separate server computers are used for handling WWW data transfer requests and hypervideo data file accesses from client terminals, respectively, that problem of CPU overload can be avoided, and it can be ensured that video data components of hypervideo are correctly transferred to the client terminals as required.

In the above description of the fifth embodiment it has been assumed that the information browsing section 120 of each client terminal, and the WWW data service section 130 and hypervideo data service section 150 of the server computer, are each identical in configuration and operation to the corresponding sections of the first embodiment. However it would be equally possible to achieve similar results by making these sections respectively identical to the corresponding sections of the second embodiment of the invention.

Figure 21:
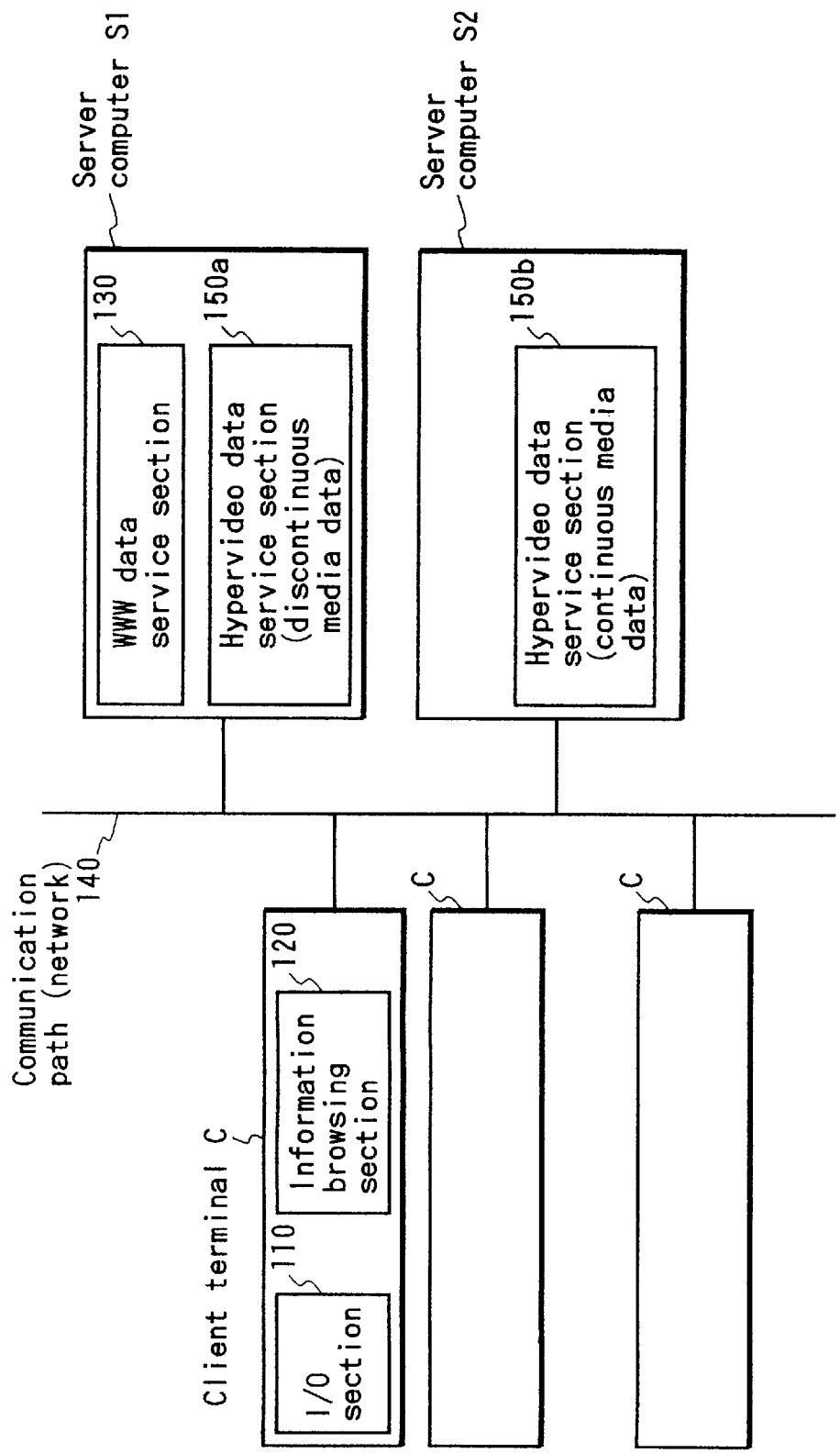
FIG. 21 is a system block diagram showing the basic configuration of a sixth embodiment of the invention, which is configured as a network, having a pair of dedicated server computers, respectively for WWW data and hypervideo data which are of discontinuous type such as text data, and for hypervideo data which are of continuous type, such as video data.

A sixth embodiment of the invention will be described in the following, referring to FIG. 21, which is a simple system block diagram of this embodiment. In FIG. 21, C denotes respective ones of a plurality of client terminals which are connected via a data communication path 140 to server computers S1 and S2. This embodiment also constitutes a computer network, with the data communication path 140 being configured as a network data transmission path. Each of the client terminals has the configuration described hereinabove for the first embodiment as shown in FIG. 2, i.e. includes an I/O section 110 and an information browsing section 120. The server computer S1 contains a WWW data service section 130 and a hypervideo service section 150*a*, while the second server computer S2 contains a hypervideo service section 150*b*. The I/O section 110, information browsing section 120 and WWW data service section 130 are respectively configured to operate on data as described hereinabove for the first embodiment. However the hypervideo service section 150*a* stores and handles only those parts of the hypervideo data (such as scenario data, lists of subject matter data file names, subject matter data consisting of text data files or still picture data files) which are not of continuous data type, i.e. hypervideo data other than subject matter data of video clips or audio clips. The hypervideo service section 150*b* stores and handles only those parts of the hypervideo data which are of continuous data type, i.e. which must be transferred in a substantially continuous manner to a client terminal, when required. Data transfers from the hypervideo service section 150*a* or hypervideo service section 150*b* to the client terminals are performed using the NFS communication system 142, as described for the first embodiment shown in FIG. 2, so that the hypervideo service section 150*a* of the server computer S1 and the hypervideo service section 150*b* of the server computer S2, in combination, perform the functions of the hypervideo data service section 150 of the first embodiment.

Thus with this embodiment, the server computer S1 is a "discontinuous data server" which handles all management of storing and transferring data of the WWW data and those parts of the hypervideo data which are not of continuous media data type, whereas the server computer S2 is a "continuous media data server", which handles all the functions of storing and transferring (i.e. by direct file access via the data communication path 140) those parts of the hypervideo subject matter data which are of continuous media data type.

The basic operation sequence executed with this embodiment is similar to that of the prior art apparatus of FIG. 66, described hereinabove. With each of the client terminals, a user can execute input/output operations to acquire WWW data or hypervideo data which are stored in the server computer S1 or the server computer S2. In the same way as for the fourth and fifth embodiments described above, such data transfer operations are executed mutually independently by each of the client terminals. This embodiment is advantageous, for example, when the hypervideo subject matter contents mainly consist of continuous-type media data such as video or audio data, with only a small proportion of non-continuous data such as text or graphics data.

Since the server computer S2 is dedicated to handling the transfer of only continuous-type media data to the client terminals, it can be ensured that reliable transfer of such hypervideo data to the client terminals, without delays in transfer, can be achieved, irrespective of the level of load that is being imposed on the CPU of the server computer S1 (i.e. if there is a large volume of WWW data being handled by the server computer S1, for example). Enhanced performance in playing hypervideo by the client terminals can thereby be achieved.

In the above description of the sixth embodiment it has been assumed that the information browsing section 120 of each client terminal, and the WWW data service section 130 of the server computer S1, are each identical in configuration and operation to the corresponding sections of the first embodiment, while the combination of the hypervideo service section 150a and hypervideo service section 150b perform in combination the same functions as those of the hypervideo data service section 150 of the first embodiment. Hence, the scenario reference data are stored in the WWW data service section 130, and the scenario data are stored in the hypervideo service section 150a. However it would be equally possible to achieve similar results by arranging that, in the same way as for the second embodiment, the scenario data are not utilized, while the scenario data are stored in the WWW data service section 130 and are accessed in the same manner as other WWW data.

With this embodiment, since the server computer S2 is a dedicated server of continuous media data such as video data, a machine which has been hardware-configured for high efficiency of transferring media data over a network such as a LAN (local area network), and in particular for high efficiency of transferring video data, can be advantageously used as that server computer. Moreover, although it has been assumed that the embodiment uses the NFS system for transfer of hypervideo data between the server computer S2 and the client terminals, it would be equally possible to utilize a data communication system such as the aforementioned VideoShower.

Figure 22:
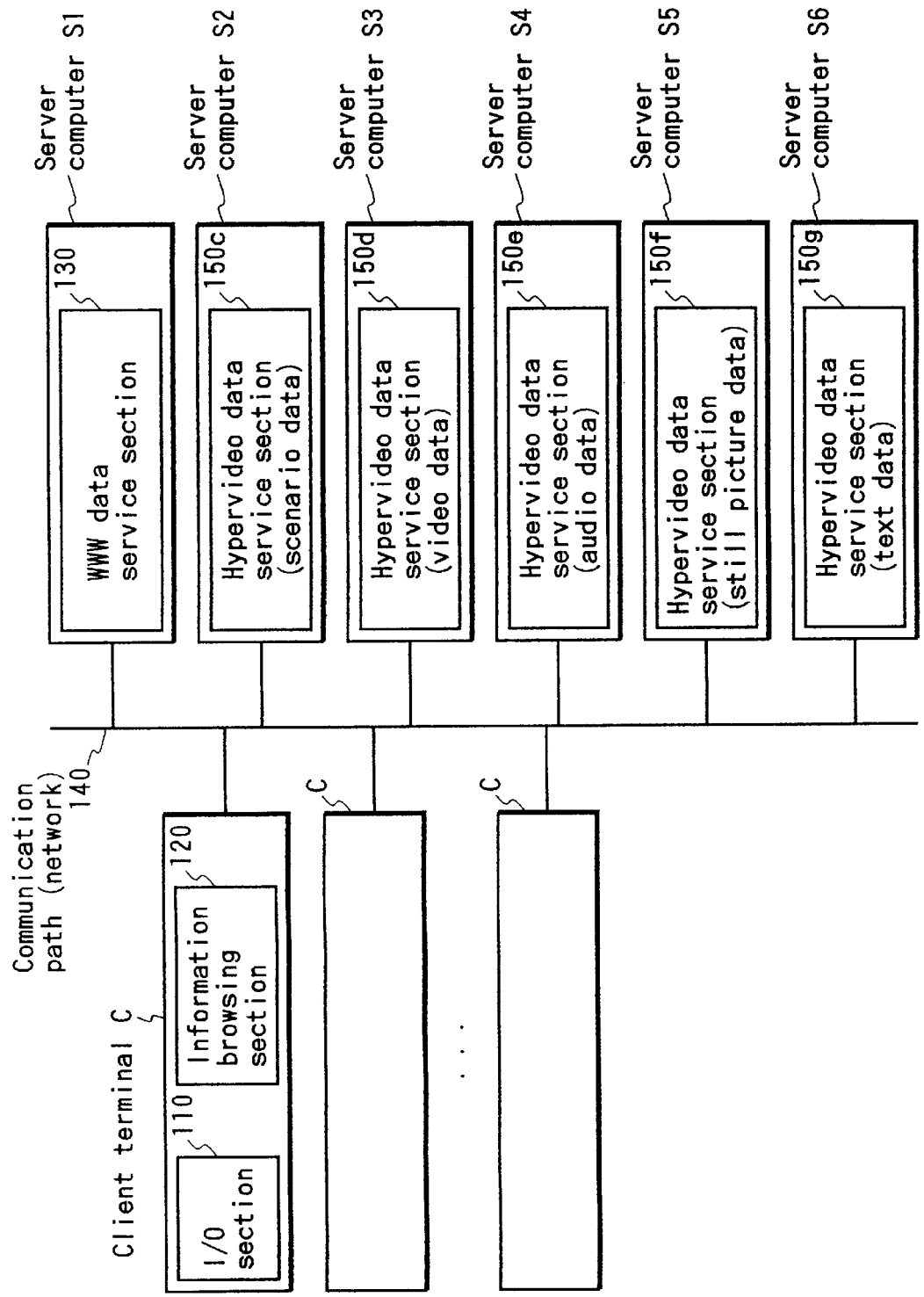
FIG. 22 is a system block diagram showing the basic configuration of a seventh embodiment of the invention, which is configured as a network, having a dedicated server computer for WWW data, and respective dedicated server computers for a plurality of different types of hypervideo data.

A seventh embodiment of the invention will be described in the following, referring to FIG. 22, which is a simple system block diagram of this embodiment. In FIG. 22, C denotes respective ones of a plurality of client terminals which are connected via a data communication path 140 to server computers S1 to S6. As for the preceding embodiment, this embodiment also constitutes a computer network, with the data communication path 140 being configured as a network data transmission path. Each of the client terminals C has the configuration described hereinabove for the first embodiment as shown in FIG. 2, i.e. includes an I/O section 110 and an information browsing section 120.

This embodiment has a total of six server computers, designated as S1 to S5 respectively. The data held in the server computers are as follows:

In WWW data service section 130 of server computer S1: WWW data, i.e. hypertext data and monomedia data (other than hypervideo subject matter data), including scenario reference data, In hypervideo service section 150c of server computer S2: scenario data, In hypervideo service section 150d of server computer S3: video subject matter data of hypervideo, In hypervideo service section 150e of server computer S4: audio subject matter data of hypervideo, In hypervideo service section 150f of server computer S5: still picture subject matter data of hypervideo, In hypervideo service section 150g of server computer S6: text subject matter data of hypervideo.

Thus, the server computer S1 functions as a WWW data server, while the server computers S2 to S6 function as respective hypervideo subject matter data servers.

Each I/O section 110, information browsing section 120 and WWW data service section 130 is configured to operate on data in a similar manner to that described hereinabove referring to the first embodiment, so that detailed description of these will be omitted. Each of the hypervideo data service sections 150c to 150g is configured to operate on data in a similar manner to that described for the hypervideo data service section 150 of the first embodiment, except for the fact that these hypervideo data service sections are dedicated to respectively different categories of monomedia data which constitute hypervideo subject matter data. With this embodiment, the storage location information contained in the scenario data for a hypervideo clip will also include, for each subject matter data file of that hypervideo clip, the name of the server computer where the file is stored.

The basic operation sequence executed with this embodiment is similar to that of the prior art apparatus of FIG. 66, described hereinabove. With each of the client terminals, a user can execute input/output operations to acquire WWW data or hypervideo data which are stored in the server computers S1 to S6. In the same way as for the fourth through sixth embodiments described above, such data transfer operations are executed mutually independently by each of the client terminals. However with this embodiment, during playing of hypervideo by a client terminal, respectively different ones of the server computers S2 to S6 are accessed by that client terminal, to read out the contents of a scenario data file and to read out the contents of respective subject matter data files (i.e. video data files, text data files, etc.) which are specified in the scenario data.

This embodiment is especially advantageous when it is necessary to store large amounts of hypervideo subject matter data, and when there is a high frequency of network accessing, since with this embodiment it is ensured that when any of the server computers is operating with a high level of CPU load, that will not have any adverse effect upon any of the other server computers. Hence, stable performance with regard to playing hypervideo can be achieved.

This embodiment has been described for the case in which respective single server computers are dedicated as servers for each of the various categories of hypervideo subject matter data. However it is equally possible to determine the number of such dedicated server computers in accordance with the relative proportions of amounts of data which must be stored for these different categories, i.e. in relation to the total amount of hypervideo subject matter data. For example, if the amount of still picture and text subject matter data is relatively small, then it might be preferable to use a single server computer which is dedicated as a server of that category of subject matter data. Conversely, if the amount of video subject matter data is very large, then it may be preferable to use a plurality of server computers as video data servers (i.e. storing respectively different files of the video subject matter data for the hypervideo). In that way, the number of server computers which function as servers of hypervideo subject matter data can be determined such as to match the characteristics of a particular network.

Also with this embodiment, since the server computers S3 and S4 function as dedicated server of continuous media data, computer installations which have been specially configured for high efficiency of transferring continuous media data over a network can be advantageously used as these server computers. Moreover, although it has been assumed that the embodiment uses the NFS system for transfer of hypervideo data between the server computers S2 to S6 and the client terminals, it would be equally possible to utilize a data communication system such as the aforementioned VideoShower, in particular for data transfer between the server computers S3, S4 and the client terminals.

In the above description of the seventh embodiment it has been assumed that the information browsing section 120 of each client terminal, and the WWW data service section 130 of the server computer S1, are each identical in configuration and operation to the corresponding sections of the first embodiment, while the combination of the WWW data service sections 150c to 150g of the server computers S2 to S6 performs the same functions as those of the hypervideo data service section 150 of the first embodiment. In that case, the scenario reference data are stored in the WWW data service section 130 of the server computer S1, and the scenario data are stored in the hypervideo service section 150c of the server computer S2. However it would be equally possible to achieve similar results by arranging that, in the same way as for the second embodiment, the scenario reference data are not utilized, while the scenario data are stored in the WWW data service section 130 of the server computer S1 and are accessed by the client terminals in the same manner as other WWW data.

Figure 23:
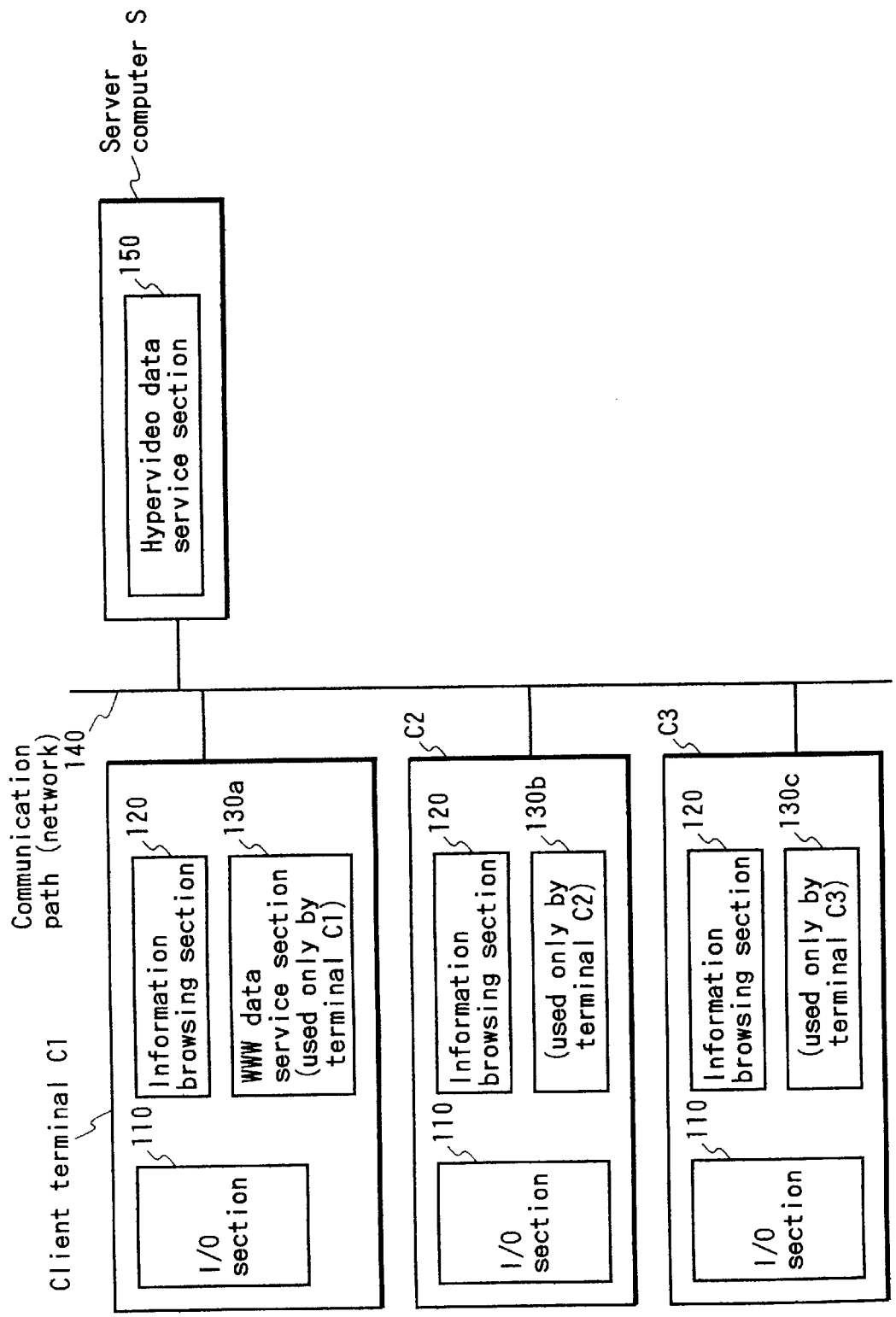
FIG. 23 is a system block diagram showing the basic configuration of an eighth embodiment of the invention, which is configured as a network, having respective WWW data service sections within each of the client terminals.

An eighth embodiment of the invention will be described in the following, referring to FIG. 23, which is a simple system block diagram of this embodiment. In FIG. 23, numerals C1 to C3 denote respective ones of a plurality of client terminals which are connected via a data communication path 140 to a server computer S. As for the preceding embodiment, this embodiment also constitutes a computer network, with the data communication path 140 being configured as a network data transmission path.

This embodiment differs from each of the preceding embodiments as follows. Instead of the server computer S being provided internally with both a hypervideo data service section 150 (formed of a hypervideo data storage section 151 and hypervideo data management section 152) and a WWW data service section 130 (formed of a WWW data storage section 131 and WWW data management section 132, as shown in FIG. 2), the server computer S includes only a hypervideo data service section 150, which stores hypervideo data (i.e. scenario data and subject matter data) which can be accessed by any of the client terminals of the network, such as client terminals C1 to C3. Each of these client terminals is provided internally with a WWW data service section, i.e. designated as 130a, 130b, 130c for the client terminals C1 to C3 respectively in FIG. 23, while in addition each client terminal includes an I/O section 110 and an information browsing section 120. In each of these WWW data service sections, the WWW data storage section 131 stores WWW data (hypertext data, monomedia data and scenario reference data) which are for use by the corresponding client terminal. In that way, each of the client terminals C1 to C2 can display a home page which is specific to that client terminal, i.e. so that a user of one of these client terminals may be able to access hypervideo clips (determined by the particular scenario reference data files which are held in the WWW data service section 130 of that client terminal) which are not available to users of other ones of the client terminals, for example, while some of the hypervideo clips (and monomedia data and hypertext data) may be available at any of the client terminals.

Each I/O section 110, information browsing section 120 and hypervideo data service section 150 is configured to operate on data in a similar manner to that described hereinabove referring to the first embodiment, so that detailed description of these will be omitted. Each of the WWW data service sections 130c to 130c is configured to operate on data in a similar manner to that described for the WWW data service section 130 of the first embodiment, except for the fact that these WWW data service sections are dedicated to respectively different sets of WWW data, specific to the respective client terminals.

The basic operation sequence executed with this embodiment is similar to that of the prior art apparatus of FIG. 66, described hereinabove. With each of the client terminals, a user can execute input/output operations to acquire hypervideo data which are stored in the server computer S. In the same way as for the fourth through seventh embodiments described above, such data transfer operations are executed mutually independently by each of the client terminals.

Such an apparatus has various advantages, in certain types of application, such as when it is desirable to provide different hypervideo access capabilities for client terminals which are disposed in respectively different locations. In the case of a large department store for example, the client terminals C1, C2, C3, etc. could be provided on respectively different floors of the store. It can thereby be arranged that each of the client terminals can play hypervideo clips which relate to the goods that are being marketed on that particular floor, but can also play certain hypervideo clips which are common to the department store as a whole, i.e. both localized and general information can be provided in multimedia form, by each of the client terminals. That is to say, the client terminals can display respectively different menu pages (for hyperlink selection), from which a user can select various hypervideo clips.

Alternatively, the embodiment could be applied to education in which the client terminals are used as individual education terminals, by enabling each of the client terminals to provide information (in multimedia form) which is adapted to the degree of advancement of a particular student, i.e. again with the client terminals displaying respectively different menu pages, with the hypervideo items that can be selected from a menu page being predetermined in accordance with the educational level of the particular student.

In the above description of the eighth embodiment it has been assumed that the information browsing section 120 of each client terminal is identical in operation and configuration to that of the first embodiment, and that each of the WWW data service sections 130a to 130c of the client terminals is identical in operation and configuration to the WWW data service section 130 of the first embodiment, while the hypervideo data service section 150 of the server computer S performs the same functions as those of the hypervideo data service section 150 of the first embodiment. In that case, the scenario reference data for a client terminal are stored in the WWW data service section (130a, 130b or 130c) of that client terminal, while the scenario data (i.e. all of the scenario data files which corresponds to the various scenario reference data that are stored in the WWW data service sections of the client terminals) are stored in the hypervideo data service section 150 of the server computer S. However it would be equally possible to achieve similar results by arranging that, in the same way as for the second embodiment, the scenario reference data are not utilized, while the scenario data for the hypervideo clips that are for use by a particular client terminal are stored in the WWW data storage section 131 of the WWW data service section of that client terminal, i.e. to be accessed by the client terminal in the same way as other WWW data which are stored in that WWW data storage section 131.

Figure 24:
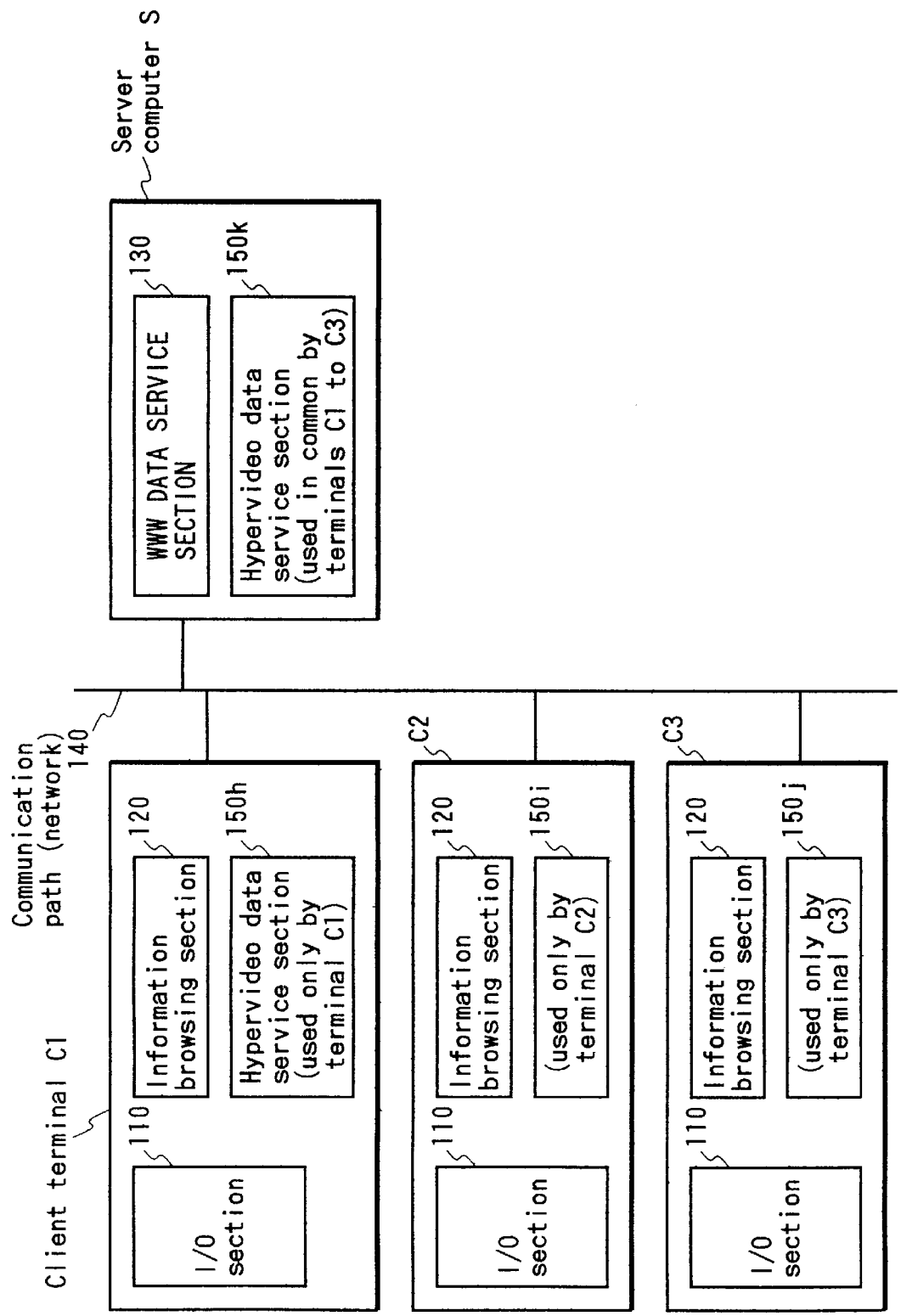
FIG. 24 is a system block diagram showing the basic configuration of a ninth embodiment of the invention, which is configured as a network, having respective dedicated hypervideo data service sections within each of the client terminals, and a server computer having a hypervideo service section which is used in common by the client terminals.

A ninth embodiment of the invention will be described in the following, referring to FIG. 24, which is a simple system block diagram of this embodiment. In FIG. 24, numerals C1 to C3 denote respective ones of a plurality of client terminals which are connected via a data communication path 140 to a server computer S. As for the preceding embodiment, this embodiment also constitutes a computer network, in which each of the client terminals can communicate with the server computer, and with the data communication path 140 being configured as a network data transmission path.

In FIG. 24, each of the client terminals C1 to C2 contains an I/O section 110, an information browsing section 120, and a hypervideo service section (150*h*, 150*i* or 150*j*), while the server computer S contains a WWW data service section 130 and a hypervideo service section 150*k*. The configuration and operation of each I/O section 110, information browsing section 120 and the WWW data service section 130 are identical to those of the first embodiment described hereinabove. Each of the hypervideo data service sections functions in a similar manner to that of the hypervideo data service section 150 of the first embodiment. However with this embodiment, the hypervideo data storage section 151 of the hypervideo service section of a client terminal stores hypervideo data which are for use by only that client terminal. In addition, the hypervideo data storage section 151 of the hypervideo service section 150*k* of the server computer S stores hypervideo data (scenario data and subject matter data) which can be accessed by any of the client terminals.

To summarize:

Data stored by each client terminal: hypervideo data (scenario data and subject matter data), stored in the hypervideo data storage section 151 of the hypervideo service section of that client terminal, the hypervideo data being for use by only that particular client terminal.

Data stored by the server computer S:

(a) WWW data, i.e. monomedia data and hypertext data, the hypertext data including data of hypertext pages respectively corresponding to each of the client terminals (with each page containing hyperlinks to hypervideo data that are specific to a particular client terminal). Also scenario reference data for hypervideo data which are held in the server computer S and for hypervideo data which are held in the various client terminals. These WWW data are stored in the WWW data storage section 131 of the WWW data service section 130 of the server computer S, and are available to each of the client terminals via the data communication path 140, using the HTTP communication system 141;

(b) hypervideo data (scenario data and subject matter data), stored in the hypervideo data storage section 151 of the hypervideo service section 150*k* of the server computer S, available in common to all of the client terminals, via the data communication path 140, by using the NFS communication system 142.

Thus with this embodiment, each of the client terminals (or each of a plurality of groups of client terminals) can store and use respectively different hypervideo data from that of the other client terminals, while the server computer S stores hypervideo data and WWW data that can be accessed by each of the client terminals, the WWW data including data expressing hyperlinks to hypervideo data that are specific to the various client terminals, as well as scenario reference data for all of the hypervideo data.

Hence, with this embodiment, the process of selecting data to be played by any particular client terminal can be understood by referring again to the WWW data example of FIG. 7, described above for the first embodiment. In the case of the ninth embodiment, when a user of a client terminal selects the set of hypervideo clips, i.e. the hyperlink item "mvs.html" from the home page, then WWW data expressing a menu page (i.e. the menu page "mvs.html" in FIG. 7) containing hyperlinks to various hypervideo clips will be transferred from the server computer S to that client terminal, and displayed. That menu page will be specific to the client terminal which is being operated (or to a group of client terminals within which that client terminal is a member). The menu page will contain hyperlinks to hypervideo clips that are common all of the client terminals (i.e. for which the hypervideo data are stored in the hypervideo service section 150*k* of the server computer S) and also hyperlinks to hypervideo clips which are only available at that particular client terminal (i.e. for which the hypervideo data are stored within the hypervideo service section of that client terminal).

The basic operation sequence executed with this embodiment is similar to that of the prior art apparatus of FIG. 66, described hereinabove. Users of each of the client terminals can execute input/output operations, by selection of displayed hyperlink data items, to acquire various types of data which are stored at the server computer S. Specifically, the information browsing section 120 of each of the client terminals C1, C2, etc. can execute data communication with the WWW data service section 130 and the hypervideo service section 150*k* of the server computer S, and also with the hypervideo service section (150*h*, 150*i*, etc.) of that client terminal itself.

An information provider apparatus in accordance with the ninth embodiment of the invention can be advantageously applied to applications such as a data providing network in which the client terminals function as customer information display terminals. That is to say, a server computer at the head office of a company can store scenario data for hypervideo data which could be of interest to customers of the company in general, together with hypervideo data which relate to customers of the head office, while client terminals are provided at each of the branch offices, with each of these client terminals storing hypervideo customer information that is specific to that branch office. In that way, it can be arranged that each of the branch offices can only access customer hypervideo data relating to its own customers, and the head office customer hypervideo data. It can thus be understood that such a system can be configured appropriately, in accordance with the range of hypervideo data which must be accessed by each of the client terminals.

In the above description of the ninth embodiment it has been assumed that scenario reference data for all of the hypervideo data stored in the various hypervideo data service sections of the network are held in the WWW data service section 130 of the server computer S, with corresponding scenario data being held in the respective hypervideo data service sections of the client terminals C1, C2, etc. and of the server computer S, in a similar manner to that described for the first embodiment. However it would be equally possible to achieve similar results by arranging that, in the same way as for the second embodiment, scenario reference data are not utilized, and the scenario data for all of the hypervideo data are held (in the form of WWW data) in the WWW data service section 130 of the server computer S. Irrespective of which of these arrangements is used, it is ensured that any user of a client terminal can easily access those hypervideo clips which are available at that particular client terminal, by selection of hyperlink items in a displayed hypertext page, in the same way as for the preceding embodiments.

Figure 25:
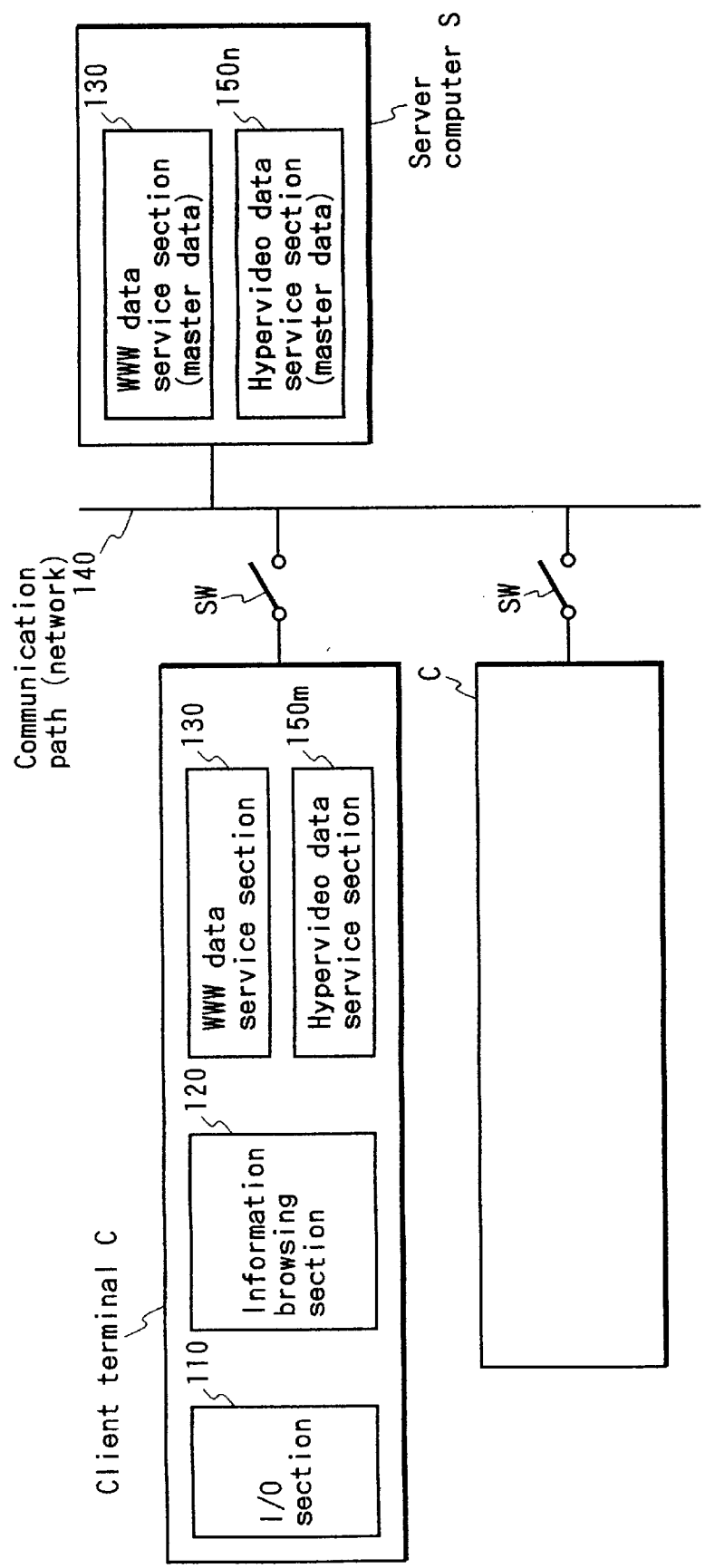
FIG. 25 is a system block diagram showing the basic configuration of a tenth embodiment of the invention, which is configured as a network, having respective dedicated WWW data service sections and hypervideo data service sections within each of the client terminals, and switches for enabling master data to be selectively transferred from a server computer and stored in the respective client terminals.

A tenth embodiment of the invention will be described in the following, referring to FIG. 25, which is a simple system block diagram of this embodiment. In FIG. 25, C designates respective ones of a plurality of client terminals which are connected via a data communication path 140 to a server computer S. With this embodiment, the data communication path 140 is used only for transferring data from the server computer S to the client terminals C, when necessary.

Each of the client terminals C has the same internal configuration, i.e. contains an I/O section 110, an information browsing section 120, a WWW data service section 130d and a hypervideo service section 150m, as shown in FIG. 25. The server computer S contains a WWW data service section 130e and a hypervideo service section 150n. The configuration and operation of each I/O section 110, information browsing section 120 WWW data service section 130s, and hypervideo service section 150m are identical to those of the I/O section 110, information browsing section 120, WWW data service section 130 and hypervideo data service section 150 of the first embodiment described hereinabove. However with this embodiment, the WWW data and the hypervideo data stored in the WWW data service section 130e and the hypervideo service section 150n of the server computer S are used only as master versions of data which are actually accessed and used (as copy versions) within each of the client terminals.

That is to say, the respective data held by the server computer and client terminals are:

Host computer S: WWW data, including scenario reference data (master), hypervideo (scenario and subject matter) data (master)

Each client terminal C: WWW data, including scenario reference data (copy), hypervideo data (copy)

Each of the client terminals C can be selectively connected via a switch SW as shown to the server computer S via the data communication path 140. The data communication path 140 is again in the form of a network communication path.

With this embodiment, all of the the master WWW data and hypervideo data held in the server computer S are transferred via the data communication path 140 at appropriate intervals (e.g. periodically, or when any changes are made in the contents of the data stored by the server computer S) to be loaded into storage at each of the client terminals C. Typically, these data will be read out from a hard disk storage device of the server computer S (constituting the WWW data storage section 131 of the WWW data service section 130e and the hypervideo data storage section 151 of the hypervideo service section 150n), to be written into a hard disk storage device (constituting the WWW data storage section 131 of the WWW data service section 130d and the hypervideo data storage section 151 of the hypervideo service section 150n) in a client terminal. Thereafter, each of the client terminals operates in the same manner as described above for the first embodiment, with the exception that WWW data and hypervideo data are transferred via respective internal circuit paths of the client terminal (not shown in the drawing) from the WWW data service section 130d and hypervideo service section 150m to the information browsing section 120 of that client terminal, rather than being transferred via the data communication path 140 as with the first embodiment.

Alternatively, it would be possible for the server computer S to hold respectively different sets of master WWW data and hypervideo data for each of the client terminals, and to periodically download into a client terminal only those data which are specific to that client terminal, rather than to download the same data in common to each of the client terminals.

Transferring of WWW data and hypervideo data from the server computer S to be downloaded into the client terminals can be implemented by any of various types of commonly used data communication systems, such as the FTP (File Transfer Protocol) system, since it is not necessary that the hypervideo data data be transferred at a sufficiently high speed to enable real-time transfer with continuous-motion display, of video data contents of the hypervideo data. Hence, with this embodiment, it is not necessary for the client terminals, the data communication path 140 or the server computer to satisfy the hardware and software requirements of a high-speed data communication system such as the NFS.

It would be possible to modify this embodiment, by eliminating the data communication path 140, and to use transportable high-capacity data storage media (such as CD-ROMs or removable hard disk units) to transfer copies of the master WWW data and hypervideo data from the server computer S to each of the client terminals.

This embodiment would be of use in applications such as when a company has a number of client terminals installed at various branch offices or shops, which cannot be maintained continuously in an on-line connection status to a server computer at the head office of the company, and in particular when the client terminals can be connected periodically to the server computer of the head office via a data communication path which enables only a relatively low rate of data transfer.

In the above description, it has been assumed that the information browsing section 120, the WWW data service section 130d and the hypervideo service section 150m within each client terminal function in a similar manner to the information browsing section 120, WWW data service section 130 and hypervideo data service section 150 of the first embodiment described above. However it would be equally possible to eliminate the use of scenario reference data, as is done with the second embodiment, i.e. to hold the hypervideo scenario data, as WWW data, within the WWW data service section 130d of a client terminal.

Furthermore, the above embodiment has been described on the assumption that the WWW data and hypervideo data are handled, within each client terminal, in a similar manner to that described for the first embodiment. However since it is not necessary to provide respectively separate arrangements for transferring the WWW data and the hypervideo data (in particular, the hypervideo subject matter data) from storage to the information browsing section 120 of a client terminal of the tenth embodiment, as is necessary with the first embodiment, the hypervideo data can be handled within each client terminal in the same way as described above for the third embodiment. That is to say, all of the data for a hypervideo clip can be managed in a unified manner, as a single large "file" of WWW data (such as "c.tit" in FIG. 14), containing the scenario data and subject matter data of the hypervideo clip. In that case, the hypervideo service section 150m can be omitted from each client terminal.

Figure 26:
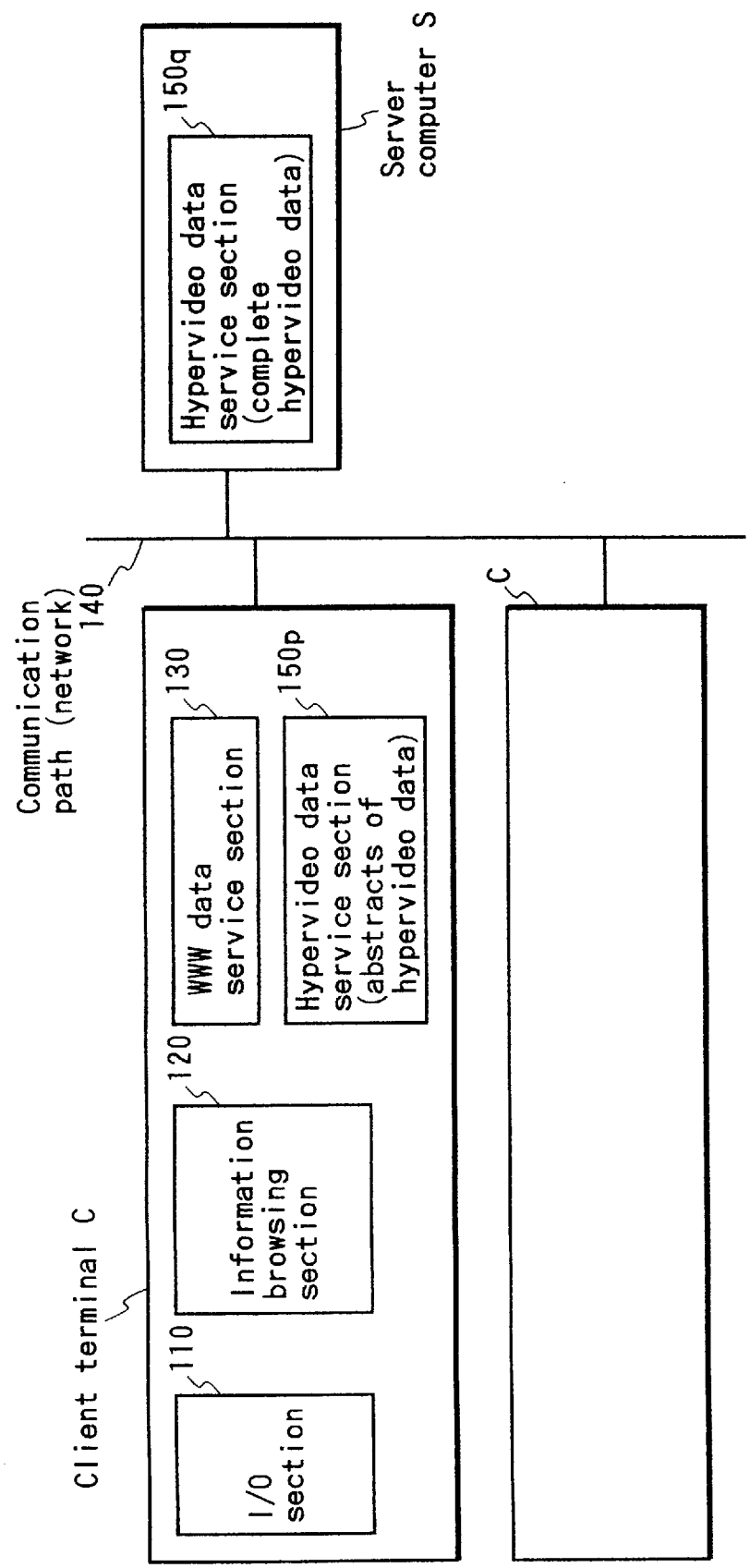
FIG. 26 is a system block diagram showing the basic configuration of an eleventh embodiment of the invention, which is configured as a network, wherein abstract portions of hypervideo data clips are stored in respective client terminals, and complete hypervideo data are stored in a server computer.

An eleventh embodiment of the invention will be described in the following, referring first to FIG. 26, which is a simple system block diagram of this embodiment. In FIG. 26, respective ones of a plurality of client terminals C are connected via a data communication path 140 to a server computer S.

Each of the client terminals C, has an identical configuration, i.e. is formed of a an I/O section 110, an information browsing section 120, a WWW data service section 130 and a hypervideo service section 150p, while the server computer S contains hypervideo service section 150q.

The configuration, interconnections and operation of each of the I/O section 110, information browsing section 120 WWW data service section 130, are identical to those of the first embodiment described hereinabove. However with this embodiment, the hypervideo service section 150q of the server computer S holds and manages hypervideo data for complete versions of various hypervideo clips (that data being referred to in the following as the original hypervideo data), whereas the hypervideo service section 150p of a client terminal holds only hypervideo data for abstracts of the contents of the hypervideo clips whose data are stored at the server computer S. The term "abstracts" as used here is to be interpreted in a very broad sense. For example, although the data held in the hypervideo service section 150q of the server computer S are referred to here as being hypervideo data, in some applications the subject matter data of the hypervideo may consist only of video data. For example, the information provider apparatus may have the function of enabling a user of a client terminal to select from a number of video clips or cinema films, by using hyperlink selection, while also enabling the user to play beforehand respective "abstracts" of the various films, in multimedia form, before selecting a complete film which is to be viewed. In that case, the server computer S may store only video data constituting various different cinema films, and the "abstracts" which are stored in the hypervideo service section 150p of each client terminal in that case can consist of multimedia "trailers" for these cinema films, i.e. containing short abstracted portions of the films together with superimposed audio and text material.

The basic operation sequence executed with this embodiment is similar to that of the prior art apparatus of FIG. 66, described hereinabove. However in this case, the information browsing section 120 of each client terminal may execute data communication internally with the WWW data service section 130 of that client terminal and with the hypervideo service section 150p of that client terminal, and also (via the data communication path 140, using the NFS communication system 142) with the hypervideo service section 150q of the server computer S.

Thus, the types of data stored in each of the the client terminals and in the server computer S of this embodiment are as follows:

Data stored by each client terminal: hypervideo data (scenario data and subject matter data), stored in the hypervideo data storage section 151 of the hypervideo service section of that client terminal, the hypervideo data expressing various "abstracts" as described above, and WWW data (including hypertext pages having hyperlinks to original hypervideo clips, such as complete films, which are stored in the server computer S, and hyperlinks to hypervideo data "abstracts" stored in the hypervideo service section 150p of that client terminal, and also including scenario reference data for these hypervideo data "abstracts").

Data stored by the server computer S: original hypervideo data (scenario data and subject matter data), stored in the hypervideo service section 150q, such as hypervideo data expressing respective complete cinema films, for example.

It can thus be understood that this embodiment enables an information provider apparatus to be realized in which each of a plurality of client terminals stores hypervideo data for a number of relatively small-scale hypervideo clips, which constitute "abstract" information that relates to corresponding large-scale hypervideo clips whose data are stored at a server computer, and in which a user of any of the client terminals can first select and play any desired "abstract" hypervideo clip by selecting the appropriate hyperlink from a displayed menu selection page of hypertext data, can use the "abstract" information thus provided to search for, or to obtain information concerning, a particular original hypervideo clip, and can then select and play (again using hyperlink selection from a hypertext menu page) the desired original hypervideo clip, which is stored at the server computer. It is therefore only necessary for each of the client terminals to store and manage relatively small amounts of data, while storage and managing of large amounts of hypervideo data, e.g. using high-capacity hard disk storage, can be centralized at a server computer.

As mentioned above, this embodiment can be used in an application in which cinema films, stored in video data form at the server computer S, can be selected to be viewed by a user of any of the client terminals C, with "abstract" hypervideo clips relating to the cinema films being stored at each of the client terminals. However the embodiment could also be used in other applications, for example in which the hypervideo "abstract" information consists of news digest information, and the original hypervideo data represents corresponding complete news programs. Alternatively, the hypervideo "abstract" information might consist of television program summary information, with the original hypervideo data representing corresponding complete prerecorded television programs. Another possibility is for the hypervideo "abstract" information to consist of catalog information relating to commercial products, with the original hypervideo data representing user manual information for the products. It can thus be understood that this embodiment has a wide range of possible applications.

It will be understood that if the hypervideo data stored at the server computer represent only complete cinema films, then it will in general be unnecessary to specify such parameters as display screen position, size of the display picture, times of starting and ending playing, etc., for each hypervideo clip, since these may be inherently predetermined. Hence, the necessary amount of scenario data in such hypervideo data will be negligible.

In the above description of the eleventh embodiment it has been assumed that the information browsing section 120, WWW data service section 130, and hypervideo service section 150p of each of each client terminal is identical in configuration and operation to the corresponding sections of the first embodiment, i.e. that the WWW data held in the WWW data service section 130 of a client terminal includes hypertext page information containing hyperlinks to scenario reference data for hypervideo data held in that client terminal and the hypervideo data which are held in the server computer S. In that case, the scenario reference data are held in the WWW data service section 130 of each client terminal, while the scenario data are stored in the hypervideo service section 150p of each client terminal and in the hypervideo service section 150q of the server computer S. However it would be equally possible to achieve similar results by arranging that, in the same way as for the second embodiment, the scenario reference data are not utilized, while the scenario data are stored in the WWW data service section 130 of each client terminal and are accessed (directly, from hyperlinks) in the same manner as other WWW data.

Figure 27A:
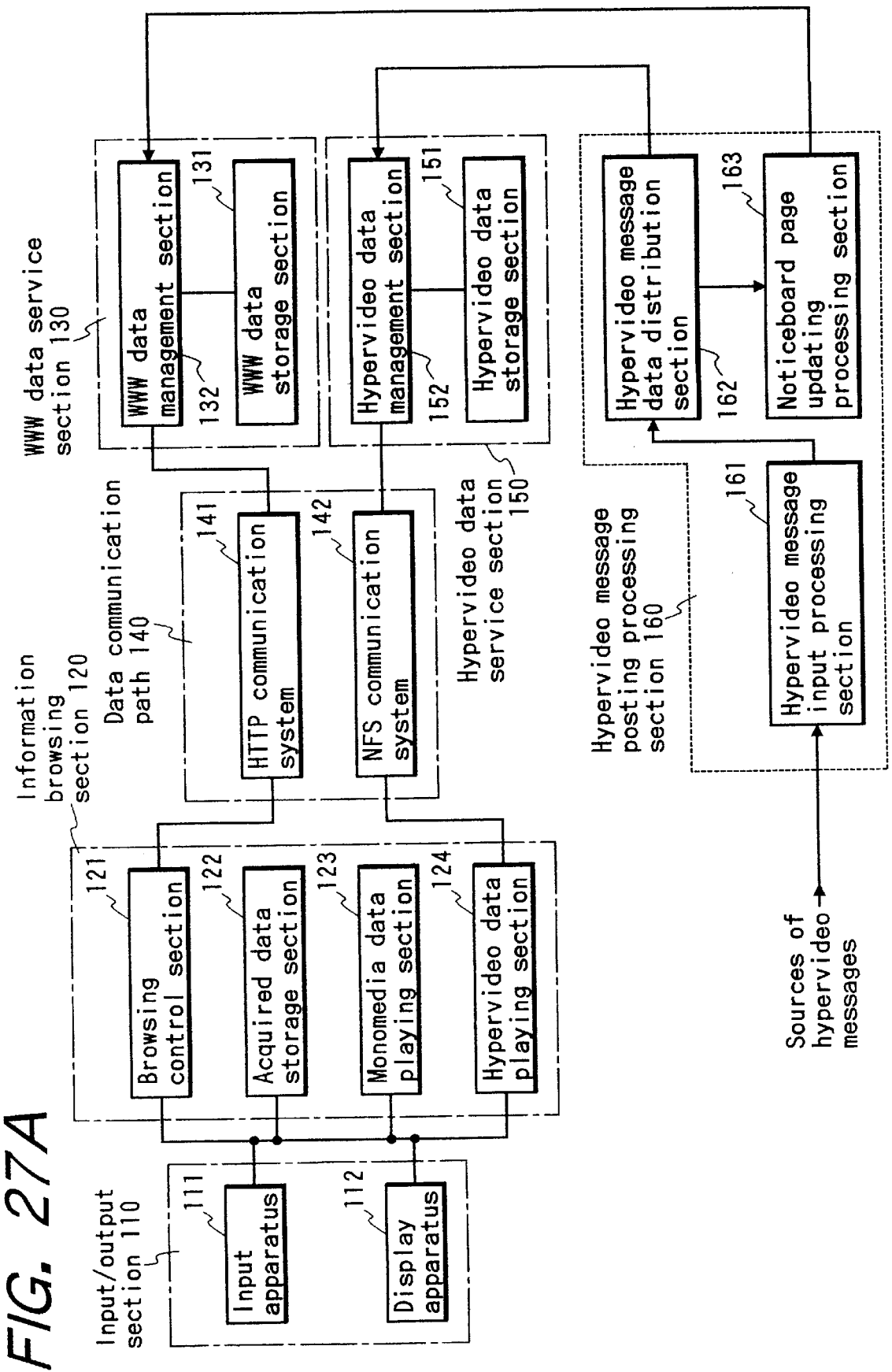
FIG. 27A is a system block diagram of a twelfth embodiment of the invention, which is an information provider apparatus having a capability for posting hypervideo messages on a hypertext page which is utilized as a notice board.

A twelfth embodiment of the invention will be described in the following, referring first to FIG. 27A, which is a simple system block diagram for illustrating the basic concepts of this embodiment. In FIG. 27A, 110 denotes an I/O section, 120 denotes an information browsing section, 140 denotes a data communication path, 130 denotes a WWW data service section, and 150 denotes a hypervideo data service section, with each of these having essentially identical configurations and operating relationships to the corresponding sections of the first embodiment. This embodiment further includes a hypervideo message posting processing section 160, which contains a notice board page updating processing section 163, a hypervideo message data distribution section 162 and a hypervideo message input processing section 161. With this embodiment, messages which are in the form of respective hypervideo clips can be registered (i.e. by storing the scenario data and subject matter data of the message in the hypervideo data service section 150 and storing the corresponding scenario reference data in the WWW data service section 130), with respective hyperlinks from a specific hypertext page which is stored in the WWW data service section 130 (i.e. within the WWW data storage section 131). Such a hypertext page is referred to in the following as a "notice board" page. There may a be a plurality of such notice board pages stored in the WWW data service section 130, with each of these being connected by hyperlink to the home page (described hereinabove with respect to the first embodiment). In that way, a user of the I/O section 110 can select a specific notice board page (from the home page), and can then select a desired hypervideo message to be played by the display apparatus 112, from that notice board page.

The function of the hypervideo message input processing section 161 is to receive and temporarily hold the data of a hypervideo message which is to be posted on a notice board page, supplied from hypervideo message sources, and to execute any necessary input processing of the data. Various types of apparatus could be used to generate the hypervideo message data by a user, so that specific description of the hypervideo message sources will be omitted. However in general the message data will be transferred to the hypervideo message posting processing section 160 via the same physical communication path (140) which is used for data browsing, as described hereinabove. The hypervideo message data, arranged in a format described hereinafter, are supplied to the hypervideo message data distribution section 162, which has the function of transferring the scenario data and subject matter data of the hypervideo message to the hypervideo data management section 152 of the hypervideo data service section 150, to be stored in the hypervideo data storage section 151, and receiving from the hypervideo data management section 152 information which specifies the locations where the scenario data and subject matter data have been stored (e.g. file name and directory path information, for the scenario data file and subject matter data files which constitute the hypervideo message). The function of the notice board page updating processing section 163 is to transfer that storage location information to the WWW data service section 130, in such a way that a scenario reference data file corresponding to the stored hypervideo data of the message is stored in the WWW data storage section 131, and is connected by hyperlink to a specific one of the notice board pages.

Figure 28:
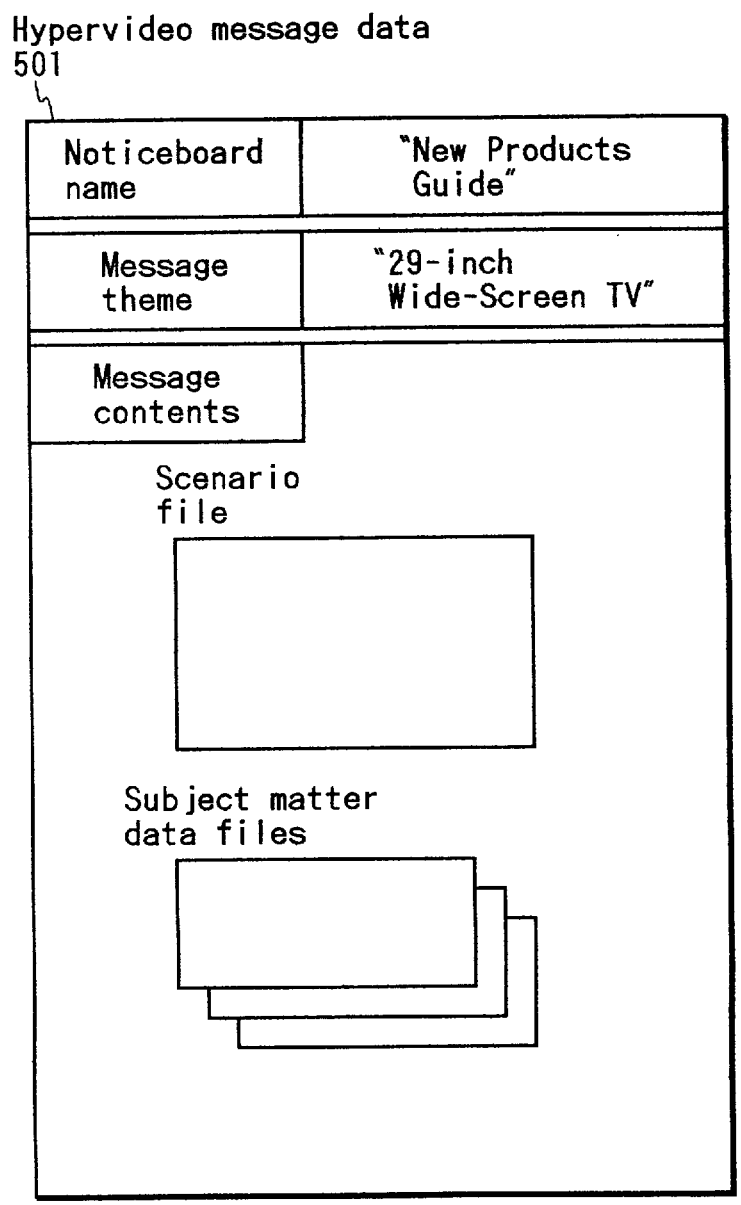
FIG. 28 is a conceptual diagram for illustrating an example of the data configuration of a hypervideo message, used with the twelfth embodiment.

The above can be understood more clearly by referring first to FIG. 28, which shows the data structure of a hypervideo message 501, i.e. as supplied to the hypervideo message data distribution section 162. As shown, the message data 501 contains the following:

Notice board name: this is the name of a notice board page (as defined above) having an embedded hyperlink to this hypervideo message.

Message theme: this indicates the nature of the contents of the message.

Message contents: this is the actual message information, in the form of hypervideo data, i.e. consisting of scenario data and subject matter data.

It can thus be understood that all of the information shown in FIG. 28 must be supplied to the hypervideo message data distribution section 161 of the hypervideo message posting processing section 160, in order to post a new message on a notice board.

The basic operation of an information provider apparatus according to this embodiment will be described in the following. When a new hypervideo message is to be posted on a notice board page, when the corresponding message data (containing the information shown in FIG. 28) are received by the hypervideo message posting processing section 160, then as described above the hypervideo data (scenario data and subject matter data) are transferred by the hypervideo message data distribution section 162 to be stored in the hypervideo data storage section 151 of the hypervideo data service section 150, while scenario reference data expressing the storage location of the corresponding scenario data in the hypervideo data storage section 151 are generated and stored by the notice board page updating processing section 163 in the WWW data storage section 131 of the WWW data service section 130, linked to a notice board page in conjunction with the message theme information. Thereafter, a user of the I/O section 110 can select and play that hypervideo message by first selecting the corresponding notice board page (such as "New Products Guide" in the example of FIG. 28), then selecting the message (i.e. by specifying the message theme, such as "29 inch Wide-Screen Television Receiver" in the example of FIG. 28). That selection procedure, to play a desired hypervideo message, is identical to that described above for the first embodiment for selecting a desired hypervideo item to be played.

Thus with the information provider apparatus of this embodiment, the basic operation sequence of the I/O section 110, the information browsing section 120, the WWW data service section 130, the data communication path 140 and the hypervideo data service section 150 is similar to that of the information provider apparatus of the first embodiment, and the display operation examples which have been provided for the first embodiment are also applicable to this embodiment.

Figure 27B:
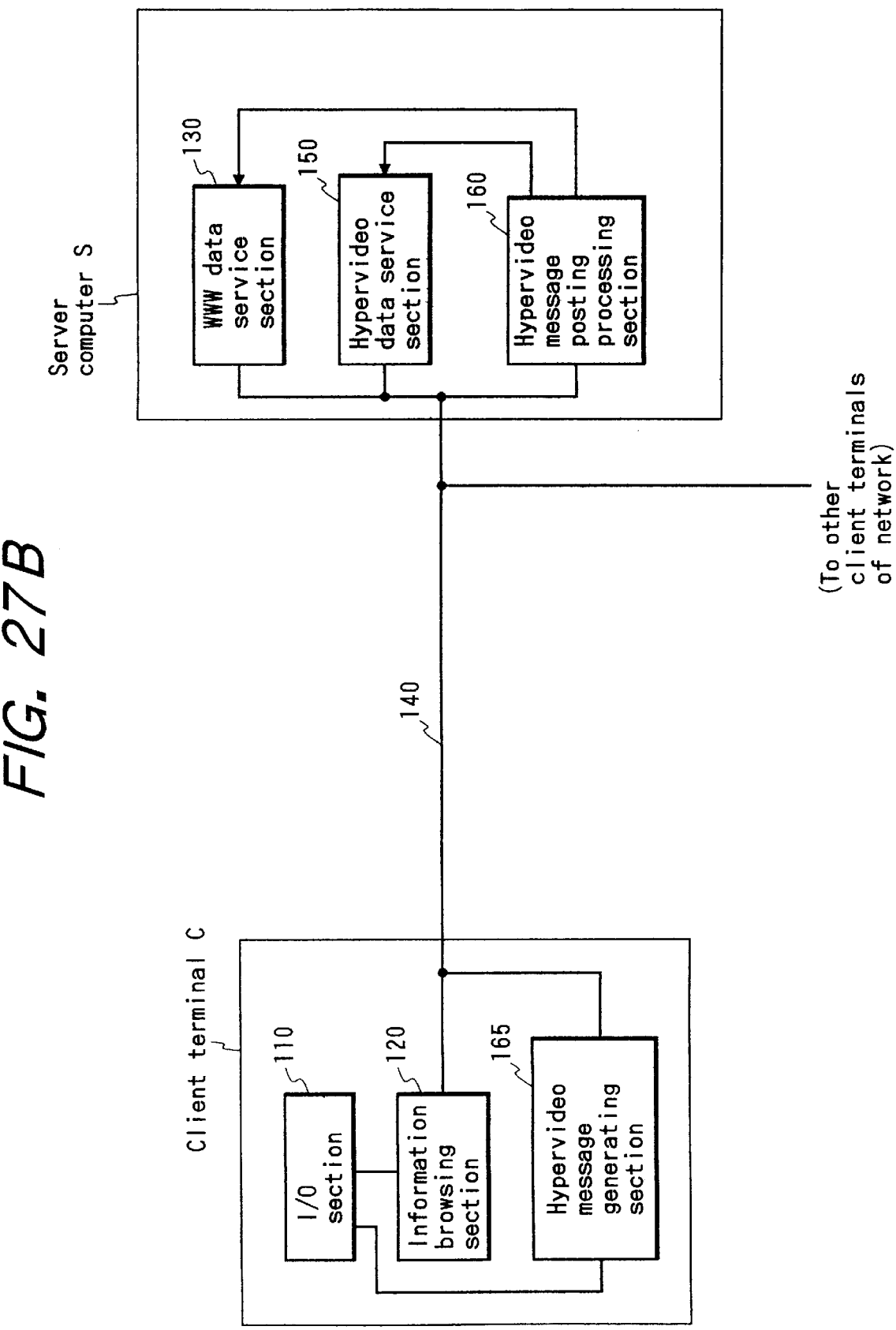
FIG. 27B is a system block diagram showing an example of implementing the twelfth embodiment in the form of a client/server network.

FIG. 27B is a block system diagram corresponding to the apparatus of FIG. 27A, for illustrating how this embodiment can be applied to a host/server network which consists of a single host computer S that is coupled via a data communication path 140 to a plurality of client terminals C. In this embodiment, each of the client terminals C is made up of a I/O section 110, an information browsing section 120, and a hypervideo message generating section 165, which are connected as shown to to send/receive data via the data communication path 140 to/from the server computer S. The term "hypervideo message generating section" is used to refer to a combination of devices which can be used to generate a hypervideo message. Since various arrangements for implementing the hypervideo message generating section could readily be envisaged by a skilled person, specific details will be omitted herein. The server computer S is made up of a WWW data service section 130, a hypervideo data service section 130 and a hypervideo message posting processing section 160, configured as shown in FIG. 27A and described hereinabove.

Figure 29:
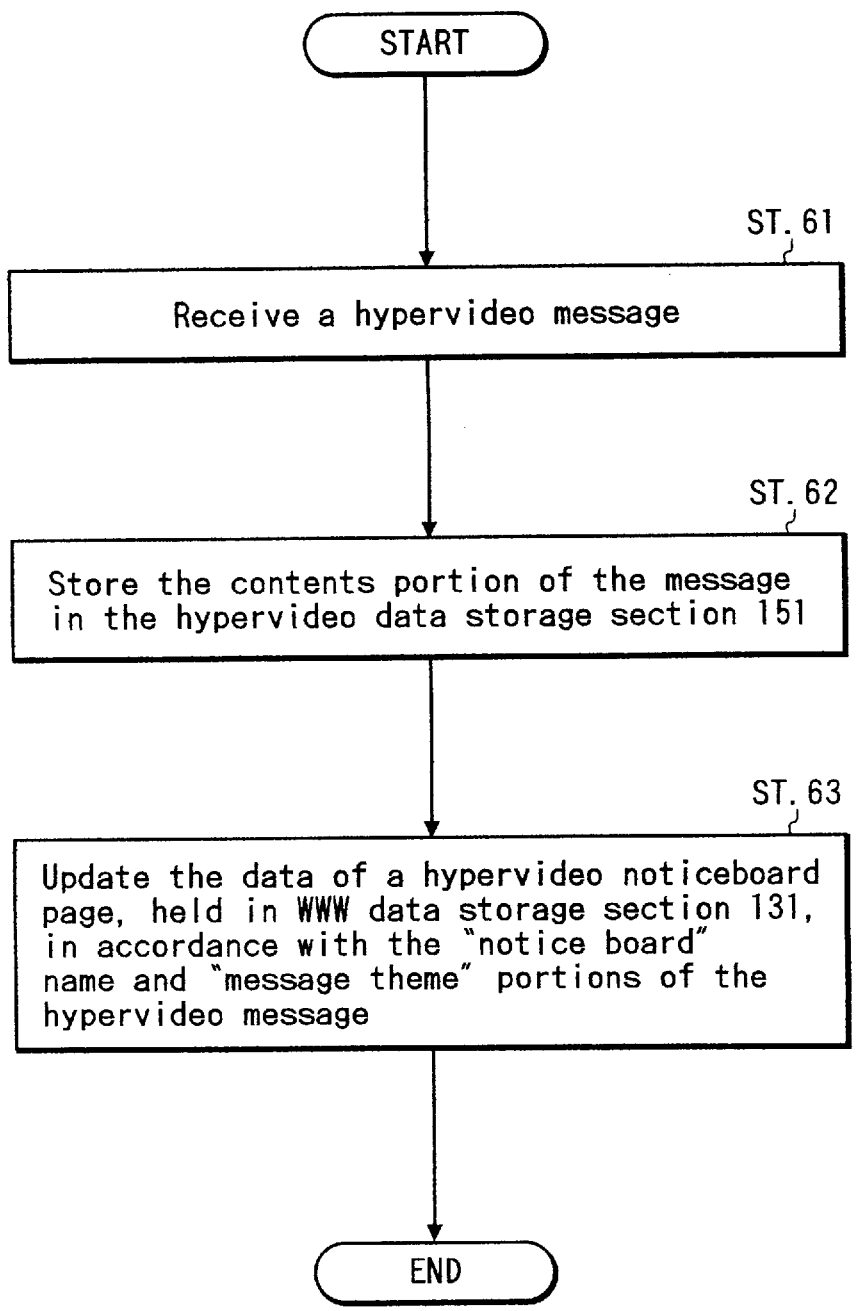
FIG. 29 is an operation flow diagram for a hypervideo message posting processing section in the twelfth embodiment.

The processing sequence executed by the hypervideo message posting processing section 160 of this embodiment will be described in the following, referring to FIG. 29, which shows the basic sequence that is executed to register the hypervideo message example of FIG. 28, as:

Step 61: a request is received by the hypervideo message input processing section 161, to register a new hypervideo message.

Step 62: the hypervideo message data distribution section 162 stores the "message content" data part of the received message data, in the hypervideo data service section 150.

Step 63: the notice board page updating processing section 163 updates the WWW data which are held in the WWW data service section 130, in accordance with the storage locations of the "message content" data in the data storage section 151 and in accordance with the contents of the "notice board name" and "message theme", to thereby register in section 130 a new scenario reference file corresponding to the stored "message content" hypervideo data, with that scenario data file being connected by hyperlink to a specific notice board page, i.e. the page whose "notice board name" is specified in the hypervideo message data that were supplied to the hypervideo message input processing section 161.

Figure 30:
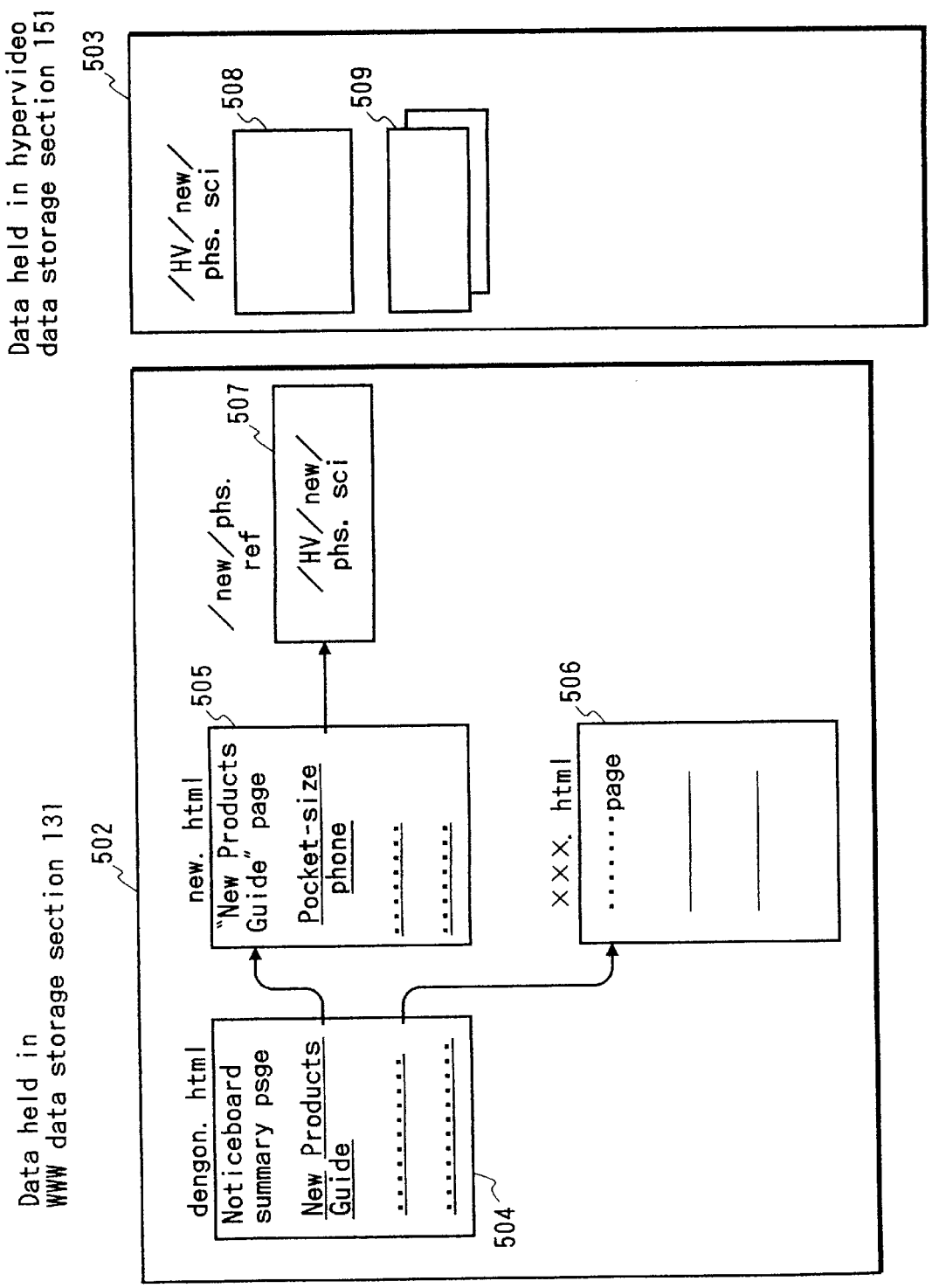
FIG. 30 is a conceptual diagram for illustrating respective examples of data configurations of WWW data and hypervideo data, stored in the twelfth embodiment, prior to receiving a certain hypervideo message.
Figure 31:
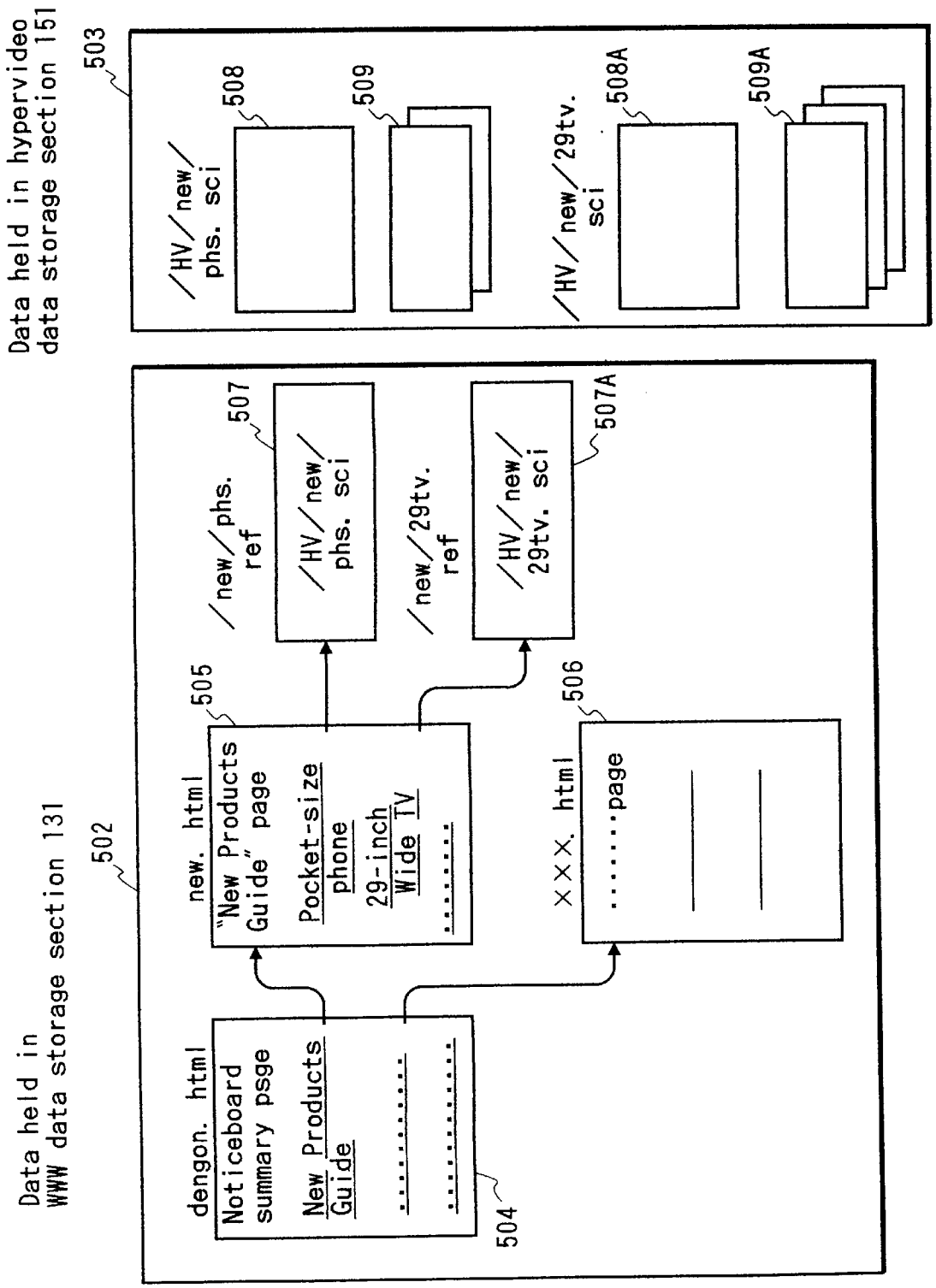
FIG. 31 is a diagram corresponding to FIG. 30, showing the data configurations after the hypervideo message has been received.

FIG. 30 shows examples of WWW data and hypervideo data, designated as 502 and 503, which are stored in the WWW data storage section 131 of the WWW data service section 130 and in the hypervideo data storage section 151 of the hypervideo data service section 150, respectively. FIG. 31 is a corresponding diagram showing how these data are changed when a hypervideo message such as the example of FIG. 28 is newly registered. The WWW data 502 consist of a notice board summary data page 504, having embedded hyperlinks to two notice board pages 505 and 506, and with the notice board page 505 having an embedded hyperlink to a scenario reference file 507. The hypervideo data corresponding to the scenario reference file 507 are designated as scenario data 508 and subject matter data 509. Thus in the initial condition shown in FIG. 30, the (new.html) notice board page "New Products Guide" has a link to one hypervideo message, with the theme of that message being "Pocket-size phone". After the message shown in FIG. 28 has been received by the hypervideo message posting processing section 160 and processed as described above, then as shown in FIG. 31, a hyperlink for the hypervideo message having the theme "29-inch Wide TV" is inserted into the (new.html) notice board page 505, i.e. a hyperlink to to a scenario reference file 507A (having the file name "29tv.ref") which has been established for the new message. The hypervideo data (scenario data 508A and subject matter data 509A) for that new message are stored in the hypervideo data storage section 151 of the hypervideo data service section 150, with the scenario data file assigned the file name "29tv.sci".

It will be clear that this embodiment can be used in a network to provide the notice board information to all of the client terminals of the network, i.e. with the hypervideo messages of a notice board being available to users of each of the client terminals C in the same way as hypervideo clips stored at the server computer of the fourth embodiment, shown in FIG. 18 and described hereinabove, can be selectively accessed by users of the client terminals, by the usual browsing operations.

Although it has been assumed in the above description of the twelfth embodiment that scenario data and hypervideo data are stored and used in the same manner as described for the first embodiment, it would be equally possible to eliminate the scenario reference data, as described for the second embodiment, or to configure the apparatus as described for the third embodiment, i.e. storing the hypervideo subject matter data as part of the WWW data in the WWW data service section 130.

Figure 32:
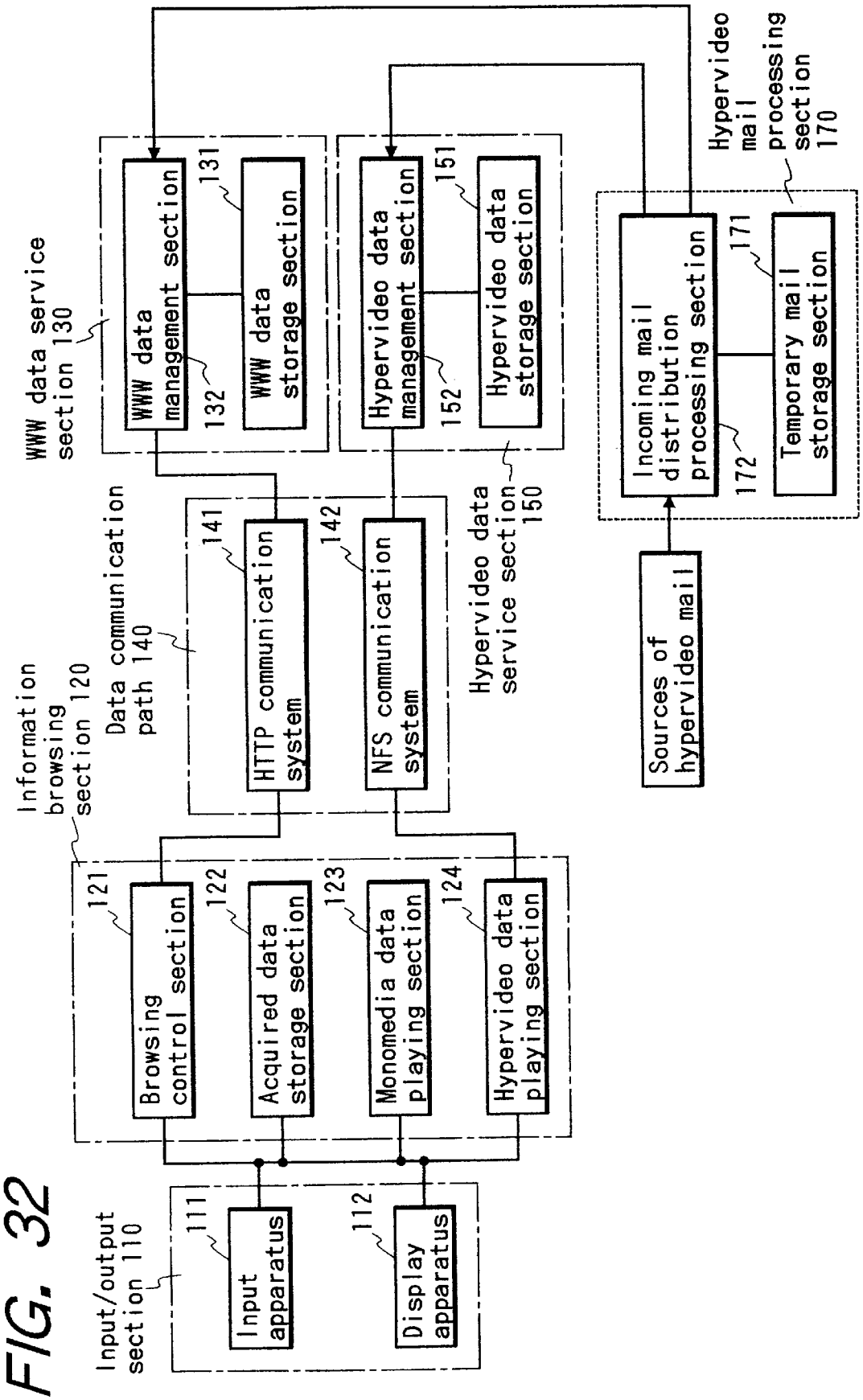
FIG. 32 is a system block diagram of a thirteenth embodiment of an information provider apparatus according to the present invention, having a capability for processing hypervideo mail items.

Embodiments of the invention will be described in the following, whereby hypervideo mail can be exchanged between client terminals of a network, i.e. whereby a client terminal can generate hypervideo mail data and can send hypervideo mail via the network to one or more other client terminals of the network. Firstly, a thirteenth embodiment will be described, which is a hypervideo mail client/server network having a single dedicated hypervideo mail server computer. The basic concepts of this embodiment will be described referring to FIG. 32. In FIG. 32, the contents and functions of the I/O section 110, information browsing section 120, data communication path 140, WWW data service section 130 and hypervideo data service section 150 are respectively substantially identical to those of the first embodiment shown in FIG. 2 and described hereinabove, so that further description will be omitted. However the embodiment further includes a hypervideo mail processing section 170, which is coupled to receive hypervideo mail from a plurality of sources (specifically, respective client terminals as described hereinafter). The hypervideo mail is generated and sent in data sets, each having the format designated by numeral 601 in FIG. 33, which will be referred to as hypervideo mail items. As shown, the data contents include the name of the destination (in general, a name of a client terminal user) which is assumed in this example to be user "b", the subject of the mail item, and the actual hypervideo data of the mail, i.e. scenario data and subject matter data, which are constituted as described hereinabove for the preceding embodiments.

In FIG. 32, the hypervideo mail processing section 170 is formed of a temporary mail storage section 171 and an incoming mail distribution processing section 172. When a hypervideo mail item is received, the data are stored temporarily in the temporary mail storage section 171, and examined by the incoming mail distribution processing section 172, to determine the destination of that item. The hypervideo mail item is then transferred to the hypervideo data service section 150, and stored in the hypervideo data storage section 151. The incoming mail distribution processing section 172 then updates the contents of specific WWW data held in the WWW data service section 130 (i.e. mail page data, as described hereinafter), in accordance with the destination and subject contents of the mail item and the storage location of the item within the hypervideo data storage section 151 (i.e. the directory path information for the stored item).

Figure 34:
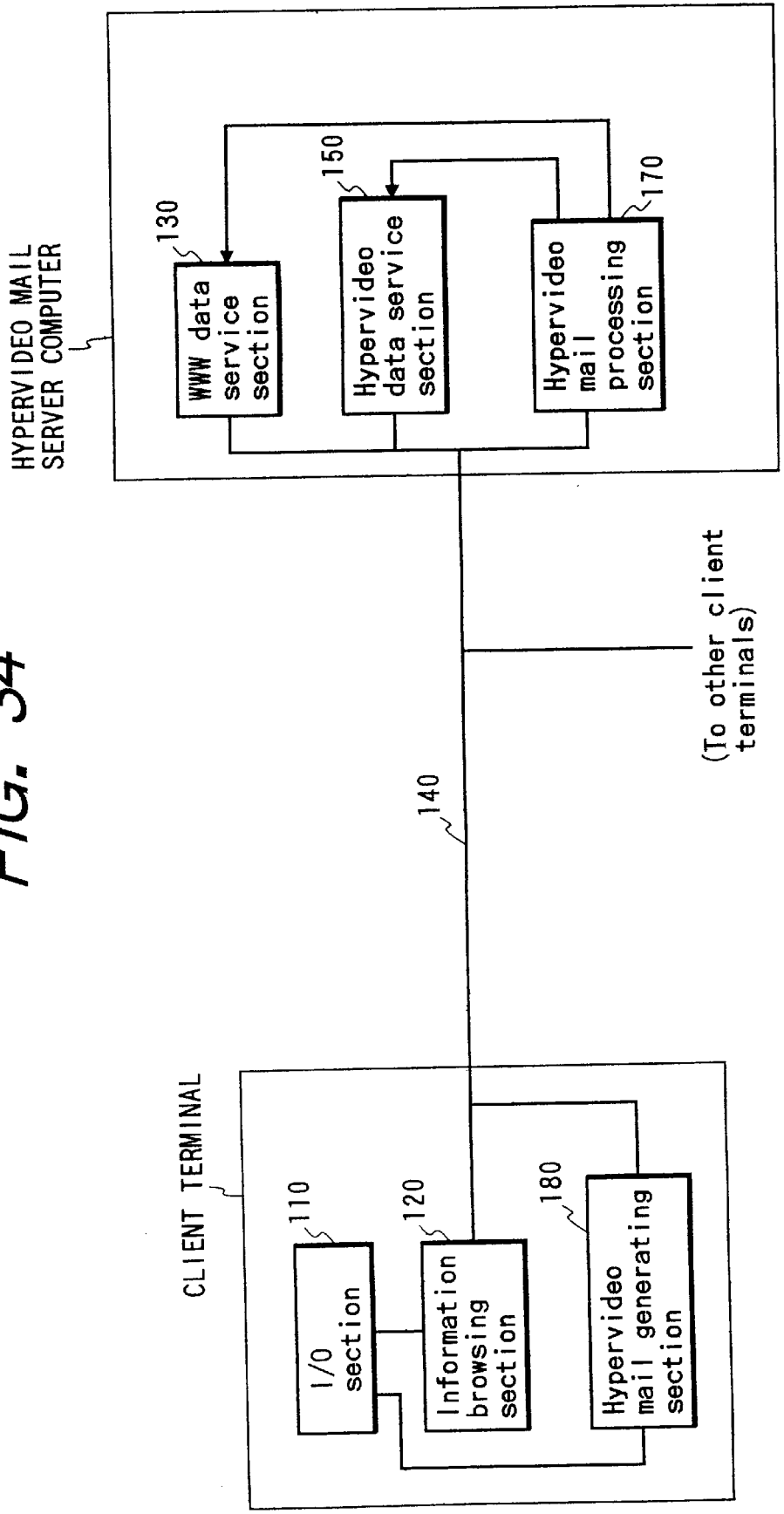
FIG. 34 is a partial system block diagram of the thirteenth embodiment, configured as a hypervideo mail server computer and a plurality of client terminals connected as a network, for showing the respective basic internal configurations of a client terminal and the hypervideo mail server computer.

FIG. 34 is a simple system block diagram showing the respective configurations of a client terminal and the hypervideo mail server computer of this embodiment. In addition to an I/O section 110 and information browsing section 120, the client terminal is provided with a hypervideo mail generating section 180, which can be controlled by a user to generate desired hypervideo mail items. The hypervideo mail server computer is assumed to include a WWW data service section 130, a hypervideo data service section 150 and a hypervideo mail processing section 170. This embodiment can for example be a LAN (Local Area Network), in which the data communication path 140 between client and server units of the network has a sufficiently wide bandwidth to permit real-time transfer of video data (e.g. using the NFS communication protocol) as described for the preceding embodiments. Hypervideo mail items are sent via the data communication path 140 to the hypervideo mail server computer, to be processed in the hypervideo mail processing section 170 as described above referring to FIG. 32.

Figure 33:
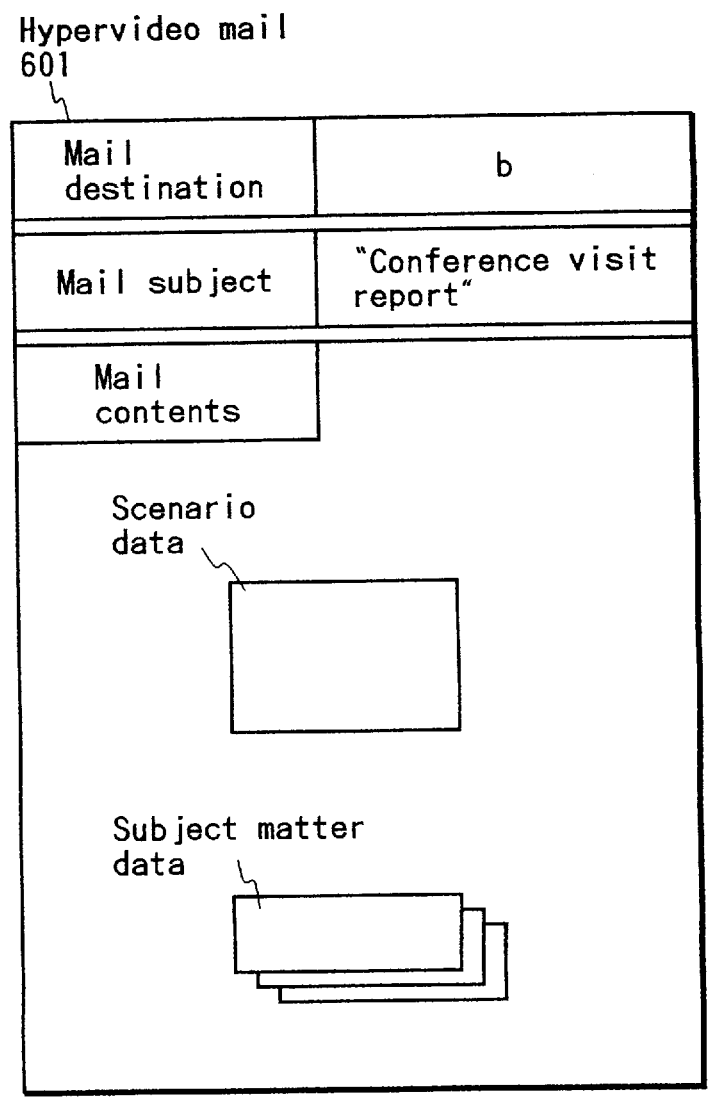
FIG. 33 is a conceptual diagram for illustrating an example of the data configuration of a hypervideo mail item, used with the thirteenth embodiment.
Figure 35:
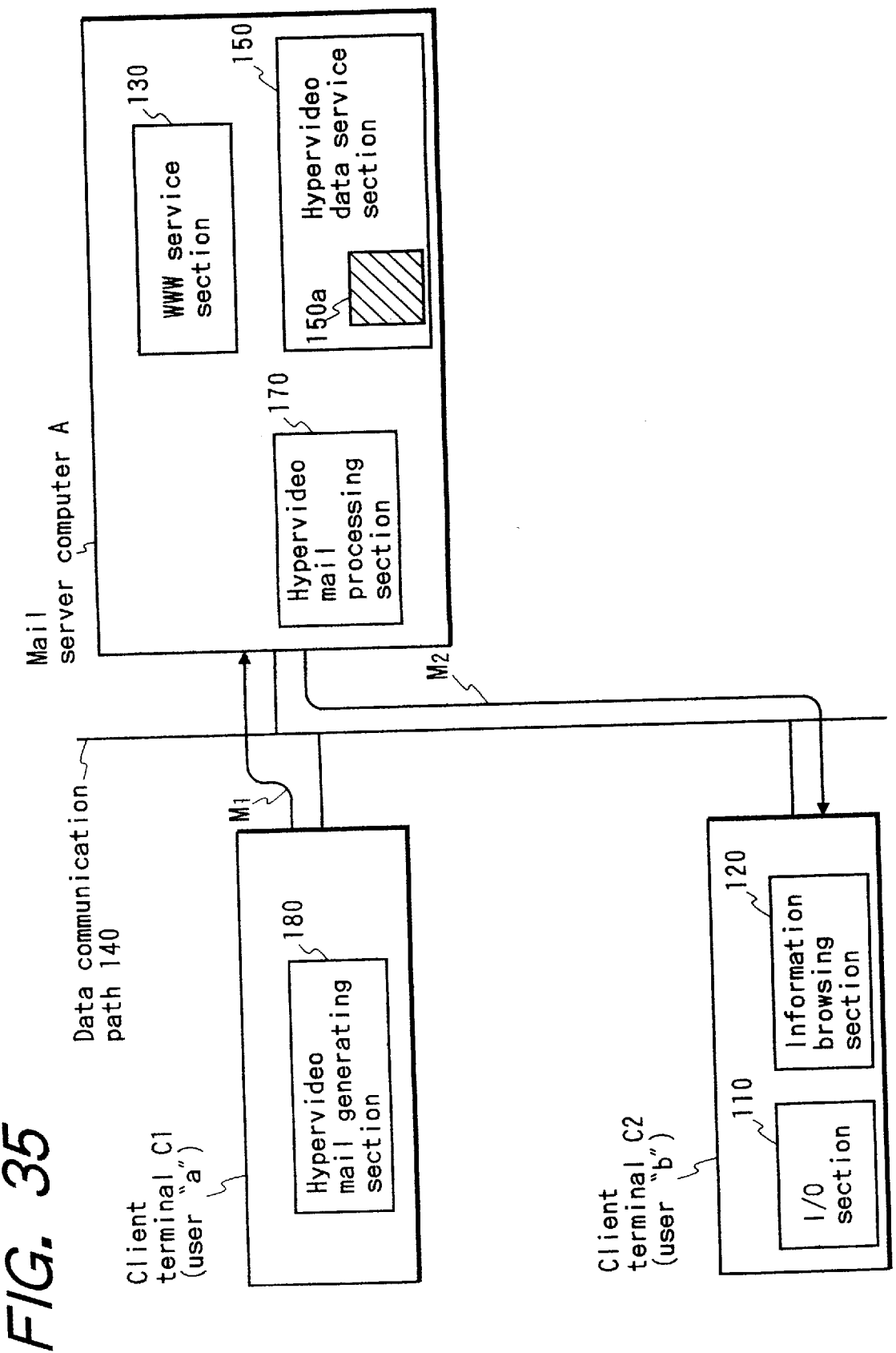
FIG. 35 is a system block diagram corresponding to FIG. 34, for illustrating data flows between the mail server computer and the client terminals.
Figure 36:
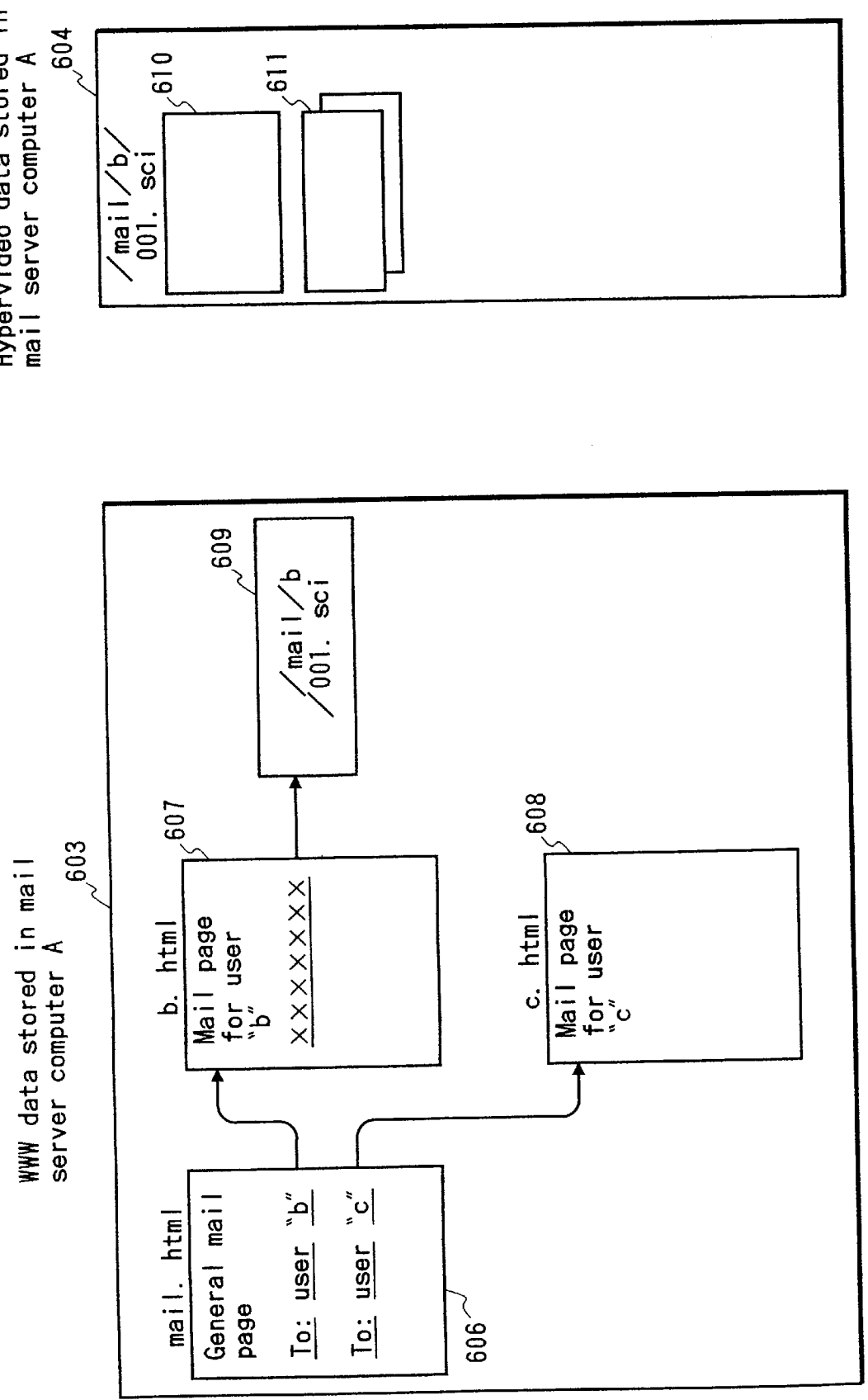
FIG. 36 is a conceptual diagram for illustrating respective examples of data configurations of WWW data and hypervideo data, stored in the thirteen embodiment, prior to a certain hypervideo mail item being received by a mail server computer.
Figure 37:
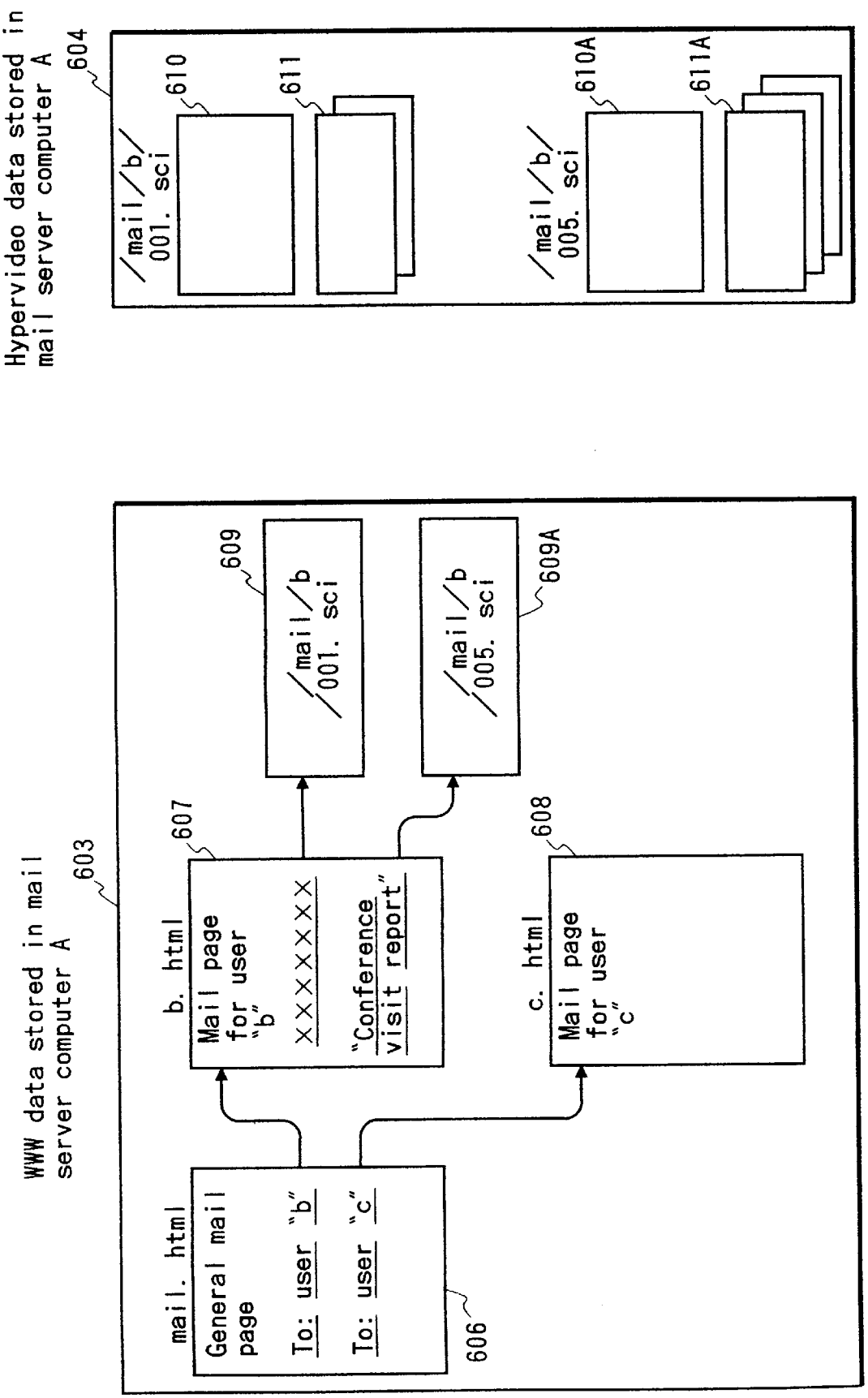
FIG. 37 is a diagram corresponding to FIG. 36, showing the respective data configurations after the hypervideo mail item has been received.
Figure 38:
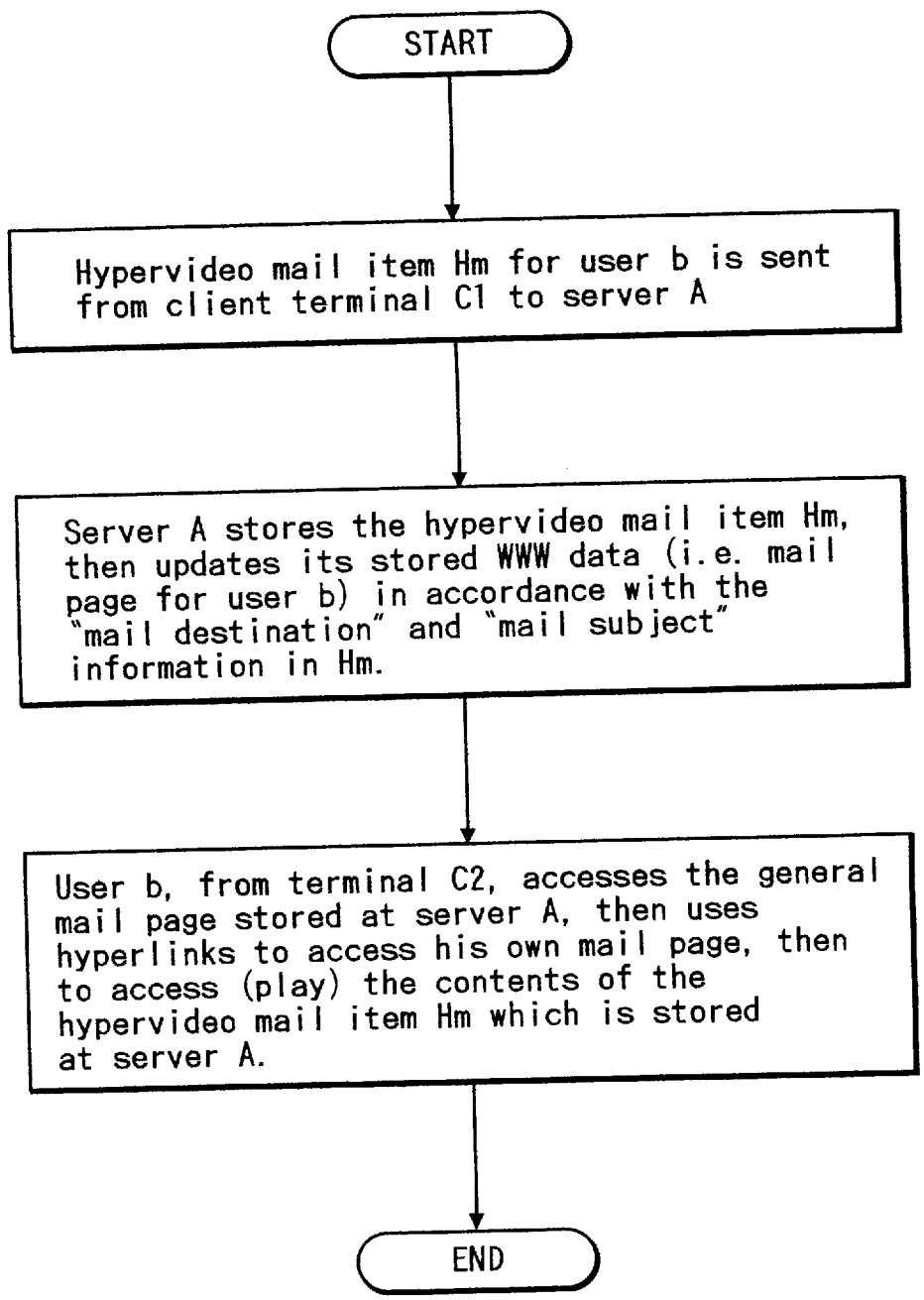
FIGS. 38 and 39 are flow diagrams for illustrating the basic operation sequences which are executed for transferring a hypervideo mail item, with the thirteenth embodiment.
Figure 39:
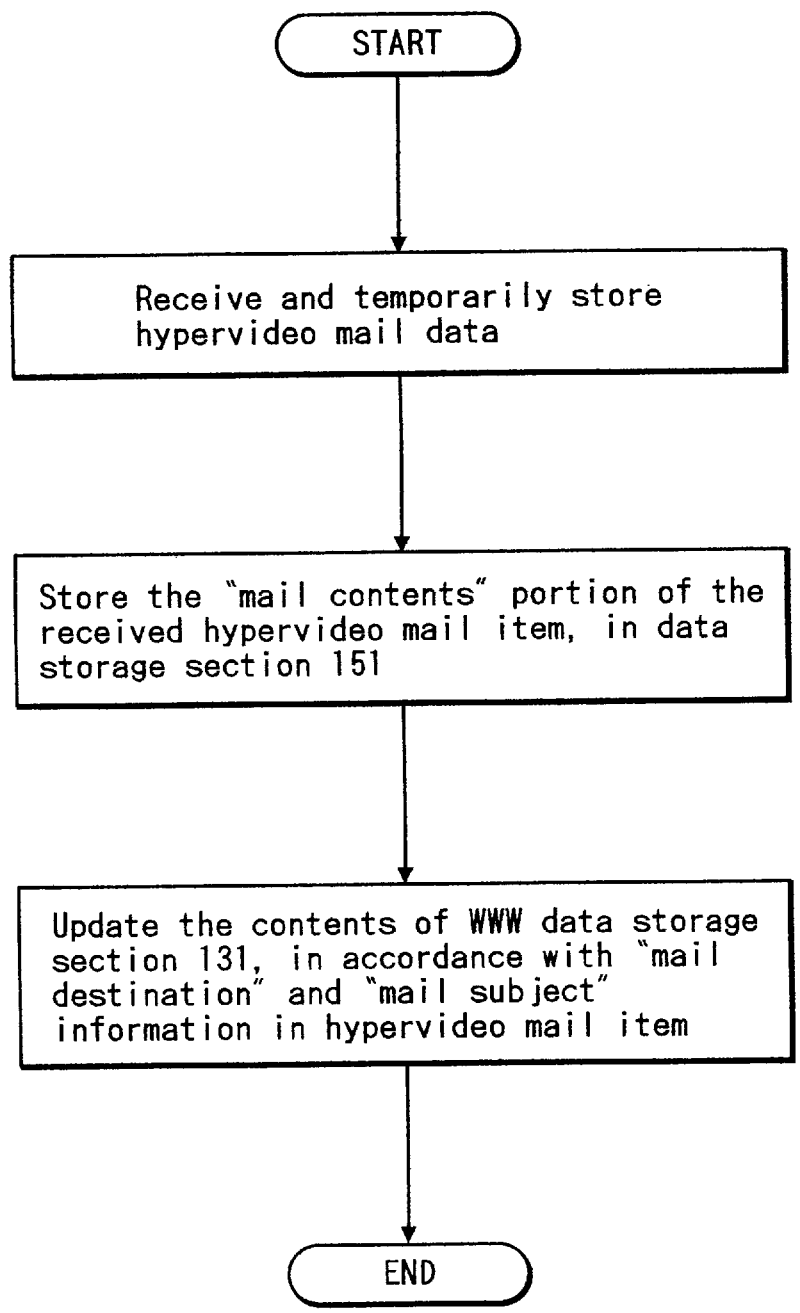

FIG. 35 is a simple system block diagram for describing an example of transferring a hypervideo mail item from a client terminal to the server computer A of this embodiment, while FIG. 36 and FIG. 37 show examples of conditions of data held in the system, before and after this hypervideo mail transfer. FIG. 38 is a simple flow diagram showing the basic operation sequence of the embodiment, during such a transfer, while FIG. 39 is a corresponding flow diagram showing the the operation sequence which is executed by the server computer A of the embodiment. It will be assumed that the hypervideo mail item 601 shown in FIG. 33 is generated and sent. Initially, the WWW data 603 stored in the WWW data service section 130 consist of a general mail page 606, which is a hypertext page having the name "mail.html" and containing embedded hyperlinks to user pages 607, 608, named "b.html" and "c.html" respectively, for use by two users, identified as "b" and "c" respectively. The user page 607 contains a hyperlink to a hypervideo mail item whose scenario data and subject matter data are stored in data service section 150, as part of the data 604. The storage location information 609 for the scenario data of this mail item (that information corresponding to the scenario reference data of the preceding embodiments) is assumed to be "/mail/b/001.sci", and the mail item consists of scenario and subject matter data 610 and 611 (i.e. a scenario data file with file name "001.sci", and one or more subject matter data files).

A user of the client terminal C1 then uses the hypervideo mail generating section 180 to generate a new hypervideo mail item, whose destination is user "b". The generated hypervideo mail data are sent, as indicated by the arrow line M1 in FIG. 35, to the hypervideo mail server computer A, to be processed by the hypervideo mail processing section 170, and then stored in the hypervideo data storage section 151 of the hypervideo data service section 150 as indicated by the hatched-line portion 150a. The contents of the data held in the server computer A will therefore become as shown in FIG. 37, due to the WWW data held in the WWW data service section 130 being updated by the hypervideo mail processing section 170 as described hereinabove, in accordance with the destination of the hypervideo mail item and the storage position of that item within the hypervideo data storage section 151 of the hypervideo data service section 150. As a result, the mail page 607 for user "b" now contains an additional hyperlink to storage information 609a for the scenario data file "005.sci" of the second mail item, that item having the theme "Conference visit report". The scenario data and subject matter data of that hypervideo mail item, stored in the hypervideo data service section 150, are designated as 610A, 611A respectively in FIG. 37.

Subsequently, the user "b" can access the mail page 607, from client terminal C2, and "click on" the displayed item "Conference visit report", whereupon the data contents of the corresponding hypervideo mail item will begin to be transferred to the client terminal C2 as indicated by arrow line M2 in FIG. 35, with the subject matter data 611A being played by that terminal in accordance with the contents of the scenario data 610A in the same way as described for the first embodiment hereinabove.

It can thus be understood that with this embodiment, any user of a network such as a LAN can generate hypervideo mail that can be sent to one or more other users of the network, with each of the users being able to access their hypervideo mail by browsing operation as for conventional electronic mail, for example by executing "click" selection operations using an input device such as a mouse, while observing displayed hypertext pages. The embodiment therefore extends, to the field of multimedia data transfer, the same advantages which are provided by conventional electronic mail services.

Although the above embodiment has been described on the assumption that scenario reference data are utilized as for the first embodiment, it would be equally possible to omit the use of scenario reference data and use hyperlinks directly to the scenario data, as with the second embodiment. In that case, for example, the scenario data file 610 in FIG. 36 would be stored as WWW data in server computer A, in place of scenario reference data 609. Alternatively, the embodiment could store and manage each hypervideo mail item as WWW data, as for the third embodiment.

Figure 40:
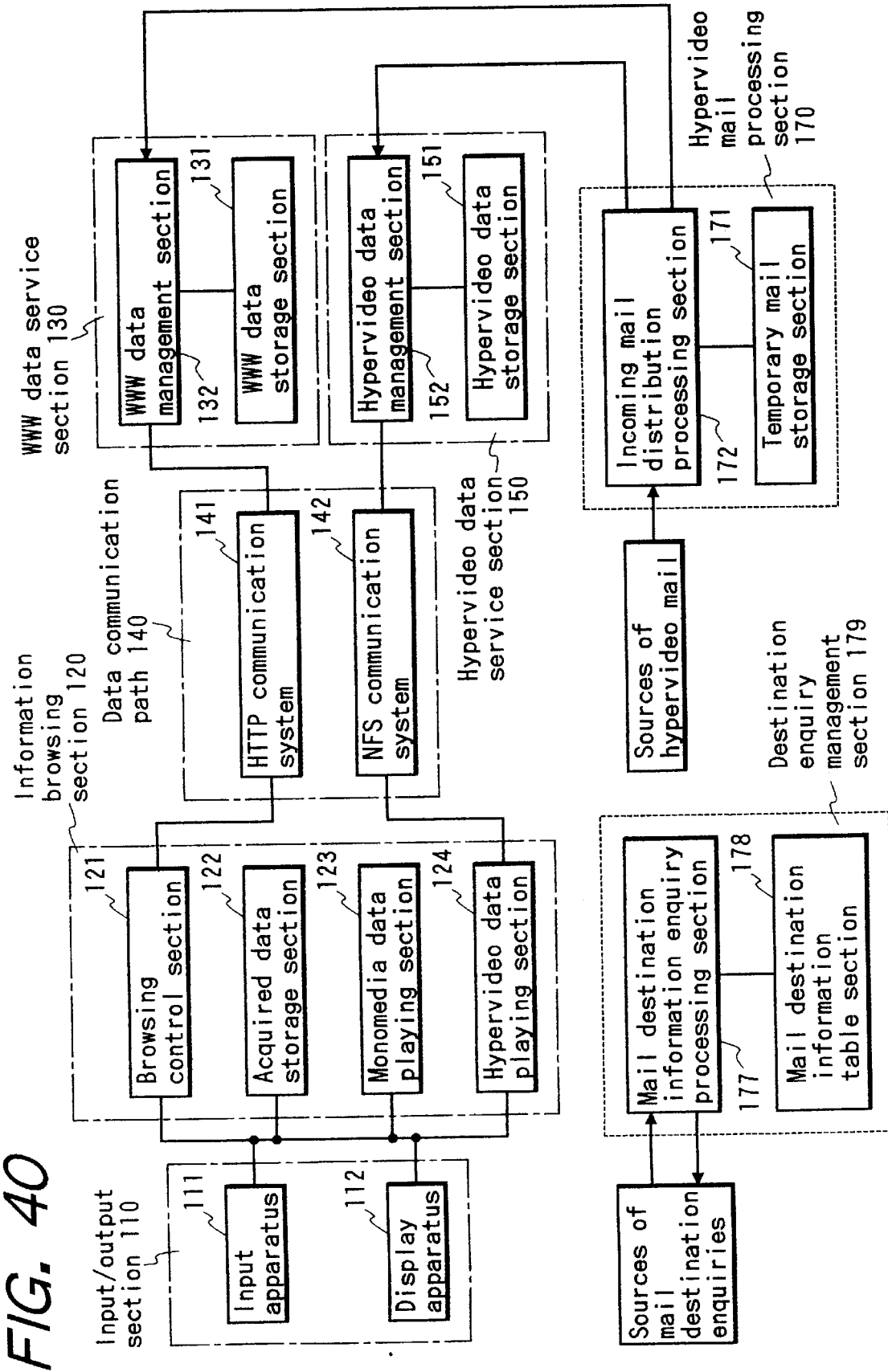
FIG. 40 is a system block diagram showing the basic components of a fourteenth embodiment of the invention, which is an information provider apparatus having a hypervideo mail processing capability, and which is suitable for being configured as a plurality of interconnected LANs (local area networks)

A fourteenth embodiment of the invention will be described, which is a network formed of a plurality of hypervideo mail client/server networks. These will be assumed to be respective LANs (local area networks) each having a single dedicated hypervideo mail server computer. The basic concepts of this embodiment will be described referring to FIG. 40. In FIG. 40, the contents and functions of the I/O section 110, information browsing section 120, data communication path 140, WWW data service section 130 and hypervideo data service section 150 are respectively substantially identical to those of the first embodiment shown in FIG. 2 and described hereinabove, so that further description will be omitted. However the embodiment further includes a hypervideo mail processing section 170, which is coupled to receive hypervideo mail from a plurality of sources as described for the preceding embodiment, and a destination enquiry management section 179. The destination enquiry management section 179 consists of a mail destination information enquiry processing section 177 and a mail destination information table section 178, with the mail destination information enquiry processing section 177 receiving mail destination enquiries from a plurality of sources (specifically, respective client terminals as described hereinafter).

Figure 41:
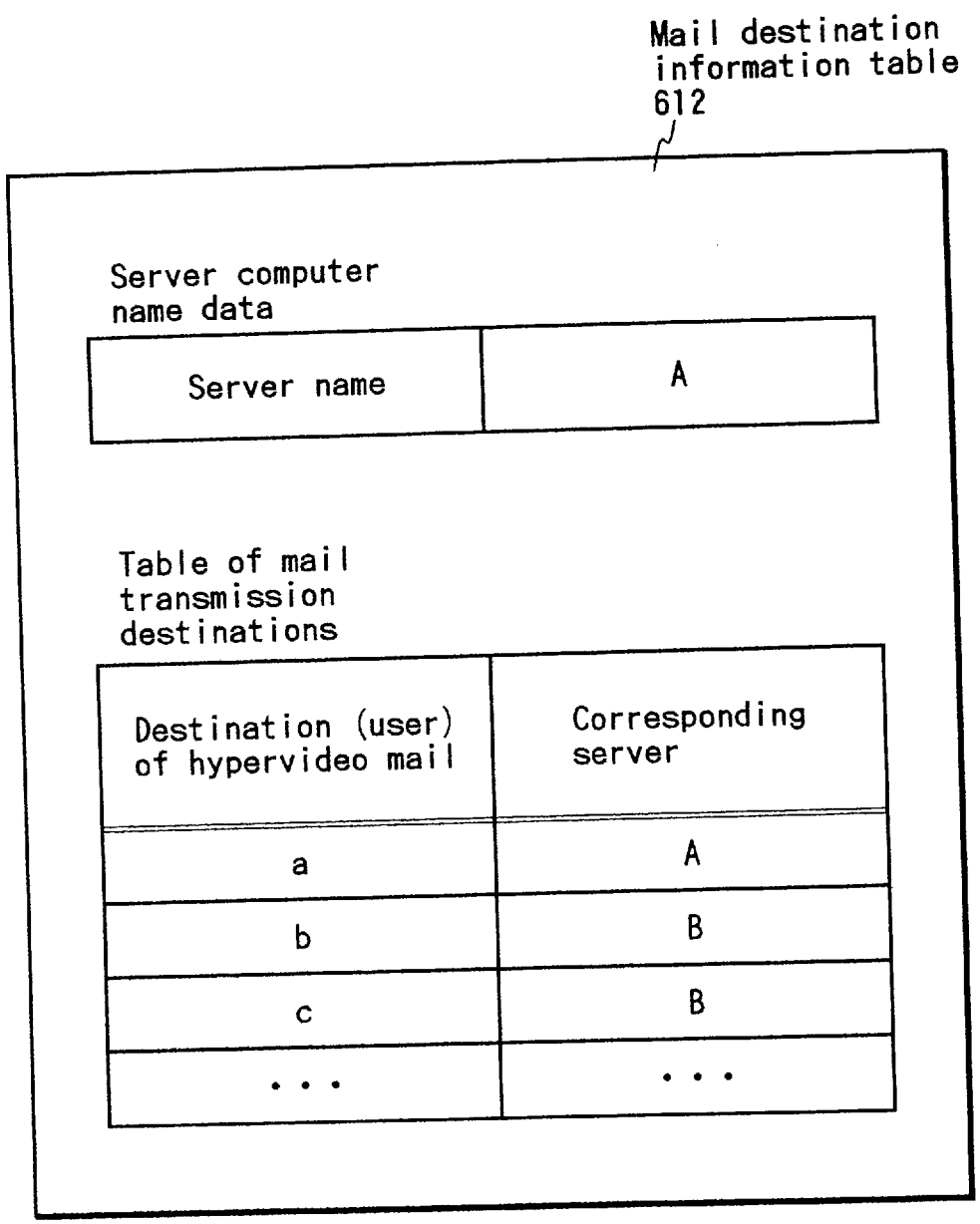
FIG. 41 shows an example of the contents of a mail destination information table which is stored in a destination enquiry management section of a mail server computer, with the fourteenth embodiment.

The mail destination information table section 178 stores a mail destination information table, such as the example 612 shown in FIG. 41. The table is used with a specific hypervideo mail server computer, i.e. a local server computer, which is assumed to have the name "A" assigned, and that name is specified in a "server name" field of the table. The remainder of the table is a list of mail transmission destinations, which relates each of a plurality of hypervideo mail destinations (e.g. respective users) designated by respective names, to corresponding hypervideo mail server computers.

Figure 42:
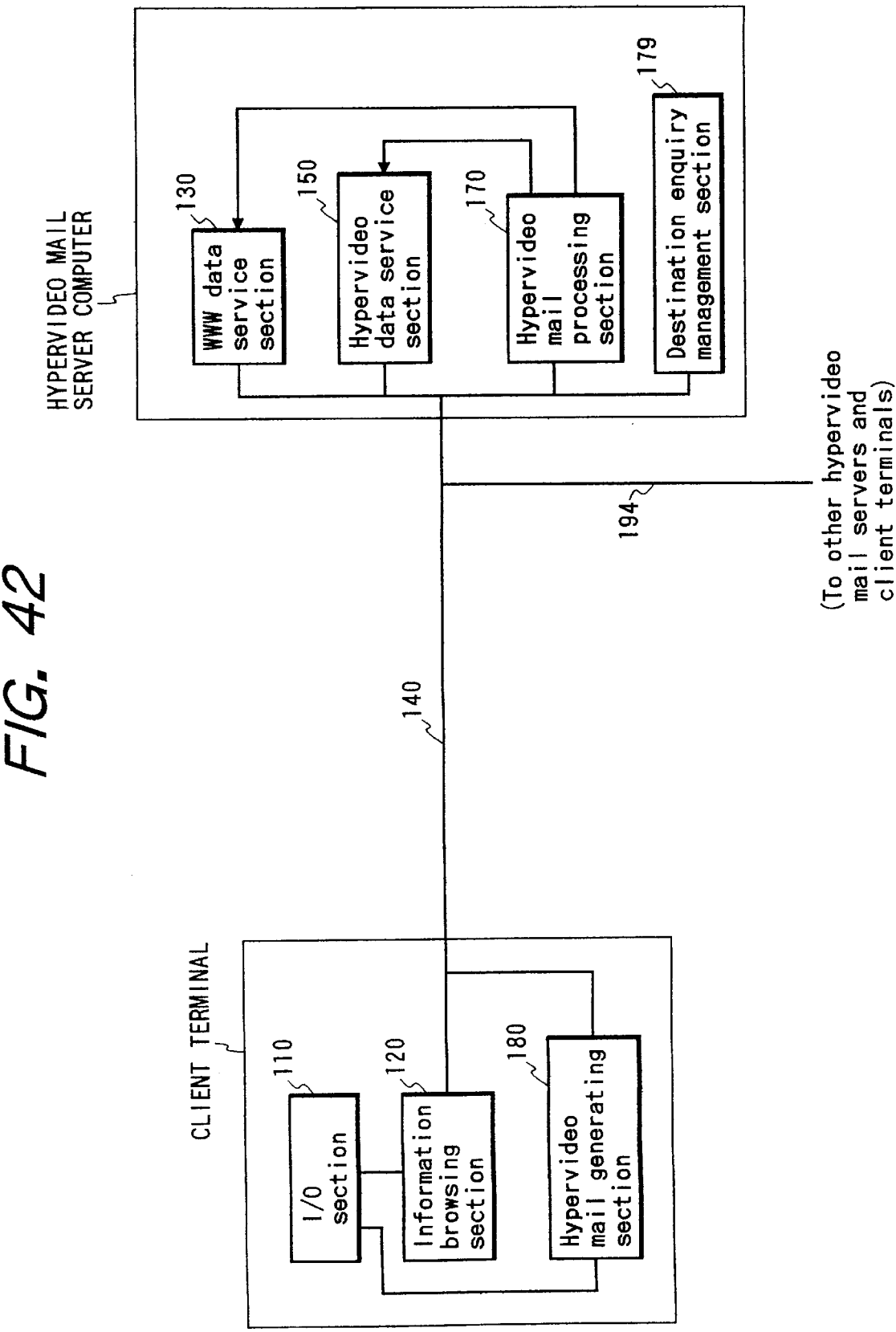
FIG. 42 is a partial system block diagram of the fourteenth embodiment, showing a hypervideo mail server computer and one of a plurality of client terminals connected thereto, for illustrating the respective basic internal configurations of the client terminal and hypervideo mail server computer.

FIG. 42 is a simple system block diagram showing the respective configurations of a client terminal and the corresponding hypervideo mail server computer of a LAN of this embodiment. In addition to a I/O section 110 and information browsing section 120, the client terminal is provided with a hypervideo mail generating section 180, which can be controlled by a user to generate desired hypervideo mail items. The hypervideo mail server computer is assumed to include a WWW data service section 130, a hypervideo data service section 150, a hypervideo mail processing section 170, and also a destination enquiry management section 179. In the same way as for the preceding embodiment, the data communication path 140 between the client terminal and server computer has a sufficiently wide bandwidth to permit real-time transfer of video data (e.g. using the NFS communication protocol). Hypervideo mail items are sent via the data communication path 140 to the hypervideo mail server computer, to be processed in the hypervideo mail processing section 170 as described hereinabove referring to FIG. 32.

The format of each hypervideo mail item can for example be as shown in FIG. 33 and described above. An inter-network data communication path 194 connects the data communication path 140 of the LAN to those of other LANs, to permit interchange of data between LANs. In the same way as for the data communication path 140, the inter-network data communication path 194 has a sufficiently wide bandwidth to enable real-time transfer of video data with resultant continuous-motion display of the data contents.

Figure 43:
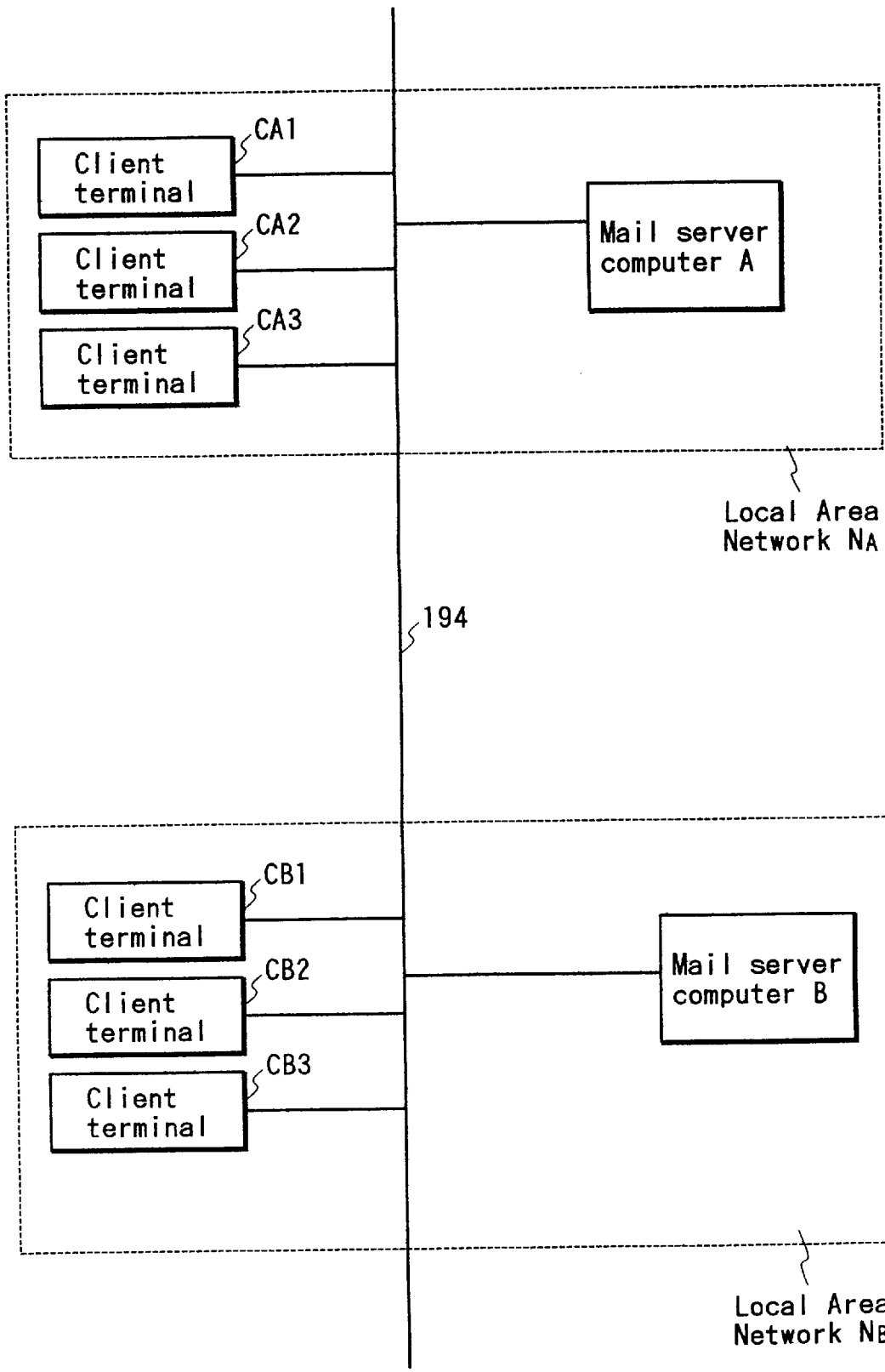
FIG. 43 is a partial system block diagram of the fourteenth embodiment, configured as a plurality of interconnected LANs (local area networks.

FIG. 43 shows the general configuration of this embodiment. This consists of two or more LANs, such as the networks $N_A$ and $N_B$, with the client terminals (e.g. CA1, CA2, CA3) of a LAN being coupled via a wide-band data communication path 140 to the hypervideo mail server computer of that LAN (e.g. computer A) and also to each of the other LANs of the system, such as the LAN $N_B$.

Figure 44:
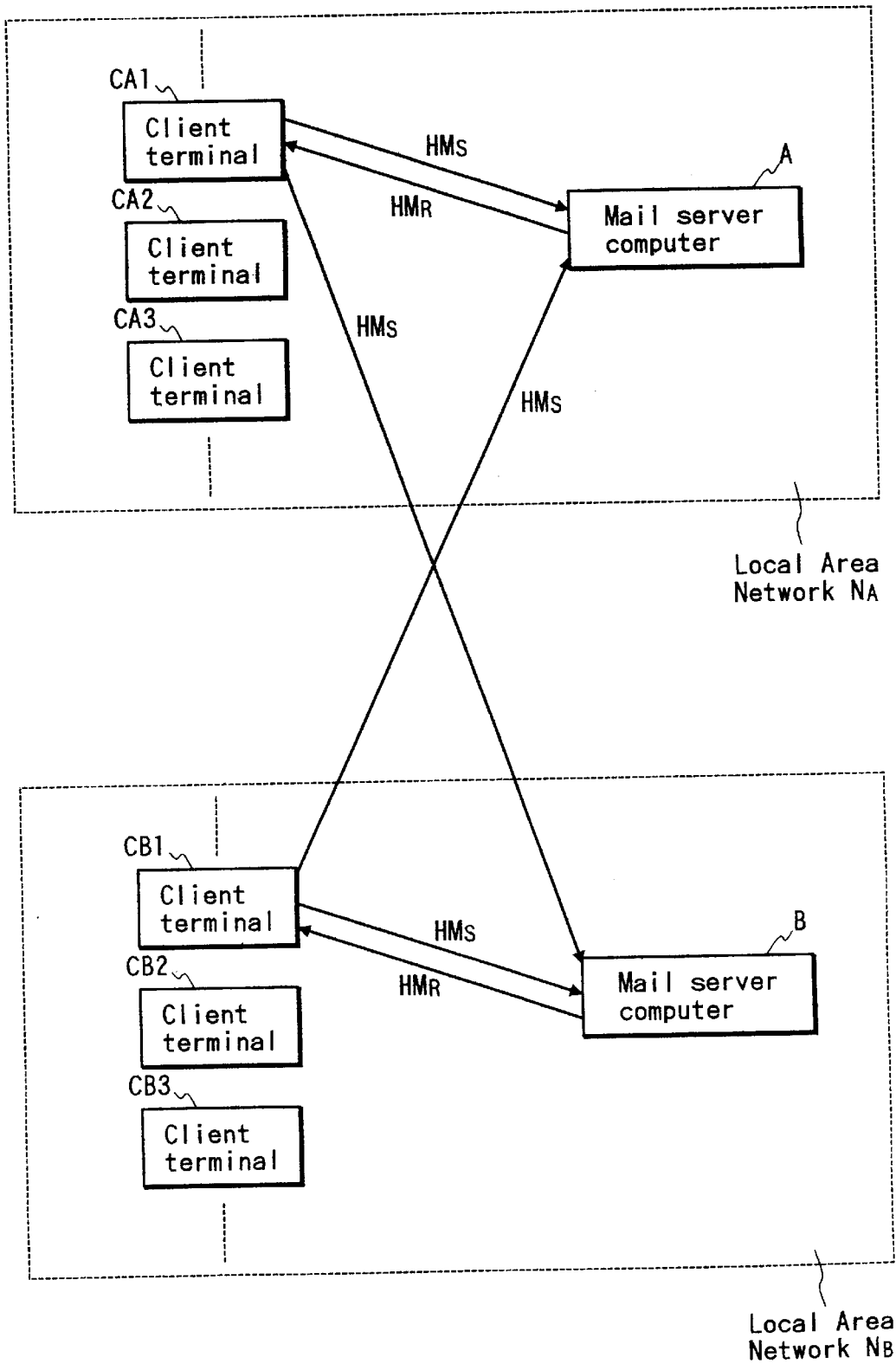
FIG. 44 is a conceptual system diagram corresponding to FIG. 43, for illustrating data flows within the system of FIG. 43.

FIG. 44 is a conceptual diagram (corresponding to FIG. 43) for illustrating the flow of data when hypervideo mail is sent between the client terminals CA1 and CB1 of the LANs $N_A$, $N_B$ of FIG. 43. In FIG. 44, each of the arrow lines $HM_S$ indicates a path over which hypervideo mail data can be sent from a client terminal to a hypervideo mail server computer, while each of the arrow lines $HM_R$ indicates a path over which hypervideo mail data can be sent from a hypervideo mail server computer to a client terminal (i.e. when a user of the client terminal requests that a hypervideo mail item be played). It can be understood from FIG. 44 that each client terminal in a LAN will access only the dedicated hypervideo mail server computer of that LAN, when a hypervideo mail item addressed to a user of that client terminal is to be played, irrespective of whether the hypervideo mail item has originated from a client terminal within that LAN or within some other LAN of the system.

Figure 45:
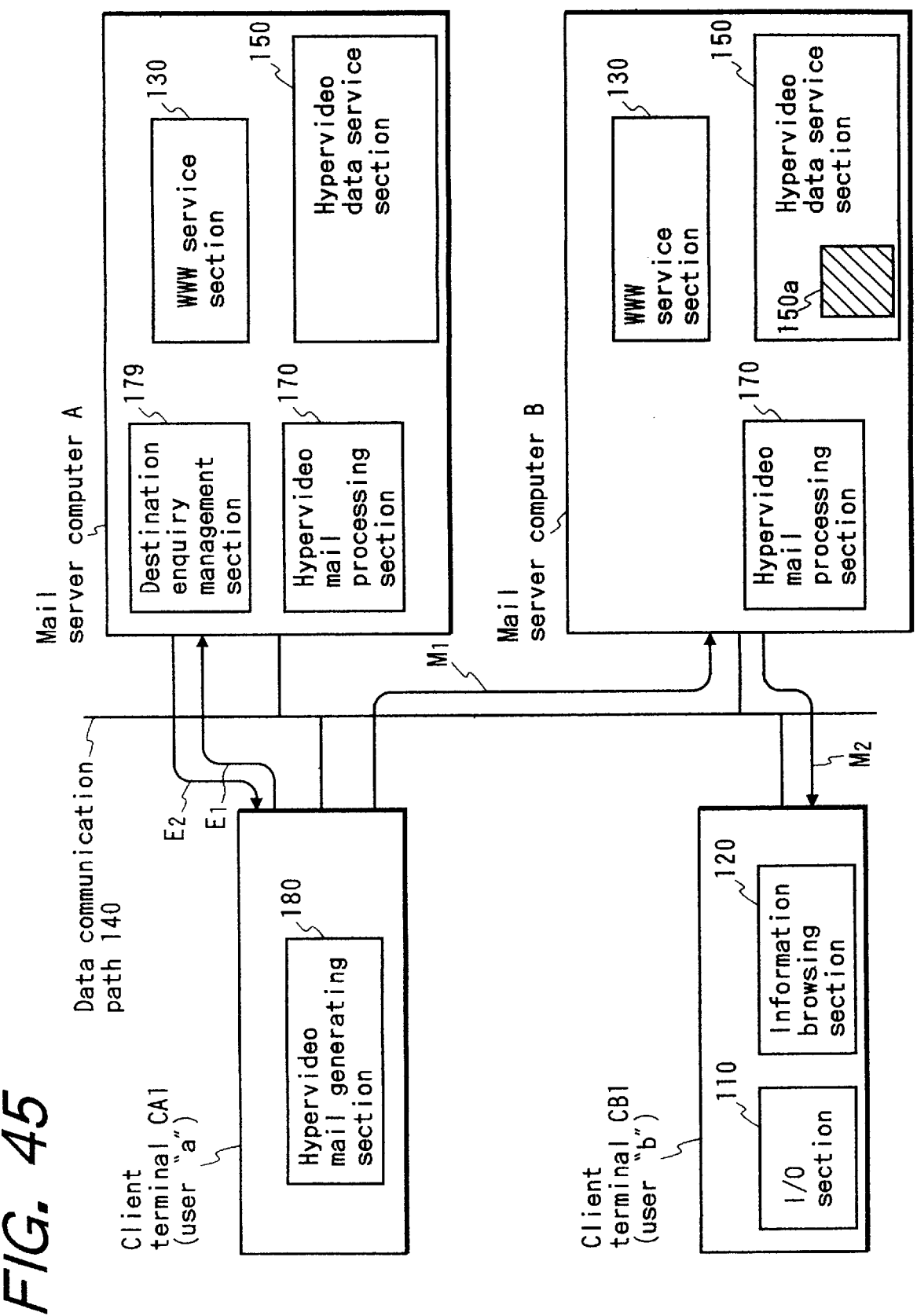
FIG. 45 is a partial system block diagram of the fourteenth embodiment, showing in greater detail the respective data flows which occur during exchanges of hypervideo mail items.
Figure 47A:
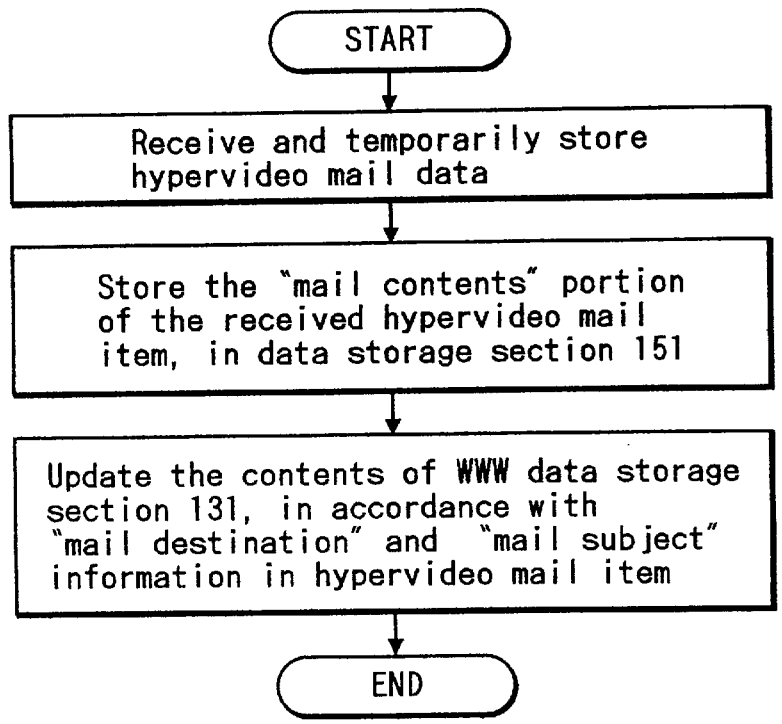
FIG. 47A and 47B are flow diagrams which respectively illustrate operating sequences of a hypervideo mail processing section and a destination enquiry management section, of the fourteenth embodiment.
Figure 47B:
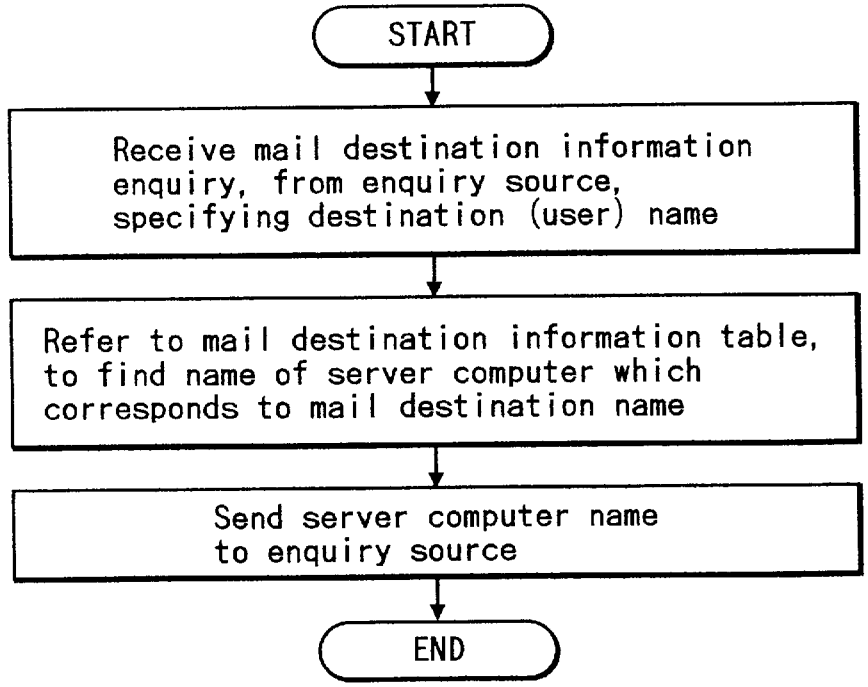

FIG. 45 is a diagram for illustrating the operation of this embodiment, assuming the specific example that a user of the client terminal CA1 of LAN $N_A$ shown in FIG. 44 is to send a hypervideo mail item Hm to a user "b" of the client terminal CB1 of LAN $N_B$. FIG. 46 is a corresponding flow diagram, showing the overall operating sequence which occurs during this transfer of mail, while FIG. 47A shows the operating sequence executed by the hypervideo mail processing section 170 of the mail server $H_A$, and FIG. 47B shows the corresponding operating sequence executed by the destination enquiry management section 179 of that mail server $H_A$. In FIG. 45, the client terminal CA1 first accesses the destination enquiry management section 179 of hypervideo mail server computer A, via the data communication path 140, as indicated by arrow line El, to obtain information (i.e. the server name) identifying the hypervideo mail server computer of the LAN which contains the client terminal that has been designated as being used by user "b". That information is then sent back to client terminal CA1, as indicated by arrow line E2. The client terminal CA1 then sends the hypervideo mail item, via the data communication path 140 as indicated by the arrow line M1, to the mail server B, to be processed by the hypervideo mail processing section 170 and stored in the hypervideo data service section 150 of that mail server, as indicated by the hatched-line portion 150a, and with the WWW data in the WWW data service section 130 being updated accordingly as described above.

Subsequently, when the user "b" of client terminal CB1 accesses his mail page, and so finds that the hypervideo mail item Hm is waiting for him, the user can initiate playing of the hypervideo data as described for the preceding embodiments, with data then being transferred via the data communication path 140 as indicated by the arrow line M2.

In other respects, the operation of this embodiment is identical to that of the preceding embodiment.

Furthermore, although it has been assumed that the fourteenth embodiment described above utilizes scenario reference data, as for the first embodiment, it would be equally possible to omit the scenario reference data and configure each mail server computer to store the scenario data of a received hypervideo mail item as WWW data, as for the second embodiment. Alternatively, all mail item data could be stored and managed as WWW data, as for the third embodiment.

Although this embodiment has been described in the above on the assumption that a system configured of a plurality of mutually communicating LANs is used, the embodiment would of course be equally applicable to a single LAN in which more than one dedicated hypervideo mail server computer is provided, i.e. with each server computer providing WWW data for a specific set of client terminals of the network. Such a system might be necessary for example, when the number of client terminals in the LAN is large and there is a practical upper limit to the number of client terminals which can be handled by a single hypervideo mail server computer.

It can thus be understood that with this embodiment, when applied to a plurality of mutually communicating LANs, any user of a client terminal in a LAN can generate hypervideo mail which is destined for a user of a client terminal within the same LAN or for a user of a client terminal within a different LAN of the system. In the same way as for the preceding embodiment, each of the users is able to access hypervideo mail which has been addressed to them, in a similar manner to that of conventional electronic mail.

Figure 48:
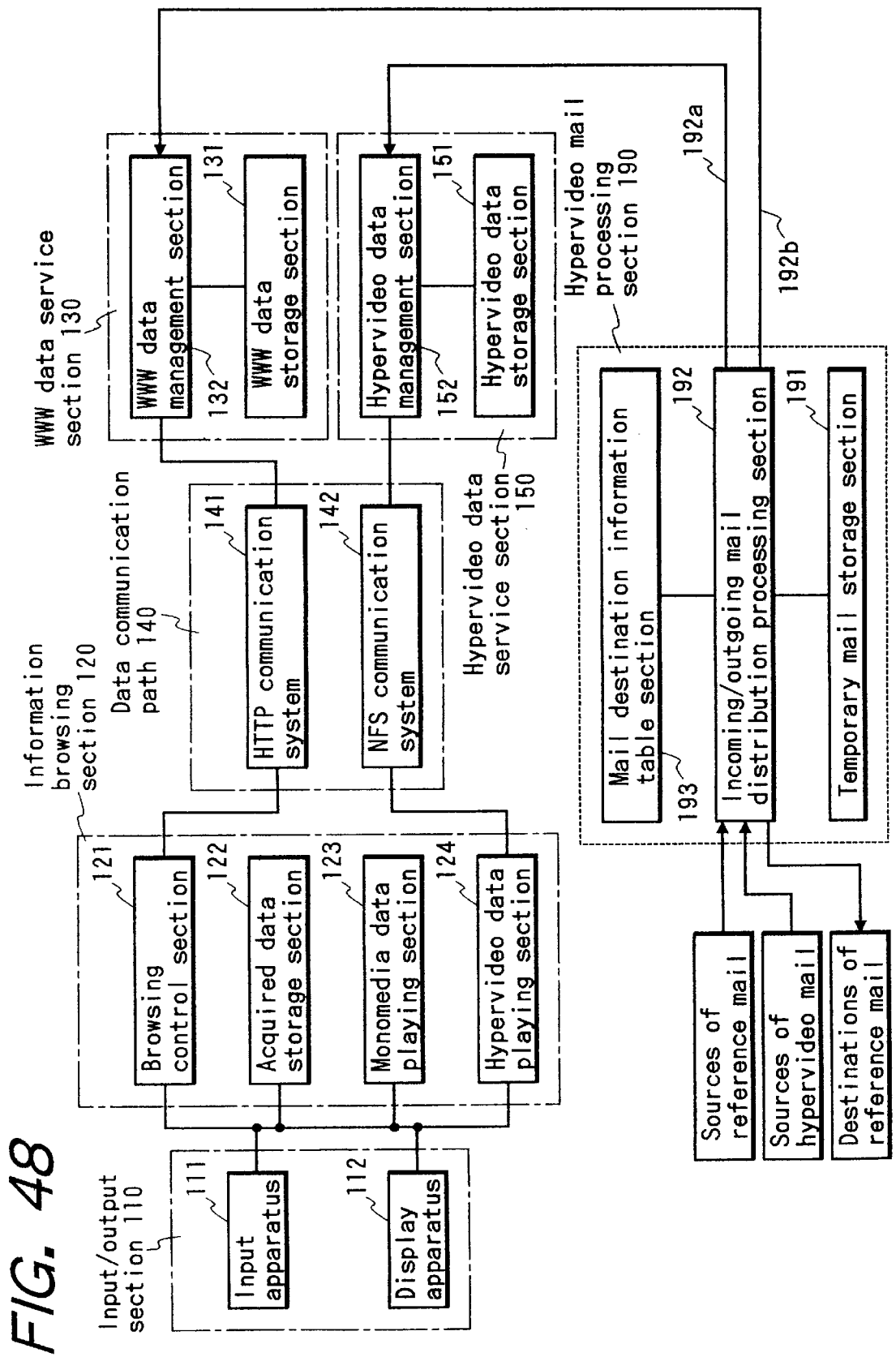
FIG. 48 is a system block diagram showing the basic components of a fifteenth embodiment of the invention, which is an information provider apparatus having a hypervideo mail processing capability, and which is suitable for being configured as a plurality of interconnected LANs.

A fifteenth embodiment of the invention will be described. As for the preceding embodiment, this is a network formed of a plurality of mutually communicating hypervideo mail client/server networks (which will be assumed in the following to be respective LANs) each having a single dedicated hypervideo mail server computer. The basic concepts of this embodiment will be described referring to FIG. 48. In FIG. 48, the contents and functions of the I/O section 110, information browsing section 120, data communication path 140, WWW data service section 130 and hypervideo data service section 150 are respectively substantially identical to those of the first embodiment shown in FIG. 2 and described hereinabove, so that further description will be omitted. This embodiment includes a hypervideo mail processing section 190, formed of a temporary mail storage section 191, incoming/outgoing mail distribution processing section 192 and mail destination information table section 193. The incoming/outgoing mail distribution processing section 192 is coupled to receive and process hypervideo data from various sources (specifically, client terminals as described hereinafter), and also to receive and generate reference mail (described hereinafter). The temporary mail storage section 191 is used to temporarily hold received hypervideo mail and reference mail data, while these are examined by the temporary mail storage section 191. The mail destination information table section 193 holds a mail destination information table, which provides similar information to that of the mail destination information table of the mail destination information enquiry processing section 177 of the preceding embodiment, i.e. a table which can have the data configuration shown in FIG. 41, to relate the name of each registered user of the system to the name of the mail server computer of the LAN which contains the client terminal employed by the user.

Figure 49:
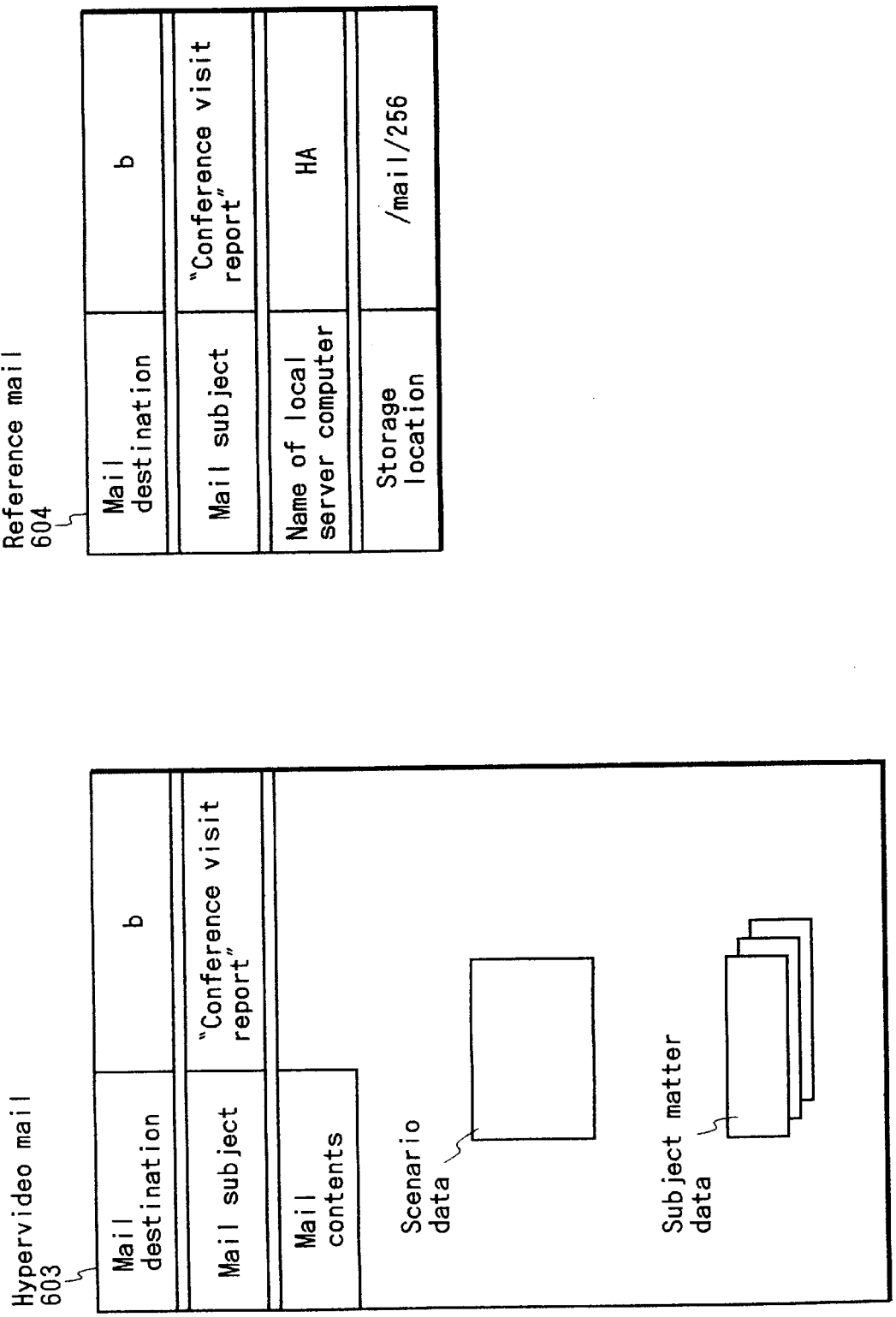
FIG. 49 is a conceptual diagram for illustrating respective examples of the data configurations of a hypervideo mail item and a reference mail item, used with the fifteenth embodiment.
Figure 54:
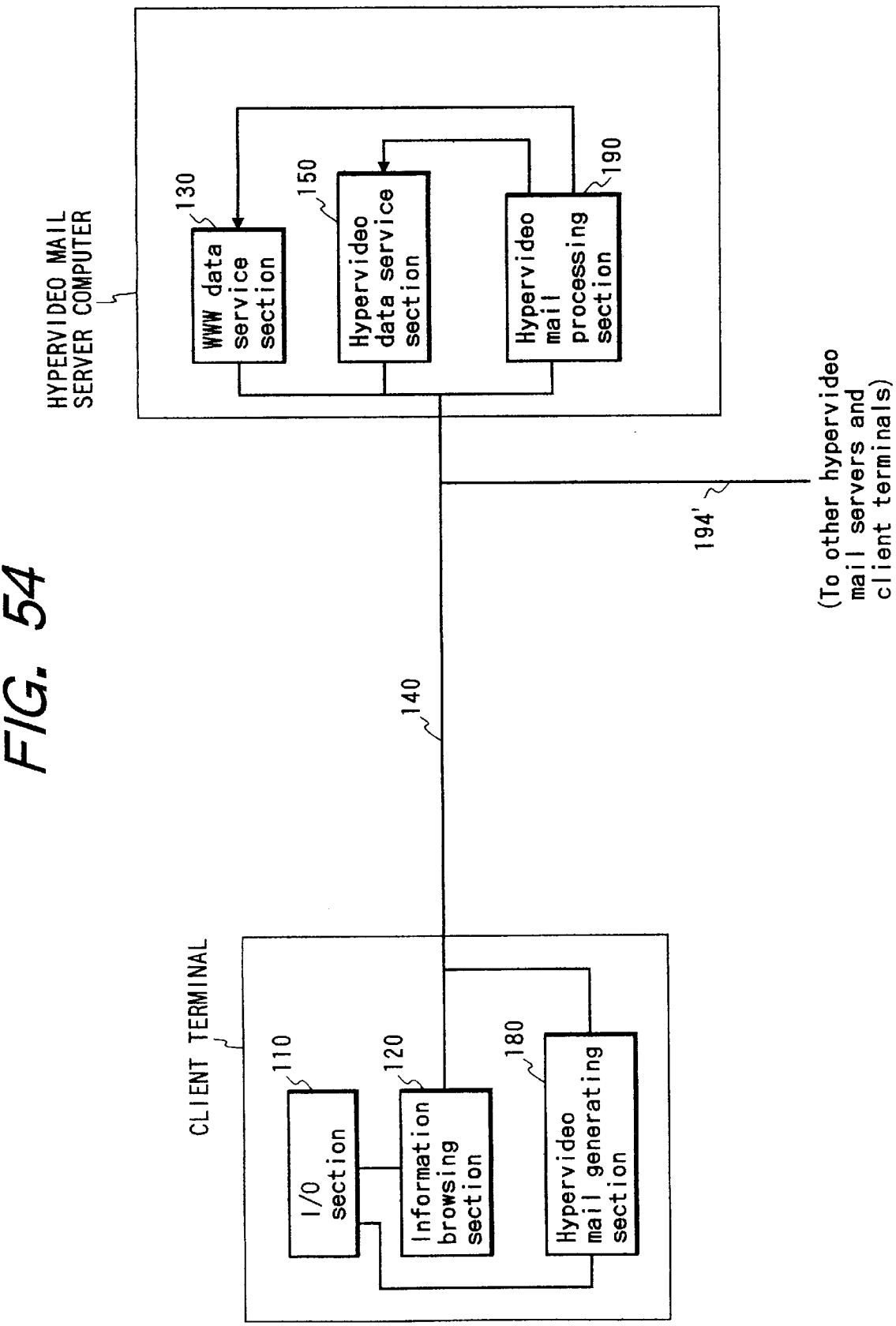
FIG. 54 is a partial system block diagram showing the basic internal configurations of a client terminal and mail server computer of a LAN, with the fifteenth embodiment.

The data configuration of a hypervideo mail item can be identical to that of the thirteenth and fourteenth embodiments, i.e. as indicated by numeral 603 in FIG. 49. The data configuration of a reference mail item, corresponding to the hypervideo mail item 603, can be as designated by numeral 604 in FIG. 49. As shown, this contains fields which respectively specify:

(a) the destination of the hypervideo mail item (in this example, the user name "b"), (b) the subject of the mail item, (c) the name of the local server computer for the originating client terminal (i.e. the dedicated hypervideo mail server computer that provides WWW data to the client terminal which originates the mail item) and (d) information specifying the storage location of the mail item in the hypervideo data service section 150 of that local server computer FIG. 54 is a simple system block diagram showing the respective configurations of a client terminal and the corresponding hypervideo mail server computer of a LAN of this embodiment. In addition to a I/O section 110 and information browsing section 120, the client terminal is provided with a hypervideo mail generating section 180, which can be controlled by a user to generate desired hypervideo mail items. The hypervideo mail server computer is assumed to include a WWW data service section 130, a hypervideo data service section 150, and a hypervideo mail processing section 190. A wide-band inter-network data communication path 194' connects the data communication path 140 of the LAN to those of other LANs, as for the preceding embodiment. However in this case, the data communication path 194' has a sufficiently wide bandwidth to enable real-time transfer of video data with resultant continuous-motion display of the data contents, i.e. is also a wide-band data communication path, in the same way as for the data communication path 140.

The basic physical configuration of this embodiment is as illustrated in FIG. 43 and described hereinabove for the preceding embodiment, i.e. consisting of a plurality of mutually communicating LANs, interconnected by data communication paths having a transmission bandwidth which is sufficiently wide to permit real-time transfer of video data from a server computer to a client terminal while the data are being displayed at the client terminal.

Figure 50:
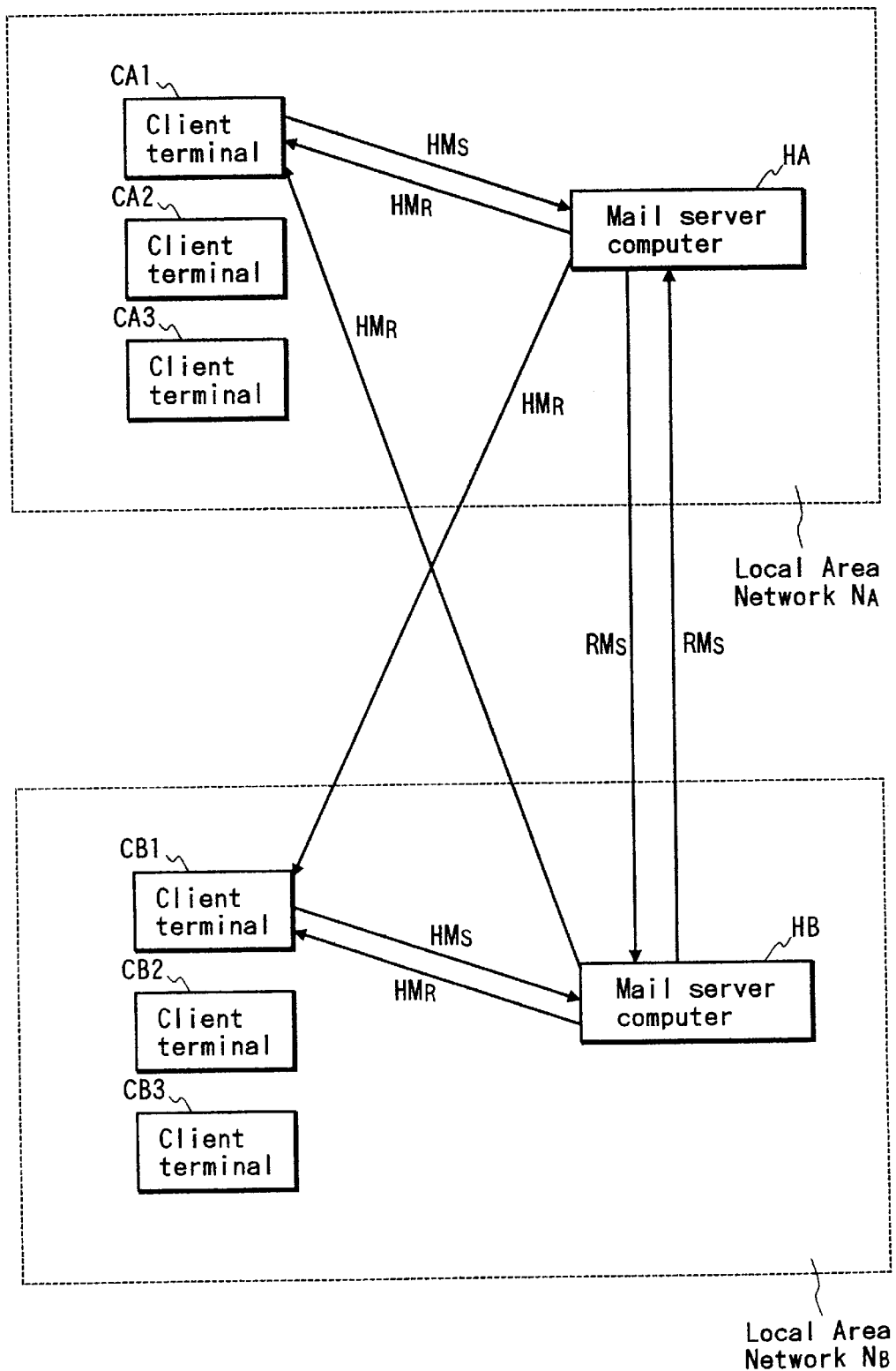
FIG. 50 is a conceptual system diagram of the fifteenth embodiment, configured as a plurality of mutually communicating LANs, for illustrating respective flows of data within and between the LANs.

FIG. 50 is a conceptual diagram (corresponding to FIG. 43) for illustrating the flow of data when hypervideo mail is sent between the client terminals CA1 and CB1 of the LANs $N_A$, $N_B$ of FIG. 43. In FIG. 44, each of the arrow lines $HM_S$ indicates a path over which hypervideo mail data can be sent from a client terminal to a hypervideo mail server computer, while each of the arrow lines $HM_R$ indicates a path over which hypervideo mail data can be sent from a server computer to a client terminal (i.e. when a user of the client terminal requests that a hypervideo mail item be played). It can be understood from FIG. 50 that this embodiment differs from the previous embodiment, in that each client terminal in a LAN may access either its own dedicated mail server computer or the mail server computer of another LAN, to receive mail which is addressed to a user of that client terminal.

In FIG. 50, the arrow lines $RM_S$ denote flows of reference mail data, between hypervideo mail server computers.

Figure 51:
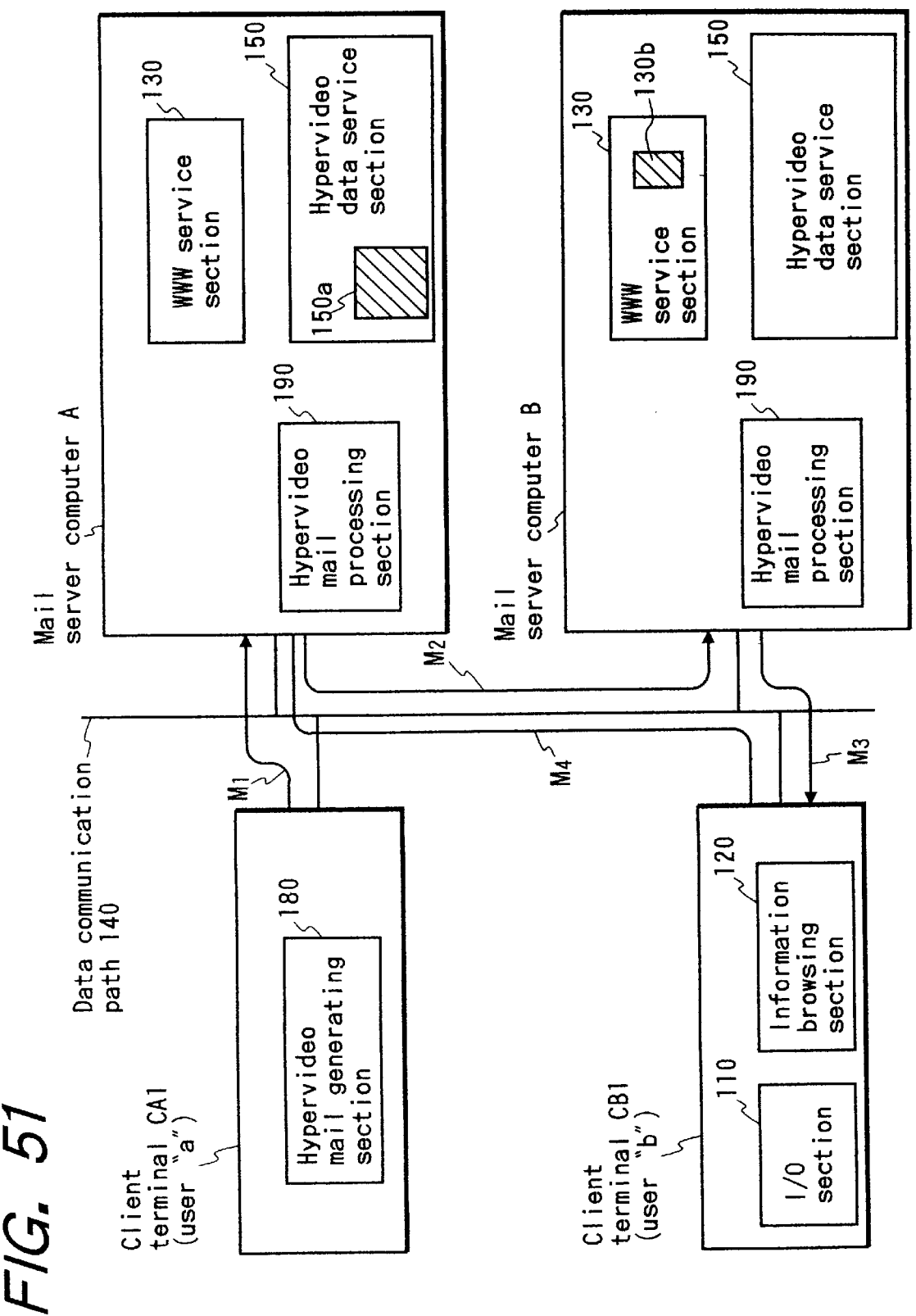
FIG. 51 is a partial system block diagram of the fifteenth embodiment, showing a respective hypervideo mail server computers of two LANs, connected to one client terminal of each of the LANS, for illustrating the transfer of a hypervideo mail item between the two client terminals, based on the use of a corresponding reference mail item.
Figure 52:
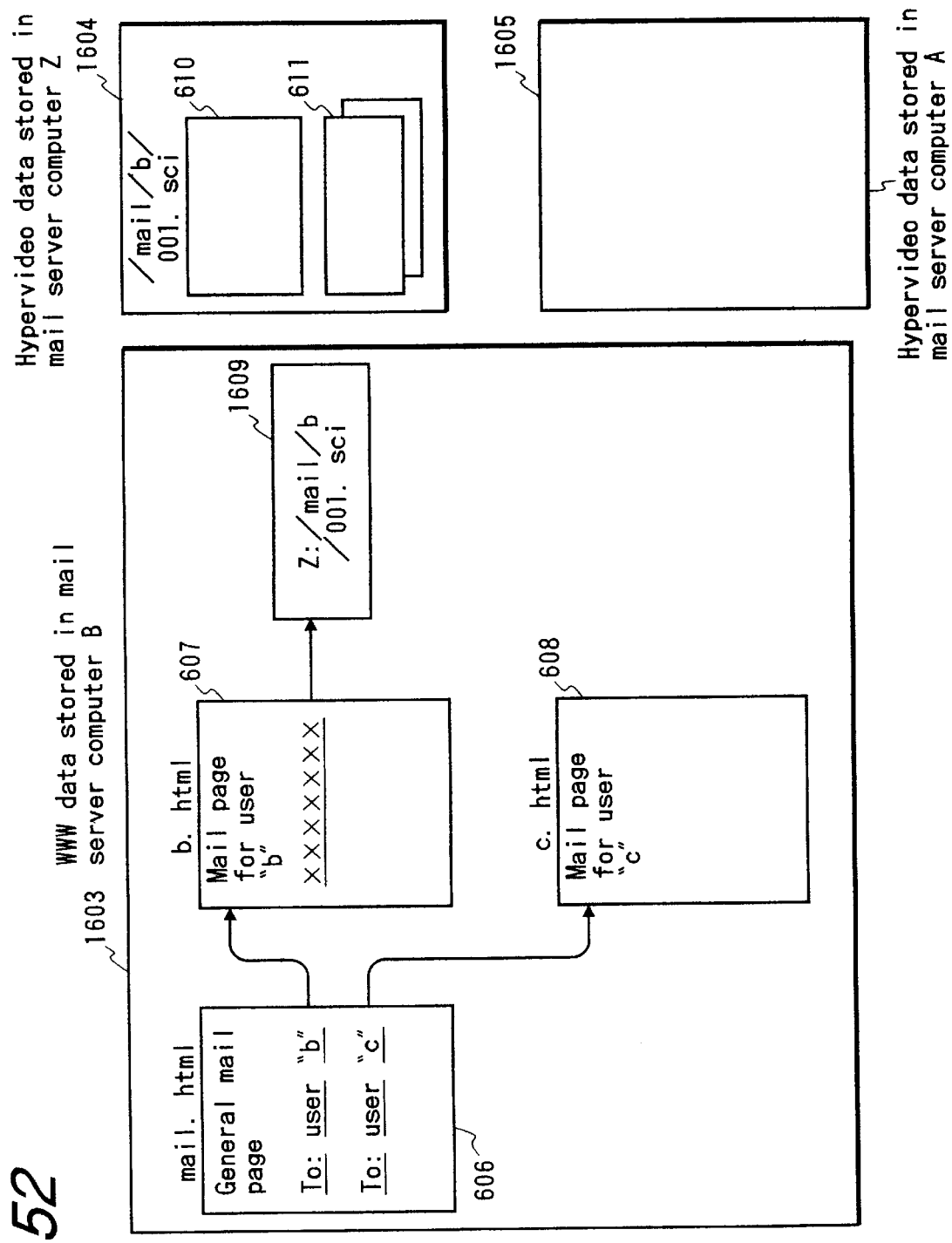
FIG. 52 is a conceptual diagram for illustrating respective examples of data configurations of WWW data and hypervideo data, stored in the fifteenth embodiment, prior to a certain hypervideo mail item being received by a mail server computer.
Figure 53:
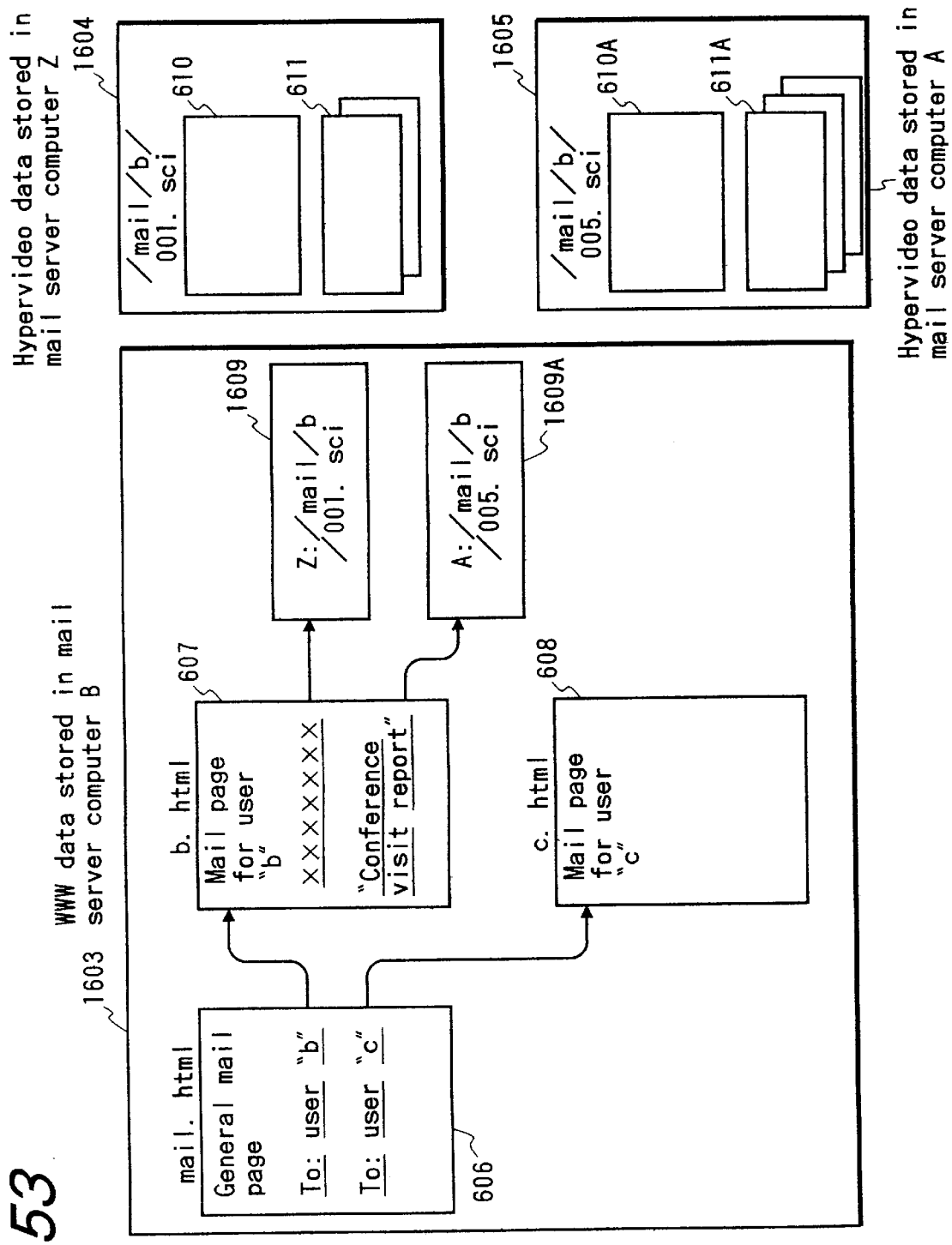
FIG. 53 is a diagram corresponding to FIG. 52, showing the respective WWW data and hypervideo data configurations after the hypervideo mail item has been received.
Figure 55:
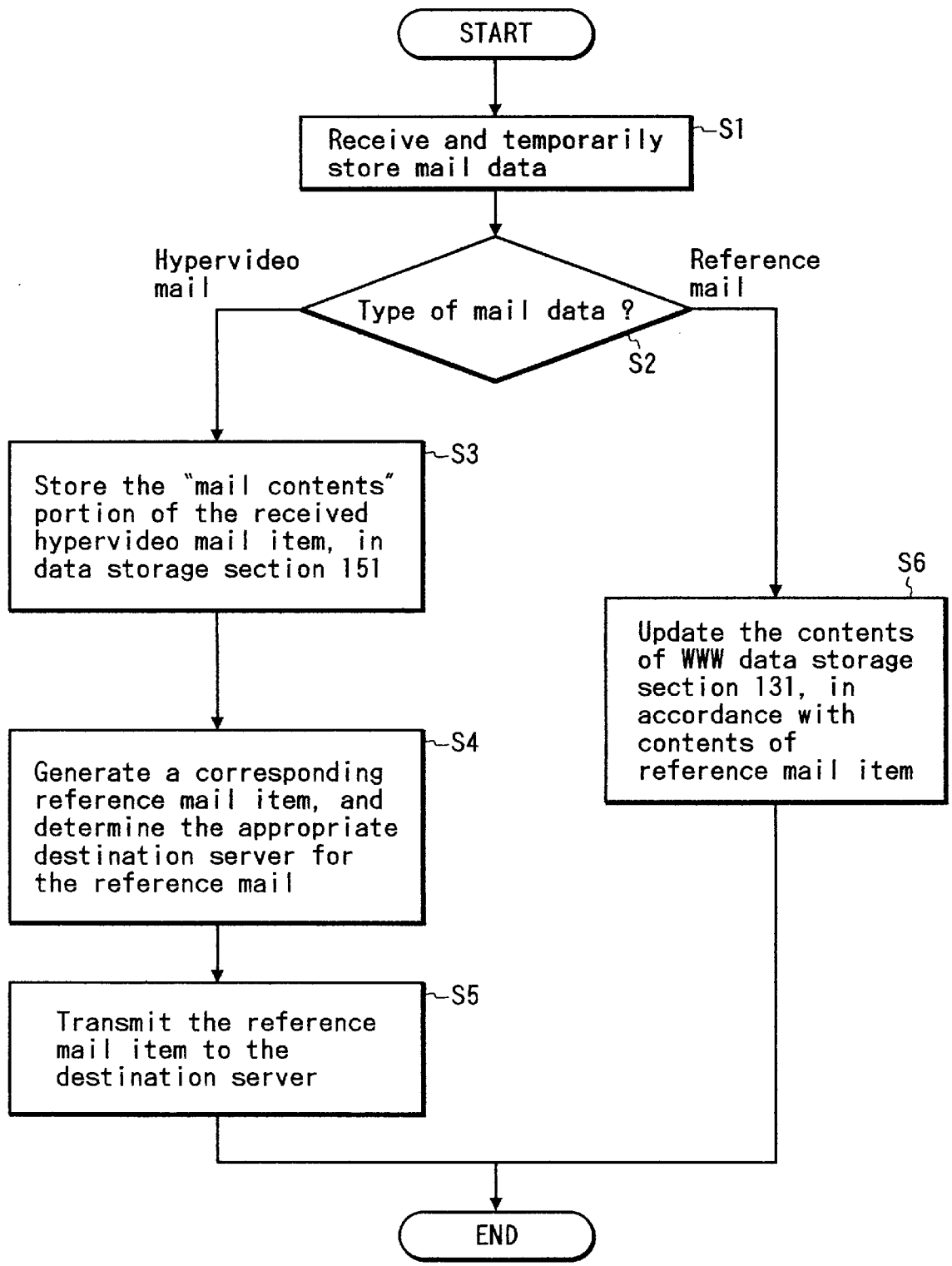
FIG. 55 is a flow diagram for illustrating the basic operation sequence which is executed for transferring a reference mail item, corresponding to a hypervideo mail item, to the server computer of a destination client terminal, with the fifteenth embodiment.
Figure 56:
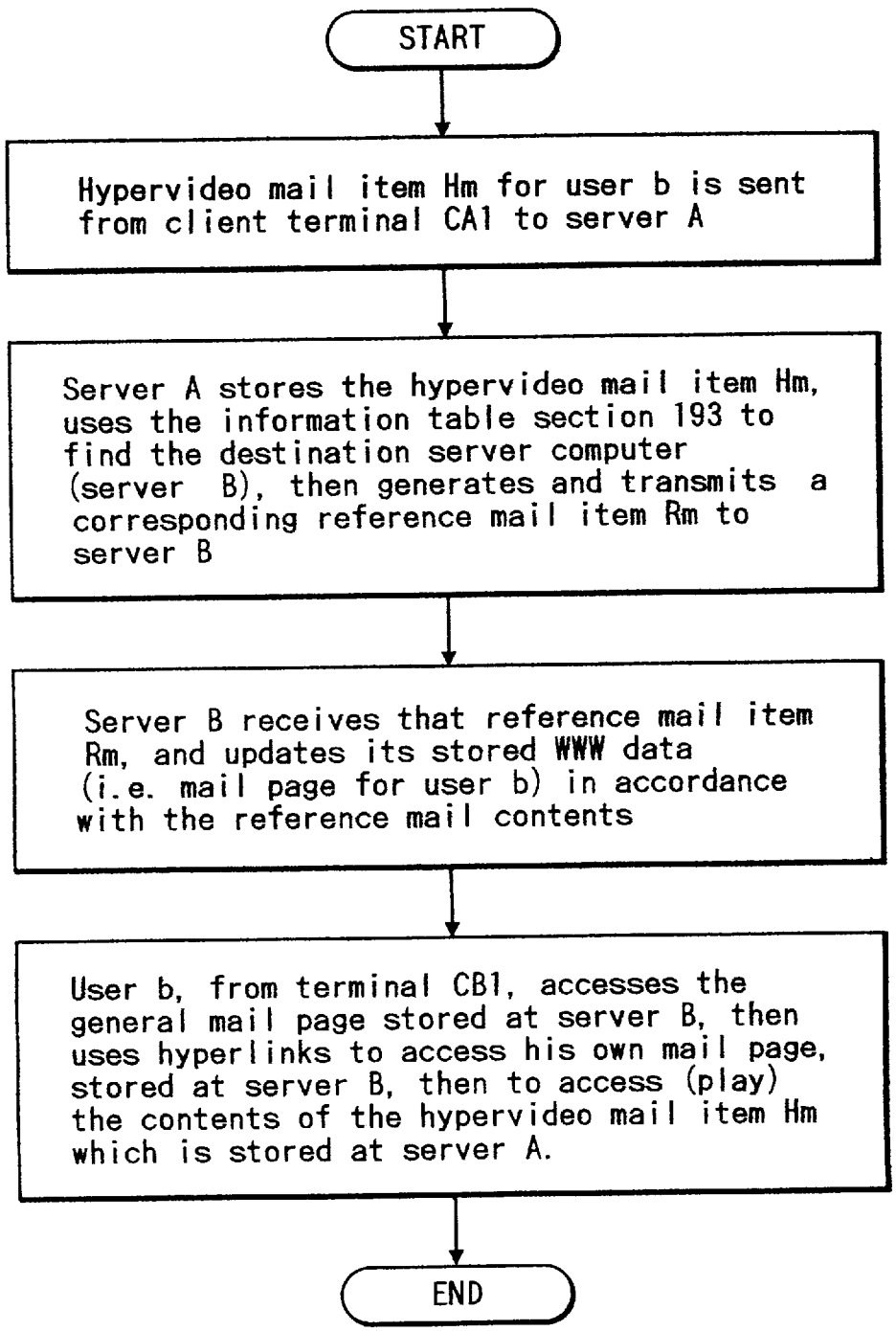
FIG. 56 is a flow diagram for illustrating the basic operation sequence which is executed for transferring a hypervideo mail item between two client terminals, with the fifteenth embodiment.

FIG. 51 is a diagram for illustrating the operation of this embodiment, again assuming the specific example that a user of the client terminal CA1 of LAN $N_A$ shown in FIG. 43 is to send a hypervideo mail item Hm to a user "b" of the client terminal CB1 of LAN $N_B$. FIG. 56 is a corresponding flow diagram, showing the overall operating sequence which occurs during this transfer of mail. FIG. 52 shows a data condition of server computers in the system prior to this mail transfer operation, while FIG. 53 shows the corresponding condition after the hypervideo mail item has been set in a state in which it can be played by the destined user. FIG. 55 shows the operating sequence executed by a hypervideo mail processing section 190 of a hypervideo mail server computer of this embodiment.

Referring first to FIG. 51 and FIG. 52, it is assumed that initially the WWW data service section 130 of the mail server computer B (of the LAN $N_B$) contains the WWW data 1603, while there is no hypervideo data stored in the hypervideo data service section 150 of the mail server computer A. The WWW data 1603 stored in the WWW data service section 130 consist of a general mail page 606, which is a hypertext page having the name "mail.html" and containing embedded hyperlinks to user hypertext pages 607, 608, named "b.html" and "c.html" respectively, for use by two users who are named "b" and "c" respectively. The user page 607 contains a hyperlink to a scenario reference file 1609, holding storage location information for the scenario data file "001.sci" which is stored in the hypervideo data service section 150 of a mail server computer Z (i.e. the mail server computer of another LAN of the system, which is not shown in FIG. 51), as data 1604. When a user of client terminal CA1 uses the hypervideo mail generating section 180 of that terminal to generate the hypervideo mail item whose destination is user "b", then the corresponding data are transferred to the hypervideo mail processing section 190 of the mail server computer A as indicated by the arrow line M1 in FIG. 51. The hypervideo mail processing section 190 then processes the mail data, to generate a corresponding reference mail item, then stores the contents of the hypervideo mail item in the hypervideo data service section 150 of mail server computer A, as indicated by the hatched-line region 150a, refers to the mail destination information table section 193 to find the name of the mail server computer of the destination LAN, and sends the reference mail item to that mail server computer (in this case, the mail server computer B), as indicated by the arrow line M2 in FIG. 51, to be processed by the hypervideo mail processing section 190 of that mail server computer. That hypervideo mail processing section 190 then updates the contents of the WWW data service section 130 of mail server computer B, as indicated by the hatched-line region 130b in FIG. 51.

Thus, as shown in FIG. 53, the WWW data 1603 held in the mail server computer A now have been updated such that the mail page for user "b" has a new hyperlink item, which points to the storage location of the scenario data file of the new mail item (i.e. in mail server computer A, with the internal storage location information "/mail/b/005.sci/"). In addition, the data contents 1605 of the hypervideo data service section 150 of mail server computer A now contain the scenario data and subject matter data 610A, 611A for the new hypervideo mail item.

In this condition, if the user "b" of client terminal CB1 now accesses the mail item displayed as "Conference visit report" on his mail page 607, (i.e. after accessing that user's mail page in the WWW data service section 130 of the mail server computer B, as indicated by the arrow line M3), the hypervideo data of that mail item will be accessed at mail server computer A, and the mail contents will begin to be transferred (as indicated by arrow line M4) to client terminal CB1 from the mail server computer A, and played.

The above process is shown in the flow diagram of FIG. 56, in which the reference mail item whose destination is user "b" being designated as Rm, and the corresponding hypervideo mail item as Hm.

As shown by the flow diagram of FIG. 55, when the hypervideo mail processing section 190 of a mail server computer of this embodiment receives a hypervideo mail item, the data are first stored in the temporary mail storage section 191, as a first step (S1). The type of data (i.e. hypervideo mail or reference mail) is then judged, in step S1, with appropriate processing steps S3 to S5, or S6, then being executed by hypervideo mail processing section 190 in accordance with whether a reference mail item or a hypervideo mail item is received.

It can thus be understood that with this embodiment, when a hypervideo mail item is generated and sent by a user within a first LAN with the destination being a user located within a second LAN, it is not necessary for the contents of that mail item to be immediately transferred over the data communication path between the two LANs. Instead, corresponding reference mail information is sent to the second LAN, to update the WWW data of the mail server computer of that LAN (i.e. to update the mail page data of the destined user). Thereafter, the actual contents of the mail item can be accessed by the destined user, when required, with the mail data being transferred via the data communication path between the two LANs.

In the above description of the fifteenth embodiment, it has been assumed that WWW data for the client terminals of a LAN are held in the mail server computer of that LAN. However it would be equally possible to arrange that the WWW data are instead held in each of the client terminals of the LAN, in a similar manner to that described for the second embodiment hereinabove.

Furthermore the three preceding embodiments have been described, for ease of understanding, with the temporary mail processing section of the hypervideo mail processing section being shown as a separate system block from the hypervideo data storage section 151. However in a practical apparatus, that temporary mail processing section can of course consist of a dedicated storage region which is defined within the same data storage device (in general, a high-capacity hard disk apparatus) which is used to implement the hypervideo data storage section 151.

With the fourteenth and fifteenth embodiments of the invention described above, hypervideo mail can be sent within a network which consists of a plurality of sub-networks (e.g. LANs) which mutually communicate via a common data communication path having a sufficiently wide bandwidth to permit real-time transfer and display of video data, such as the data communication path 140 in the example of FIG. 43 described above. Embodiments of the invention will be described in the following, whereby hypervideo mail can be exchanged within a network which consists of a plurality of sub-networks (e.g. LANs) which mutually communicate via a data communication path which does not have a sufficiently wide bandwidth to permit real-time transfer and display of video data. A typical example of such a situation, at the present time, is hypervideo mail exchange between client terminals of respective networks which are linked via the Internet. For that reason, the following embodiments will be described on the assumption of such a linkage via the Internet. However it should be understood that the invention is not limited to such linkage, and is applicable to the general case of two or more wide-band networks such as LANs mutually linked by any form of data communication path which does not provide sufficient bandwidth to permit real-time transfer of video data such as to enable continuous-motion display of the data contents.

Figure 57:
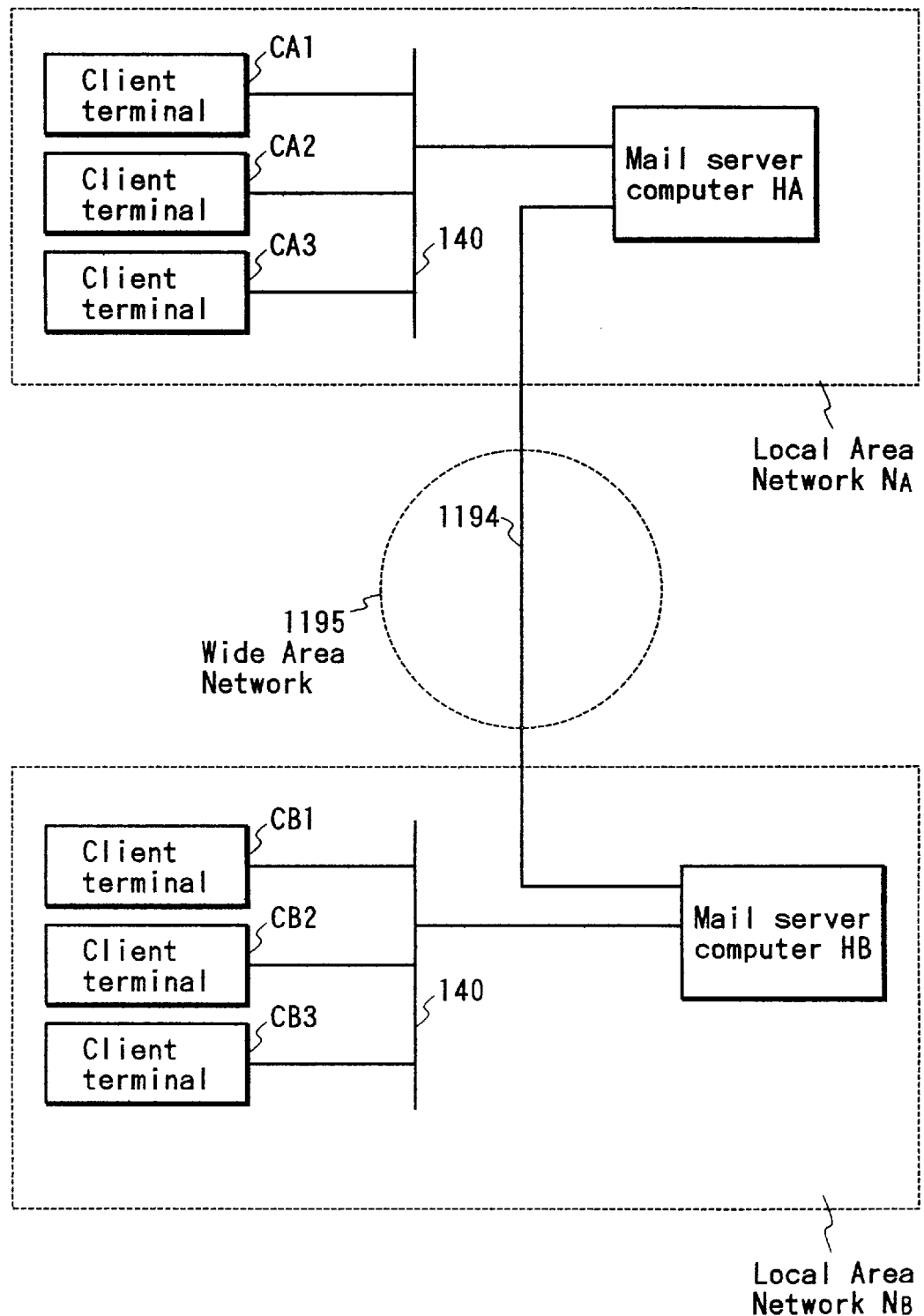
FIG. 57 is a system block diagram of a sixteenth embodiment of the invention, which is an information provider apparatus having a hypervideo mail processing capability, configured as a plurality of LANs which mutually communicate via data communication paths which extend through a wide area network.
Figure 58:
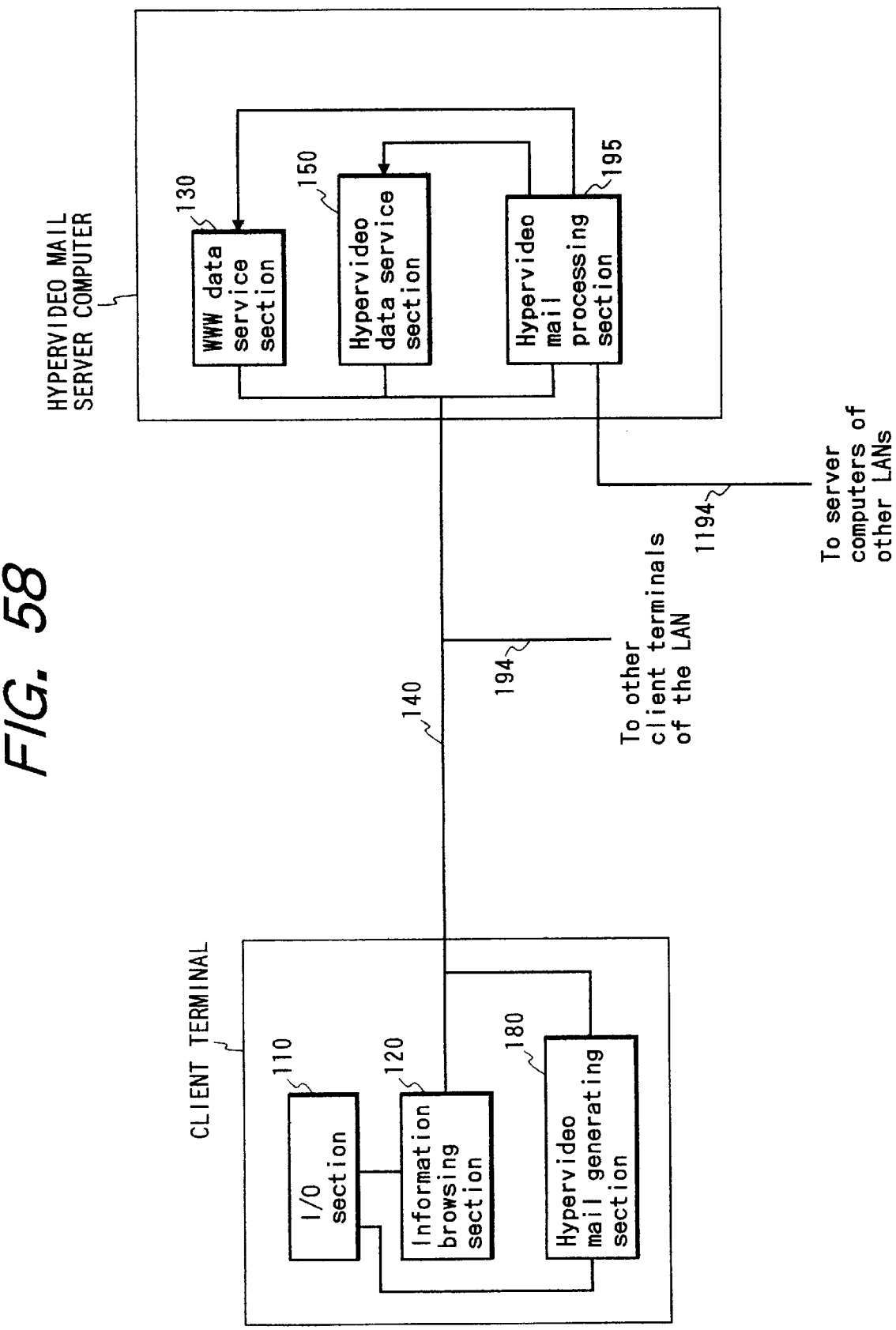
FIG. 58 is a partial system block diagram of the sixteenth embodiment, showing the basic internal configurations of a mail server computer and a client terminal of a LAN.

FIG. 57 is a general system block diagram of a sixteenth embodiment of the invention. The configuration is basically similar to that of FIG. 43 described above, but differs in that the respective hypervideo mail server computers HA, HB of the two LANs $N_A$, $N_B$ communicate via a data communication path 1194 which does not permit data transfer at a sufficiently high rate to enable real-time transfer/display of video data as described hereinabove, and which extends, at least partially, through a wide area network 1195 which will be assumed to be the Internet. FIG. 58 is a simple system block diagram showing the respective configurations of each client terminal and the corresponding hypervideo mail server computer of a LAN of this embodiment. In addition to a I/O section 110 and information browsing section 120, the client terminal is provided with a hypervideo mail generating section 180, as for the preceding two embodiments. The hypervideo mail server computer includes a WWW data service section 130, a hypervideo data service section 150, and a hypervideo mail processing section 195. In the same way as for the preceding embodiments, the data communication path 140 between the client terminal and server computer has a sufficiently wide bandwidth to permit real-time transfer of video data (e.g. using the NFS communication protocol). Hypervideo mail items are sent via the data communication path 140 to the hypervideo mail server computer, to be processed in the hypervideo mail processing section 195 as described in the following. As shown, the hypervideo mail processing section 195 is connected to communicate with the other client terminals of its LAN, via the data communication path 140, and also to communicate with hypervideo mail server computers of other LANs, via the data communication path 1194.

The format of each hypervideo mail item can for example be as shown in FIG. 33 and described above. However when the destined user must be accessed via the Internet, it may be necessary for the hypervideo mail item to also include Internet address information relating to that user.

Figure 59:
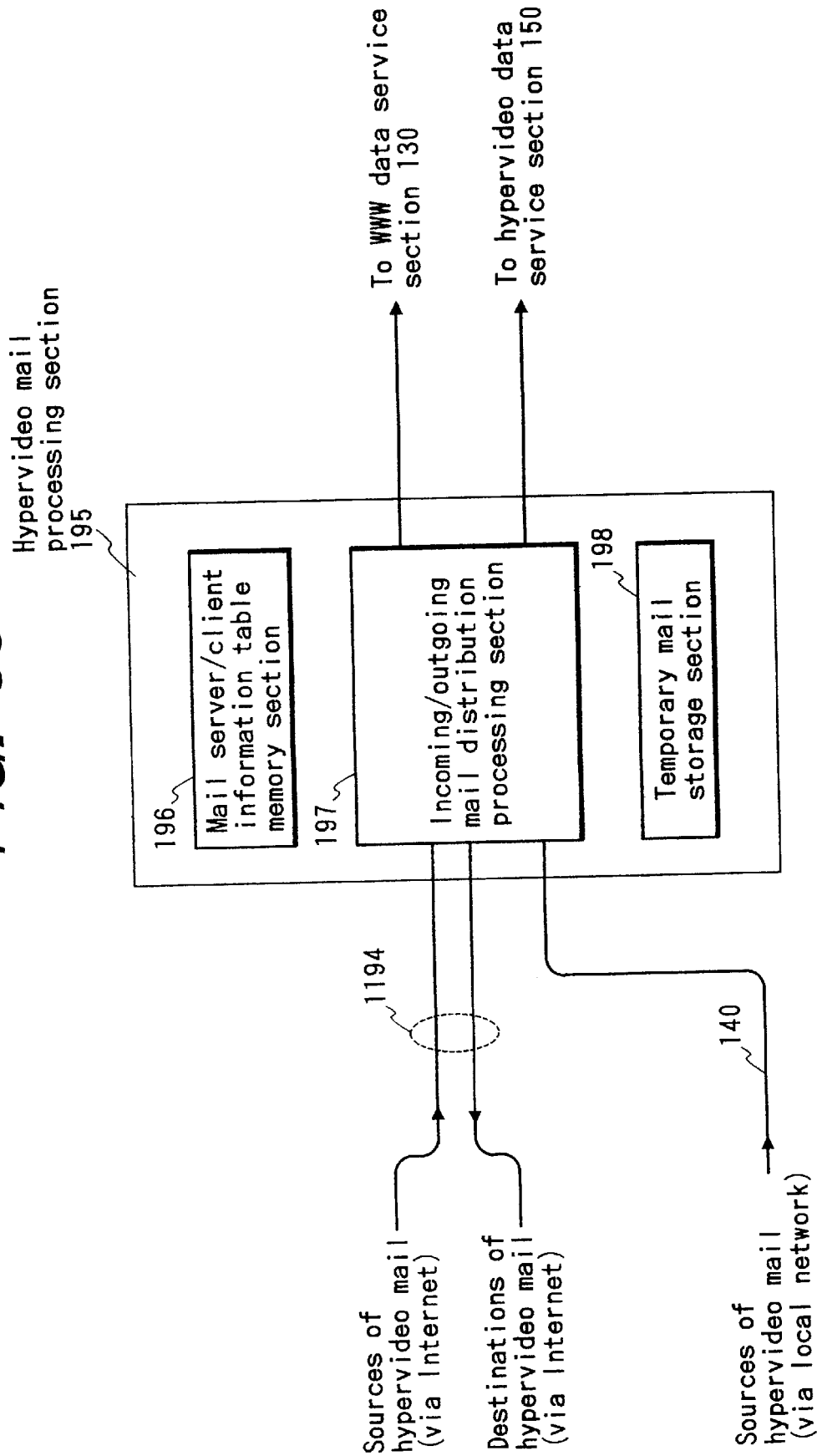
FIG. 59 is a block diagram showing the internal configuration of a hypervideo mail processing section of the mail server computer of FIG. 58.

FIG. 59 shows the internal configuration of the hypervideo mail processing section 195. As shown, the hypervideo mail processing section 195 consists of a mail server/client information table memory section 196, a incoming/outgoing mail distribution processing section 197 and a temporary mail storage section 198.

The incoming/outgoing mail distribution processing section 197 executes communication via the data communication path 140 and data communication path 1194, and generates output data for updating the contents of the WWW data service section 130 and the hypervideo data service section 150 of that mail server computer, in a similar manner to that described for the fourteenth embodiment above. The mail server/client information table memory section 196 performs a basically similar function to the mail destination information table section 193 of the fifteenth embodiment described above, i.e. storing a mail destination information table essentially similar to the table 612 in FIG. 41, but provides information (for each destination user) which specifies a path passing via the Internet to the hypervideo mail server computer of the LAN of that user.

Figure 60:
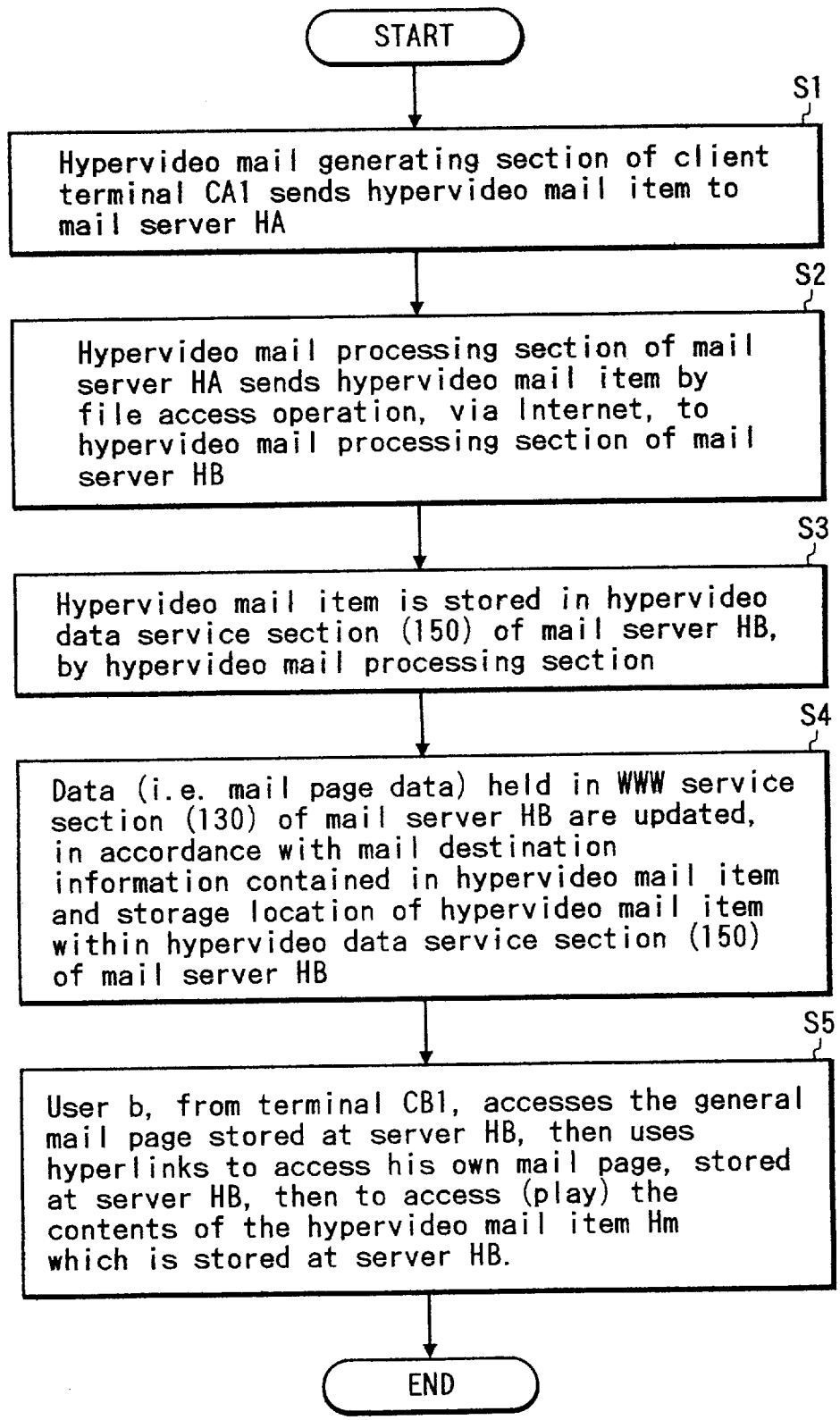
FIG. 60 is a flow diagram showing the basic operation sequence which is executed for transferring a hypervideo mail item between two client terminals, with the sixteenth embodiment.

The basic operating sequence of this embodiment, from the point of generating a hypervideo mail item to the point at which the item becomes available to the destined user, is shown in the flow diagram of FIG. 60, which again assumes as an example that a hypervideo mail item Hm is sent from the client terminal CA1 of the LAN $N_A$, addressed to the client terminal CB1 of LAN $N_B$, in FIG. 57. This sequence occurs as follows:

Step S1: The hypervideo mail generating section 180 of client terminal CA1 sends the data of hypervideo mail item Hm via the data communication path 140, e.g. by using the NFS protocol, to be received by the hypervideo mail processing section 195 of the mail server HA Step S2: The hypervideo mail processing section 195 of mail server HA temporarily stores the hypervideo mail data in the temporary mail storage section 198, and examins the data to obtain the name information of the destined user (which in this case will also specify an Internet address), then obtains, from the mail server/client information table memory section 196, path information which is necessary for sending data via the Internet to the hypervideo mail server computer of the LAN of the destined user. The mail server computer HA then sends the data of that mail item, by file access operation to hypervideo mail processing section 195 of mail server HB Step S3: The hypervideo mail processing section 195 of mail server HB temporarily stores the data of mail item Hm in the temporary mail storage section 198, and examins the data to obtain the name of the destined user, then stores the mail data contents (i.e. scenario data and subject matter data) in hypervideo data service section (150) of mail server HB.

Step S4: The hypervideo mail processing section 195 of mail server $H_B$ updates the WWW data (specifically, the mail page data for user "b") held in WWW service section (130), in accordance with the mail destination information contained in mail item Hm and the storage location of the mail contents within hypervideo data service section (150) of mail server HB.

Step S5: User "b", from terminal CB1, accesses the general mail page stored at server HB, then uses hyperlinks to access his own mail page and then to select the mail item Hm to be played. The contents of the hypervideo mail item Hm (i.e. the scenario data and subject matter data for that mail item) then begin to be transferred via the data communication path 140 to the client terminal CB1, e.g. using the NFS communication protocol, with real-time transfer and playing of the contents of mail item Hm being thereby implemented as described hereinabove for the first embodiment.

Figure 61:
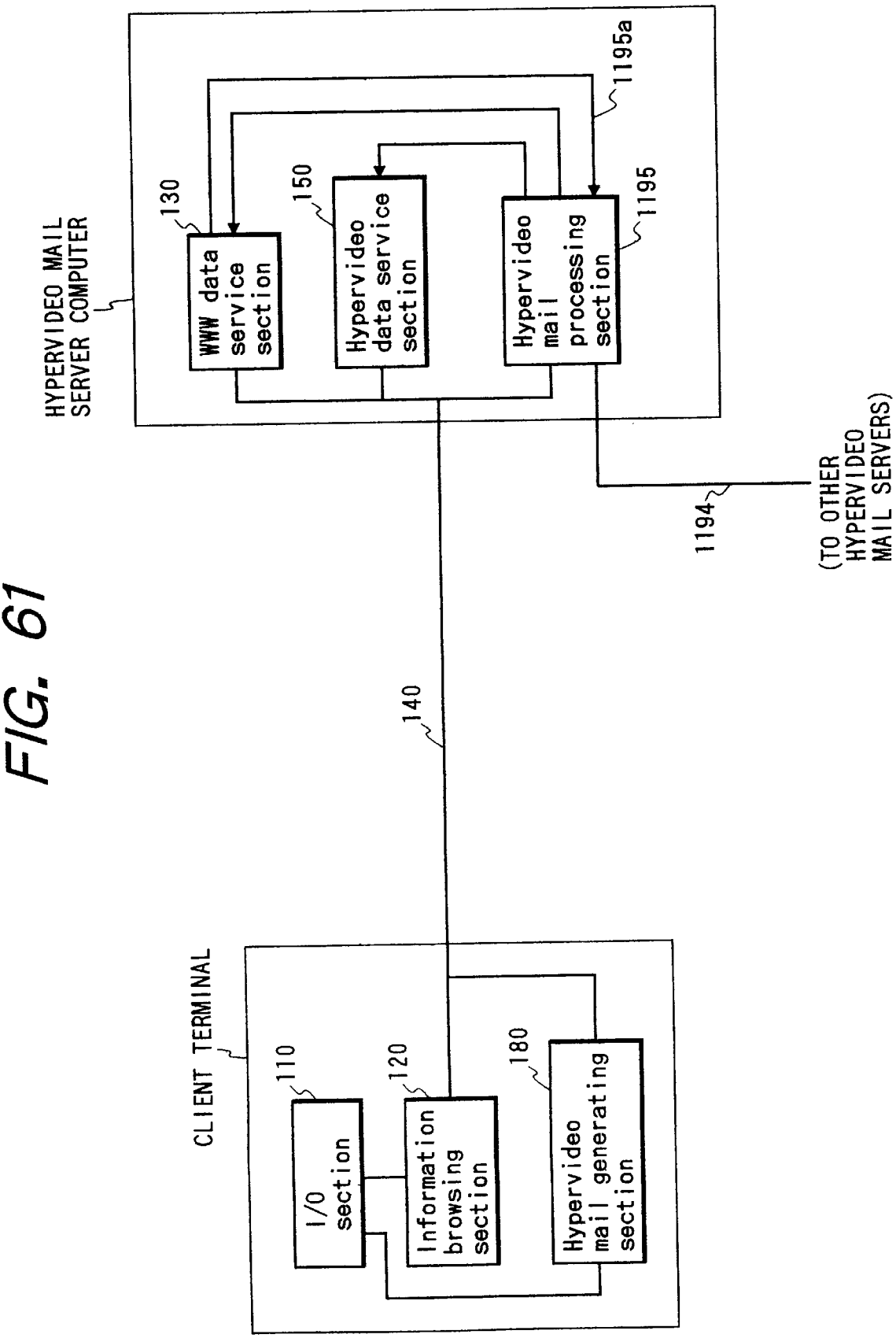
FIG. 61 is a partial system block diagram of a seventeenth embodiment which is a modification of the sixteenth embodiment, showing the basic internal configurations of a mail server computer and a client terminal of a LAN.
Figure 62:
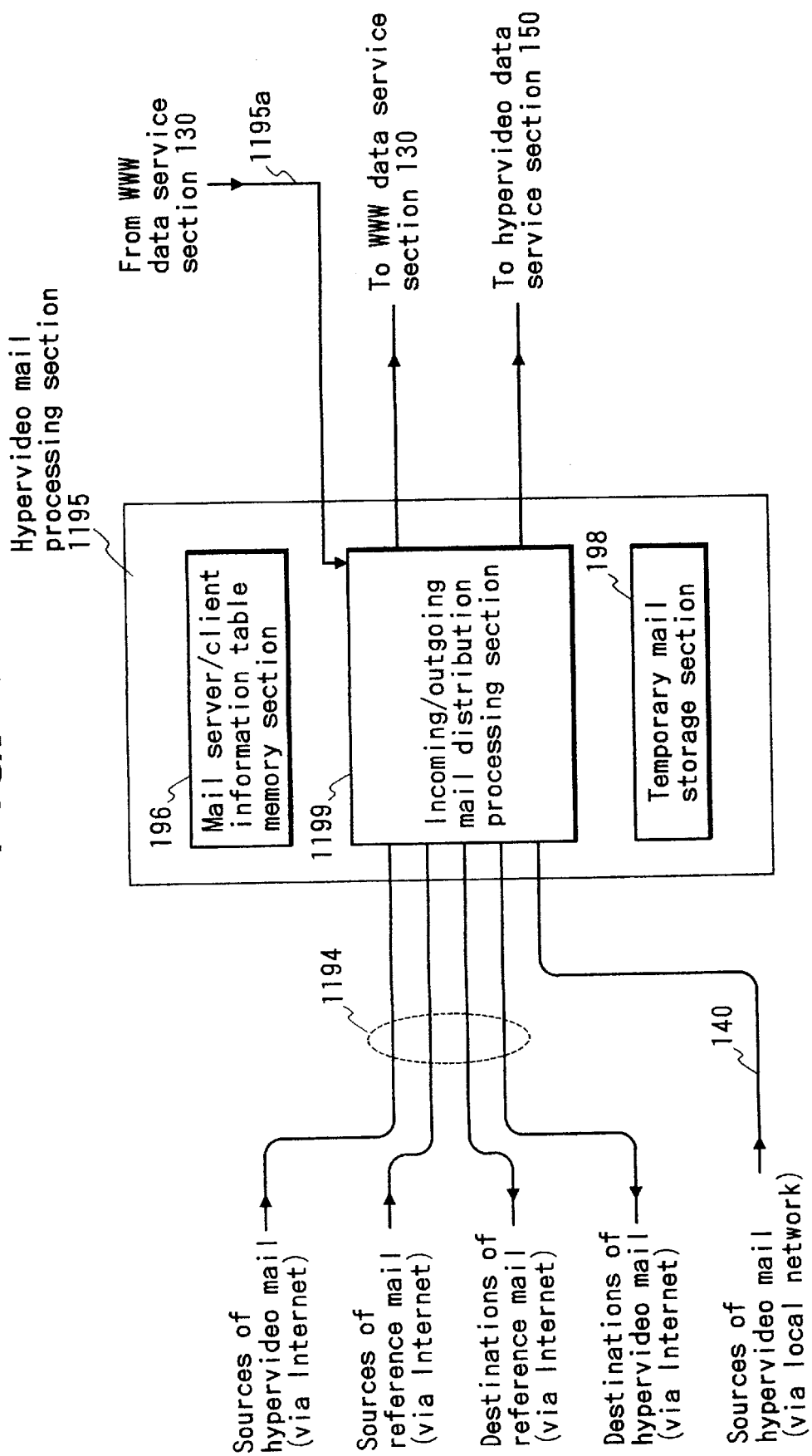
FIG. 62 is a block diagram showing the internal configuration of a hypervideo mail processing section of the mail server computer of FIG. 61.

A seventeenth embodiment will be described, having a general configuration which is similar to that of the preceding embodiment, shown in FIG. 57. This embodiment differs from the preceding embodiment in that reference mail is transmitted from the hypervideo mail server of the originating LAN to the hypervideo mail server of the destination LAN, with the reference mail having a similar function to that of the fifteenth embodiment described above. The respective internal configurations of each client terminal and the corresponding mail server of a LAN in this embodiment, as shown in FIG. 61, are similar to those of the preceding embodiment however the configuration and operation of the hypervideo mail processing section of this embodiment differs from that of the preceding embodiment. That processing section is shown in FIG. 62, designated by numeral 1195. As shown, the hypervideo mail processing section 1195 is formed of a mail server/client information table memory section 196 and temporary mail storage section 198, which function as described for the preceding embodiment, together with an incoming/outgoing mail distribution processing section 1199 which is configured to send and receive hypervideo mail and reference mail items via the Internet, and also to receive hypervideo mail items from client terminals of the local LAN, sent via the data communication path 140. The received hypervideo mail are processed in the same way as described for the preceding embodiments, i.e. if the mail item has as its destination a client terminal within the LAN of that mail server computer, the the data contents (scenario data and subject matter data) of a received hypervideo mail item are stored in the hypervideo data service section 150, with the data (i.e. of a user mail page) held in the WWW data service section 130 then being updated accordingly. In addition, with this embodiment, it is necessary for the hypervideo mail processing section 1195 to have a capability for accessing (via the Internet) hypervideo mail items which are stored at other mail servers. Specifically, when a user of a client terminal in the local LAN selects a mail item which is addressed to that user and is being held at the mail server of some other LAN, then the WWW data service section 130 of the local LAN sends a request (via line 1195a in FIG. 61) to the incoming/outgoing mail distribution processing section 1199, whereupon the incoming/outgoing mail distribution processing section 1199 executes a file access operation via the Internet, to obtain the hypervideo mail data from the other mail server.

Figure 63:
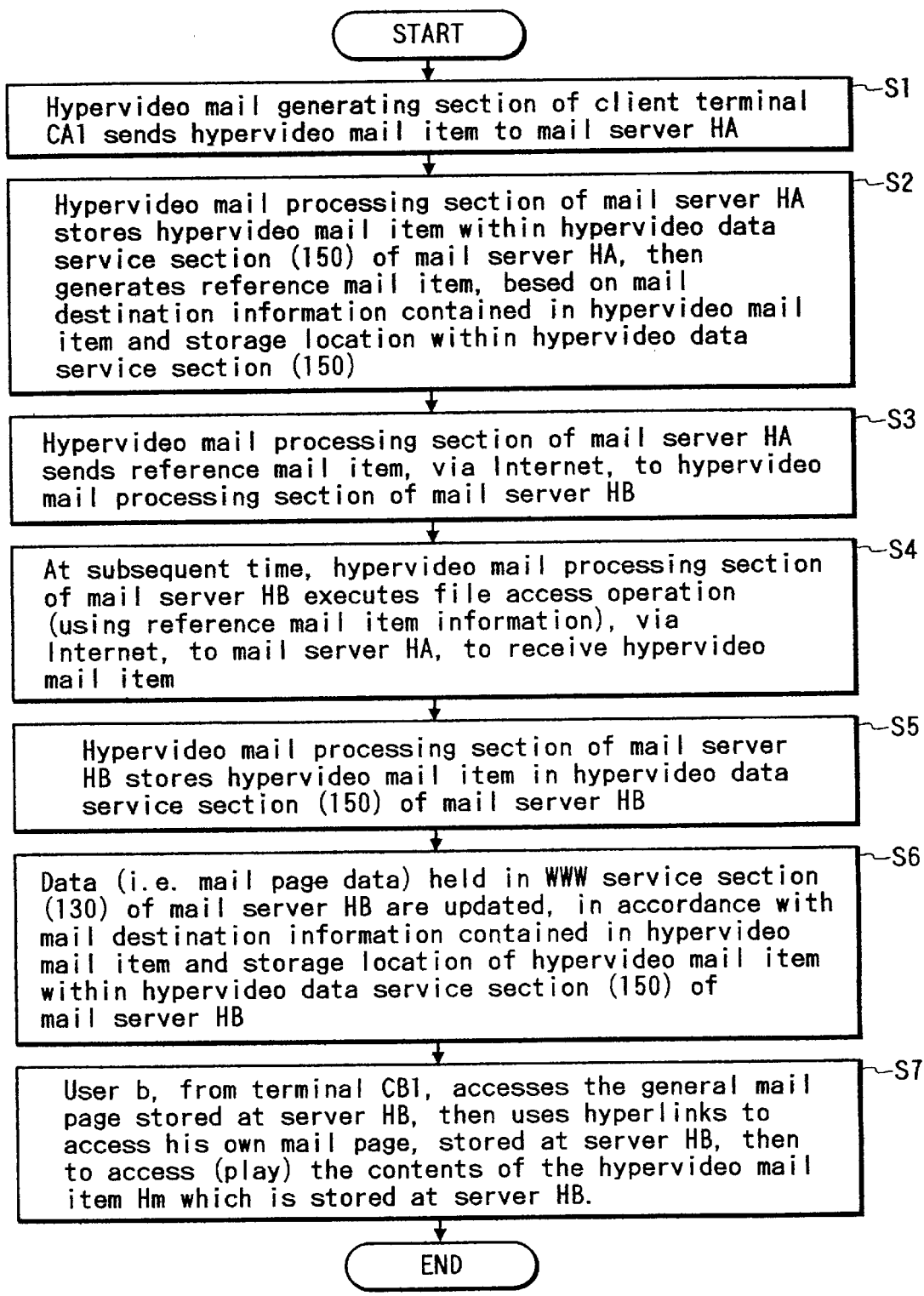
FIG. 63 is a flow diagram showing the basic operation sequence which is executed for transferring a hypervideo mail item between two client terminals, with the seventeenth embodiment.

The operating sequence that is executed with this embodiment, for the case of sending a hypervideo mail item Hm from a client terminal CA1 of the LAN $N_A$ to a user of the client terminal CB1 of the LAN $N_B$, via the Internet, is shown in FIG. 63. The sequence is as follows:

Step S1: The hypervideo mail generating section 180 of client terminal CA1 sends the data of hypervideo mail item Hm via the data communication path 140, e.g. by using the NFS protocol, to be received by the hypervideo mail processing section 1195 of the mail server HA Step S2: The hypervideo mail processing section 1195 of mail server HA temporarily stores the hypervideo mail data in the temporary mail storage section 198, and examines the data to obtain the name information of the destined user (which in this case will also specify an Internet address), then obtains, from the mail server/client information table memory section 196, path information which is necessary for sending data via the Internet to the hypervideo mail server computer of the LAN of the destined user, and stores the hypervideo mail data in the hypervideo data storage section 151 of the hypervideo data service section 150. Section 1195 then generates a reference mail item, based on the mail destination information contained in the hypervideo mail item and storage location of that mail item in the hypervideo data storage section 151. The data configuration of a reference mail item can be basically similar to that described for the fifteenth embodiment, but must also include Internet address information for the destined user.

Step S3: The hypervideo mail processing section 1195 of mail server HA sends the reference mail item, via the Internet, to the hypervideo mail processing section 1195 of mail server HB, which then updates the WWW data (specifically, mail page data for user "b") in the WWW data service section 130, in accordance with the contents of the reference mail item, to incorporate information which specifies the mail server (HA) that is is holding the mail item, and specifies storage location information (i.e. directory path information) for the mail item within that mail server.

Step S4: At a subsequent time, the user "b" of client terminal CB1 designates (using hyperlink selection, processed by the WWW data service section 130 of mail server HB) that the mail item Hm is to be made available for playing at client terminal CB1. When that occurs, the WWW data service section 130 of server HB notifies the incoming/outgoing mail distribution processing section 1199 as described above, and a file access operation is executed via the Internet to the mail server HA, by the incoming/outgoing mail distribution processing section 1199 of server HB, to receive the data of mail item Hm. The received hypervideo mail data are then processed as for the preceding embodiment, i.e. with the mail contents being stored in the hypervideo data service section 150 of mail server HB and the WWW data service section 130 being updated accordingly.

Step S5: User "b", from terminal CB1, accesses the general mail page stored at server HB, then uses hyperlinks to access his own mail page and then to select the mail item Hm to be played. The contents of the hypervideo mail item Hm (i.e. the scenario data and subject matter data) then begin to be transferred via the data communication path 140 to the client terminal CB1, e.g. using the NFS communication protocol, with real-time transfer and playing of the contents of mail item Hm being thereby executed as described for the first embodiment.

In the above description, it has been assumed that it is necessary for a user to designate that a hypervideo mail item, held at a remote hypervideo mail server, is to be transferred via the Internet to the local hypervideo mail server of that user, to be then available to be played by the user. However it would be equally possible to arrange that such a hypervideo mail item is automatically transferred by that local hypervideo mail server itself at an appropriate time, for example during during night hours, when the service charges for using the Internet may be reduced by comparison with daytime use.

It can thus be understood that with this embodiment, when a hypervideo mail item is generated and sent by a user within a first LAN with the destination being a user of a client terminal which is within a second LAN, it is not necessary for the contents of that mail item to be immediately transferred via the Internet between the two LANs. Instead, corresponding reference mail information is sent by the hypervideo mail server computer of the first LAN to that of the second LAN, to update the WWW data of the mail server computer of the second LAN such as to indicate that the mail item is waiting at the mail server of the first LAN. Thereafter, the actual contents of the mail item can be transferred to the second LAN at a suitable time, and can then be played by the user to whom that hypervideo mail item has been addressed.

Figure 64:
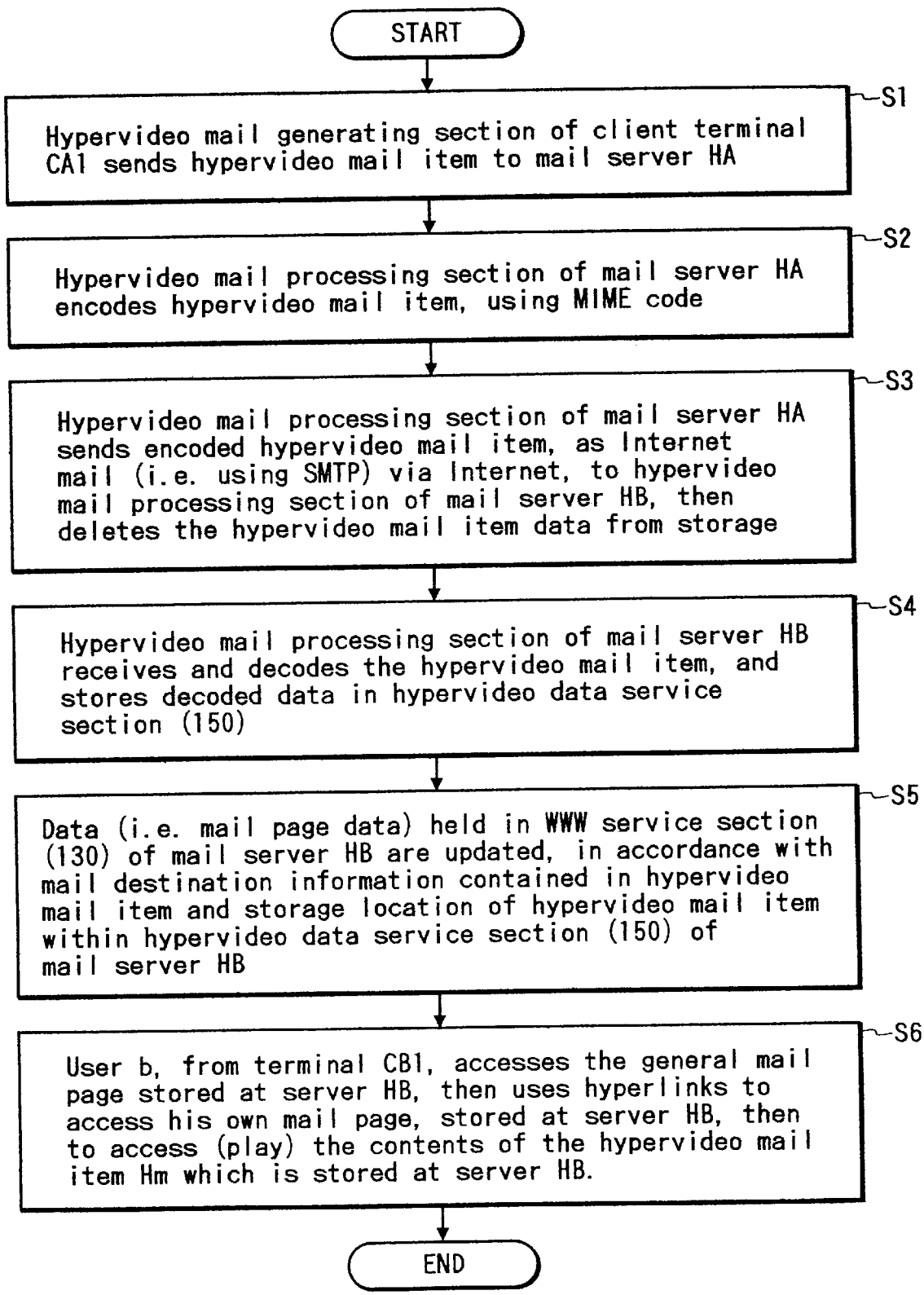
FIG. 64 is a flow diagram showing the basic operation sequence which is executed for transferring a hypervideo mail item between two client terminals, with an eighteenth embodiment, which has the same physical configuration as the seventeenth embodiment.

An eighteenth embodiment of the invention will be described in the following. The configuration of this embodiment can be similar to those of the sixteenth embodiment, described hereinabove referring to FIG. 57, FIG. 58 and FIG. 59. The operating sequence will be described referring to the flow diagram of FIG. 64, again for the example of sending a hypervideo mail item Hm from a client terminal CA1 of the LAN $N_A$ to a user named as "b" of the client terminal CB1 of the LAN $N_B$, via the data communication path 1194, at least part of which will be assumed to extend through the Internet.

Step S1: The hypervideo mail generating section 180 of client terminal CA1 sends the data of hypervideo mail item Hm via the data communication path 140, e.g. by using the NFS protocol, to be received by the hypervideo mail processing section 195 of the mail server HA Step S2: The hypervideo mail processing section 195 of mail server HA temporarily stores the hypervideo mail data in the temporary mail storage section 198, and examines the data to obtain the name information of the destined user (which in this case will also specify an Internet address), then obtains, from the mail server/client information table memory section 196, path information which is necessary for sending data via the Internet to the hypervideo mail server computer of the LAN of the destined user.

Step S3: The hypervideo mail processing section of mail server HA then encodes the hypervideo mail item Hm, using MIME (Multipurpose Internet Mail Extensions) code, and sends the encoded data via the Internet, as Internet mail, to the hypervideo mail processing section of mail server HB, then deletes the data of item Hm from storage. The SMTP (Simple Mail Transfer Protocol) can for used for this data transfer operation.

Step S4: The hypervideo mail processing section of mail server HB receives and decodes the hypervideo mail item Hm, temporarily stores the decoded data in the temporary mail storage section 198, and examines the data to obtain the name of the destined user, then stores the mail data contents (i.e. scenario data and subject matter data) in the hypervideo data service section 150 of mail server HB.

Step S5: The WWW data (specifically, the mail page data relating to user "b") held in WWW service section 130 of mail server HB are updated in accordance with the mail destination information contained in mail item Hm and the storage location of the mail contents within the hypervideo data service section 150 of mail server HB.

Step S6: User "b", from terminal CB1, accesses the general mail page stored at server HB, then uses hyperlinks to access his own mail page and then to select the mail item Hm to be played. The contents of the hypervideo mail item Hm (i.e. the scenario data and subject matter data for that mail item) then begin to be transferred via the data communication path 140 to the client terminal CB1, e.g. using the NFS communication protocol, with real-time transfer and playing of the video data contents of mail item Hm being thereby executed as described for the first embodiment.

Figure 65:
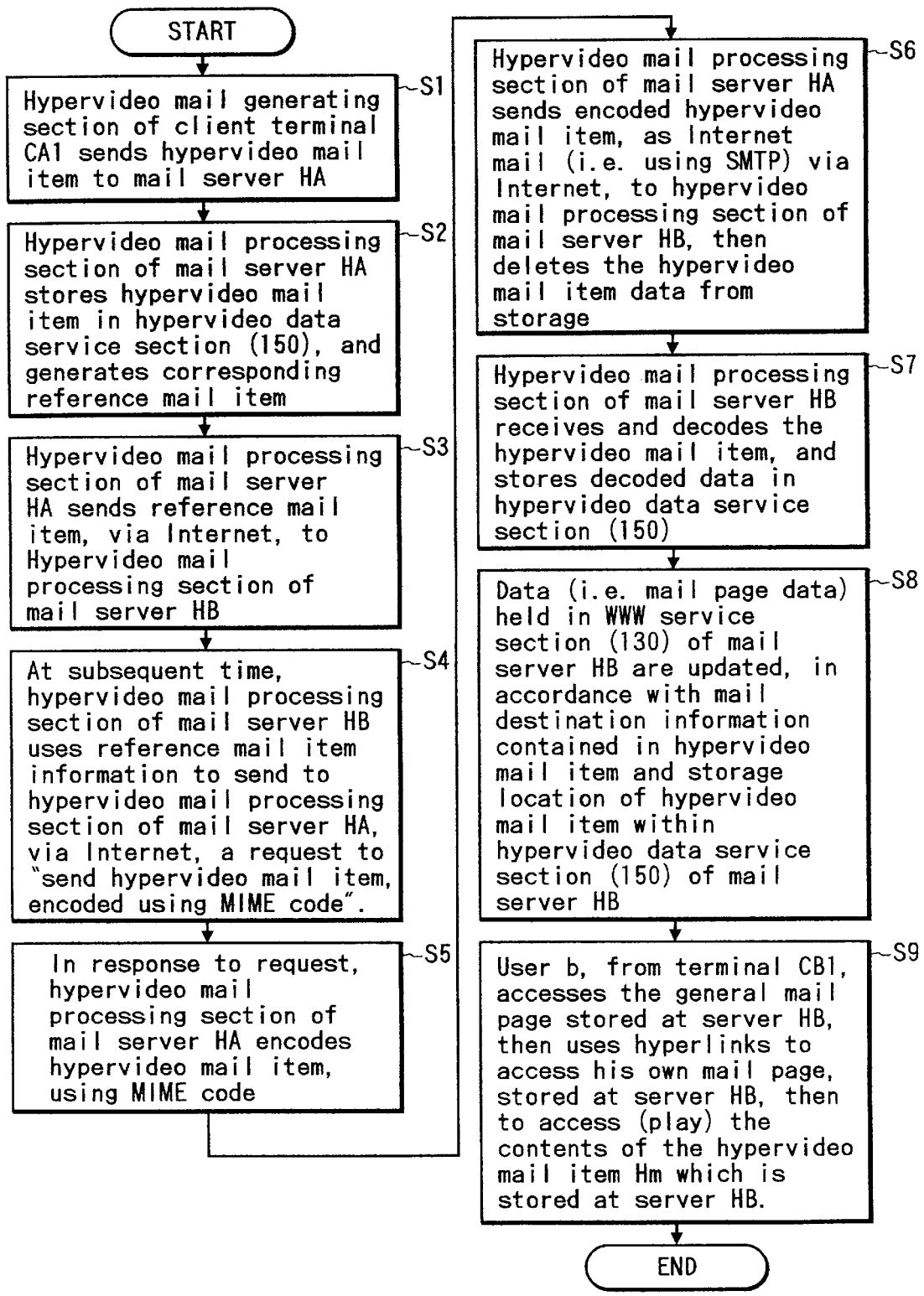
FIG. 65 is a flow diagram showing the basic operation sequence which is executed for transferring a hypervideo mail item between two client terminals, with a nineteenth embodiment, which has the same physical configuration as the seventeenth embodiment.

A nineteenth embodiment of the invention will be described in the following. The configuration of this embodiment can be similar to those of the seventeenth embodiment, described hereinabove referring to FIG. 57, FIG. 61 and FIG. 62. The operating sequence will be described referring to the flow diagram of FIG. 65, again for the example of sending a hypervideo mail item Hm from a client terminal CA1 of the LAN $N_A$ to a user named as "b" of the client terminal CB1 of the LAN $N_B$, via the data communication path 1194, at least part of which will be assumed to extend through the Internet.

Step S1: The hypervideo mail generating section 180 of client terminal CA1 sends the data of hypervideo mail item Hm via the data communication path 140, e.g. by using the NFS protocol, to be received by the hypervideo mail processing section 195 of the mail server HA Step S2: The hypervideo mail processing section of mail server HA temporarily stores the hypervideo mail data in the temporary mail storage section 198, and examines the data to obtain the name information (Internet address) of the destined user, then obtains, from the mail server/client information table memory section 196, path information which is necessary for sending data via the Internet to the hypervideo mail server computer of the LAN of the destined user. The data of the mail item Hm are then stored in the hypervideo data storage section 151 of mail server HA. The hypervideo mail processing section of mail server HA then generates a reference mail item, based on the mail destination information contained in mail item Hm and the storage location of that mail item in the hypervideo data storage section 151. The data configuration of a reference mail item can be as described for the seventeenth embodiment.

Step S3: The hypervideo mail processing section of mail server HA sends the reference mail item, via the Internet, to the hypervideo mail processing section 1195 of mail server HB, which then updates the WWW data (specifically, mail page data for user "b") in the WWW data service section 130, in accordance with the contents of the reference mail item, i.e. to specify that the mail server (HA) is is holding the mail item Hm, and to specify the storage location of the mail item within the mail server HA.

Step S4: At a subsequent time, the user "b" of client terminal CB1 designates (using hyperlink selection, processed by the WWW data service section 130 of mail server HB) that the mail item Hm is to be made available for playing at client terminal CB1. When that occurs, the WWW data service section 130 of the mail server HB sends a notifying signal to the hypervideo mail processing section of that mail server, as described above for the seventeenth embodiment, which responds by sending to the hypervideo mail processing section of the mail server computer HA, via the Internet, a request to send the mail item Hm (using SMTP) encoded using MIME code.

Step S5: The hypervideo mail processing section of mail server HA reads out the hypervideo mail item Hm from the hypervideo data service section 150, and encodes the data of the mail item, using MIME code.

Step S6: The hypervideo mail processing section of mail server HA sends the encoded data of mail item Hm via the Internet, as Internet mail, to the hypervideo mail processing section of mail server HB, then deletes the data of item Hm from storage. The Simple Mail Transfer Protocol (SMTP) can for used for this data transfer operation.

Step S7: The hypervideo mail processing section of mail server HB receives and decodes the hypervideo mail item Hm, temporarily stores the decoded data in the temporary mail storage section 198, and examines the data to obtain the name of the destined user, then stores the mail data contents (i.e. scenario data and subject matter data) in the hypervideo data service section 150 of mail server HB.

Step S8: The WWW data (specifically, the mail page data for user "b") held in WWW service section 130 of mail server HB are updated in accordance with the mail destination information contained in mail item Hm and the storage location of the mail contents within the hypervideo data service section 150 of mail server HB.

Step S9: User "b", from terminal CB1, accesses the general mail page stored at server HB, then uses hyperlinks to access his own mail page and then to select the mail item Hm to be played. The contents of the hypervideo mail item Hm (i.e. the scenario data and subject matter data for that mail item) then begin to be transferred via the data communication path 140 to the client terminal CB1, e.g. using the NFS communication protocol, with real-time transfer and playing of the video data contents of mail item Hm being thereby executed as described for the first embodiment.

It can thus be understood that with this embodiment, hypervideo mail can be transferred as encoded data between two LANs, via the Internet, in the same manner as conventional electronic mail, by using the SMTP, while in addition the transfer can be executed at any suitable time, after a hypervideo mail item has been generated at a client terminal of a LAN and stored in the hypervideo mail server computer of that LAN.

With the twelfth embodiment of the invention described hereinabove referring to FIGS. 27 to 31, a user of a client terminal of a client/server network can generate a hypervideo message which is transferred to the server computer of that network, and is posted on a specific "notice board" hypertext page (generally referred to herein simply as a "notice board) that is stored in the WWW data service section 130 of the server computer, while the message contents are stored in the hypervideo data service section 150 of the server computer), with the message thereby being made available to users of all of the client terminals of the network through the usual hypertext browsing procedure. Embodiments of the invention will be described in the following that are applicable to a plurality of LANs which are interconnected to form a wide-area network as described for the sixteenth embodiment of the invention described hereinabove referring to FIGS. 57 to 62 (i.e. such as "net sites" which are interconnected by the Internet), whereby a message that is posted on a notice board of one LAN can be distributed to specific other LANs of the wide-area network. It will be assumed that the client terminals of each LAN can directly exchange data only with the server computer of that LAN. Although it will in general be assumed in the following that the server computers of the LANs communicate via the Internet, it will be understood that the basic principles described are not limited to use with the Internet.

Figure 73:
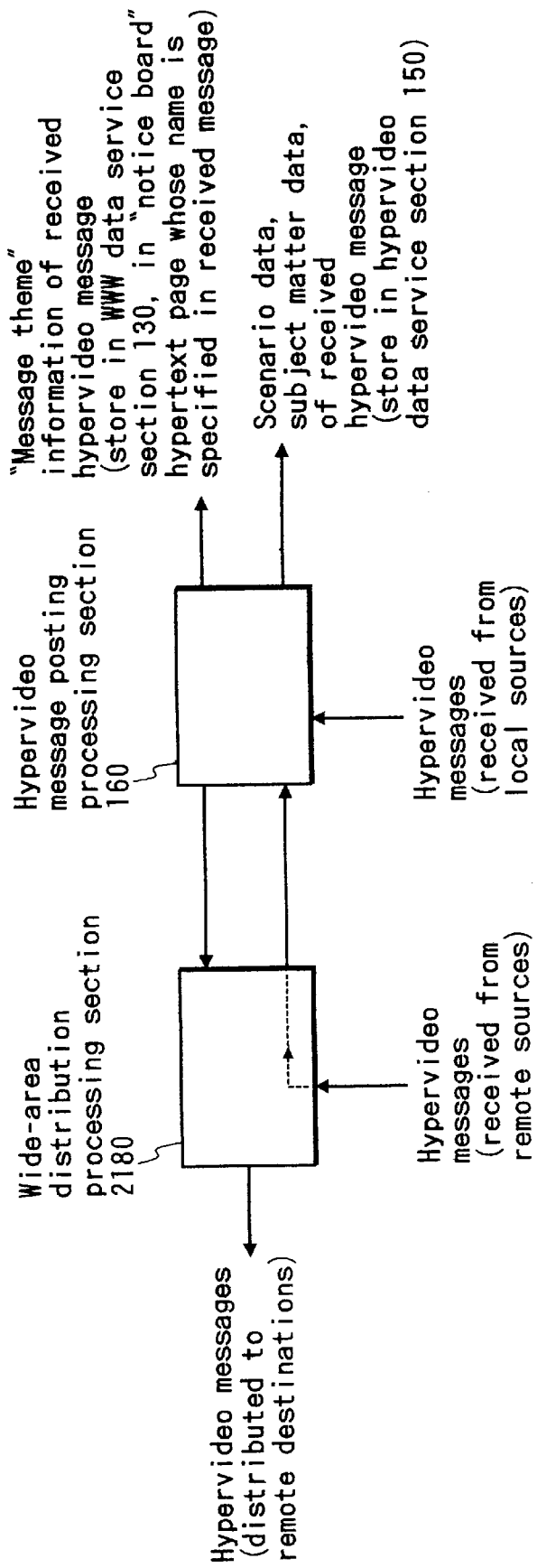
FIG. 73 is a simple block diagram for illustrating the basic principles of a twentieth embodiment of the invention, which is a data processing apparatus enabling hypervideo messages to be received from local sources, such as client terminals of a local area network, and posted on a specific notice board page, while in addition being distributed to specific remote destinations (i.e. specific other sites of a wide-area network) to be posted.

Firstly the basic principles of a twentieth embodiment will be described referring to the simple block diagram of FIG. 73. With this embodiment, when a message is received from a local source (i.e. from a local client terminal), the message is posted as described hereinabove. However in addition, that posting operation is detected by a wide-area distribution processing section 2180. If the message has been posted to a specific notice board, whose posted messages are to be distributed to each of a predetermined set of remote destinations (i.e. other sites, of a wide-area network), then the message is transmitted to each of these destinations by the wide-area distribution processing section 2180.

Figure 74:
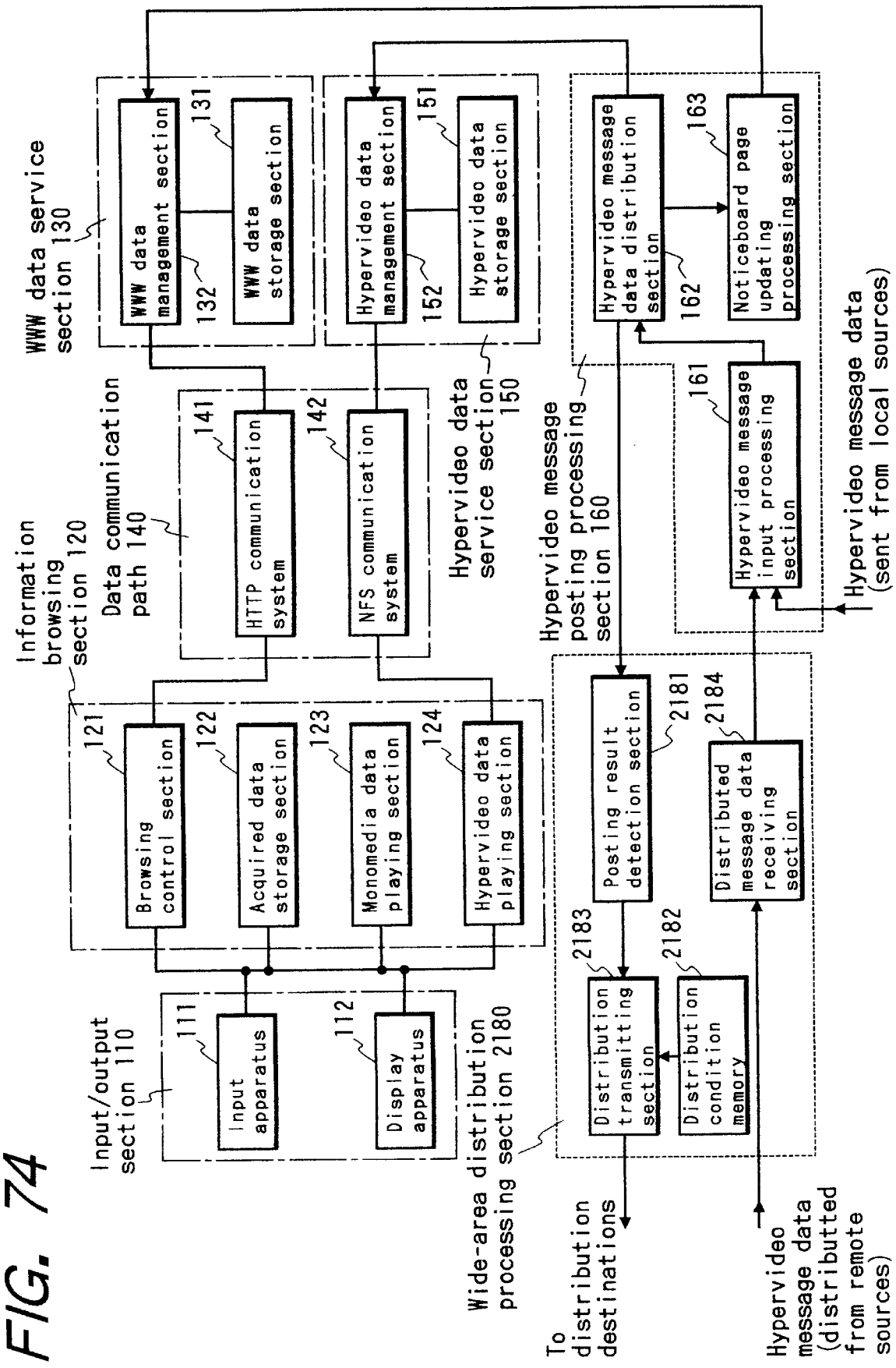
FIG. 74 is a system block diagram showing details of the embodiment of FIG. 73.

FIG. 74 is a general system block which shows this embodiment in greater detail. In FIG. 74 the I/O section 110, information browsing section 120, data communication path 140, WWW data service section 130 and hypervideo data service section 150 respectively correspond to the identically numbered sections of the first embodiment, described hereinabove referring to FIG. 2. In addition, the hypervideo message posting processing section 160 corresponds to that of the twelfth embodiment, shown in FIG. 27A and described hereinabove, which has the function of posting a received hypervideo message by storing the message contents (scenario data and subject matter data) in the hypervideo data service section 150 and registering in the WWW data service section 130 the "message theme" information of the message in the notice board which is specified by the "notice board name" information of the message, linked to the respective storage locations of the message contents in the hypervideo data service section 150. This embodiment further includes the wide-area distribution processing section 2180, which has three basic functions, i.e.:

(a) to detect each occurrence of a hypervideo message posting operation that is executed by the hypervideo message posting processing section 160, (b) to determine whether that message is to be distributed to remote destinations, i.e. to one or more sites of a wide-area network (server computers of other LANs), (c) if so, to transmit the message to these other server computers, and (d) to receive data of messages that have been transmitted from remote sources, i.e. from other server computers, to arrange the data into the structure of a standard hypervideo message (e.g. such as that shown in FIG. 28 and described hereinabove), and to input the message to the hypervideo message posting processing section 160, to be thereby posted on the notice board (i.e. hypertext "notice board" page) which is specified in the message, as described hereinabove.

To provide the above functions, the wide-area distribution processing section 2180 is made up of a distribution transmitting section 2183 which performs functions (b) and (c) above, a distribution condition memory 2182 which can be accessed by the distribution transmitting section 2183, a posting result detection section 2181 which supplies data to the distribution transmitting section 2183, to perform function (a) above, and a distributed message receiving section 2184 which receives hypervideo message data supplied from remote sources (i.e. other server computers) to perform function (d) above. The distributed message receiving section 2184 includes a memory section for temporarily storing the data of a distributed hypervideo message as they are received, before transferring the entire data of the message (arranged in the standard hypvervideo message format) to the hypervideo message posting processing section 160.

As shown, the hypervideo message input processing section 161 of the hypervideo message posting processing section 160 receives hypervideo message data (in standardized format) supplied from either the distributed message receiving section 2184 or from local sources (i.e. from client terminals of the local network).

Specifically, the distribution condition memory 2182 stores the names of each of the notice boards for which messages are to be distributed to other server computers, and the names of these other server computers. The posting result detection section 2181 monitors the operation of the hypervideo message data distribution section 162, to detect each message posting operation and the name of the notice board on which the message has been posted, and supplies the notice board name information to the distribution transmitting section 2183, which thereby uses the information stored in the distribution condition memory 2182 to determine whether that message is to be distributed to other server computers. If the message is to be distributed, the distribution transmitting section 2183 then obtains via the posting result detection section 2181 the remaining contents of the hypervideo message data (i.e. message theme, the scenario data file, and the subject matter data files), and transmits these together with the notice board name information to each of the other server computers that have been specified by the contents of the distribution condition memory 2182.

Figure 75:
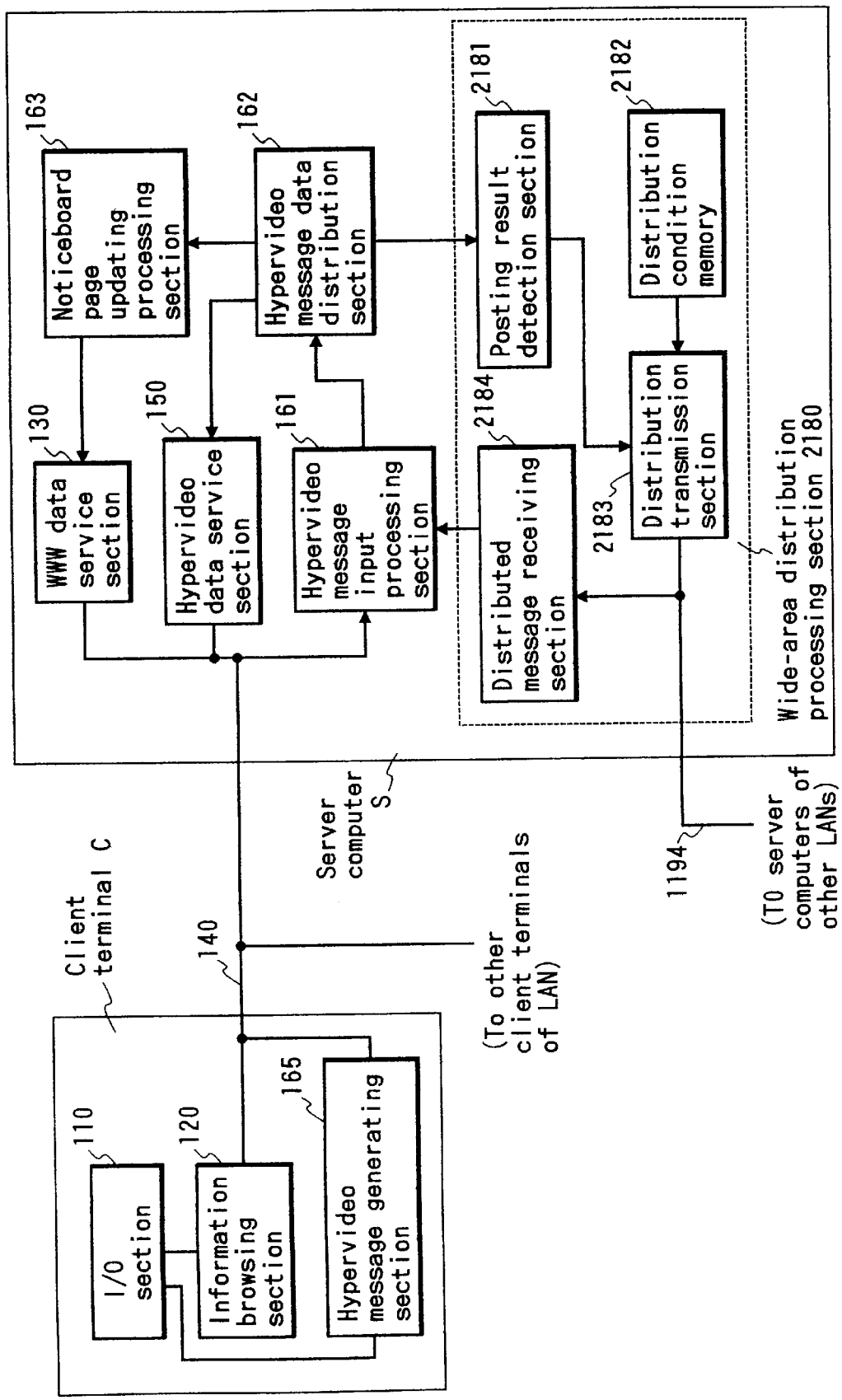
FIG. 75 is a system block diagram showing an example of a client terminal and a server computer configured in accordance with the twentieth embodiment, for use in a wide-area network.

It will be assumed that the sections shown in FIG. 74 are configured, in the server computer of a LAN and in each of the server computers of that LAN, as shown in the system block diagram of FIG. 75. Each client terminal C, formed of a I/O section 110, information browsing section 120 and hypervideo message generating section 165, is connected via the data communication path 140 to the server computer S of the LAN. The server computer S includes the WWW data service section 130 and hypervideo data service section 150, and also includes the hypervideo message input processing section 161, hypervideo message data distribution section 162 and notice board page updating processing section 163 which in combination constitute the hypervideo message posting processing section 160. These are interconnected in the same manner as described for the twelfth embodiment hereinabove. The server computer S further includes the wide-area distribution processing section 2180, which transmits/receives distributed hypervideo message data to/from other server computers via a data communication path 1194 of a wide-area network, which will be assumed in the following to be the Internet.

Irrespective of whether the data of a hypervideo message are sent via the data communication path 140 from a client terminal or via the data communication path 1194 from another server computer, the message is posted by the same procedure, executed by the hypervideo message posting processing section 160. Specifically, the "message theme" part of the message is registered in the specified notice board (stored in the WWW data service section 130), while the scenario data and subject matter data of the message are stored in the hypervideo data service section 150, connected by hyperlink to the "message theme" registered in the notice board page, in the same manner as described for the twelfth embodiment hereineabove.

The basic operations performed to distribute a message to one or more specific server computers will be described referring to the simple system block diagram of FIG. 76. This shows three LANs designated as A, B and C respectively, with only one of the client terminals (C1, C2, C3) of each LAN being shown. It will be assumed that a hypervideo message is generated by the client terminal C1 and sent to the hypervideo message posting processing section 160 of the server computer A, with the message specifying the notice board name "New Products Guide" and the message theme being "29-inch Wide-Screen TV". As a result, when that message is posted by the hypervideo message posting processing section 160 of server computer A, the posting result detection section 2181 of that server computer will detect the occurrence of the posting and will obtain the detection result data. The format of the detection result data may for example be as shown in FIG. 77, and specifies the above-mentioned notice board name and message theme information. It will further be assumed that any message which is posted on the "New Products Guide" notice board of any of the server computers A, B and C is to be distributed to each of the other server computers. In that case, the distribution condition memory 2182 of each of the server computers A, B, C can for example contain respective distribution condition tables as shown in FIGS. 78A, 78B, 78C respectively. Such a distribution condition table consists of a set of table entries each specifying a notice board name, in conjunction with a list of the names of the server computers which are to be distribution destinations for any message which is posted to that notice board.

Various methods could be envisaged for the posting result detection section 2181 of a server computer to detect posting of a message by the hypervideo message posting processing section 160 of that server computer, so that specific description will be omitted. For example, the hypervideo message data distribution section 162 could be configured such as to directly notify the posting result detection section 2181 each time that a posting operation occurs. Alternatively, the posting result detection section 2181 could monitor each log-in operation executed from a client terminal, whereby hypervideo message data are sent to the hypervideo message input processing section 161.

Figure 79:
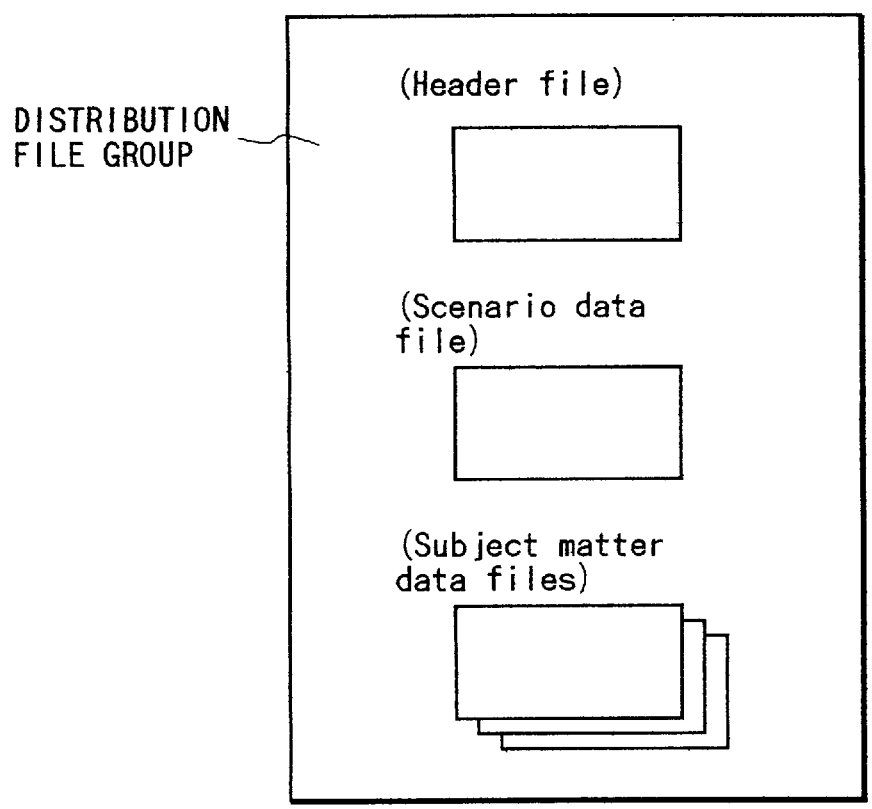
FIG. 79 illustrates the data format of a distribution file group containing the data of a hypervideo message as a set of files.

FIG. 79 shows a distribution file group, which is a set of files for a hypervideo message that is to be distributed, with this embodiment. That is to say, when distributing a message, the distribution transmitting section 2183 of the distribution server computer first transmits a header file, containing the aforementioned detection result data shown in FIG. 77, then scenario data file and subject matter data files which contain the actual contents of the message as described hereinabove for the twelfth embodiment.

Figure 80:
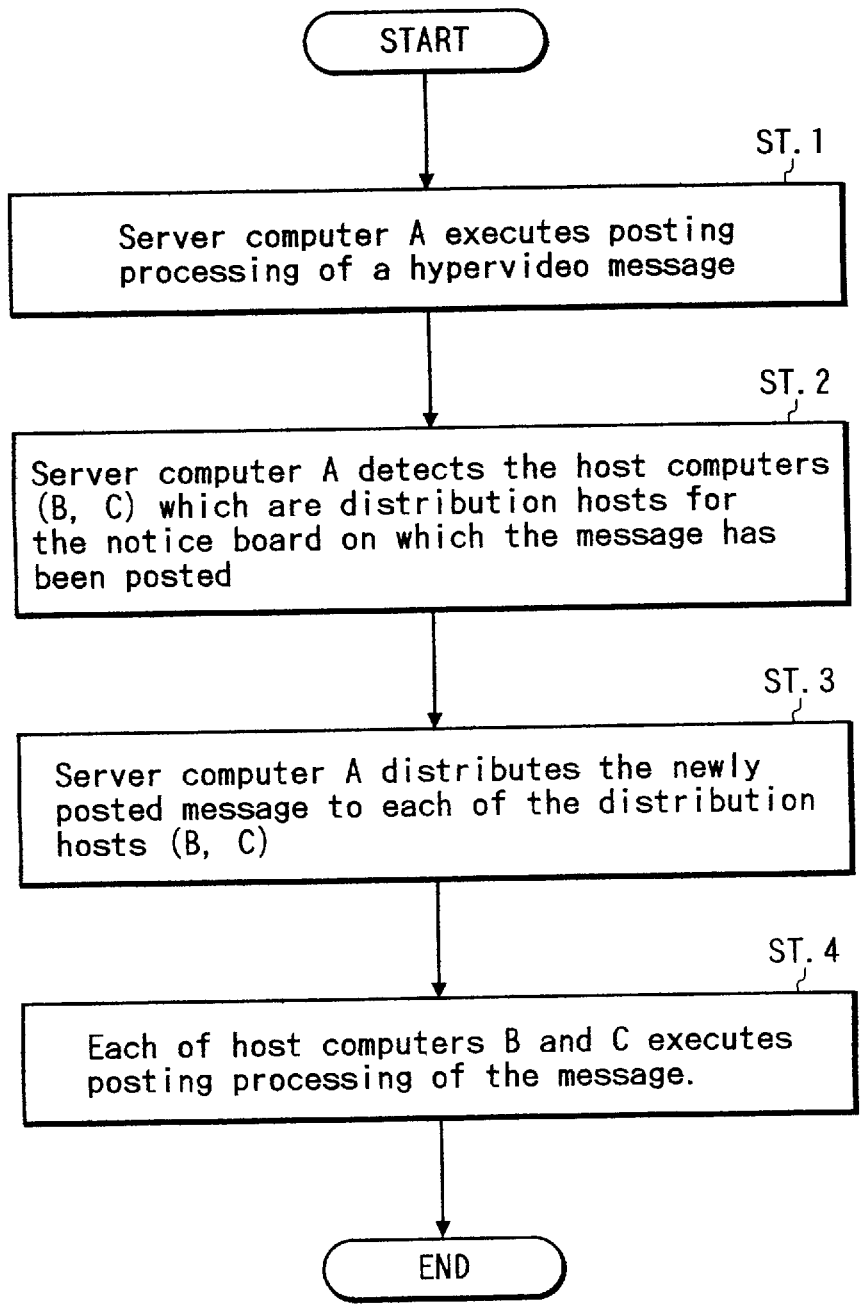
FIG. 80 is a flow diagram for illustrating the basic operation of the twentieth embodiment, based on the message distribution example of FIG. 76.

FIG. 80 is a flow diagram showing the basic operation procedure of this embodiment, assuming the message distribution example of FIG. 76 and assuming that the contents of each distribution condition memory 2182 of the server computers A, B, C are as shown in FIG. 78A, 78B and 78C respectively. The steps of this procedure are as follows:

Step 1: Server computer A receives (from a local client terminal) a hypervideo message, and executes posting processing of the message to the specified notice board ("New Products Guide").

Step 2: The wide-area distribution processing section 2180 of server computer A detects the server computers (B, C) which are specified as distribution destination servers for the ""New Products Guide"" notice board.

Step 3: Server computer A distributes the newly posted message to each of the distribution server computers (B, C), by transferring the distribution file group of the message to each of these server computers, using the FTP protocol.

Step 4: Each of server computers B and C executes posting processing of the message to the "New Products Guide" notice board of that server computer, i.e. to the notice board which is specified in the header file of the distribution file group.

Figure 81:
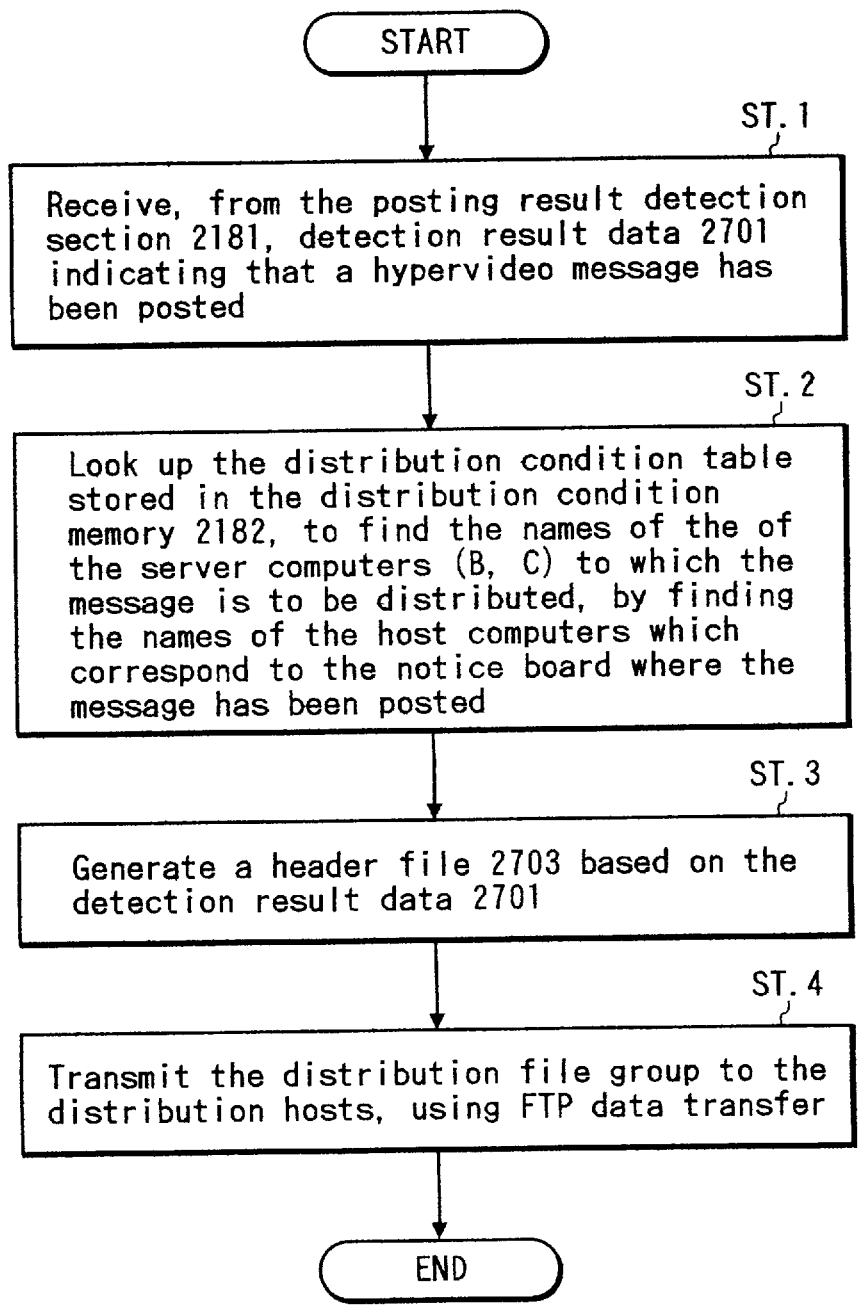
FIG. 81 is a flow diagram for illustrating a processing sequence executed by a distribution transmitting section of the twentieth embodiment.

The processing sequences which are executed by the distribution transmitting section 2183 of the server computer A, and by the distributed message receiving section 2184 of each of the server computers B and C, in step 2 of the flow diagram of FIG. 80, will be described in the following. FIG. 81 is a flow diagram of the processing sequence which is executed by the distribution transmitting section 2183 of the server computer A, and which consists of the following operations:

Step 1: Detection result are received from the posting result detection section 2181, indicating that a hypervideo message has been posted.

Step 2: Look up the distribution condition table stored in the distribution condition memory 2182, to find the names the of the server computers (B, C) to which the message is to be distributed, by finding the names of the server computers which correspond to the notice board name ""New Products Guide"".

Step 3: Generate a header file for the distribution file group of this message, based on the contents of the detection result data.

Step 4: Transmit the distribution file group to the distribution destination servers (B, C), using FTP data transfer.

Figure 82:
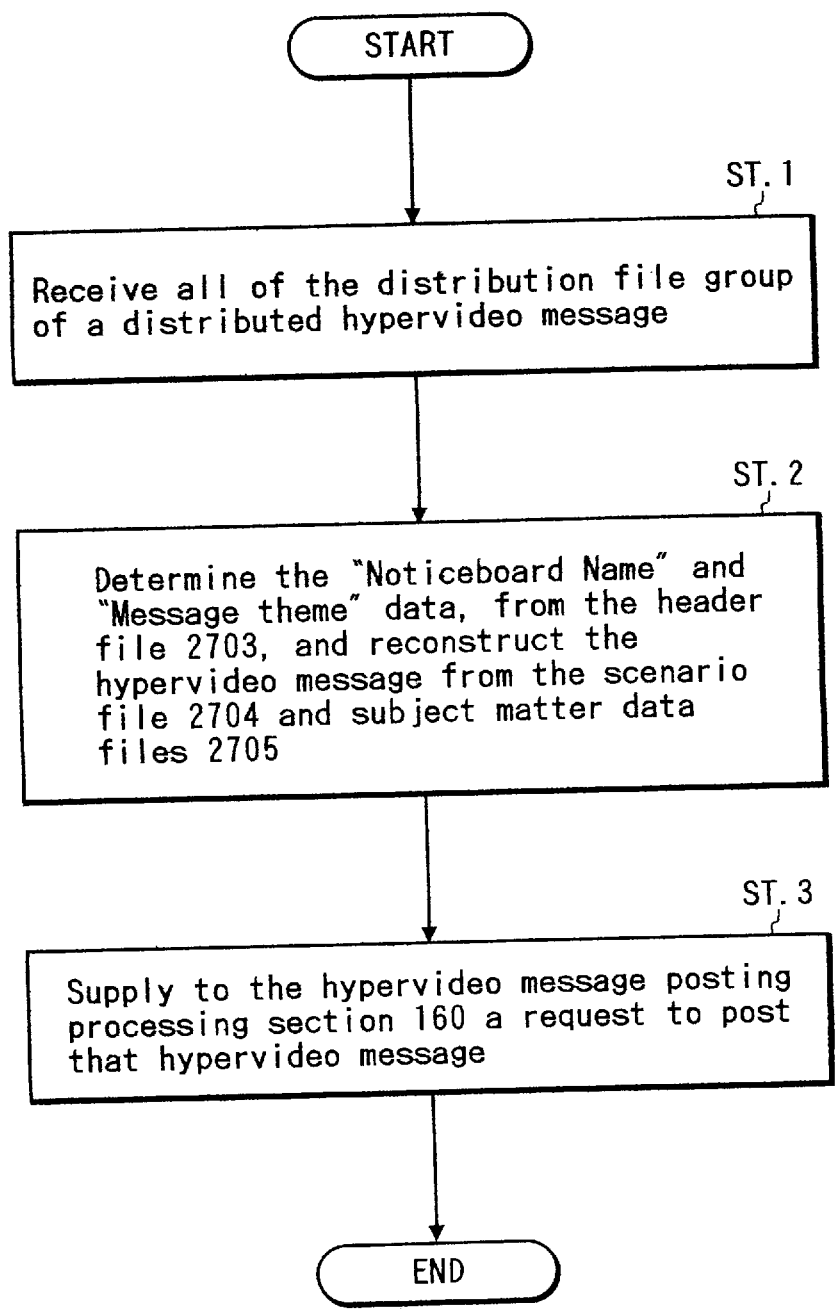
FIG. 82 is a flow diagram for illustrating a processing sequence executed by a distributed message receiving section of the twentieth embodiment.

FIG. 82 is a flow diagram of the processing sequence which is executed by the distributed message receiving section 2184 of the server computer B, and which consists of the following operations:

Step 1: Receive and hold the distribution file group of the distributed hypervideo message.

Step 2: Reconstitute the message in the standard hypervideo message format, using the "Noticeboard Name" and "Message theme" data, from the header file of the distribution file group, and the data of the scenario data file and subject matter data files of the distribution file group as the contents of the message.

Step 3: Request the hypervideo message posting processing section 160 to post that message, and supply the message data to the hypervideo message input processing section 161.

The contents of the above step 3 may simply consist of the action of supplying to the hypervideo message posting processing section 160 the notice board name and message theme information of the hypervideo message. However it can be understood that, since a hypervideo message is supplied to the hypervideo message input processing section 161 of the hypervideo message posting processing section 160 in the same way and with the same data format as a hypervideo message which is sent locally from a client terminal of the LAN, the hypervideo message posting processing section 160 of a server computer can execute the same operations to post a message, irrespective of whether a locally generated message or a distributed message is to be posted.

Figure 83:
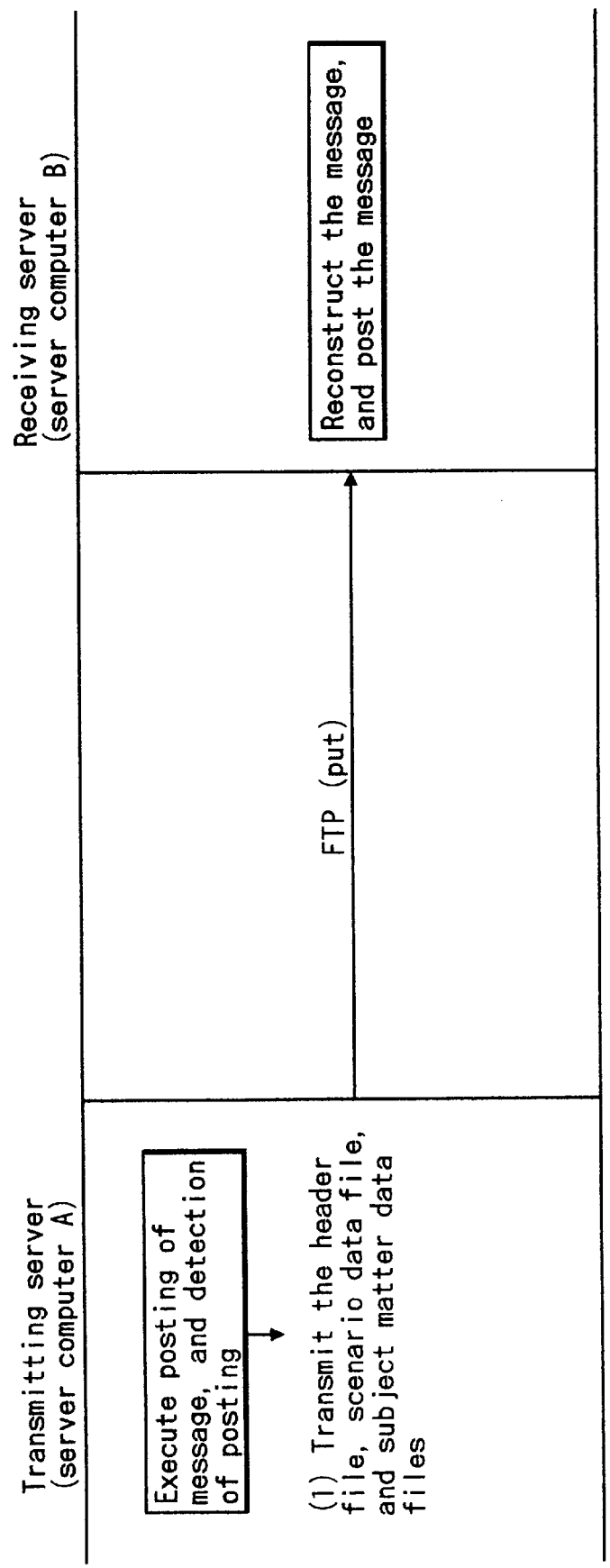
FIG. 83 is a conceptual diagram for illustrating a synchronization relationship between server computers which respectively distribute and receive a hypervideo message, with the twentieth embodiment.

FIG. 83 is a conceptual diagram for illustrating the synchronization relationships between respective processing operations which are executed by a server computer which posts and distributes a message and a server computer which receives and posts that message, e.g. between the server computers A and B in the above example. As shown, when the server computer A detects posting of a message, it uses the "put" command of the Internet FTP (File Transfer Protocol) to transfer the distribution file group of the message to server computer B. On receiving the file group, server computer B posts the message to the ""New Products Guide"" notice board which is specified in the header file of that file group, with the scenario data file and subject matter data files from the distribution file group being stored in the hypervideo data service section 150 as the contents of the message.

It can be understood from the above that with the twentieth embodiment described above, it is made possible for a hypervideo message which is posted at the server computer of a LAN of a wide-area network to be selectively distributed to other server computers of the wide-area network, and hence made available to each of the client terminals of these other server computers. In particular, it can be ensured that all of the messages which are posted on a specific notice board of one LAN can be accessed (employing the usual data browsing operations, based on displayed hypertext pages) by any user of one or more other specified LANs.

With the above embodiment, due to the fact that each server computer only executes message distribution processing (using the FTP for data transfer) for hypervideo messages which are first posted at that server computer, the proportion of the total message distribution processing load which is imposed on a server computer will vary in proportion to the frequency with which messages are sent to that server computer from its client terminals. Hence, each server computer may be be configured in accordance with the anticipated frequency of posting of messages at that site, so as to ensure that none of the server computers of the wide-area network will become excessively overloaded by the CPU demand that is imposed by the hypervideo message distribution processing.

Although the basic configuration of a server computer and the client terminals of this embodiment have been assumed to be similar to those of the first embodiment described hereinabove, it would be equally possible to configure these in accordance with the second or third embodiments.

A twenty-first embodiment will be described in the following, which can have respective configurations for the server computer and client terminals that are similar to those described above for the twentieth embodiment. This embodiment differs from the preceding embodiment in that, rather than the distribution server computer transferring the entire data contents of a hypervideo message in a distribution operation, only representative parts of the message data are initially transferred to each of the distribution destination server computers. Specifically, the notice board name, the message theme, and a list of the names and storage locations of the scenario and subject matter data files (e.g. directory path information for these files, with respect to the hypervideo data service section 150 of the distribution server computer) are initially transmitted to each of the distribution destination server computers. In the following, such representative information will be referred to as the message updating information, with the format of that data being for example as shown in FIG. 84. When such a set of message updating information are received by a server computer as the destination of the data, this signifies that a message having the theme "29-inch Wide-Screen TV" is to be posted on the ""New Products Guide"" notice board of that server computer, and that the data files of the message are stored in server computer A, at storage locations specified by the "list of stored files".

The basic operation of this embodiment will be described, again using the simple distribution example of FIG. 76 in which a message is distributed from server computer A to the server computers B, C. It will again be assumed that the detection result data derived by server computer A is as shown in FIG. 77, i.e. specifying the name of the notice board on which the message has been posted, together with the message theme, and that the contents of the distribution condition memory 2182 of each of the server computers A, B, C are as shown in FIGS. 78A, 78B and 78C respectively.

Figure 85:
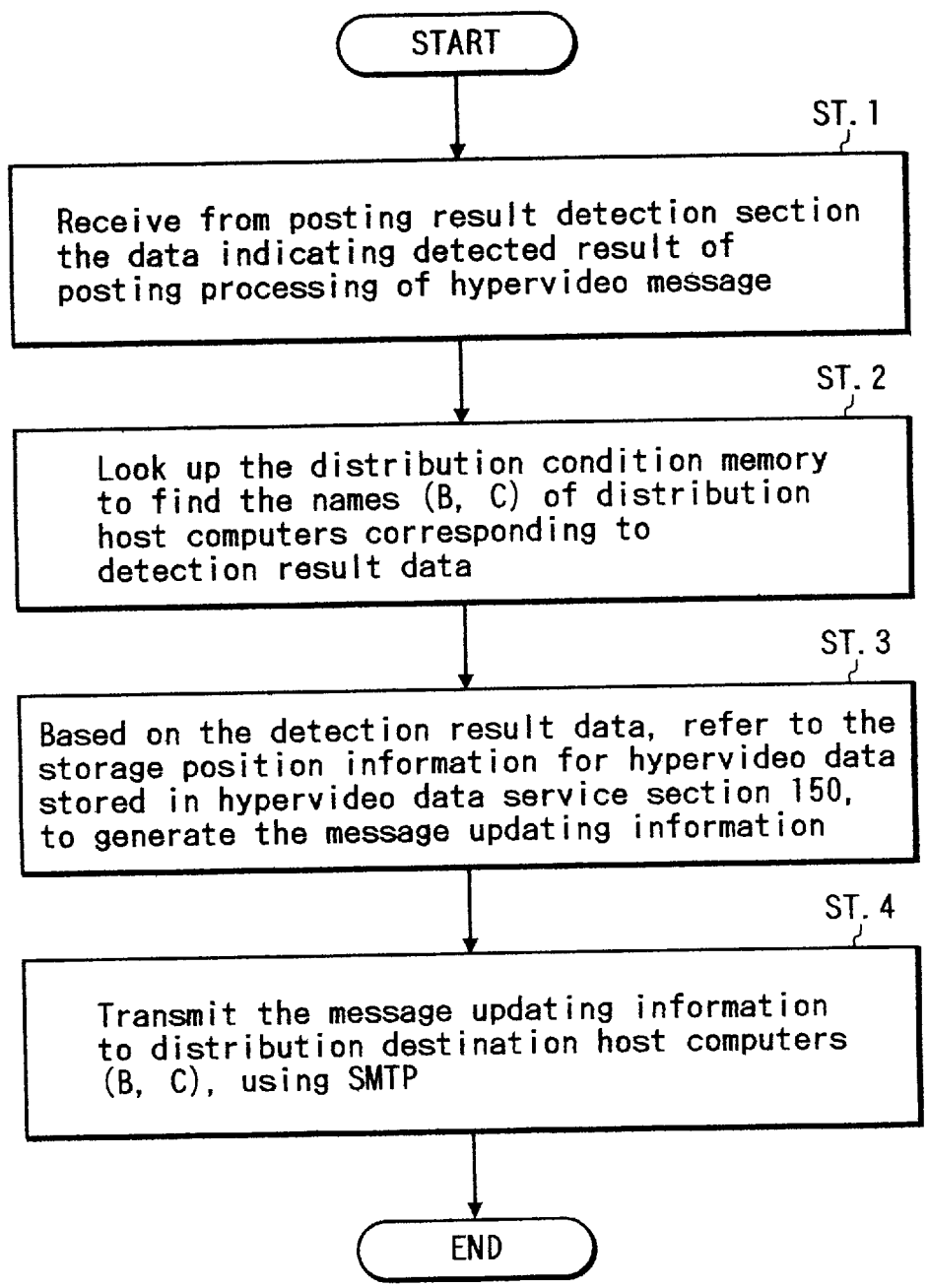
FIG. 85 is a flow diagram showing the basic operation sequence executed by a distribution transmitting section of the twenty-first embodiment.

FIG. 85 is a flow diagram showing the basic operation sequence which is executed by the distribution transmitting section 2183 of the distribution server computer A in this case, with the operation steps being as follows:

Step 1: Receive from posting result detection section 2181 the detection result data for this message.

Step 2: Refer to the distribution condition memory 2182 to find the names (B, C) of the server computers which correspond to the notice board name ""New Products Guide"".

Step 3: Based on the detection result data, refer to the storage position information for hypervideo data which are stored in hypervideo data service section 150, to obtain the storage position information for the scenario and subject matter data files containing the message data contents, and combine that storage position information with the "Notice Board Name" and "Message Theme" information of the detection result data to thereby generate the message updating information.

Step 4: Transmit the message updating information to the server computer B, using the SMTP (Simple Mail Transfer Protocol).

Figure 86:
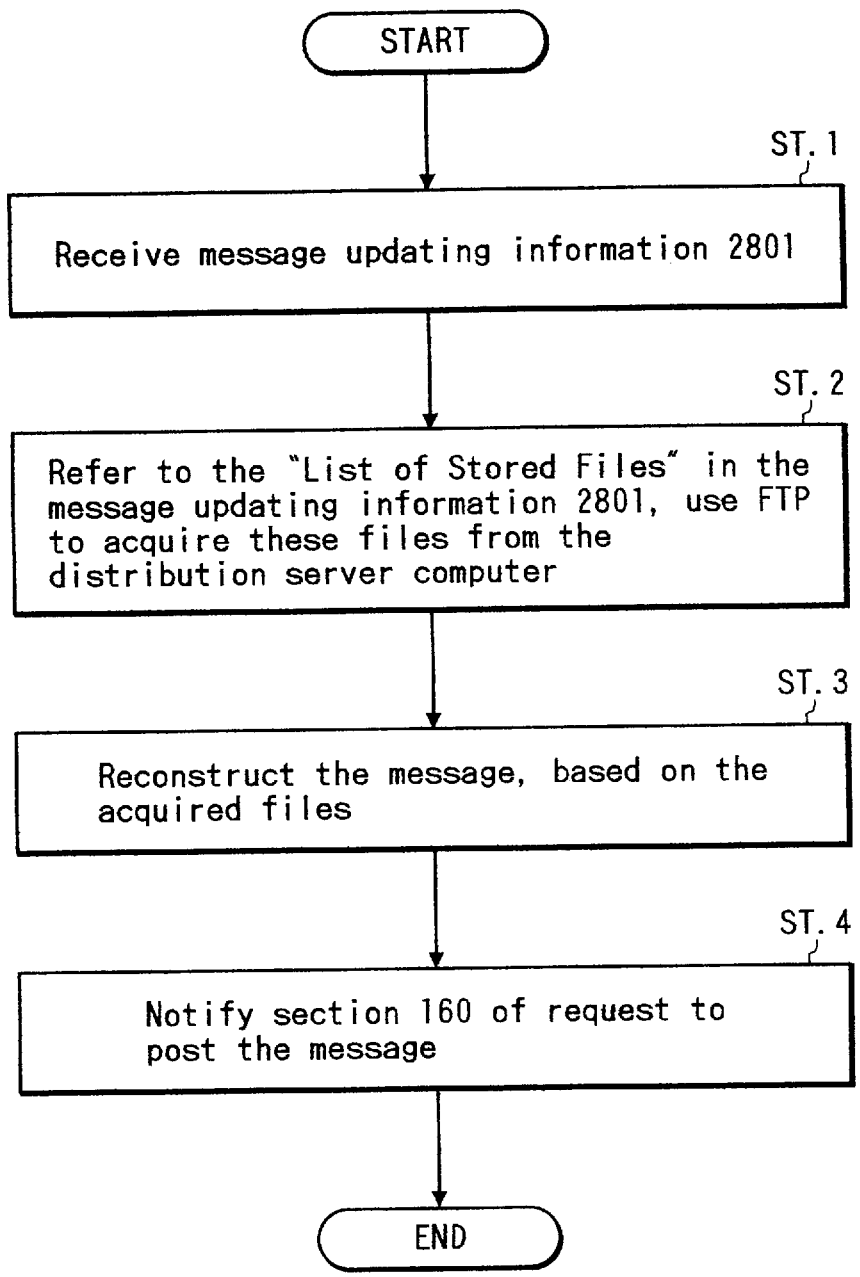
FIG. 86 is a flow diagram for illustrating a processing sequence executed by a distributed message receiving section of the twenty-first embodiment.

FIG. 86 similarly shows the basic operation sequence executed by the distributed message receiving section 2184 of each of the distribution destination server computers B, C. The steps are as follows:

Step 1: Receive message updating information transmitted from server computer A.

Step 2: Refer to the "List of Stored Files" in the message updating information, then execute the Internet FTP "get" command to acquire each of these files from the hypervideo data service section 150 of the distribution server computer A Step 3: When all of the listed files (scenario data and subject matter data) have been acquired, i.e. all of the message data contents have been received, then configure the message data in the standard hypervideo message format.

Step 4: Notify section 160 that a message is to be posted, and supply the message data to the hypervideo message input processing section 161.

Figure 87:
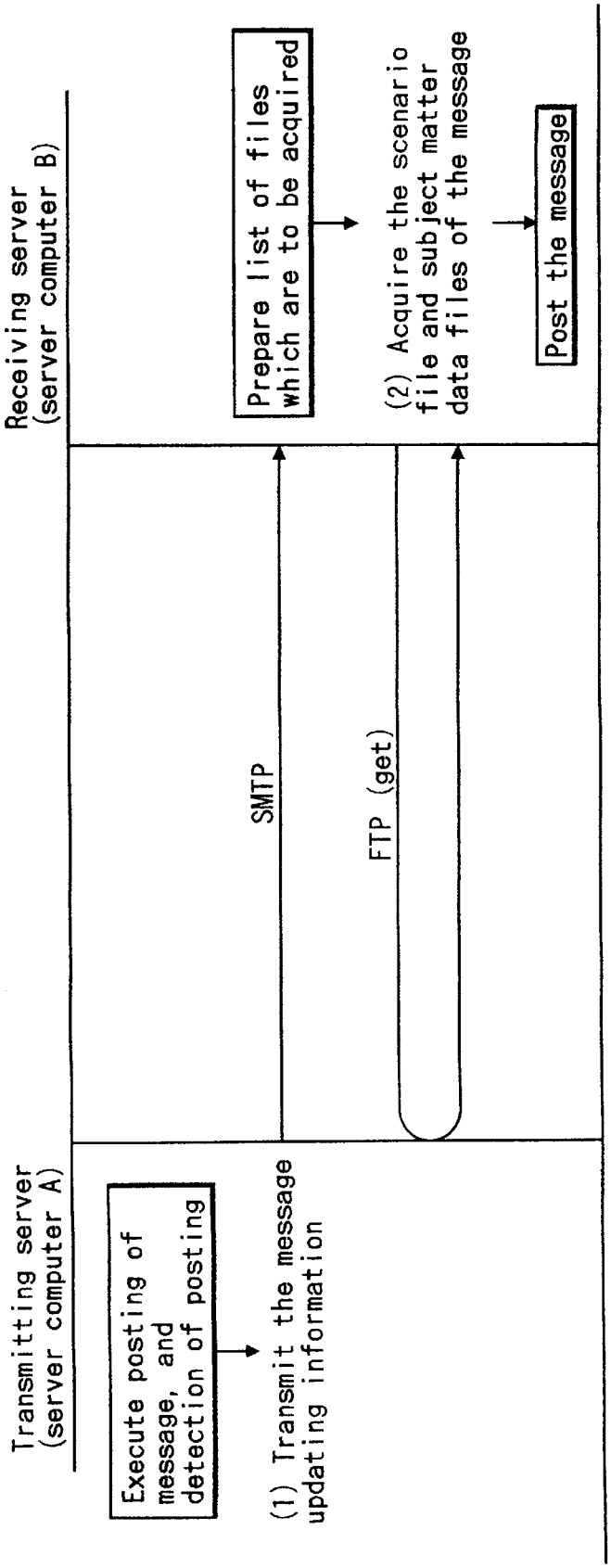
FIG. 87 is a conceptual diagram for illustrating a synchronization relationship between server computers which respectively distribute and receive a hypervideo message, with the twenty-first embodiment.

FIG. 87 is a conceptual diagram for illustrating the synchronization relationships between respective processing operations which are executed by a server computer which posts and distributes a message and a server computer which then receives and posts that message, e.g. between the server computers A and B in the above example. As shown, when the distribution server computer A detects posting of a message, it then prepares and transmits the message updating information (using the SMTP) to the destination server computer B. The server computer B then obtains from the message updating information the list of files containing the message contents, which are stored at server computer A and must be acquired. The server computer B then uses direct transfer of files (i.e. by executing the Internet FTP "get" command) to acquire each of the required files from the hypervideo data service section 150 of server computer A, uses the acquired files and the contents of the message updating information to configure the message in the standard hypervideo message format, and then posts the message.

With this embodiment, similar results can be achieved to those described for the twentieth embodiment described hereinabove. However with the twenty-first embodiment, only the message updating information (i.e. reference data, which can easily and rapidly be transferred between server computers of a wide-area network such as the Internet) is sent from the distribution server computer to each destination server computer, whereas the processing for acquiring the actual hypervideo data contents of a message (i.e. direct high-speed transfer of binary data files, using the FTP), which imposes a high load on the CPU of a server computer, is executed by each of the distribution destination server computers. Hence if a high frequency of message postings occurs in any one LAN of the wide-area network, so that the server computer of that LAN is currently operating under high load, the processing for actually transferring the hypervideo data of these messages to other server computers will be dispersed among these destination server computers. Hence, the overall operation of the wide-area network with respect to message distribution will not be adversely affected by a high frequency of message posting that may occur in one of the LANs.

The decision as to whether to configure the wide-area distribution processing section 2180 of each server computer of a wide-area network in accordance with the twentieth or the twenty-first embodiment will depend upon the such factors as the anticipated type of utilization of client terminals of each site (i.e. the expected frequency of posting messages from the client terminals, or frequency of referencing of posted messages by client terminal users, etc.), and factors such as the type of message processing that is anticipated for the various server computers (e.g. whether a server computer will primarily distribute messages to a large number of destinations, or will primarily receive messages that are distributed, etc.). Generally speaking, if it is anticipated that message interchange between sites will be performed mainly on a two-way conversational basis, then the form of the twentieth embodiment is to be preferred, whereas in the case of a wide-area network in which a specific server computer will mainly be used to distribute messages to other sites, then the form of the twenty-first embodiment is to be preferred.

Figure 88:
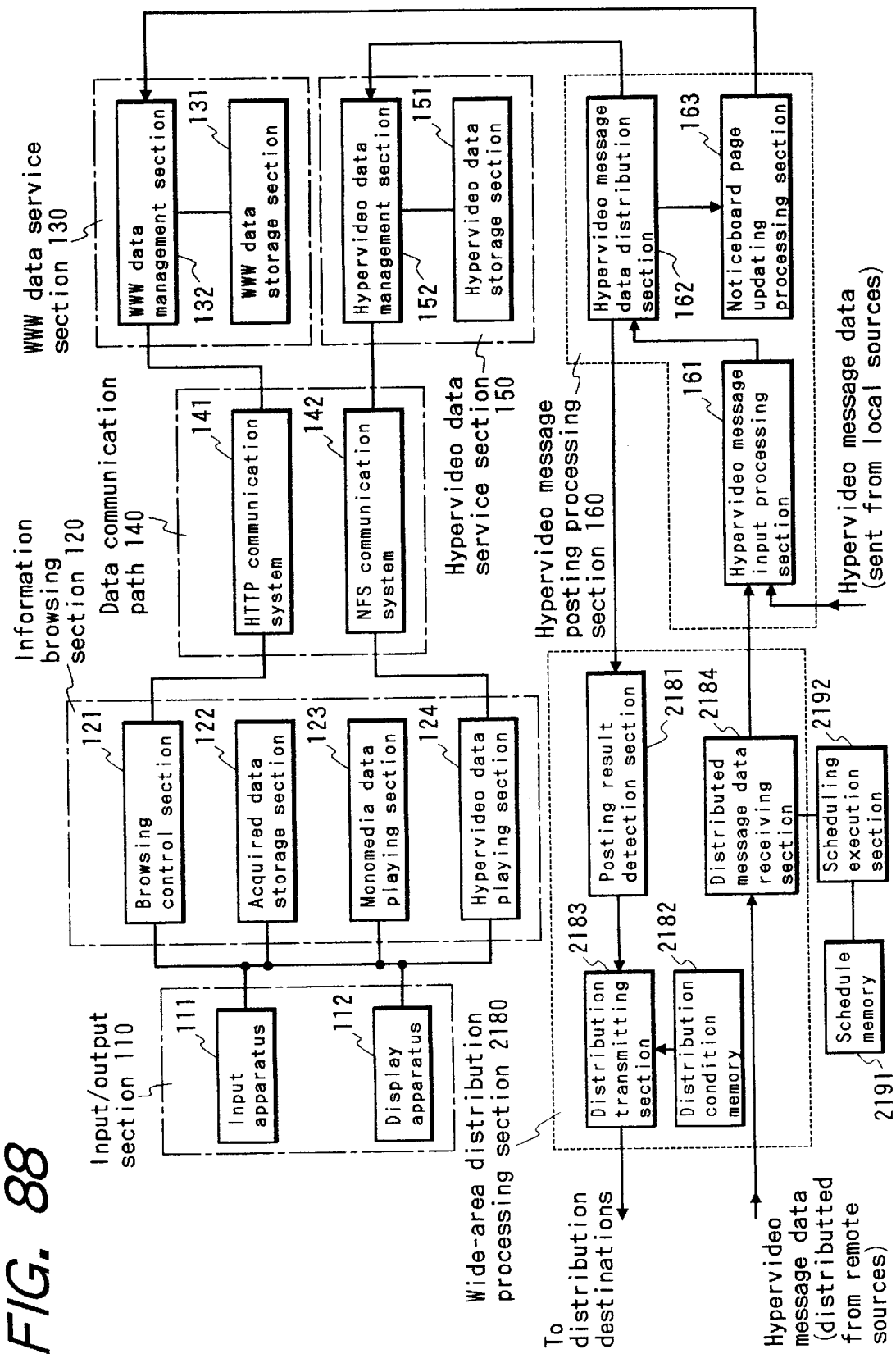
FIG. 88 is a system block diagram showing the basic configuration of a twenty-second embodiment of the invention, which also is a data processing apparatus enabling hypervideo messages to be received from local sources, such as client terminals of a local area network, and posted on a specific notice board page, while in addition being distributed to specific remote destinations, to be subsequently posted on notice boards of these destinations at arbitrarily scheduled times.

A twenty-second embodiment of the invention will be described in the following, which has the basic configuration shown in FIG. 88. The configuration of this embodiment differs from that of the twenty-first and twenty-second embodiments described above only with respect to the addition of a schedule memory 2191 and a scheduling execution section 2192, so that description of the remaining portions will be omitted. The actual configuration of a server computer of this embodiment can be as shown in FIG. 75, but with the addition of the scheduling execution section 2192 and scheduling execution section 2192, coupled as shown in FIG. 88 to the distributed message receiving section 2184 of the wide-area distribution processing section 2180. The schedule memory 2191 has stored therein schedule information, consisting of a list of programs which are scheduled to be executed, in conjunction with respective scheduled execution times for these programs. The scheduling execution section 2192 serves to periodically execute these programs at the scheduled times, in accordance with the information held in the schedule memory 2191.

In describing the operation of this embodiment, the same example as for the two preceding embodiments will be employed, i.e. example of FIG. 76 in which a message is posted to a notice board of the server computer A of LAN A, and is distributed to server computers B and C of two other LANs. It will again be assumed that the detection result data derived by server computer A is as shown in FIG. 77, and that the contents of the distribution condition memory 2182 of each of the server computers A, B, C are as shown in FIGS. 78A, 78B and 78C respectively.

FIG. 89 shows an example of the configuration of an execution schedule table which is stored in the schedule memory 2191. The execution schedule table contains the following schedule data, in the form of respective records:

Program that is scheduled to be executed: Name of a program (or name of the processing which is performed by that program) which is to be executed at predetermined times.

Scheduled time of execution: Information specifying the times at which the program is to be executed.

In the example of FIG. 89 it is assumed that the program which is used to acquire message files (i.e. the scenario data file and subject matter data files of a distributed message) is to be executed once each day, at 21:00.

Figure 90A:
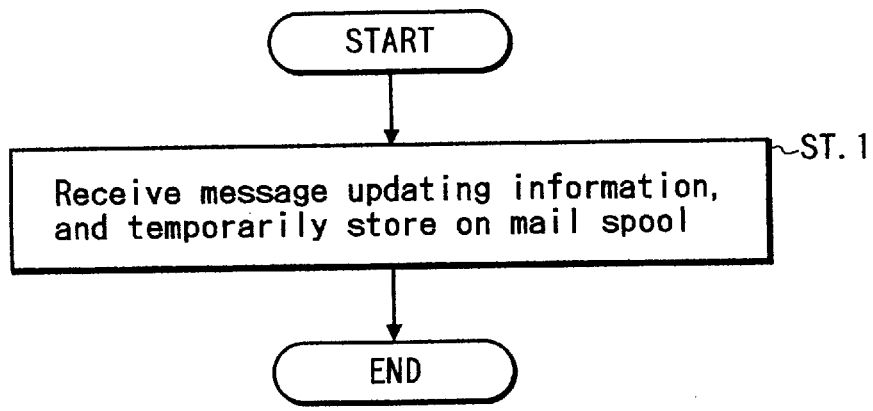
FIGS. 90A, 90B are flow diagrams for illustrating the operation of a distribution message receiving section of the twenty-second embodiment.
Figure 90B:
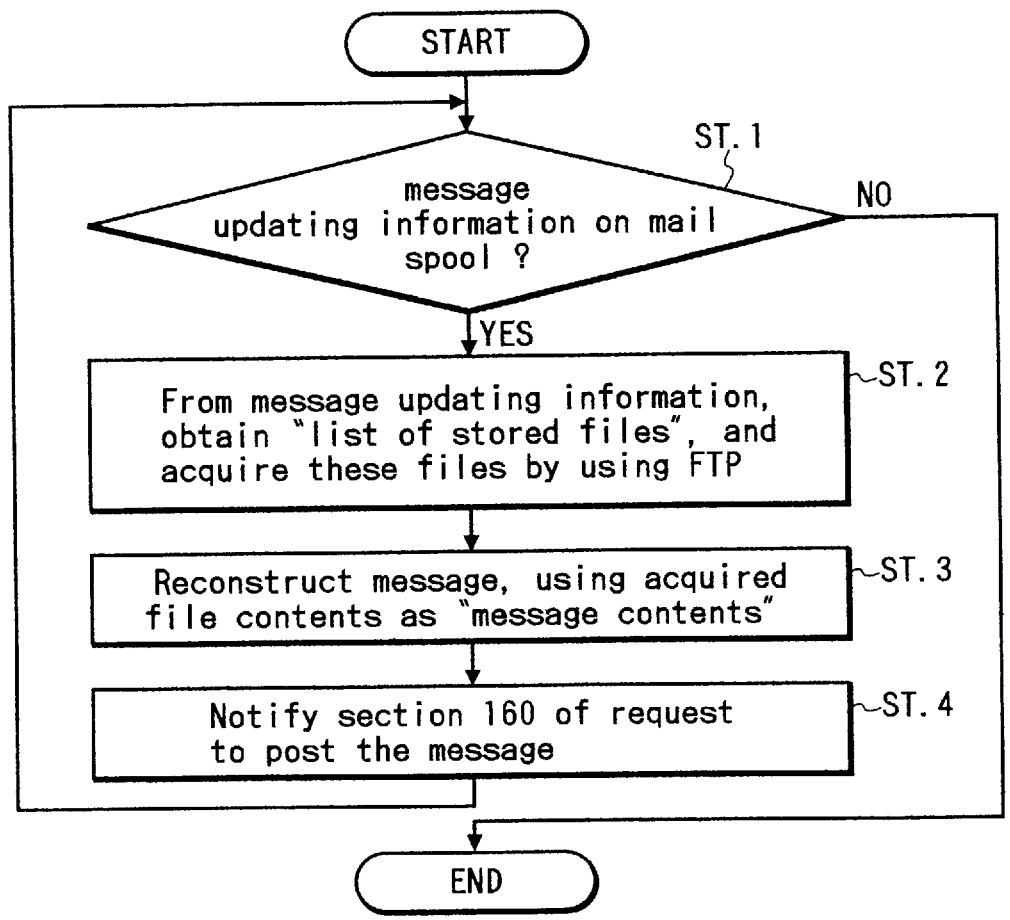

The distribution processing sequence of this embodiment is almost identical to that of the twenty-first embodiment described above, but differs with respect to the operation of the distributed message receiving section 2184. FIG. 90A is a one-step flow diagram showing the processing sequence executed by the distributed message receiving section 2184 in response to receiving the message updating information of a distributed message, while FIG. 90B shows the operation sequence executed by the distributed message receiving section 2184 in order to acquire the files which are listed in the message updating information of a distributed message. The operation of the distribution transmitting section 2183 of this embodiment is identical to that described above for the twenty-first embodiment, so that further description will be omitted.

The operating sequence shown in FIG. 90A consists of the following:

Step 1: When the message updating information of a distributed message is received, the message updating information are stored unchanged on the mail spool (i.e. a temporary storage region assigned for holding electronic mail items).

The operating sequence shown in FIG. 90B consists of the following:

Step 1: Determine whether there is message updating information currently held on the mail spool (i.e. for one or more distributed hypervideo messages). If so, then successively process the message updating information for each of the distributed messages, as follows.

Step 2: From the message updating information, obtain the "list of stored files", then successively transfer these files from the hypervideo data service section 150 of the distribution server computer by using the FTP "get" command in conjunction with the storage location information from the "list of stored files". Temporarily hold the successively transferred files.

Step 3: Reconstruct message into standard hypervideo message format, using the data of the set of acquired files as the "message contents" part of the standard format, and using the "notice board name" and "message theme" information from the message updating information which had been held on the mail spool.

Step 4: Notify section 160 that message is to be posted, and supply the hypervideo message input processing section 161.

Figure 91A:
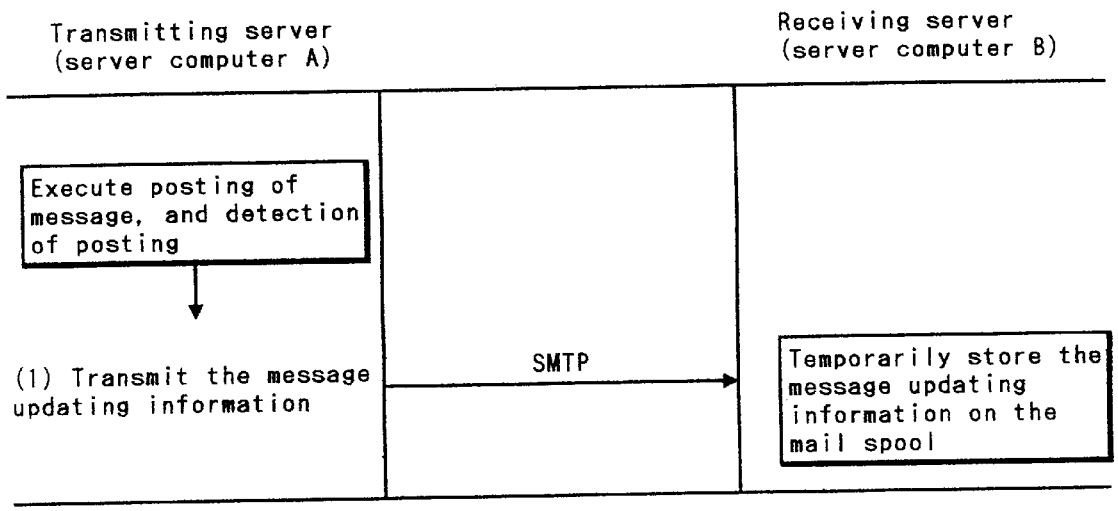
FIGS. 91A, 91B are conceptual diagrams for illustrating a synchronization relationship between server computers which respectively distribute and receive a hypervideo message, with the twenty-second embodiment.
Figure 91B:
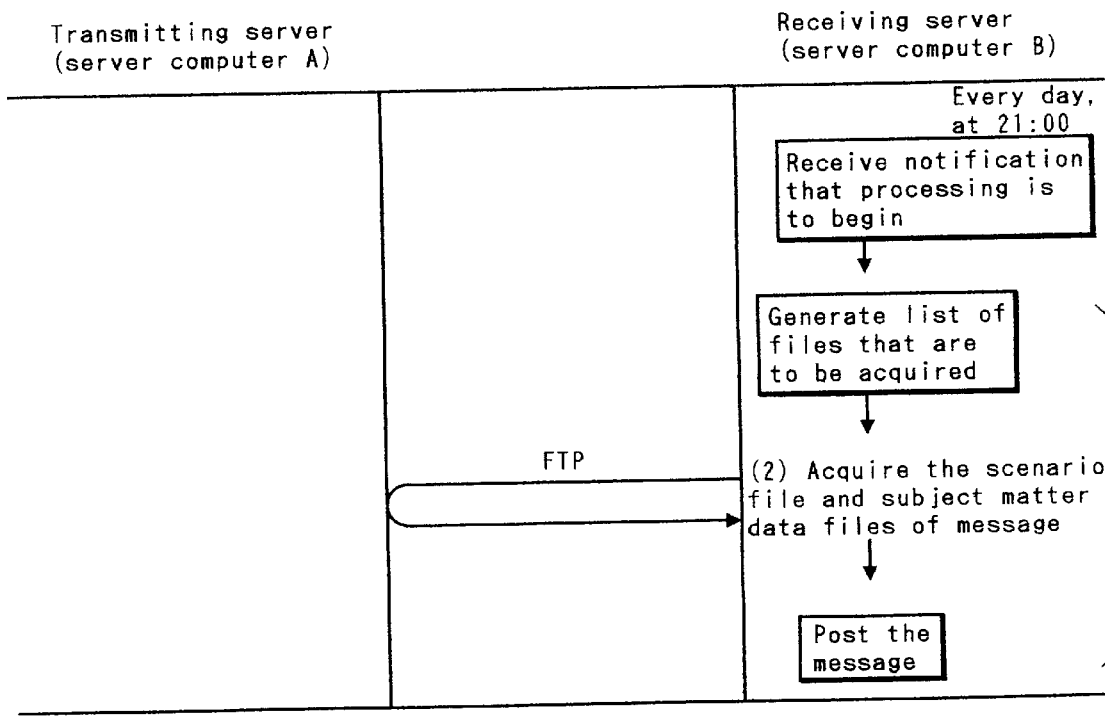

FIG. 91 is a conceptual diagram for illustrating the synchronization relationships between respective processing operations which are executed by a server computer (A) which posts a hypervideo message and then distributes the message updating information for that message to another server computer (B), for this embodiment. As shown, when the distribution server computer A detects posting of a message, it then prepares and transmits the message updating information for that message (using the SMTP) to the destination server computer B. The server computer B temporarily stores the message updating information on the mail spool. Subsequently, at the next occurrence of the scheduled execution time of day (21:00), the server computer B executes processing to obtain the list of files which are specified in the message updating information, in the same way as described for the preceding embodiment, i.e. using the FTP. The message data are then configured to the standard format, and the message is posted by server computer B.

The functions of the schedule memory 2191 and scheduling execution section 2192 can readily be implemented, for example by using the UNIX (a registered trade mark of UNIX System Laboratories Inc.) "cron" facility, if the server computer uses the UNIX operating system. Alternatively, the "System Agent" facility of the Windows 95 operating system can be utilized. "Windows" is a registered trade mark of Microsoft Corp., U.S.A.

With this embodiment, in addition to the advantage of dispersal of CPU processing load that is provided by the twenty-first embodiment as described hereinabove, the advantage is obtained that it becomes possible to adjust the timings at which each each server computer (to which hypervideo messages are distributed) processes the distributed messages. That is, each server computer can individually determine the time periods within which FTP data communication processing is executed to acquire the scenario data and subject matter data files of distributed hypervideo messages. In that way, it becomes possible to set these execution time periods in accordance with the utilization conditions of a particular LAN, and in accordance with factors such as the requirements of other programs for FTP communication, the CPU performance capabilities, etc. Alternatively, these file transfer time intervals can be determined based on the time of day at which the costs of using the communication path of the wide-area network are lowest.

With this embodiment, message updating information for successively received distributed hypervideo messages are accumulated by a server computer, and posting processing is executed only at specified predetermined times. For that reason, this embodiment is inferior to the preceding embodiment with respect to the speed with which a newly posted message at one site of the wide-area network is made available to users of other sites. However it would be possible to modify this embodiment, such as to ensure that when message updating information is received and stored on the mail spool of a server computer, the "message theme" part of the message is registered on the specified notice board page, held in the WWW data service section 130. In that way, the "message theme" is made available to the users of client terminals of that site, to indicate that this message will be distributed. In that case it could for example be arranged that file transfer and posting of the message at that site are executed (prior to the next scheduled time for posting of messages) if so requested by any user.

A twenty-third embodiment of the invention will be described in the following. The configuration and basic operation of this embodiment are similar to those of the twentieth embodiment described hereinabove, but differs in that the data of a message which is to be distributed are encoded using the aforementioned MIME encoding, and then distributed to other server computers by using the SMTP, to be then decoded to obtain the original message contents. In practice, MIME encoding/decoding of data for SMTP transfer can be readily performed by using a suitable mailer program, i.e. a program which permits exchange of electronic mail between server computers of a wide-area network and which is applicable to MIME encoding. In that case, the encoding and decoding operations are executed automatically by the mailer program.

Figure 92:
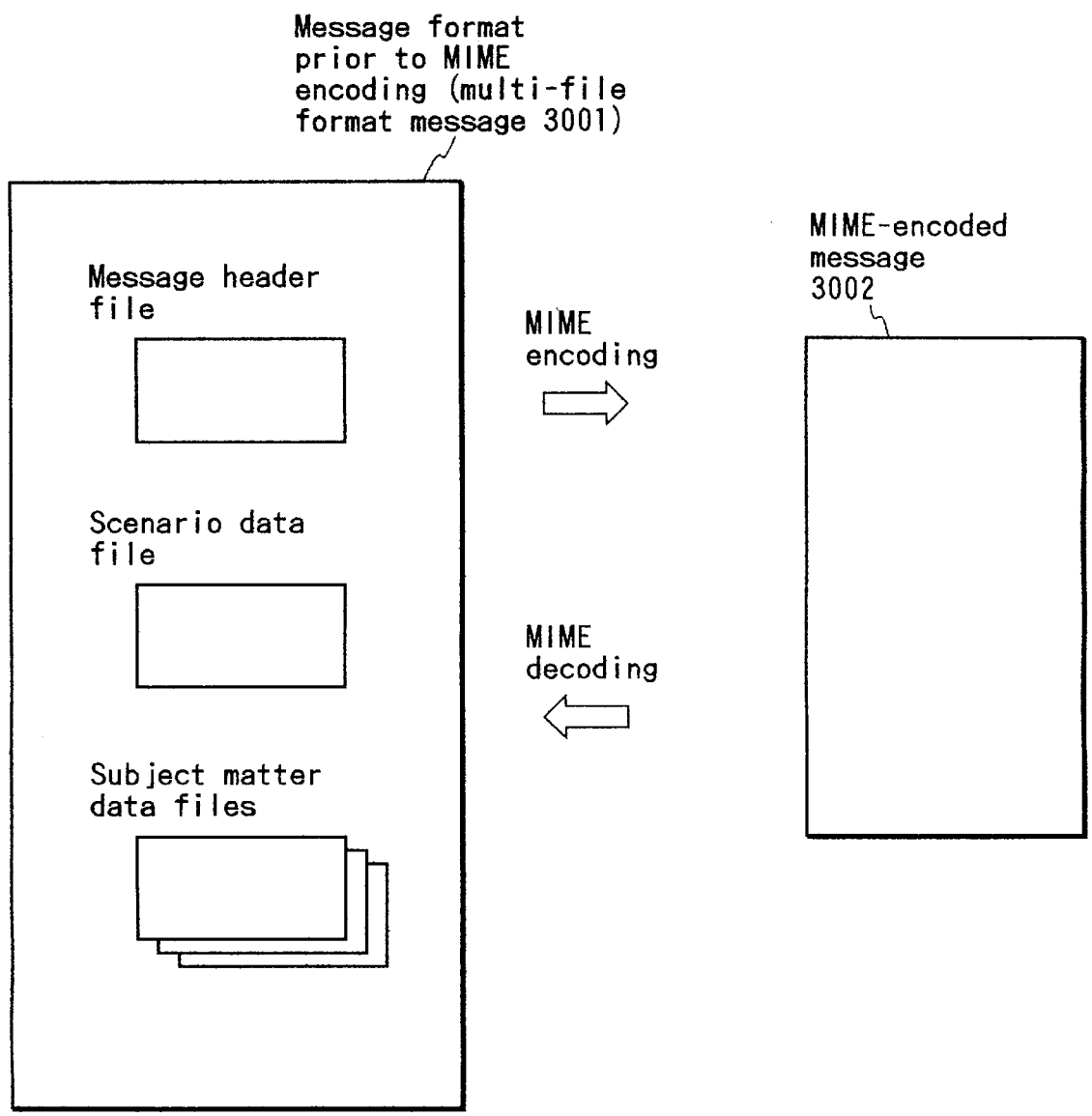
FIG. 92 is a conceptual diagram for illustrating a process of encoding and subsequently decoding a hypervideo message to/from the form of an electronic mail item, as executed with a twenty-third embodiment of the invention.

With this embodiment, as illustrated in FIG. 92, the aforementioned distribution file set for a message is first prepared. The data of that entire set of files are then MIME-encoded as a single large file, which is sent by SMTP to other server computers, is decoded, and then separated into the original set of data files, and the data are then configured in the standard hypervideo message format.

Figure 93:
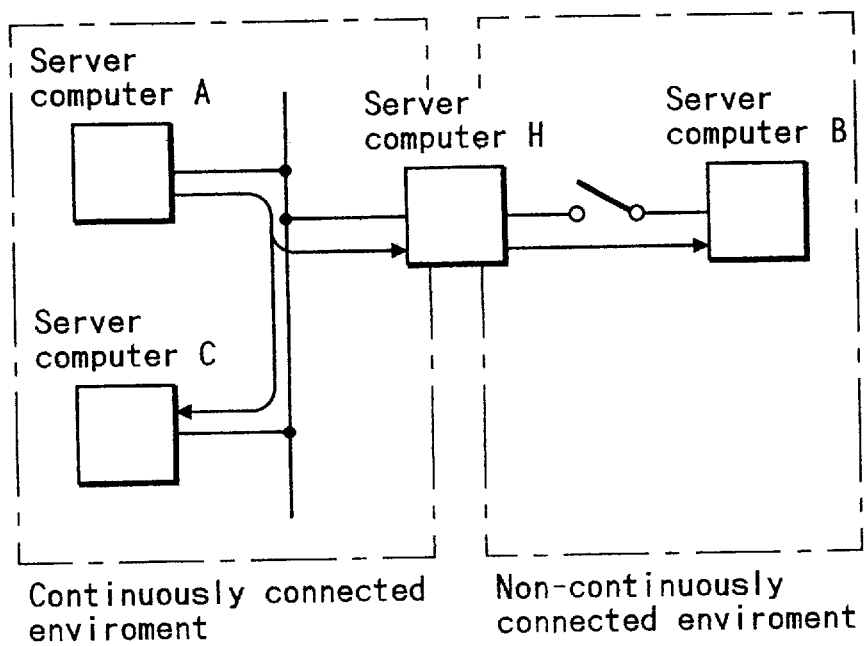
FIG. 93 is a simple system block diagram for illustrating a condition in which hypervideo message data cannot be transferred between sites of a wide-area network by using a file transfer protocol (FTP), due to absence of a continuously connected data path.

The reason for utilizing this embodiment is that in some cases, (as mentioned hereinabove with respect to the embodiments relating to hypervideo mail) it may not be possible to transfer data between server computers by using the FTP protocol, i.e. whereby data of files which are stored at one server computer can be directly transferred (as a result of executing an Internet FTP "get" or "put" command) to another server computer, via the wide-area network. However in such cases it will frequently be possible to reliably transfer data between the server computers by using the SMTP, if the data have been MIME-encoded. Such a case is illustrated in FIG. 93, for the case of the aforementioned example of the server computers A, B, C of FIG. 76. In FIG. 93 (which shows only the server computers of each LAN of the wide-area network, with client terminals being omitted) the server computers A, C are located in an environment in which it is ensured that a continuous path will exist between these, via the wide-area network, during an FTP file transfer operation. However server computer B is located in an environment in which such a path condition is not ensured between that server computer and server computer A, but for which reliable data transfer using the SMTP can be ensured.

Various mail transfer programs are available for executing data transfer using the SMTP, such as the Unix "Sendmail" program (a registered trade name of Sun Microsystems Corp., U.S.A.). To use such a program it is necessary to set certain network path information into each server computer, beforehand.

Figure 94:
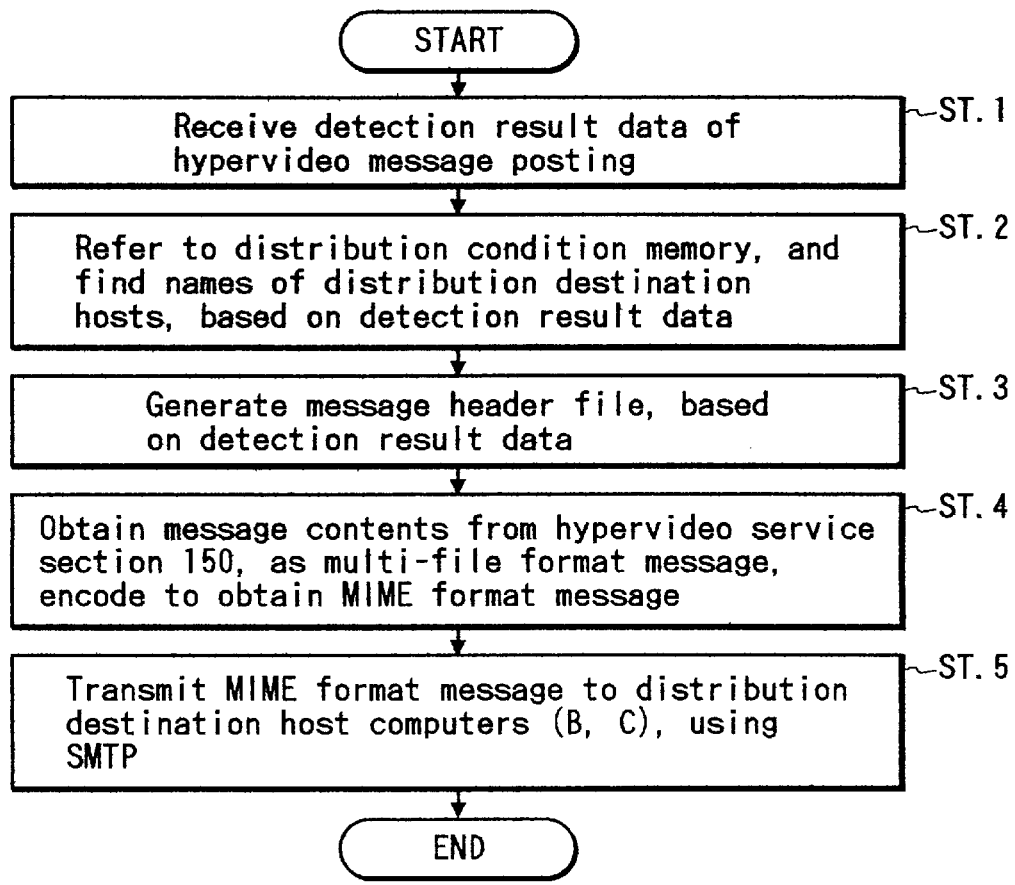
FIG. 94 is a flow diagram for illustrating a processing sequence executed by a distribution transmitting section of the twenty-third embodiment.

The basic operation sequence executed by this embodiment, for message distribution processing, will be described referring to the flow diagram of FIG. 94. This embodiment will be assumed to use the same format and contents for the detection result data (i.e. shown in FIG. 77) and for the distribution condition tables (as shown in FIGS. 78A, 78B, 78C) as described hereinabove. FIG. 94 shows the processing sequence executed by the distribution transmitting section 2183 of the wide-area distribution processing section 2180 of server computer A, for this embodiment, i.e. again assuming the distribution example of FIG. 76. The sequence steps are as follows:

Step 1: Receive from the posting result detection section 2181 the detection result data from posting a hypervideo message.

Step 2: Refer to distribution condition memory 2182 to find the names (B, C) of distribution destination server computers which correspond to the notice board name ""New Products Guide"".

Step 3: Generate message header file (containing notice board name ""New Products Guide"" and message theme "29-inch Wide-Screen TV"), based on detection result data.

Step 4: Obtain message data contents (scenario data file, subject matter data files) from hypervideo service section 150, combine with message header file to obtain distribution file group, and MIME-encode data of file group to obtain a single encoded message.

Step 5: Transmit MIME format message to each of the distribution destination server computers (B, C), using SMTP.

Figure 95:
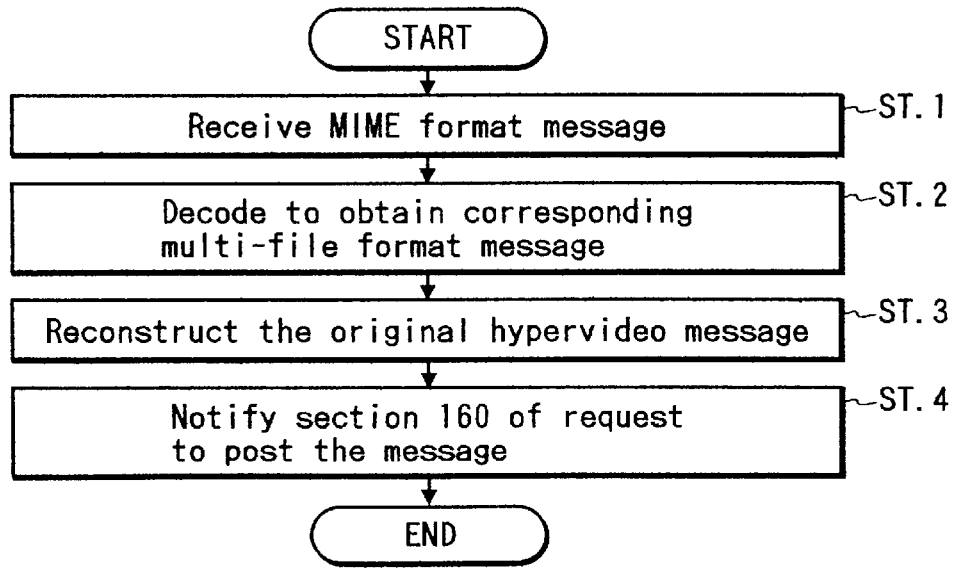
FIG. 95 is a flow diagram for illustrating a processing sequence executed by a distributed message receiving section of the twenty-third embodiment.

FIG. 95 shows the processing sequence which is executed by the distributed message receiving section 2184 of a server computer which receives a distributed hypervideo message, with this embodiment, e.g. the server computer B of the above example. The sequence steps are:

Step 1: Receive the hypervideo message, sent by SMTP in MIME-encoded format.

Step 2: Decode to obtain the message data in the form of the distribution file group.

Step 3: Reconstruct message data into standard hypervideo message format.

Step 4: Notify section 160 that message is to be posted, and supply the hypervideo message input processing section 161.

Figure 96:
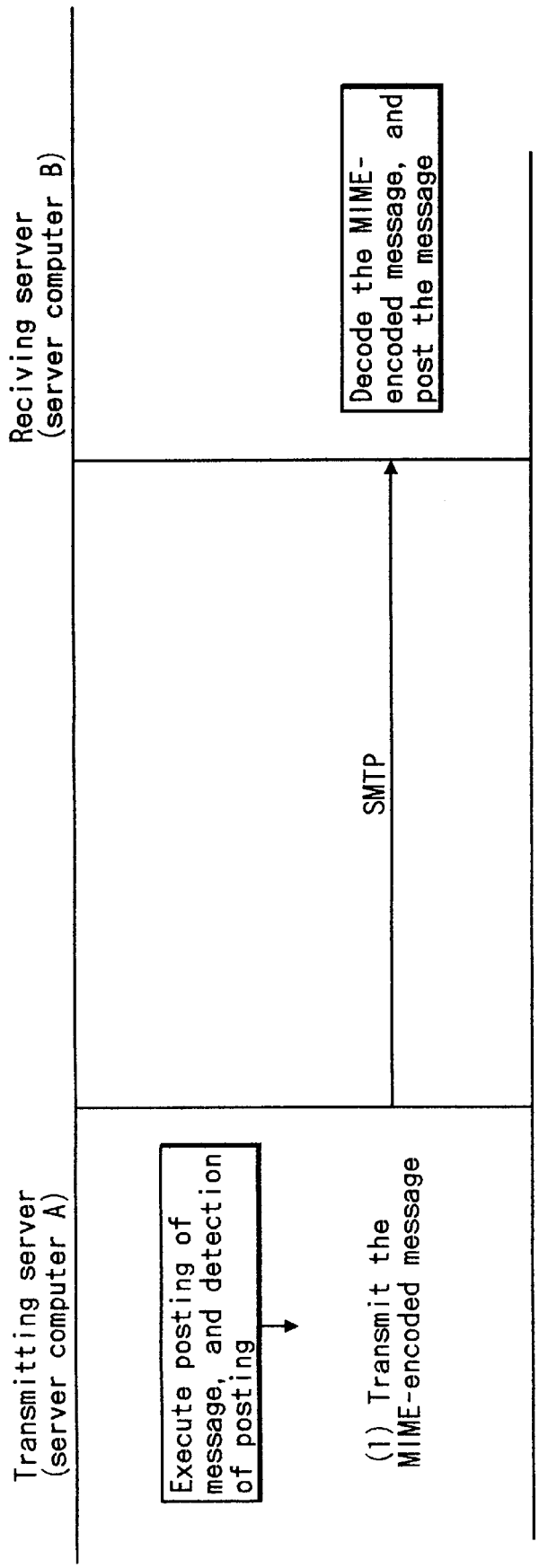
FIG. 96 is a conceptual diagram for illustrating a synchronization relationship between server computers which respectively distribute and receive a hypervideo message, with the twenty-third embodiment.

FIG. 96 is a conceptual diagram for illustrating the synchronization relationships, for this embodiment, between respective processing operations which are executed by a server computer which posts and distributes a message and a server computer which then receives and posts that message, e.g. between the server computers A and B in the example of FIG. 76. As shown, when the distribution server computer A detects posting of a message, it then encodes the message data and transmits the data by SMTP, and the destination server computer B then decodes the received data and recovers the original hypervideo message, and posts the message.

It can thus be understood that with this embodiment, hypervideo messages can be distributed among server computers of a wide-area network, even if the data communication path conditions do not enable direct transfer of data files between the server computers, i.e. even if a data communication path is not continuously maintained between the server computers. This is made possible by transferring all of the data of a hypervideo message in MIME-encoded form, using the SMTP, in the same way as ordinary electronic mail is transferred via the Internet, i.e. with the data being transferred during predetermined intervals when a communication path is available.

By comparison with the preceding embodiments which utilize the FTP protocol for transferring the data contents of a hypervideo message during message distribution, this embodiment has a slower speed of distribution. This is due to factors such as the time required to execute MIME encoding of the message contents, and also due to the low speed of data transfer of the Telnet protocol, i.e. the lower-level data transfer protocol on which the SMTP is based. Furthermore as mentioned above, whereas with FTP data transfer the data are conveyed directly in binary form, the Telnet protocol transfers the data as ASCII code. Such a method therefore presents problems with respect to transferring large amounts of data. However this embodiment does enable hypervideo message distribution to be accomplished within a wide-area network, in those cases where FTP data transfer is not possible.

Figure 97:
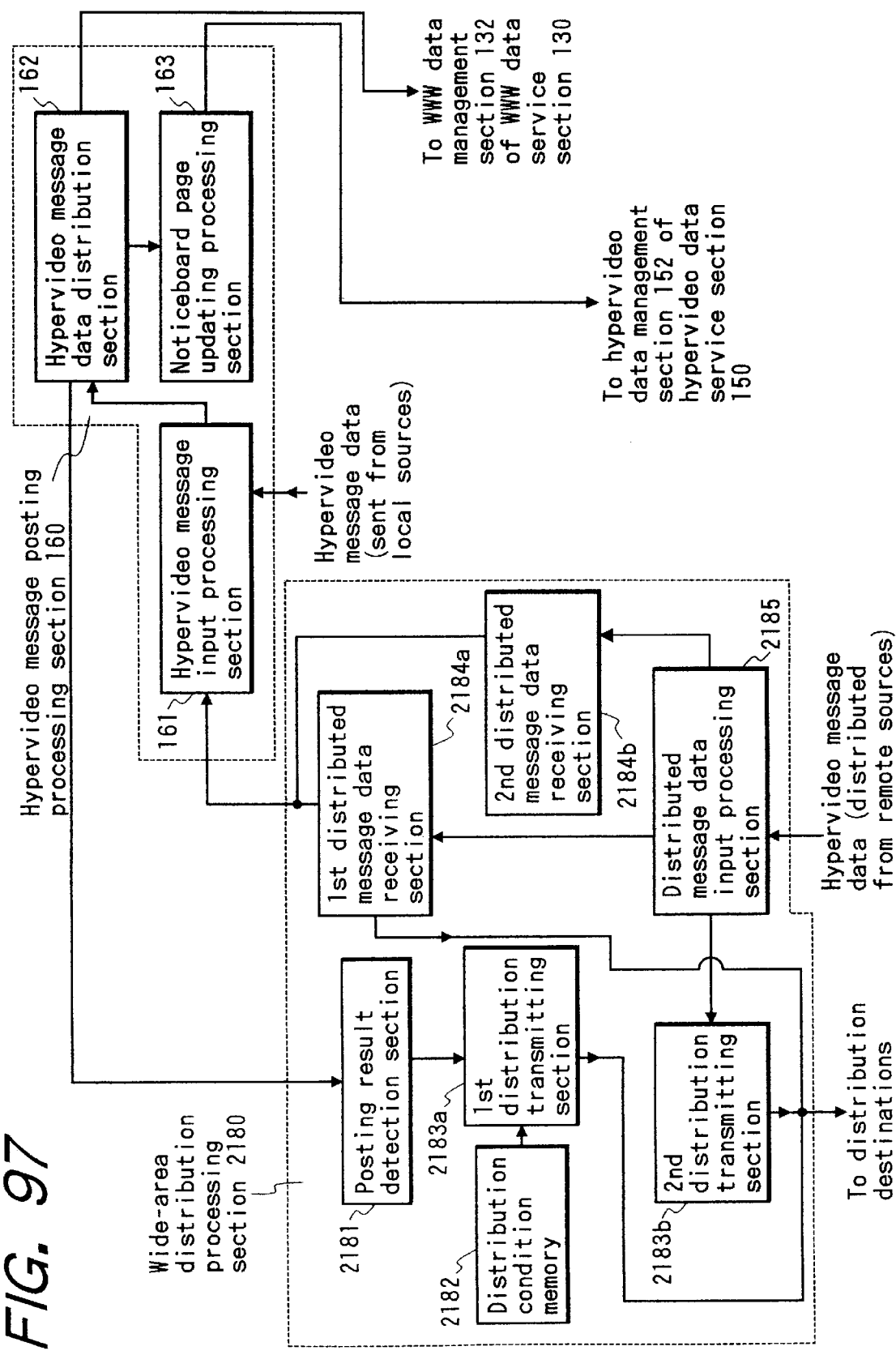
FIG. 97 is a partial system block diagram, showing the basic features of a twenty-fourth embodiment of the invention, which also is a data processing apparatus enabling hypervideo messages to be received from local sources, such as client terminals of a local area network, and posted on a specific notice board page, while in addition being distributed to specific remote destinations.

A twenty-fourth embodiment of the invention will be described in the following, which is again basically similar in functions and structure to the twentieth embodiment. The basic configuration of this embodiment differs from that of the twentieth embodiment (shown in FIG. 74) only with respect to the wide-area distribution processing section 2180, and for that reason only the internal configuration of the wide-area distribution processing section 2180 of this embodiment is shown in FIG. 97, in relation to the hypervideo message posting processing section 160. A server computer of a wide-area network in accordance with this embodiment preferably has the structure shown in FIG. 75, but with the configuration of the wide-area distribution processing section 2180 being as shown in FIG. 97. As shown in FIG. 97, the wide-area distribution processing section 2180 of this embodiment is formed of a posting result detection section 2181, a distribution condition memory 2182, a 1st distribution transmitting section 2183a, a 2nd distribution transmitting section 2183b, a 1st distributed message data receiving section 2184a, a 2nd distributed message data receiving section 2184b, and a 2185. The function of the posting result detection section 2181 is identical to that of the two preceding embodiments, i.e. to detect each execution of message posting processing by the hypervideo message posting processing section 160. The function of the distribution condition memory 2182 is also identical to that of the two preceding embodiments, i.e. to hold information specifying those server computers to which any messages that are posted to specific notice boards are to be distributed. The function of the 2183a is as follows. When message posting is executed by the hypervideo message posting processing section 160 so that the above-described detection result data are supplied to the 1st distribution transmitting section 2183a by the posting result detection section 2181, the distribution transmitting section 2183 obtains from the distribution condition memory 2182 the names of each server computer to which the newly posted message is to be distributed, then generates the aforementioned message updating information (e.g. as shown in FIG. 84) containing the notice board name and message theme information together with information ("list of stored files") indicating the storage locations (within the hypervideo data service section 150) of the actual data contents of the message, and transmits the message updating information (by SMTP transfer) to each of the distribution destination server computers.

With this embodiment, as described hereinafter, it is possible that it may be necessary to retransmit the contents of a message that is to be distributed, in MIME-encoded form. This MIME encoding and retransmission function is performed by the 2nd distribution transmitting section 2183b, i.e. by preparing a distribution file group containing all of the message data and then MIME-encoding that group as a single file, which is transferred by SMTP as described hereinabove.

The functions of the 1st message receiving section 2184a are as follows. In response to receving message updating information for a distributed hypervideo message, The 1st distributed message data receiving section 2184a executes processing to acquire the data of the distribution file group, from the distribution server computer, by FTP file transfer. If these files are successfully acquired, then the 1st distributed message data receiving section 2184a arranges the hypervideo message in the standard message format, using the notice board name and message theme information from the header file of the distribution file group, and using the data of the "list of stored files" as the message data contents. The 1st distributed message data receiving section 2184a then notifies the hypervideo message posting processing section 160 that this message is to be posted, and supplies the message to the hypervideo message posting processing section 160. However if the files of the distribution file group are not successfully acquired by using FTP transfer, then the 1st distributed message data receiving section 2184a generates a request which is transmitted (by SMTP) to the distribution server computer, to request that the message be encoded as a MIME file and retransmitted using the SMTP.

The 2nd distributed message data receiving section 2184b executes decoding of a message which is received in MIME-encoded form by SMTP transfer, and reconfigures the message in the standard hypervideo message format, then notifies the hypervideo message posting processing section 160 that this message is to be posted, and supplies the message data to the hypervideo message posting processing section 160.

The distribution message data input processing section 2185 receives data sent from other server computers of the wide-area network, and specifically judges whether message updating information of a distributed hypervideo message, a MIME-encoded distributed hypervideo message, or a request for retransmission of a hypervideo message has been received. If message updating information are received, then the distribution message data input processing section 2185 supplies the data to the 1st distributed message data receiving section 2184a. If a MIME-encoded hypervideo message is received then the data are supplied to the 2nd distributed message data receiving section 2184b. If a request for message retransmission is received, then the distribution message data input processing section 2185 notifies the 2nd distribution transmitting section 2183b that the message is to be encoded in MIME form and retransmitted by SMTP to the server computer which has sent the retransmission request.

Figures 98A, 98B:
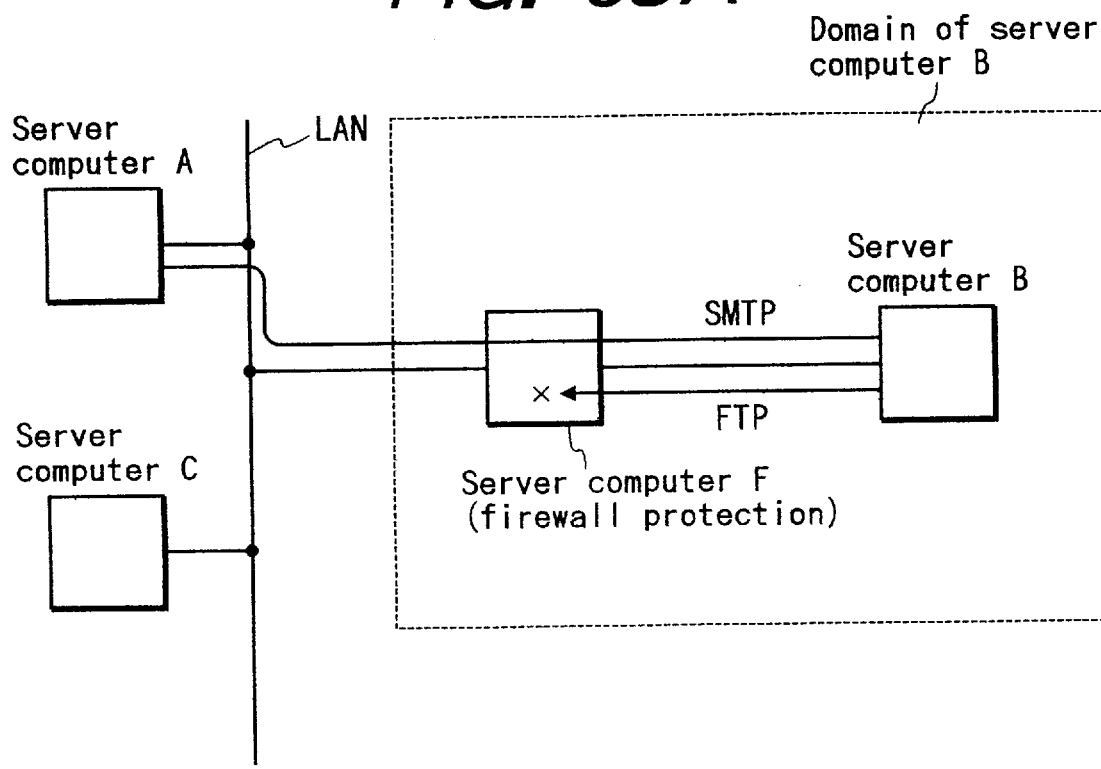
FIG. 98A is a simple system block diagram for illustrating a condition in which hypervideo message data cannot be transferred between sites of a wide-area network by using a file transfer protocol (FTP), due to use of a "firewall" protection feature.
FIG. 98B is a table showing an example of possiblities of using data communication protocols, corresponding to FIG. 98A.

Within a wide-area network, it is possible that there may be domains (i.e. regions of the wide-area network) defined with a "firewall protection" feature, such that direct transfer of stored files of one server computer from another server computer (e.g. by using the FTP protocol) is permitted within the domain, but with such direct file transfer being inhibited for server computers which are located outside the domain. That point has been mentioned hereinabove with respect to the embodiments relating to hypervideo mail, and is illustrated in FIGS. 98A, 98B. It will again be assumed that the server computers A, B and C correspond to those of the hypervideo message distribution example of FIG. 76 described hereinabove. In FIG. 98A, the server computer B is assumed to be located in a domain in which FTP data transfer via the network between server computer B and server computer F is possible, but with such data transfer between server computer A (located outside the domain of server computer B) not being possible, although transfer of MIME-encoded data using the SMTP protocol, from server computer A to server computer B is possible. That relationship is illustrated in the table of FIG. 98B.

Figures 99, 100:
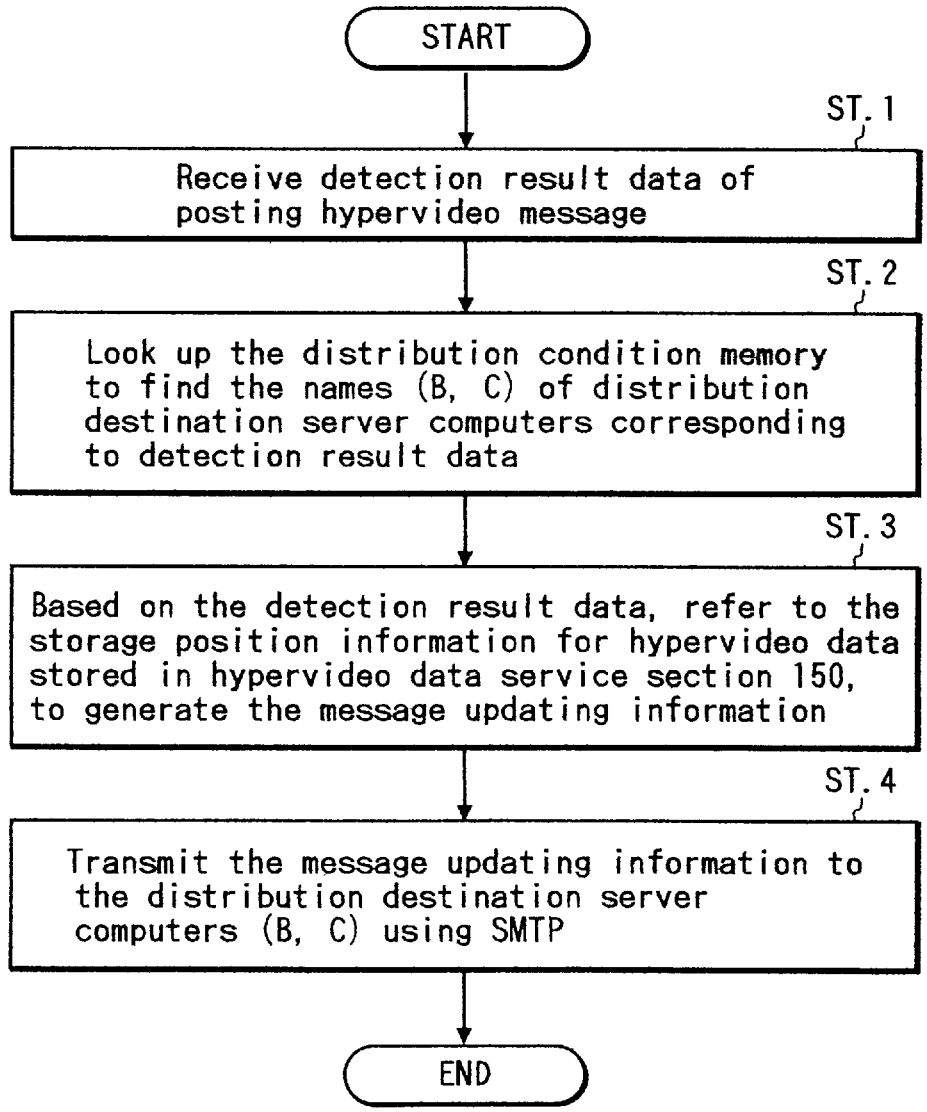
FIG. 99 shows an example of the format of retransmission request data, used with the twenty-fourth embodiment.
FIG. 100 is a flow diagram showing the basic operation sequence executed by the twenty-fourth embodiment, for hypervideo message distribution processing.

FIG. 99 shows the format of retransmission request data which are sent by the 2nd distribution transmitting section 2183b of a distribution server computer and are received by each of the destination server computers. The constituent parts of the such request data are as follows: "Request name": This part of the data specifies the nature of the request that is being made to a destination server computer.

"Server computer name": This identifies the server computer which is sending the request data.

"Notice board name": The name of the notice board of the message for which retransmission is being requested, i.e. the notice board of the hypervideo message whose files could not be transferred using FTP communication.

"Message theme": The "message theme" part of the message for which retransmission is being requested.

The basic operation sequence executed by this embodiment, for message distribution processing, will be described referring to the flow diagram of FIG. 100. This embodiment will be assumed again use the distribution example of FIG. 76, and the same format and contents for the detection result data (i.e. shown in FIG. 77) and for the distribution condition tables (as shown in FIGS. 78A, 78B, 78C) as described hereinabove, i.e. so that when a message is posted at server computer A, the message is to be distributed to each of the server computers B and C. FIG. 94 shows the processing sequence executed by the 1st distribution transmitting section 2183a of the wide-area distribution processing section 2180 of server computer A, for this embodiment. The sequence steps of FIG. 100 are as follows:

Step 1: The detection result data, is provided from the posting result detection section 2181 when the hypervideo message is posted, are received.

Step 2: The distribution condition memory 2182 is referred to, to find the names (B, C) of the distribution server computers corresponding to the notice board name ""New Products Guide"" which is specified in the detection result data.

Step 3: Based on the detection result data, the storage position information for hypervideo data stored in hypervideo data service section 150 is searched, to obtain the storage position information for the message scenario and subject matter data files, to be inserted in the message updating information, and the complete set of message updating information is prepared.

Step 4: The message updating information is transmitted to each of the server computers B, C, by using the SMTP.

Figure 101:
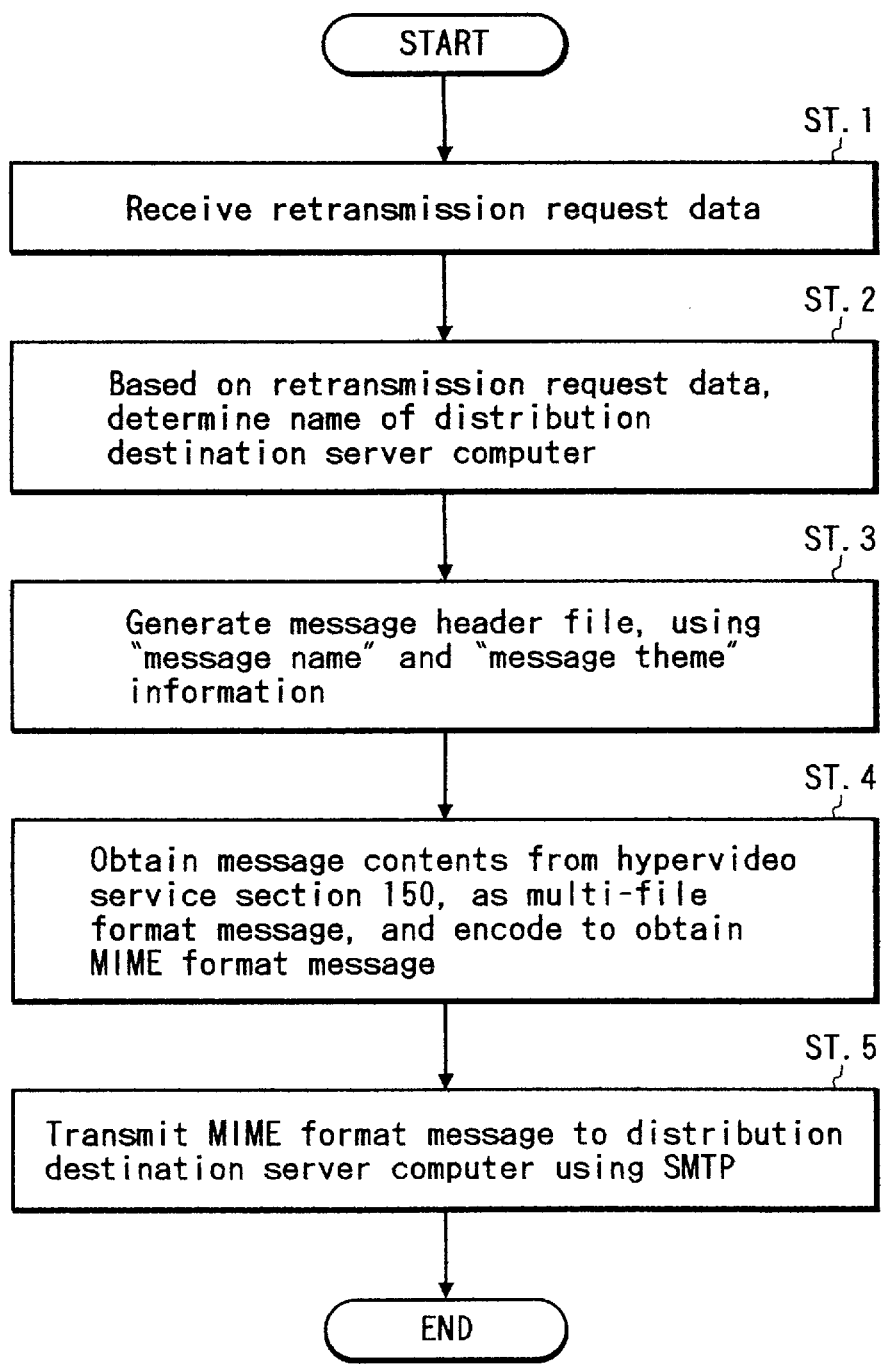
FIG. 101 is a flow diagram for illustrating a processing sequence executed by a 1st distribution transmitting section of the twenty-fourth embodiment.

The operation sequence of the 2183b is as shown in the flow diagram of FIG. 101, with the sequence steps being as follows (again for the case of the server computer A):

Step 1: Retransmission request data are received, e.g. from the server computer B.

Step 2: Based on the retransmission request data, the name of distribution destination server computer which is requesting retransmission is determined.

Step 3: The message header file is configured, using the "message name" and "message theme" information of the posted message.

Step 4: The message contents are obtained from the hypervideo data service section 150, as the contents of the scenario data file and the subject matter data files, and converted to a MIME-encoded message.

Step 5: The MIME format message is transmitted to the server computer B, using the SMTP.

Figure 102:
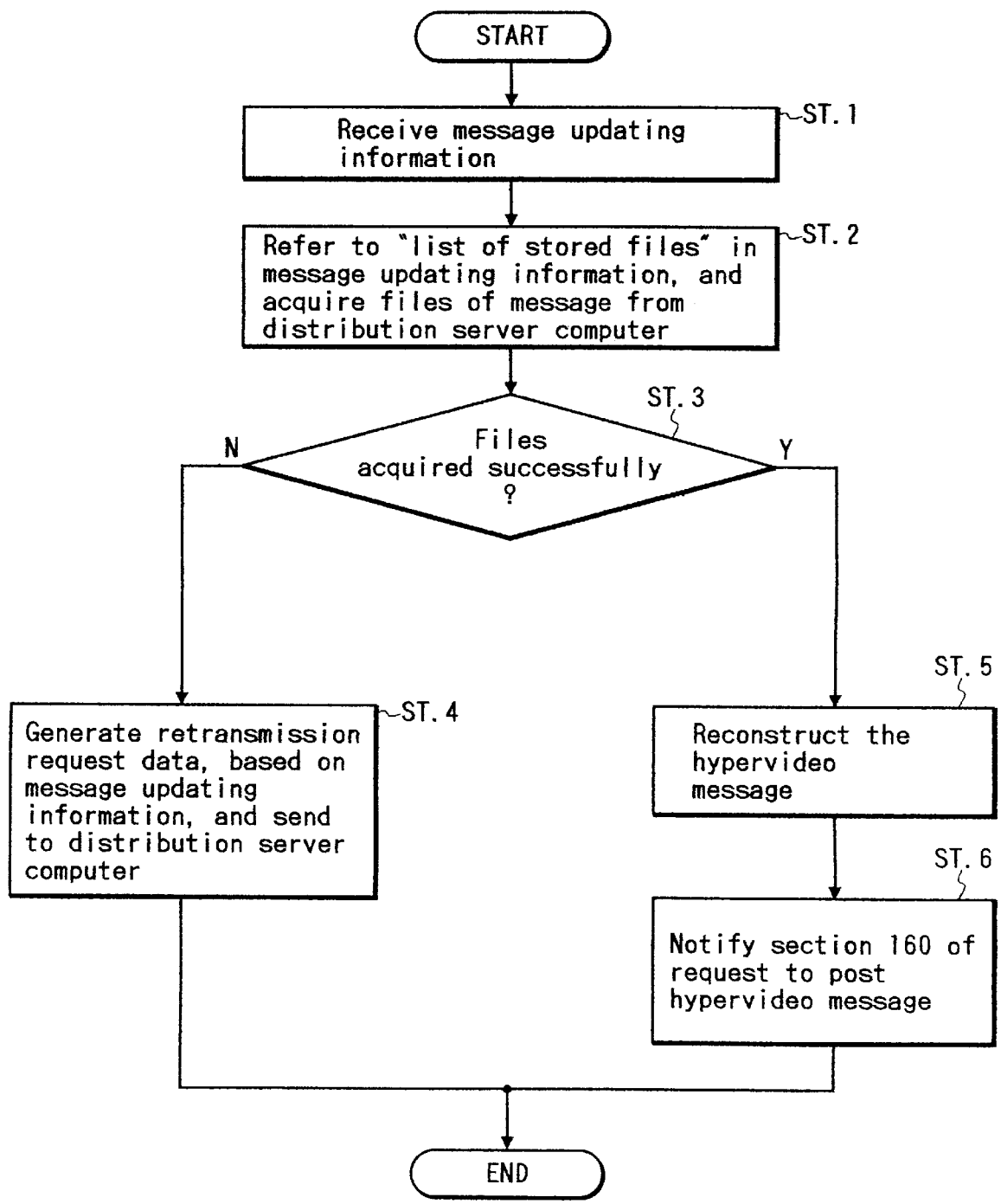
FIG. 102 is a flow diagram for illustrating a processing sequence executed by a 1st distributed message receiving section of the twenty-fourth embodiment.

FIG. 102 is a flow diagram which shows the operation sequence executed by the 1st distributed message data receiving section 2184a of this embodiment. The sequence steps are as follows, assuming that the 1st distributed message data receiving section 2184a is that of the server computer B in the example of FIG. 76:

Step 1: Message updating information are received.

Step 2: The "list of stored files" in the message updating information is examined, to obtain the file names and storage information (directory path) for the listed files, and the "get" command is executed, to attempt to acquire the data of these files from the distribution server computer A.

Step 3: If the files are not successfully acquired, then operation proceeds to step 4, otherwise operation proceeds to step 5.

Step 4: Retransmission request data are generated based on the contents of the message updating information, and sent to distribution server computer.

Step 5: The hypervideo message is reconstructed in standard format, using the data of the acquired files (scenario and subject matter data) as the "message contents" part, together with the "notice board name" and "message theme" information which were provided in the message updating information.

Step 6: Section 160 is requested to post the hypervideo message, and the message data are supplied to section 160.

Figure 103:
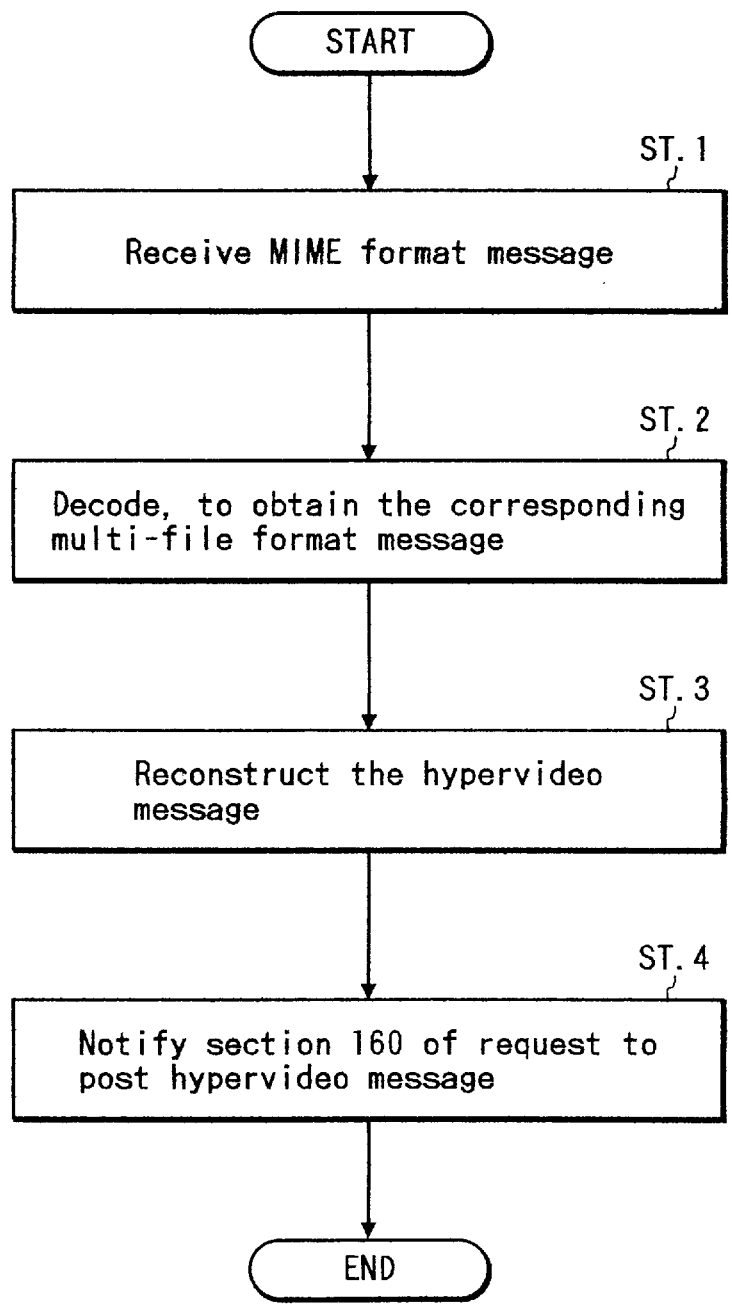
FIG. 103 is a flow diagram for illustrating a processing sequence executed by a 2nd distributed message receiving section of the twenty-fourth embodiment.

FIG. 103 is a flow diagram which shows the operation sequence executed by the 2nd distributed message data receiving section 2184b of this embodiment. The sequence steps are as follows, assuming that the 2nd distributed message data receiving section 2184b is that of the server computer B in the example of FIG. 76:

Step 1: A MIME-encoded hypervideo message is received.

Step 2: The message is decoded to obtain the corresponding multi-file format message.

Step 3: The message data are arranged in the standard hypervideo message format.

Step 4: Section 160 is requested to post the hypervideo message, and the message data are supplied to section 160.

Figure 104:
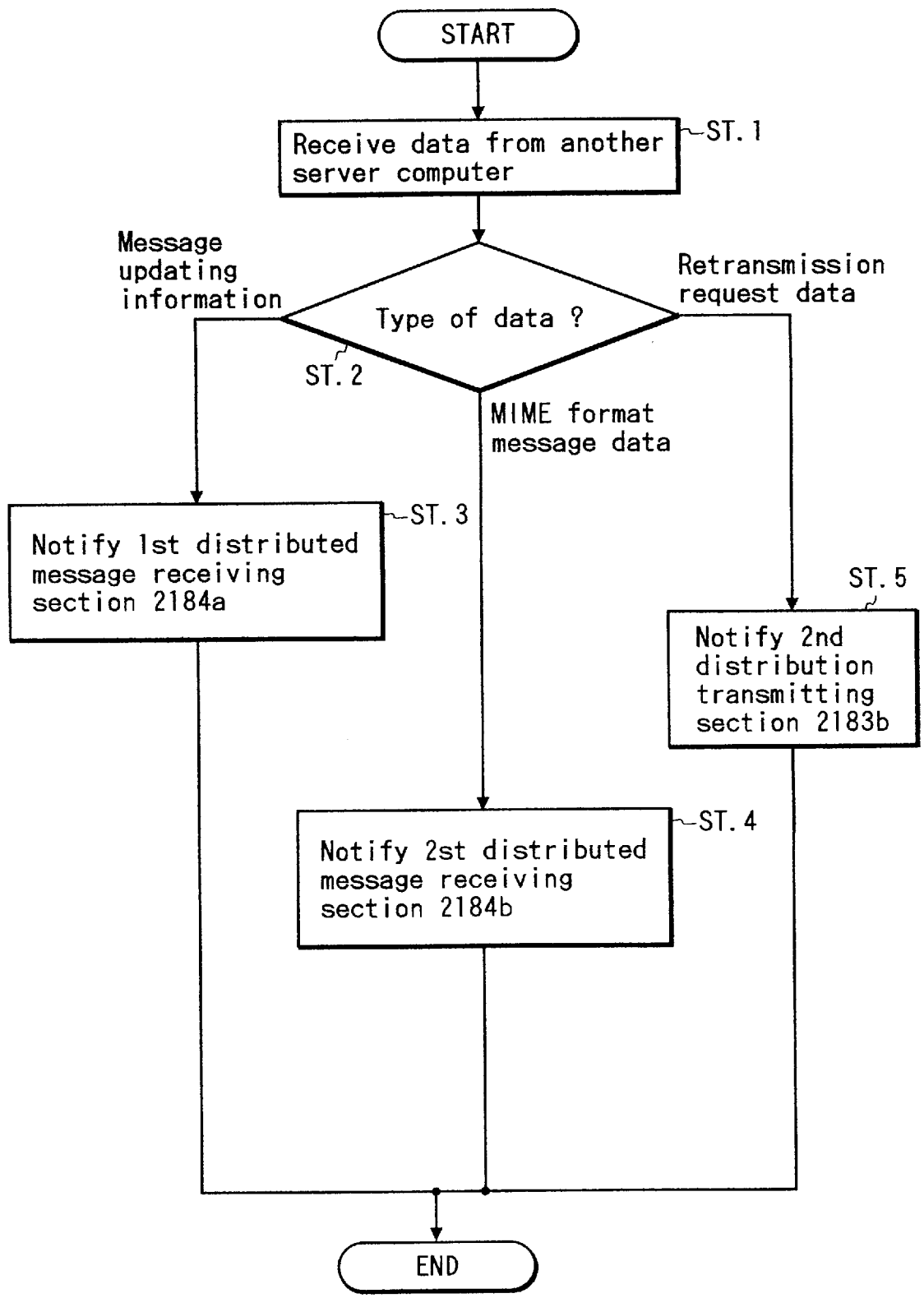
FIG. 104 is a flow diagram for illustrating a processing sequence executed by a distributed message data input processing section of the twenty-fourth embodiment.

FIG. 104 is a flow diagram which shows the operation sequence executed by the distribution message data input processing section 2185 of this embodiment. The sequence steps are as follows, assuming that the distribution message data input processing section 2185 is that of the server computer B in the example of FIG. 76:

Step 1: Data are received from another server computer of the wide-area network.

Step 2: Depending upon the type of data received, processing proceeds to step 3, 4 or 5.

Step 3: If the received data are message updating information, then that fact is notified to the 1st distributed message data receiving section 2184a, and the data are supplied thereto.

Step 4: If the received data are MIME-encoded (i.e. in electronic mail format) then that fact is notified to the 2nd distributed message data receiving section 2184b, and the data are supplied thereto.

Step 5: If the received data are "request for retransmission" data, then that fact is notified to the 2nd distribution transmitting section 2183b, and the data are supplied thereto.

FIG. 105 is a conceptual diagram for illustrating the synchronization relationships, for this embodiment, between respective processing operations which are executed by a server computer which posts and distributes a message and a server computer which then receives and posts that message, e.g. between the server computers A and B in the example of FIG. 76. As shown, when the distribution server computer (A) detects posting of a hypervideo messageg, it then generates message updating information for that message and transmits the message updating information, using the SMTP, to each of the specified destination server computers (e.g. server computer B). When a destination server computer receives the message updating information, it obtains the storage position information for the files containing the data contents of the message (from the message updating information, as described above) and uses FTP transfer to obtain the file contents, and can thereby post the message.

However if server computer B fails to acquire the file data by FTP transfer, then server computer B sends to server computer A, by SMTP, the message retransmission request data. After analyzing the message retransmission request data, server computer A encodes the message data in MIME format, and sends the data by SMTP to server computer B. The server computer B then recovers the original hypervideo message data from the MIME-encoded data, and executes processing to post the message.

It can thus be understood that this embodiment is applicable to a wide-area network within which high-speed transfer of file data of a hypervideo message between server computers, using the FTP, may be prohibited in some cases, whereas data transfer using a system which has been designed for electronic mail transmission (i.e. the SMTP) between server computers is always possible. With this embodiment, data transfer is executed as far as possible by using the most rapid method, i.e. FTP. However when an unsuccessful attempt at such data transfer, from a distribution server computer to one of the group of destination server computers (i.e. which correspond to the notice board name of the message) occurs, then that destination server computer requests the distribution server computer to retransmit the data of the hypervideo message in the form of a single MIME-encoded "electronic mail" item.

It will be apparent that various modifications of this embodiment could be envisaged. For example, although the embodiment has been described for the case of using only two different data transfer protocols (FTP direct transfer of binary data and SMTP transfer of MIME-encoded data), it may be possible to use three or more different types of data transfer protocol. Whichever is the case, the same principles as those described above would apply, i.e. it would first be attempted to transfer data using the fastest possible protocol, then, if unsuccessful, the next-fastest, and so on.

From the above description of embodiments of the invention, it will be understood that the invention provides great flexibility and convenience of use, together with ease of data management, in providing multimedia data to users of a data communication network in which users can search for and obtain desired data by a process of browsing through displayed hypertext pages while utilizing an input device such as a mouse, i.e. a network such as the Internet, or an "intranet" which is configured within a specific organization.

It will further be understood that although the invention has been described in the above based upon specific embodiments, the invention is not limited to these embodiments, and various modifications to the embodiments could be envisaged, which fall within the scope claimed for the invention in the appended claims.

What is claimed is:

1. An information provider apparatus comprising data input/output means including data input means (111) operable by a user for inputting operating commands, and data display means (112) for displaying a plurality of types of monomedia data including at least video data and text data, said operating commands being generated by hyperlink selection in accordance with a page of hypertext data which is currently being displayed by said data display means (112);

data storage means for storing hypertext data and data of at least one hypervideo clip, said hypervideo data clip data being formed of subject matter data and scenario data, said subject matter data comprising data of a plurality of monomedia data items which include a video clip that has been preassigned as a reference video clip of said hypervideo clip, said scenario data including information specifying times of starting playing of respective ones of said monomedia data items other than said reference video clip, said starting times being specified in terms of frame numbers of said reference video clip;

means responsive to said operating commands for reading out, from said data storage means, said scenario data and subject matter data of a hypervideo clip which is specified by said operating commands; and means for continuously supplying said reference video clip data of the specified hypervideo clip to said data display means (112) to be displayed thereby, as said reference video clip data are read out from said data storage means, and for maintaining a count of elapsed frame numbers of said reference video clip, selectively generating data transfer commands to acquire from said data storage means specific subject matter data of said specified hypervideo clip other than said reference video clip, at times determined in accordance with said said count of frame numbers in conjunction with said scenario data, and continuously supplying said specific subject matter data to said data data display means (112) as said specific subject matter data are read out from said data storage means, with video data of said subject matter data being transferred to said data display means (112) at a transmission rate which permits real-time transfer and continuous-motion display of the contents of said video data.

2. An information provider apparatus comprising first data service means (130) including first data storage means (131) having stored therein hypertext page data and monomedia data, said monomedia data including scenario reference data corresponding to respective hypervideo clips, said scenario reference data being connected by hyperlinks to said hypertext page data, said scenario reference data including storage location information for respective scenario data files of said hypervideo clips within second data storage means (151), said first data service means being responsive to externally supplied first data transfer commands for selectively reading out said hypertext page data and scenario reference data;

second data service means (150), including said second data storage means (151) having stored therein data constituting said hypervideo clips, responsive to second data transfer commands for selectively reading out said data, the data of a hypervideo clip consisting of a scenario data file and a plurality of subject matter data files for respective monomedia data items, said monomedia data items including a video clip which has been preassigned as a reference video clip, said scenario data including storage location information for said subject matter data files with respect to said second data storage means (151) and playing information including times of starting playing the contents of respective ones of said subject matter data files other than said reference video clip, said starting times being specified in terms of frame numbers of said reference video clip;

data input/output means (110) including input means (111) operable by a user for inputting operating commands and data display means (112) for playing a plurality of types of monomedia data including at least video data and text data, said operating commands being generated by hyperlink selection from a page of hypertext data which is currently being displayed by said data display means (112);

information browsing means (120) comprising information browsing control means (121), acquired data storage means (122) and hypervideo data playing means (124), said information browsing control means (121) being responsive to said operating commands for generating corresponding ones of said first data transfer commands to thereby acquire, from said first data service means (130) data of a specific one of said hypertext pages or scenario reference data for a specific one of said hypervideo clips, said acquired data storage means (122) storing said acquired hypertext page data and scenario reference data, with said hypertext page data being read out and supplied to said data display means (112), and said hypervideo data playing means (124) reading out said scenario reference data from said acquired data storage means (122) and using said scenario reference data to generate said second data transfer commands for thereby obtaining the scenario data data of said specific hypervideo clip from said second data service means (150), using said scenario data to further generate said second data transfer commands for thereby obtaining said reference video clip data of said specific hypervideo clip from said second data service means and continuously supplying said reference video clip data to said data display means (112), maintaining a count of elapsed frame numbers of said reference video clip, further generating said second data transfer commands to begin obtaining from said second data service means the contents of specific subject matter data files of said hypervideo clip at respective times determined in accordance with said said count of frame numbers in conjunction with said scenario data, and continuously supplying said contents to said data display means (112); and first data transfer means for transferring said first data transfer commands from said information browsing control means (121) to said first data service means (130) and for transferring resultant hypertext page data and scenario reference data to be stored in said acquired data storage means (122), and second data transfer means for transferring said second data transfer commands from said hypervideo data playing means (124) to said second data service means and for transferring resultant scenario data and subject matter data to said hypervideo data playing means (124), said second data transfer means executing said data transfer at a transmission rate permitting real-time transfer with continuous-motion display of the contents of video data portions of said subject matter data.

3. An information provider apparatus according to claim 2, comprising a data communication path (140) connecting said information browsing means (120) to said first data service means (130), said data communication path having a transmission bandwidth sufficiently wide to permit real-time data transfer of video data with continuous-motion display of the data contents, wherein said first data transfer means comprise a first data communication system (141) for transferring, via said data communication path (140), said first data transfer commands (140) to said first data service means (130) and resultant hypertext data and scenario reference data to be stored in said acquired data storage means (122), and a second data communication system (142) for transferring, via said data communication path (140), said second data transfer commands to said second data service means and resultant scenario data and subject matter data to said hypervideo data playing means (124).

4. An information provider apparatus according to claim 3, wherein said data input/output means 110 and information browsing means (120) in combination constitute a client terminal, and wherein said first data service means and second data service means in combination constitute a server computer for providing hypertext data and hypervideo data to said client terminal, said client terminal and server computer being mutually connected by said data communication path (140).

5. An information provider apparatus according to claim 4, comprising a plurality of said client terminals, each connected to said server computer by said data communication path (140) for mutually independently communicating with said server computer, said data communication path being configured as a network data communication path.

6. An information provider apparatus according to claim 3, wherein said data input/output means 110 and and information browsing means (120) in combination constitute a client terminal, wherein said first data service means constitutes a first server computer and second data service means constitutes a second server computer, said first and second server computers in combination providing hypertext data and hypervideo data to said client terminal, said client terminal and first and second server computers being mutually connected by said data communication path (140).

7. An information provider apparatus according to claim 6, comprising a plurality of said client terminals, each connected to said first and second server computers by said data communication path (140) for mutually independently communicating with said server computers, said data communication path being configured as a network data communication path.

8. An information provider apparatus according to claim 3, wherein said data input/output means 110 and information browsing means (120) in combination constitute a client terminal, wherein said second data service means comprises a discontinuous media data service means (150a) for storing and managing parts of said subject matter data which consist of discontinuous media data, and a continuous media data service means (150b) for storing and managing parts of said subject matter data which consist of continuous media data wherein said non-continuous media data service means (150a) in combination with said first data service means (130) constitutes a first server computer and said non-continuous media data service means (150a) constitutes a second server computer, said first and second server computers in combination providing hypertext data and hypervideo data to said client terminal, said client terminal and first and second server computers being mutually connected by said data communication path (140).

9. An information provider apparatus according to claim 8, comprising a plurality of said client terminals, each connected to said first and second server computers by said data communication path (140) for mutually independently communicating with said server computers, said data communication path being configured as a network data communication path.

10. An information provider apparatus according to claim 3, wherein said data input/output means 110 and information browsing means (120) in combination constitute a client terminal, said first data service means (130) constitutes a first server computer, and said second data service means comprises at least scenario data service means, constituting a second server computer, for storing and managing scenario data of hypervideo clips, video data service means, constituting a third server computer, for storing and managing video data of hypervideo clips, audio data service means, constituting a fourth server computer, for storing and managing audio data of hypervideo clips, still picture data service means, constituting a fifth server computer, for storing and managing still picture data of hypervideo clips, and text data service means, constituting a sixth server computer, for storing and managing text data of hypervideo clips;

said first, second third, fourth, fifth, and sixth server computers in combination providing hypertext data and hypervideo data to said client terminal, said client terminal and first, second third, fourth, fifth, and sixth server computers being mutually connected by said data communication path (140).

11. An information provider apparatus according to claim 10, comprising a plurality of said client terminals, each connected to said first, second third, fourth, fifth, and sixth server computers by said data communication path (140) for mutually independently communicating with said server computers, said data communication path being configured as a network data communication path.

12. An information provider apparatus according to claim 3, wherein said data input/output means 110, information browsing control means 120 and first data service means (130) in combination constitute a client terminal, and wherein said second data service means constitutes a server computer for providing hypervideo data to said client terminal, said client terminal and server computer being mutually connected by said data communication path (140).

13. An information provider apparatus according to claim 12, comprising a plurality of said client terminals, each connected to said server computer by said data communication path (140) for mutually independently communicating with said server computer, said data communication path being configured as a network data communication path, wherein said first data service means of each said client terminal holds stored, in said first data storage means thereof, scenario reference data or scenario data which are utilized solely by said client terminal.

14. An information provider apparatus according to claim 3, wherein said second data service means consists of a primary means (150$k$) and a secondary means (150$h$), wherein said data input/output means 110, information browsing control means 120 and secondary means (150$h$) of the second data service means in combination constitute a client terminal, and wherein said first data service means and said primary means (150$k$) of the second data service means in combination constitutes a server computer for providing hypertext data and hypervideo data to said client terminal, said client terminal and server computer being mutually connected by said data communication path (140).

15. An information provider apparatus according to claim 14, comprising a plurality of said client terminals, each connected to said server computer by said data communication path (140) for mutually independently communicating with said server computer, said data communication path being configured as a network data communication path, wherein said secondary means (150$h$, 150$i$, 150$j$) of said second data service means of each said client terminal holds stored, in said second data storage means thereof, subject matter data which are utilized solely by said client terminal, and in which said primary means of the second data service means holds stored, in said second data storage means thereof, subject matter data which are for use in common by said plurality of client terminals.

16. An information provider apparatus according to claim 3, wherein said second data service means consists of primary means (150$n$) and secondary means (150$m$), wherein said data input/output means 110, information browsing control means 120 and secondary means (150$m$) of the second data service means in combination constitute a client terminal, and wherein said first data service means (130$e$) and said primary means (150) of the second data service means in combination constitutes a server computer for providing hypertext data and hypervideo data to said client terminal, said second data storage means of said primary means (150$n$) of the second data service means holding master data, said second data storage means of said secondary means (150$m$) of the second data service means holding data obtained by copying at least a specific portion of said master data, said client terminal and server computer being mutually connected by said data communication path (140), further comprising switch means disposed within said data communication path, operable for selectively connecting said client terminal to said server computer to enable said master data to be transferred and copied by said client terminal.

17. An information provider apparatus according to claim 16, comprising a plurality of said client terminals, each connected to said server computer by said data communication path (140) through the intermediary of respective ones of said switch means for mutually independently communicating with said server computer, said data communication path being configured as a network data communication path.

18. An information provider apparatus according to claim 3, wherein said second data service means consists of a primary means (150$q$) and a secondary means (150$p$), wherein said data input/output means 110, information browsing control means 120, first data service means (130) and secondary means (150$p$) of the second data service means in combination constitute a client terminal, and wherein said said primary means (150$q$) of the second data service means constitutes a server computer for providing hypertext data and hypervideo data to said client terminal, said second data storage means of said primary means (150$q$) of the second data service means holding complete subject matter data of hypervideo data to be used by said client terminal, said second data storage means of said secondary means (150$p$) of the second data service means holding abstract portions of said complete subject matter data, said data communication path (140) being connected between said client terminal and said server computer, for connecting said primary means (150$q$) of the second data service means to said information browsing means (120), and said secondary means (150p) of the second data service means being connected to said information browsing means (120) by an internal circuit path within said client terminal.

19. An information provider apparatus according to claim 18, comprising a plurality of said client terminals, each connected to said server computer by said data communication path (140) for mutually independently communicating with said server computer, said data communication path (140) being configured as a network data communication path.

20. An information provider apparatus according to claim 3 further comprising hypervideo mail processing means (170) for processing hypervideo mail items each consisting of a hypervideo clip in combination with at least mail destination information, said hypertext data in said data storage means (131) further including hypervideo mail page data containing, for each of respective hypervideo mail items received by said hypervideo mail processing means, said mail destination information in conjunction with a hyperlink to the scenario reference data file of said mail item, said hypervideo mail processing means comprising:
temporary mail storage means,
mail processing means (170) for receiving externally supplied hypervideo mail items, extracting said destination information from an externally supplied hypervideo mail item, transferring the subject matter data and scenario data contents of said hypervideo mail item to said second data service means (150) to be stored in said second data storage means, and transferring resultant storage location information for said subject matter data and scenario data, in conjunction with said mail destination information, to said first data service means (130) for thereby generating a scenario reference file for said mail item and updating said hypervideo mail page data.

21. An information provider apparatus according to claim 20, wherein said hypervideo mail generating means (180), said data input/output means 110 and said information browsing means (120) in combination constitute a client terminal, and wherein said hypervideo mail processing means (170), first data service means (130) and second data service means (150) in combination constitute a mail server computer, said client terminal and mail server computer being mutually connected by said data communication path (140).

22. An information provider apparatus according to claim 21, comprising a plurality of said client terminals, each connected to said mail server computer by said data communication path (140) for mutually independently communicating with said mail server computer, said data communication path being configured as a network data communication path.

23. An information provider apparatus according to claim 22, wherein at least one of said client terminals comprises hypervideo mail generating means, operable for generating arbitrary hypervideo mail items.

24. An information provider apparatus according to claim 23, comprising a plurality of local area networks, each of said local area networks comprising a plurality of said client terminals and a mail server computer mutually connected by a network data communication path (140), and an inter-network data communication path (194) connecting said plurality of local area networks, wherein said mail server computer of a local area network executes dedicated storage of data of hypervideo mail items having as destinations any of said client terminals of said local area network, wherein each of said mail server computers further comprises destination enquiry management means (179) for providing information specifying respective hypervideo mail item storage dedication relationships between said mail server computers and client terminals, and wherein an originating client terminal functions, prior to sending a hypervideo mail item to a destination client terminal, to obtain from said destination management means of the mail server computer of said originating client terminal, the identity of the dedicated mail server computer of said destination client terminal, and to then transmit said hypervideo mail item to said dedicated mail server computer.

25. An information provider apparatus according to claim 23, comprising a plurality of local area networks, each of said local area networks comprising a plurality of said client terminals and a mail server computer mutually connected by a network data communication path (140), and an inter-network data communication path (194') for mutually connecting said local area networks, said inter-network data communication path (194') having a transmission bandwidth sufficiently wide to enable real-time transfer of video data with continuous-motion display, wherein said mail server computer of a local area network executes dedicated receiving and storage of all hypervideo mail items transmitted by the client terminals of said local area network, and wherein said mail processing means (190) of each of said mail server computers further comprises
table memory means for providing information specifying respective dedicated receiving and storage relationships between said client terminals and said mail server computers and means for
judging that a received hypervideo mail item has as its destination a client terminal which is not within the local area network of said each mail server computer,
transferring said hypervideo mail item to said second data service means (150) to be stored in said second data storage means (151),
generating a reference mail item including storage location information for said hypervideo mail item, and
transmitting said reference mail item to the mail server computer of the local area network containing said client terminal which is the destination of said hypervideo mail item.

26. An information provider apparatus according to claim 23, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, with said inter-server data communication path extending through a wide-area data communication network, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises
mail destination information memory means (196) providing information which specifies, for each of said client terminals, the mail server computer of the corresponding local area network, and
means (197, 198) for judging whether a hypervideo mail item received from a client terminal of said local area network of the mail server computer has as its destination a client terminal located within another one of said local area networks, and, if so, obtaining from said mail destination information memory means (196) the name of the mail server computer of the local area network of said destination client terminal, and transmitting said hypervideo mail item via said inter-server data communication path (1194) to said mail server computer.

27. An information provider apparatus according to claim 26, wherein said wide-area data communication network is the Internet.

28. An information provider apparatus according to claim 23, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, wherein in each of said mail server computers said hypervideo mail processing means (1195) is coupled to receive hypervideo mail items sent from other local area networks via said inter-server data communication path (1194) in addition to locally originated hypervideo mail items which are sent via said network data communication path (140) from client terminals of the local area network of said mail server computer, with said inter-server data communication path extending through a wide-area data communication network, and wherein said hypervideo mail processing means further comprises mail destination information memory means (196) providing information which specifies, for each of said client terminals, the mail server computer of the corresponding local area network, and means (1199, 1195a, 198) functioning, when a received locally originated hypervideo mail item is judged to have as its destination a client terminal within some other local area network, to supply said hypervideo mail item to said second data service means (150) to be stored in said second data storage means (151), to generate a reference mail item containing the destination information and storage location information for said hypervideo mail item, and to transmit said reference mail item via said inter-server data communication path (1194) to the mail server computer of said destination client terminal, functioning, when a reference mail item is received via said inter-server data communication path (1194), to update said mail page data held in said first data storage means (131) in accordance with the contents of said reference mail item, functioning, when said reference mail item is selected by a user from a client terminal, by hyperlink selection from said mail page data, to generate and transmit to the originating mail server computer of said reference mail item, via said inter-server data communication path (1194), a request for transmission of the hypervideo mail item corresponding to said reference mail item, and functioning, when said corresponding hypervideo mail item is received via said inter-server data communication path (1194), to supply said hypervideo mail item to said second data service means (150) to be stored in said second data storage means (151), and to update said mail page information held in said first data storage means (131) in accordance with destination information and storage location information for said hypervideo mail item.

29. An information provider apparatus according to claim 28, wherein said wide-area data communication network is the Internet.

30. An information provider apparatus according to claim 23, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, means (197, 198) for judging whether a hypervideo mail item received from a client terminal of said local area network of the mail server computer has as its destination a client terminal located within another one of said local area networks, and, if so, obtaining from said mail destination information memory means (196) the name of the mail server computer of the local area network of said destination client terminal, and means for encoding said hypervideo mail item in the form of an electronic mail item and for transmitting a resultant encoded hypervideo mail item via said inter-server data communication path (1194) to said mail server computer by using a data communication protocol which is designed for exchange of electronic mail items in a wide-area network;

and wherein each of said mail server computers further comprises decoding means for decoding each said encoded hypervideo mail item, when received from said inter-server data communication path.

31. An information provider apparatus according to claim 30, wherein each said data communication protocol is the Simple Mail Transfer Protocol (SMTP), and said encoding is executed using the Multipurpose Internet Mail Extensions code (MIME).

32. An information provider apparatus according to claim 23, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, with said inter-server data communication path extending through the Internet, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, means (197, 198) for judging whether a hypervideo mail item received from a client terminal of said local area network of the mail server computer has as its destination a client terminal located within another one of said local area networks, and, if so, obtaining from said mail destination information memory means (196) the name of the mail server computer of the local area network of said destination client terminal, means for generating a reference mail item specifying at least the name of the destination client terminal of said hypervideo mail item, and for transmitting said reference mail item via said inter-server data communication path (1194) to said mail server computer of the local area network of said destination client terminal, means responsive to receiving a reference mail item from said inter-server data communication path (1194) for generating a request for transmission in encoded form of the hypervideo mail item corresponding to said reference mail item, and for transmitting said request via said inter-server data communication path (1194) to an originating mail server computer of said received reference mail item, and means responsive to receiving a request for transmission of a hypervideo mail item in encoded form for encoding said hypervideo mail item in the form of an electronic mail item and for transmitting a resultant encoded hypervideo mail item via said inter-server data communication path (1194) to said mail server computer, using a data communication protocol which is designed for exchange of electronic mail in a wide-area network each of said mail server computers further comprising decoding means for decoding each said encoded hypervideo mail item, when received from said inter-server data communication path.

33. An information provider apparatus according to claim 32, wherein each said encoded hypervideo mail item is transmitted by utilizing the Simple Mail Transfer Protocol (SMTP), and said encoding is executed using the Multipurpose Internet Mail Extensions code (MIME).

34. An information provider apparatus according to claim 2, wherein said hypertext page data held in said first data storage means (131) include data of at least one page which is assigned as a notice board, said information provider apparatus further comprising hypervideo message posting processing means (160) for receiving externally supplied hypvervideo messages each formed of scenario data and subject matter data of a hypervideo clip in conjunction with information specifying a message theme and a name of a notice board page, each of said hypvervideo messages being configured in a predetermined format, said hypvervideo message posting processing means (160) including:

hypervideo message data distribution means (163) for supplying said subject matter data data and scenario data of a hypervideo message to said second data service means (151) to be stored as scenario data and subject matter data files in said second data storage means (151), and obtaining from said second data service means storage locating information for said message data contents, and notice board page updating processing means (163) for receiving from said hypervideo message data distribution means (162) said notice board name information and message theme information and said storage location information for said hypervideo message data contents, and for supplying said storage location information and message theme information to said first data service means to thereby update a notice board page which is specified by said notice board name information, by inserting said message theme information into said notice board page with said message theme information having a hyperlink connection to said scenario data and subject matter data files.

35. An information provider apparatus according to claim 34, wherein said hypervideo mail generating means (180), said data input/output means 110 and said information browsing means (120) in combination constitute a client terminal, and wherein said hypervideo mail processing means (170), first data service means (130), second data service means (150) and hypervideo message posting processing means (160) in combination constitute a server computer, said client terminal and server computer being mutually connected by said data communication path (140).

36. An information provider apparatus according to claim 35, comprising a plurality of said client terminals each connected to said server computer by said data communication path (140) for mutually independently communicating with said server computer, with at least one of said client terminals comprising hypvervideo message generating means controllable for generating arbitrary hypvervideo messages and sending said hypvervideo messages to said server computer via said data communication path (140) to said local area network, said data communication path being configured as a network data communication path.

37. An information provider apparatus according to claim 36 comprising a wide-area network having a plurality of local area networks, each comprising a plurality of said client terminals and a server computer mutually connected by a network data communication path (140), and an inter-network data communication path (1194) interconnecting respective server computers of said local area networks, wherein said client terminals of a local area network transmit hypvervideo messages only to the server computer of said local area network, each of said server computers further including wide-area distribution processing means (2180), said wide-area distribution processing means (2180) comprising:

means responsive to posting of a hypervideo message by said server computer for distributing said hypervideo message, via said inter-server data communication path (1194), to each of a predetermined set of other server computers of said wide-area network, and means responsive to receiving, via said inter-network data communication path (1194), a distributed hypervideo message, for executing processing to post said distributed hypervideo message in a notice board page which is specified by said notice board name information of said hypervideo message.

38. An information provider apparatus according to claim 37, wherein said wide-area distribution processing means (2180) of a server computer comprises:

distribution memory means (2182) having stored therein information specifying, for each of respective notice board pages assigned in said first data service means (130) of said server computer, respective names of other server computers to which are predetermined as distribution destination server computers for said notice board page;

message posting detection means (2181) coupled to said hypervideo message posting processing means (160), responsive to execution of processing to post a hypervideo message by said hypervideo message posting processing means (160) for generating detection result data corresponding to said hypervideo message, said detection result data specifying at least information specifying the message theme of said hypervideo message and a name of a notice board page on which said hypervideo message was posted;

distribution transmitting means (2183) coupled to receive said detection result data from said message posting detection means (2181), for obtaining from said distribution condition memory (2182) respective names of said distribution destination server computers corresponding to said notice board page, and for transmitting said hypervideo message to each of said distribution destination server computers, via said inter-server data communication path (1194), and distributed message data receiving means (2184) for receiving distributed hypervideo messages transmitted thereto via said inter-server data communication path (1194) for configuring each said distributed hypervideo message in said predetermined format and supplying said distributed hypervideo message to said hypervideo message posting processing means (160).

39. An information provider apparatus according to claim 38, wherein said distribution transmitting means (2183) comprises means for executing transmission of a hypervideo message to a distribution destination server computer via said inter-server data communication path (1194) by:

creating a header file containing said notice board name information and message theme information of said hypervideo message, obtaining from said second data service means (150) the scenario data file and subject matter data files of said hypervideo message, transmitting the data contents of each of said header file, scenario data file and subject matter data files to said distribution destination server computer via said inter-server data communication path (1194) by direct data transfer, using a wide-area network file transfer protocol (FTP), and wherein said distributed message data receiving means (2184) comprises means for processing the data of a hypervideo message received via said inter-server data communication path (1194) by:

obtaining from said header file said notice board name information and message theme information, and combining said notice board name and message theme information with the data contents of said scenario data file and subject matter data files to configure said hypervideo message in said predetermined format, and supplying a resultant hypervideo message to said hypervideo message posting processing means (160).

40. An information provider apparatus according to claim 38, wherein said distribution transmitting means (2183) comprises means for executing transmission of a hypervideo message by a server computer via said inter-network data communication path (1194) by:

obtaining storage position information for said scenario data and subject matter data files of said hypervideo message, with respect to said second data service means (150), to generate message updating information containing said storage position information together with said notice board name information and message theme information, and transmitting said message updating information via said inter-server data communication path (1194) to said distribution destination server computer;

and wherein said distributed message data receiving means (2184) comprises means for processing said message updating information of a hypervideo message, received via said inter-server data communication path (1194), by:

obtaining from said message updating information said storage position information which is contained therein;

obtaining the data contents of said scenario data file and subject matter data files of said hypervideo message by direct data transfer via said inter-server data communication path (1194) using a wide-area network file transfer protocol (FTP), from a server computer which originated said message updating information, obtaining, from said message updating information, said notice board name information and message theme information which are contained therein, and combining said notice board name and message theme information with the data contents of said scenario data file and subject matter data files to configure said hypervideo message in said predetermined format, and supplying a resultant hypervideo message to said hypervideo message posting processing means (160).

41. An information provider apparatus according to claim 40, wherein each of said server computers comprises temporary data storage means for holding said message updating information, when said message updating information are received via said inter-server data communication path (1194), wherein said means for processing said message updating information by said distributed message data receiving means (2184) performs said processing by executing a specific program, and wherein said each server computer further comprises:

scheduling memory means (2191) for storing schedule data which specify scheduled times of execution of at least said specific program;

scheduling execution means (2192) coupled to said distributed message data receiving means (2184), for controlling said distributed message data receiving means (2184) to initiate said processing of message updating information which is held in said temporary data storage means, at a time determined by said schedule data.

42. An information provider apparatus according to claim 38, wherein said distribution transmitting means (2183) comprises:

means for encoding said hypervideo message corresponding to said detection result data, to obtain an encoded hypervideo message having the form of an electronic mail item, by creating a header file containing said notice board name and message theme information from said detection result data, and encoding said header file together with the scenario data and subject matter data files of the hypervideo message corresponding to said detection result data, and means for transmitting said encoded hypervideo message to each of said distribution destination server computers via said inter-server data communication path (1194) by using an electronic mail transfer communication protocol which is designed for transfer of electronic mail items within a wide-area network, and wherein said distributed message data receiving means (2184) comprises means for decoding an encoded hypervideo message which is received via said inter-network data communication path (1194), to obtain said header file, scenario data file and subject matter data files, for configuring the data of said header file, scenario data file and subject matter data files in said predetermined format, and supplying a resultant hypervideo message to said hypervideo message posting processing means (160).

43. An information provider apparatus according to claim 42, wherein said encoding is Multi-purpose Internet Mail Extensions (MIME) encoding, and wherein said electronic mail transfer communication protocol is the Simple Mail Transfer Protocol (SMTP).

44. An information provider apparatus according to claim 37, wherein said distribution transmitting means (2183) is formed of a 1st distribution transmitting means (2183a) and a 2nd distribution transmitting means (2183b), and said distributed message data receiving means (2184) is formed of a 1st distributed message data receiving means (2184a) and a 2nd distributed message data receiving means (2184b), said 1st distribution transmitting means (2183a) comprising means for obtaining storage position information for said scenario data and subject matter data files of said hypervideo message, with respect to said second data service means (150), to generate message updating information containing said storage position information together with said notice board name information and message theme information which are conveyed by said detection result data, and means for transmitting said message updating information via said inter-server data communication path (1194) to each said distribution destination server computer, said 1st distributed message data receiving means (2184a) comprising means for processing said message updating information of a hypervideo message, received via said inter-server data communication path (1194), by obtaining from said message updating information said storage position information which is contained therein, obtaining the data contents of said scenario data file and subject matter data files of said hypervideo message by direct data transfer via said inter-server data communication path (1194) from a server computer which originated said message updating information, using a wide-area network file transfer protocol (FTP), configuring the notice board name information and message theme information from said message updating information together with the contents of said scenario data file and subject matter data files in said predetermined format, and supplying a resultant hypervideo message to said hypervideo message posting processing means (160), and comprising means, functioning in the event of a failure to obtain said data contents of said scenario data file and subject matter data files of said hypervideo message by direct data transfer, for sending to said originating server computer via said inter-server data communication path (1194) a request for retransmission of said hypervideo message, encoded in the form of an electronic mail item;

said 2nd distribution transmitting means (2183b) comprising means functioning in response to receiving via said inter-server data communication path (1194) a request for retransmission of a hypervideo message which has been transmitted by said 1st distribution transmitting means (2183a), for creating a header file containing said notice board name and message theme information from the detection result data of said hypervideo message, encoding said header file together with the scenario data and subject matter data files of said hypervideo message, as an encoded hypervideo message in the form of an electronic mail item, and transmitting said encoded hypervideo message via said inter-server data communication path (1194) using an electronic mail transfer communication protocol which is designed for transfer of electronic mail items within a wide-area network, to a distribution destination server computer which originated said request for retransmission, said 2nd distributed message data receiving means (2184b) comprising means for decoding an encoded hypervideo message which is received via said inter-network data communication path (1194), to obtain said header file, scenario data file and subject matter data files, for configuring the data of said header file, scenario data file and subject matter data files in said predetermined format, and supplying a resultant hypervideo message to said hypervideo message posting processing means (160), and distributed message data input processing means (2185) coupled to receive data transmitted via said intra-network data communication path (1194), for notifying said 1st distributed message data receiving means (2184a) when said received data consist of message updating information and for supplying said message updating information to said 1st distributed message data receiving means (2184a), for notifying said 2nd distributed message data receiving means (2184b) when said received data consist of a distributed hypervideo message encoded as an electronic mail item and for supplying said encoded hypervideo message to said 2nd distributed message data receiving means (2184b), and for notifying said 2nd distribution transmitting means (2183b) when said received data consist of a request for retransmission of a hypervideo message and for supplying said request to said 2nd distribution transmitting means (2183b).

45. An information provider apparatus comprising first data service means (130) including first data storage means (131) having stored therein hypertext page data and monomedia data files, said monomedia data files including files containing scenario data for respective hypervideo clips, said scenario data files being connected by hyperlinks to said hypertext page data, said first data service means being responsive to externally supplied first data transfer commands for selectively reading out said hypertext page data and scenario data files;

second data service means (150), including second data storage means (151) having stored therein subject matter data of said hypervideo clips, with the subject matter data of a hypervideo clip consisting of a plurality of monomedia data items configured respective subject matter data files, said monomedia data items including a video clip which has been preassigned as a reference video clip, said scenario data of a hypervideo clip including information specifying times of starting playing of respective ones of said monomedia data items other than said reference video clip, said starting times being specified in terms of frame numbers of said reference video clip;

data input/output means including input means (111) operable by a user for inputting operating commands and data data display means (112) for playing a plurality of types of monomedia data, including at least video data and text data, said operating commands being generated by hyperlink selection in accordance with a page of hypertext data which is currently being displayed by said data display means (112);

information browsing means (120) comprising information browsing control means (121), acquired data storage means (122) and hypervideo data playing means (124), said information browsing control means (121) being responsive to said operating commands for generating corresponding ones of said first data transfer commands to thereby acquire, from said first data service means (130), data of a specific one of said hypertext pages or scenario data for a specific one of said hypervideo clips, said acquired data storage means (122) storing said acquired hypertext data or scenario data, said hypertext data being read out and supplied to said data display means (112);

said hypervideo data playing means (124) comprising means for reading out said scenario data from said acquired data storage means (122), using said scenario data to generate said second data transfer commands for thereby obtaining said reference video clip data of said specific hypervideo clip from said second data service means (150) and continuously supplying said reference video clip data to said data display means (112), maintaining a count of elapsed frame numbers of said reference video clip, further generating said second data transfer commands to begin obtaining from said second data service means the contents of specific subject matter data files of said specific hypervideo clip at times determined in accordance with said count of frame numbers in conjunction with said scenario data, and continuously supplying said specific subject matter data file contents to said data display means (112); and first data transfer means for transferring said first data transfer commands from said information browsing control means (121) to said first data service means (130) and for transferring resultant hypertext data and scenario data to be stored in said acquired data storage means (122), and second data transfer means for transferring said second data transfer commands from said hypervideo data playing means (124) to said second data service means and for transferring resultant hypervideo subject matter data to said hypervideo data playing means (124), said second data transfer means executing said data transfer at a transmission rate permitting real-time transfer with continuous-motion display of the contents of video data portions of said subject matter data.

46. An information provider apparatus according to claim 45, comprising a data communication path (140) connecting said information browsing means (120) to said first data service means (130), wherein said first data transfer means comprise a first data communication system (141) for transferring, via said data communication path (140), said first data transfer commands (140) to said first data service means (130) and resultant hypertext page data and scenario data to be stored in said acquired data storage means (122), and a second data communication system (142) for transferring, via said data communication path (140), said second data transfer commands to said second data service means and resultant subject matter data to said hypervideo data playing means (124).

47. An information provider apparatus according to claim 46, further comprising hypervideo mail processing means (170) for processing hypervideo mail items each consisting of a hypervideo clip in combination with at least mail destination information, said hypertext data in said data storage means (131) further including hypervideo mail page data containing, for each of respective hypervideo mail items received by said hypervideo mail processing means, said mail destination information in conjunction with a hyperlink to the scenario data file of said mail item, said hypervideo mail processing means comprising:

temporary mail storage means, mail processing means (170) for receiving externally supplied hypervideo mail items, extracting said destination information from an externally supplied hypervideo mail item, transferring the subject matter data contents of said hypervideo mail item to said second data service means (150) to be stored in said second data storage means (151), and transferring the scenario data contents of said hypervideo mail item to said first data service means (130) to be stored in said first data storage means (131), with said hypervideo mail page data being updated accordingly.

48. An information provider apparatus according to claim 47, wherein hypervideo mail generating means (180), said data input/output means 110 and said information browsing means (120) in combination constitute a client terminal, and wherein said hypervideo mail processing means (170), first data service means (130) and second data service means (150) in combination constitute a mail server computer, said client terminal and mail server computer being mutually connected by said data communication path (140).

49. An information provider apparatus according to claim 48, comprising a plurality of said client terminals, each connected to said mail server computer by said data communication path (140) for mutually independently communicating with said mail server computer, said data communication path being configured as a network data communication path.

50. An information provider apparatus according to claim 49, comprising a plurality of local area networks, each of said local area networks comprising a plurality of said client terminals and a mail server computer mutually connected by a network data communication path (140), and an inter-network data communication path (194) connecting said plurality of local area networks, wherein said mail server computer of a local area network executes dedicated storage of data of hypervideo mail items having as destinations any of said client terminals of said local area network, wherein each of said mail server computers further comprises destination enquiry management means (179) for providing information specifying respective hypervideo mail item storage dedication relationships between said mail server computers and client terminals, and wherein an originating client terminal functions, prior to sending a hypervideo mail item to a destination client terminal, to obtain from said destination management means of the mail server computer of said originating client terminal, the identity of the dedicated mail server computer of said destination client terminal, and to then transmit said hypervideo mail item to said dedicated mail server computer.

51. An information provider apparatus according to claim 49, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, wherein in each of said mail server computers said hypervideo mail processing means (1195) is coupled to receive hypervideo mail items sent from other local area networks via said inter-server data communication path (1194) in addition to locally originated hypervideo mail items which are sent via said network data communication path (140) from client terminals of the local area network of said mail server computer, with said inter-server data communication path extending through a wide-area data communication network, and wherein said hypervideo mail processing means further comprises mail destination information memory means (196) providing information which specifies, for each of said client terminals, the mail server computer of the corresponding local area network, and means (1199, 1195a, 198) functioning, when a received locally originated hypervideo mail item is judged to have as its destination a client terminal within some other local area network, to supply said hypervideo mail item to said second data service means (150) to be stored in said second data storage means (151), to generate a reference mail item containing the destination information and storage location information for said hypervideo mail item, and to transmit said reference mail item via said inter-server data communication path (1194) to the mail server computer of said destination client terminal, functioning, when a reference mail item is received via said inter-server data communication path (1194), to update said mail page data held in said first data storage means (131) in accordance with the contents of said reference mail item, functioning, when said reference mail item is selected by a user from a client terminal, by hyperlink selection from said mail page data, to generate and transmit to the originating mail server computer of said reference mail item, via said inter-server data communication path (1194), a request for transmission of the hypervideo mail item corresponding to said reference mail item, and functioning, when said corresponding hypervideo mail item is received via said inter-server data communication path (1194), to supply said hypervideo mail item to said second data service means (150) to be stored in said second data storage means (151), and to update said mail page information held in said first data storage means (131) in accordance with destination information and storage location information for said hypervideo mail item.

52. An information provider apparatus according to claim 51, wherein said wide-area data communication network is the Internet.

53. An information provider apparatus according to claim 49, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, means (197, 198) for judging whether a hypervideo mail item received from a client terminal of said local area network of the mail server computer has as its destination a client terminal located within another one of said local area networks, and, if so, obtaining from said mail destination information memory means (196) the name of the mail server computer of the local area network of said destination client terminal, and means for encoding said hypervideo mail item in the form of an electronic mail item and for transmitting a resultant encoded hypervideo mail item via said inter-server data communication path (1194) to said mail server computer;

and wherein each of said mail server computers further comprises decoding means for decoding each said encoded hypervideo mail item, when received from said inter-server data communication path.

54. An information provider apparatus according to claim 53, wherein each said encoded hypervideo mail item is transmitted by utilizing the Simple Mail Transfer Protocol (SMTP), and said encoding is executed using the Multipurpose Internet Mail Extensions code (MIME).

55. An information provider apparatus according to claim 49, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, means (197, 198) for judging whether a hypervideo mail item received from a client terminal of said local area network of the mail server computer has as its destination a client terminal located within another one of said local area networks, and, if so, obtaining from said mail destination information memory means (196) the name of the mail server computer of the local area network of said destination client terminal, means for generating a reference mail item specifying at least the name of the destination client terminal of said hypervideo mail item, and for transmitting said reference mail item via said inter-server data communication path (1194) to said mail server computer of the local area network of said destination client terminal, means responsive to receiving a reference mail item from said inter-server data communication path (1194) for generating a request for transmission in encoded form of the hypervideo mail item corresponding to said reference mail item, and for transmitting said request via said inter-server data communication path (1194) to an originating mail server computer of said received reference mail item, and means responsive to receiving a request for transmission of a hypervideo mail item in encoded form for encoding said hypervideo mail item in the form of an electronic mail item and for transmitting a resultant encoded hypervideo mail item via said inter-server data communication path (1194) to said mail server computer by using a data communication protocol which is designed for exchange of electronic mail in a wide-area network;

each of said mail server computers further comprising decoding means for decoding each said encoded hypervideo mail item, when received from said inter-server data communication path.

56. An information provider apparatus according to claim 55, wherein each said encoded hypervideo mail item is transmitted by utilizing the Simple Mail Transfer Protocol (SMTP), and said encoding is executed using the Multipurpose Internet Mail Extensions code (MIME).

57. An information provider apparatus according to claim 49, comprising a plurality of local area networks, each of said local area networks comprising a plurality of said client terminals and a mail server computer mutually connected by a network data communication path (140), and an inter-network data communication path (194') for mutually connecting said local area networks, said inter-network data communication path (194') having a transmission bandwidth sufficiently wide to enable real-time transfer of video data with continuous-motion display, wherein said mail server computer of a local area network executes dedicated receiving and storage of all hypervideo mail items transmitted by the client terminals of said local area network, and wherein said mail processing means (190) of each of said mail server computers further comprises table memory means for providing information specifying respective dedicated receiving and storage relationships between said client terminals and said mail server computers and means for judging that a received hypervideo mail item has as its destination a client terminal which is not within the local area network of said each mail server computer, transferring said hypervideo mail item to said second data service means (150) to be stored in said second data storage means (151), generating a reference mail item including storage location information for said hypervideo mail item, and transmitting said reference mail item to the mail server computer of the local area network containing said client terminal which is the destination of said hypervideo mail item.

58. An information provider apparatus according to claim 49, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, with said inter-server data communication path extending through a wide-area data communication network, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, and means (197, 198) for judging whether a hypervideo mail item received from a client terminal of said local area network of the mail server computer has as its destination a client terminal located within another one of said local area networks, and, if so, obtaining from said mail destination information memory means (196) the mail server computer of the local area network of said destination client terminal, and transmitting said hypervideo mail item via said inter-server data communication path (1194) to said mail server computer.

59. An information provider apparatus according to claim 49, wherein said wide-area data communication network is the Internet.

60. An information provider apparatus comprising data service means (130) including first data storage means (131) having stored therein hypertext page data and monomedia data, said monomedia data including title data sets for each of respective hypervideo clips, each said title data set being connected by a hyperlink to said hypertext page data, each said title data set consisting of a file of scenario data and a plurality of subject matter data files for respective monomedia data items, said monomedia data items including a video clip which has been preassigned as a reference video clip, said scenario data including information specifying times of starting playing of contents respective ones of said subject matter data files other than that of said reference video clip, said starting times being specified in terms of frame numbers of said reference video clip, said data service means being responsive to externally supplied data transfer commands for selectively reading out respective ones of said title data sets and hypertext data pages;

data input/output means including input means (111) operable by a user for inputting operating commands and data data display means (112) for playing a plurality of types of monomedia data, including at least video data and text data, said operating commands being generated by hyperlink selection in accordance with a page of hypertext data which is currently being displayed by said data display means (112);

information browsing means (120) comprising information browsing control means (121), acquired data storage means (122) and hypervideo data playing means (124), said information browsing control means (121) being responsive to said operating commands for generating corresponding data transfer commands, to acquire an updated hypertext data page or a specific title data set from said data service means (130), said acquired data storage means (122) storing said acquired hypertext data page or title data set, said hypertext data being read out and supplied to said data display means (112), and said hypervideo data playing means (124) reading out said scenario data and data of said reference video clip of the specific title data set from said acquired data storage means (122) and continuously supplying said reference video clip data to said data display means (112), maintaining a count of elapsed frame numbers of said reference video clip, further reading out, from said acquired data storage means (122), specific subject matter data files of said specific title data set at times determined in accordance with said count of frame numbers in conjunction with said scenario data, and for continuously supplying said subject matter data file contents to said data display means (112), with video data portions of said specific subject matter data being being supplied to said data display means (112) at a transmission rate permitting real-time transfer with continuous-motion display; and data transfer means for transferring said data transfer commands from said information browsing control means (121) to said data service means (130) and for transferring resultant contents of a title data set to be stored in said acquired data storage means (122).

61. An information provider apparatus according to claim 60, comprising a data communication path (140) connecting said information browsing means (120) to said first data service means (130), wherein said data transfer means comprises a data communication system (141) for transferring, via said data communication path (140), said data transfer commands to said first data service means (130) and resultant hypertext page data or title data set contents to be stored in said acquired data storage means (122).

62. An information provider apparatus according to claim 61, further comprising hypervideo mail processing means (170) for processing hypervideo mail items each consisting of a hypervideo clip in combination with at least mail destination information, said hypertext data in said data storage means (131) further including hypervideo mail page data containing, for each of respective hypervideo mail items received by said hypervideo mail processing means, said mail destination information in conjunction with a hyperlink to the scenario reference data file of said mail item, said hypervideo mail processing means comprising:

temporary mail storage means, mail processing means (170) for receiving externally supplied hypervideo mail items, extracting said destination information from an externally supplied hypervideo mail item, transferring the subject matter data and scenario data contents of said hypervideo mail item to said data service means (130) to be stored in said data storage means as a title data set which is connected by a hyperlink to said mail page data, and updating said mail page data in accordance with said extracted destination information.

63. An information provider apparatus according to claim 62, wherein said hypervideo mail generating means (180), data input/output means 110 and information browsing means (120) in combination constitute a client terminal, and wherein said hypervideo mail processing means (170) and data service means (130) in combination constitute a mail server computer, said client terminal and mail server computer being mutually connected by said data communication path (140).

64. An information provider apparatus according to claim 63, comprising a plurality of said client terminals, each connected to said mail server computer by said data communication path (140) for mutually independently communicating with said mail server computer, said data communication path being configured as a network data communication path.

65. An information provider apparatus according to claim 64, comprising a plurality of local area networks, each of said local area networks comprising a plurality of said client terminals and a mail server computer mutually connected by a network data communication path (140), and an inter-network data communication path (194) connecting said plurality of local area networks, wherein said mail server computer of a local area network executes dedicated storage of data of hypervideo mail items having as destinations any of said client terminals of said local area network, wherein each of said mail server computers further comprises destination enquiry management means (179) for providing information specifying respective hypervideo mail item storage dedication relationships between said mail server computers and client terminals, and wherein an originating client terminal functions, prior to sending a hypervideo mail item to a destination client terminal, to obtain from said destination management means of the mail server computer of said originating client terminal, the identity of the dedicated mail server computer of said destination client terminal, and to then transmit said hypervideo mail item to said dedicated mail server computer.

66. An information provider apparatus according to claim 64, comprising a plurality of local area networks, each of said local area networks comprising a plurality of said client terminals and a mail server computer mutually connected by a network data communication path (140), and an inter-network data communication path (194') for mutually connecting said local area networks, said inter-network data communication path (194') having a transmission bandwidth sufficiently wide to enable real-time transfer of video data with continuous-motion display, wherein said mail server computer of a local area network executes dedicated receiving and storage of all hypervideo mail items transmitted by the client terminals of said local area network, and wherein said mail processing means (190) of each of said mail server computers further comprises table memory means for providing information specifying respective dedicated receiving and storage relationships between said client terminals and said mail server computers and means for judging that a received hypervideo mail item has as its destination a client terminal which is not within the local area network of said each mail server computer, transferring said hypervideo mail item to said data service means (130) to be stored in said first data storage means (131), generating a reference mail item including storage location information for said hypervideo mail item, and transmitting said reference mail item to the mail server computer of the local area network containing said client terminal which is the destination of said hypervideo mail item.

67. An information provider apparatus according to claim 64, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, with said inter-server data communication path extending through a wide-area data communication network, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, and means (197, 198) for judging whether a hypervideo mail item received from a client terminal of said local area network of the mail server computer has as its destination a client terminal located within another one of said local area networks, and, if so, obtaining from said mail destination information memory means (196) the mail server computer of the local area network of said destination client terminal, and transmitting said hypervideo mail item via said inter-server data communication path (1194) to said mail server computer of the destination client terminal.

68. An information provider apparatus according to claim 67, wherein said wide-area data communication network is the Internet.

69. An information provider apparatus according to claim 64, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, wherein in each of said mail server computers said hypervideo mail processing means (1195) is coupled to receive hypervideo mail items sent from other local area networks via said inter-server data communication path (1194) in addition to locally originated hypervideo mail items which are sent via said network data communication path (140) from client terminals of the local area network of said mail server computer, with said inter-server data communication path extending through a wide-area data communication network, and wherein said hypervideo mail processing means further comprises mail destination information memory means (196) providing information which specifies, for each of said client terminals, the mail server computer of the corresponding local area network, and means (1199, 1195a, 198) functioning, when a received locally originated hypervideo mail item is judged to have as its destination a client terminal within some other local area network, to supply said hypervideo mail item to said data service means (130) to be stored in said first data storage means (131), to generate a reference mail item containing the destination information and storage location information for said hypervideo mail item, and to transmit said reference mail item via said inter-server data communication path (1194) to the mail server computer of said destination client terminal, functioning, when a reference mail item is received via said inter-server data communication path (1194), to update said mail page data held in said first data storage means (131) in accordance with the contents of said reference mail item, functioning, when said reference mail item is selected by a user from a client terminal, by hyperlink selection from said mail page data, to generate and transmit to the originating mail server computer of said reference mail item, via said inter-server data communication path (1194), a request for transmission of the hypervideo mail item corresponding to said reference mail item, and functioning, when said corresponding hypervideo mail item is received via said inter-server data communication path (1194), to supply said hypervideo mail item to said data service means (130) to be stored in said first data storage means (131), connected by a hyperlink to said mail page data, and to update said mail page information in accordance with the destination information for said hypervideo mail item.

70. An information provider apparatus according to claim 69, wherein said wide-area data communication network is the Internet.

71. An information provider apparatus according to claim 64, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, with said inter-server data communication path extending through the Internet, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, means (197, 198) for judging whether a hypervideo mail item received from a client terminal of said local area network of the mail server computer has as its destination a client terminal located within another one of said local area networks, and, if so, obtaining from said mail destination information memory means (196) the name of the mail server computer of the local area network of said destination client terminal, and means for encoding said hypervideo mail item in the form of an electronic mail item and for transmitting a resultant encoded hypervideo mail item via said inter-server data communication path (1194) to said mail server computer by using a using a data communication protocol which is designed for exchange of electronic mail in a wide-area network, and wherein each of said mail server computers further comprises decoding means for decoding each said encoded hypervideo mail item, when received from said inter-server data communication path.

72. An information provider apparatus according to claim 71, wherein each said encoded hypervideo mail item is transmitted via the Internet by utilizing the Simple Mail Transfer Protocol (SMTP), and said encoding is executed using the Multipurpose Internet Mail Extensions code (MIME).

73. An information provider apparatus according to claim 64, comprising a plurality of local area networks, each of said local area networks comprising a plurality of said client terminals and a mail server computer mutually connected by a network data communication path (140), and an inter-server data communication path (1194) mutually connecting respective mail server computers of said local area networks, wherein in each of said mail server computers said hypervideo mail processing means (195) is coupled to receive hypervideo mail items sent from other local area networks via said inter-server data communication path (1194) in addition to hypervideo mail items sent via said network data communication path (140) from client terminals of the local area network of said mail server computer, and wherein said hypervideo mail processing means further comprises mail destination information memory means (196) providing information which specifies, for each of said client terminals, the mail server computer of the corresponding local area network, means (197, 198) for judging whether a hypervideo mail item received from a client terminal of said local area network of the mail server computer has as its destination a client terminal located within another one of said local area networks, and, if so, obtaining from said mail destination information memory means (196) the name of the mail server computer of the local area network of said destination client terminal, means for generating a reference mail item specifying at least the name of the destination client terminal of said hypervideo mail item, and for transmitting said reference mail item via said inter-server data communication path (1194) to said mail server computer of the local area network of said destination client terminal, means responsive to receiving a reference mail item from said inter-server data communication path (1194) for generating a request for transmission in encoded form of the hypervideo mail item corresponding to said reference mail item, and for transmitting said request via said inter-server data communication path (1194) to an originating mail server computer of said received reference mail item, and means responsive to receiving a request for transmission of a hypervideo mail item in encoded form for encoding said hypervideo mail item in the form of an electronic mail item code and for transmitting a resultant encoded hypervideo mail item via said inter-server data communication path (1194) to said mail server computer;

each of said mail server computers further comprising decoding means for decoding each said encoded hypervideo mail item, when received from said inter-server data communication path.

74. An information provider apparatus according to claim 73, wherein each said encoded hypervideo mail item is transmitted via the Internet by utilizing the Simple Mail Transfer Protocol (SMTP), and said encoding is executed using the Multipurpose Internet Mail Extensions code (MIME).

* * * * *